United States Patent [19]

Mitsuishi et al.

[11] Patent Number: 5,687,344

[45] Date of Patent: Nov. 11, 1997

[54] SINGLE-CHIP MICROCOMPUTER HAVING AN EXPANDABLE ADDRESS AREA

[75] Inventors: Naoki Mitsuishi, Kodaira; Shiro Baba, Higashimurayama; Hiromi Nagayama, Kodaira; Tsutomu Hayashi, Kodaira; Yukihide Hayakawa, Kodaira, all of Japan

[73] Assignee: Hitachi, Ltd., Tokyo, Japan

[21] Appl. No.: 583,763

[22] Filed: Jan. 10, 1996

Related U.S. Application Data

[63] Continuation of Ser. No. 877,890, Apr. 28, 1992, abandoned.

[30] Foreign Application Priority Data

May 8, 1991 [JP] Japan ................................ 3-132042
Feb. 27, 1992 [JP] Japan ................................ 4-076151

[51] Int. Cl.⁶ ............................. G06F 12/00; G06F 7/33
[52] U.S. Cl. ............................... 395/421.1; 395/412
[58] Field of Search ............................... 395/375, 800, 395/410, 412, 421.1, 413

[56] References Cited

U.S. PATENT DOCUMENTS

| | | | |
|---|---|---|---|
| 4,307,448 | 12/1981 | Sattler | 395/400 |
| 4,615,004 | 9/1986 | Chevillat et al. | 395/375 |
| 4,677,584 | 6/1987 | Steck | 364/784 |
| 4,758,945 | 7/1988 | Remedi | 395/750 |
| 4,916,606 | 4/1990 | Yamaoka et al. | 395/375 |
| 4,926,322 | 5/1990 | Stimac et al. | 395/500 |
| 4,991,086 | 2/1991 | Kojima | 395/375 |
| 5,109,226 | 4/1992 | MacLean | 395/750 |
| 5,142,621 | 8/1992 | Guttag et al. | 395/164 |
| 5,155,820 | 10/1992 | Gibson | 395/375 |
| 5,159,689 | 10/1992 | Shiraishi | 395/800 |
| 5,299,319 | 3/1994 | Vassiliadis et al. | 395/375 |

OTHER PUBLICATIONS

Hennessy & Patterson, Computer Architecture–A Quantitative Approach, 1990, pp. 97–98 & 149–150.
Intel Corporation, "Introduction to the 80386", 1985, pp. 2–1 thru 2–10.
Hitachi Single–Chip Microcomputer H8/330, HD6473308, HD6433308 Hardware Manual, First Edition, Dec. 1989, pp. 25–77 and 340. (Englih Version of Item Ni. 1 Above).
Hitachi Single–Chip Microcomputer H8/532, HD6475328, HD6435328 Hardware Manual, First Edition, Aug. 1989, pp. 23–73 and 90–105. (English Version of Item No. 3 Above).

*Primary Examiner*—Ayaz R. Sheikh
*Assistant Examiner*—Jeffrey K. Seto
*Attorney, Agent, or Firm*—Fay, Sharpe, Beall, Fagan, Minnich & McKee

[57] ABSTRACT

Expansion registers E0 to E7 are added to the existing general registers R0 to R7 built on-chip in an 8-bit CPU (1) so that all the registers including the added expansion registers may be grasped in its entirety as address data to access to a memory or the like. The address operation is executed at a unit including both the expansion register and the corresponding general register. All the registers including the expansion registers are grasped as one unit of address data to handle the carry or borrow caused in the address operation. Since the expansion registers have their applications limited to the generation of address, the number of kinds or combinations of executable instructions is reduced without inviting a serious reduction in the data processing ability thereby to suppress the increase in the logical and physical scales of the CPU. The register is given 32 bits in its entirety by adding the expansion register Ei of 16 bits to the general registers RiH and RiL of 16 bits of the 8-bit CPU. This register can be used in its entirety, by dividing it in half or by dividing it in quarters. As a result, the register can be used on software or hardware to reduce the logical and physical scales of the CPU. In respect of the latch of the address data using the register wholly or partially, moreover, the address space to be linearly used can be easily expanded.

17 Claims, 86 Drawing Sheets

FIG. 31

| INSTRUCTION (MNEMONIC) | OPERATION | FLAG | | | |
|---|---|---|---|---|---|
| | | N | Z | V | C |
| ADD.B #x:8, Rd | Rd8+#x:8→Rd8 | ↕ | ↕ | ↕ | ↕ |
| ADD.B Rs, Rd | Rd8+Rs8 →Rd8 | ↕ | ↕ | ↕ | ↕ |
| ADD.W #x:16, Rd | Rd16+#x:16→Rd16 | ↕ | ↕ | ↕ | ↕ |
| ADD.W Rs, Rd | Rd16+Rs16 →Rd16 | ↕ | ↕ | ↕ | ↕ |
| ADDC.B #x:8, Rd | Rd8+#x:8+C→Rd8 | ↕ | ↕ | ↕ | ↕ |
| ADDC.B Rs, Rd | Rd8+Rs8+C →Rd8 | ↕ | ↕ | ↕ | ↕ |
| ADDE.E #x:24, Rd | Ed:Rd16+#x:24 →Ed:Rd16 | — | — | — | — |
| ADDE.E Rs, Rd | Ed:Rd16+Es:Rs16 →Ed:Rd16 | — | — | — | — |
| SUB.B #x:8, Rd | Rd8-#x:8→Rd8 | ↕ | ↕ | ↕ | ↕ |
| SUB.B Rs, Rd | Rd8-Rs8 →Rd8 | ↕ | ↕ | ↕ | ↕ |
| SUB.W #x:16, Rd | Rd16-#x:16→Rd16 | ↕ | ↕ | ↕ | ↕ |
| SUB.W Rs, Rd | Rd16-Rs16 →Rd16 | ↕ | ↕ | ↕ | ↕ |
| SUBC.B #x:8, Rd | Rd8-#x:8-C→Rd8 | ↕ | ↕ | ↕ | ↕ |
| SUBC.B Rs, Rd | Rd8-Rs8-C →Rd8 | ↕ | ↕ | ↕ | ↕ |
| SUBE.E #x:24, Rd | Ed:Rd16-#x:24 →Ed:Rd16 | — | — | — | — |
| SUBE.E Rs, Rd | Ed:Rd16-Es:Rs16 →Ed:Rd16 | — | — | — | — |
| CMP.B #x:8, Rd | Rd8-#x:8 | ↕ | ↕ | ↕ | ↕ |
| CMP.B Rs, Rd | Rd8-Rs8 | ↕ | ↕ | ↕ | ↕ |
| CMP.W #x:16, Rd | Rd16-#x:16 | ↕ | ↕ | ↕ | ↕ |
| CMP.W Rs, Rd | Rd16-Rs16 | ↕ | ↕ | ↕ | ↕ |
| CMPE.E #x:24, Rd | Ed:Rd16-#x:24 | ↕ | ↕ | — | ↕ |
| CMPE.E Rs, Rd | Ed:Rd16-Es:Rs16 | ↕ | ↕ | — | ↕ |

FIG. 33

| BIT | 23 16 | 15 8 | 7 0 | |
|---|---|---|---|---|
| | E0 | R0H | R0L | |
| | E1 | R1H | R1L | |
| | E2 | R2H | R2L | |
| | E3 | R3H | R3L | |
| | E4 | R4H | R4L | |
| | E5 | R5H | R5L | |
| | E6 | R6H | R6L | |
| | E7 | R7H | R7L | |

| 23 | | | 0 |
|---|---|---|---|
| | PC | | |

CCR

| 7 | 3 | 2 | 1 | 0 |
|---|---|---|---|---|
| I | N | Z | V | C |

FIG. 36

|  | 31 15 | 23 | 15 7 | 0 | 7 | 0 |
|---|---|---|---|---|---|---|
|  |  | E0 | R0H | R0L |  |  |
|  |  | E1 | R1H | R1L |  |  |
|  |  | E2 | R2H | R2L |  |  |
|  |  | E3 | R3H | R3L |  |  |
|  |  | E4 | R4H | R4L |  |  |
|  |  | E5 | R5H | R5L |  |  |
|  |  | E6 | R6H | R6L |  |  |
|  |  | E7 | R7H | R7L |  |  |

| 23 | PC | 0 |
|---|---|---|

| | 7 | 3 | 2 | 1 | 0 |
|---|---|---|---|---|---|
| CCR | I | N | Z | V | C |

FIG. 44
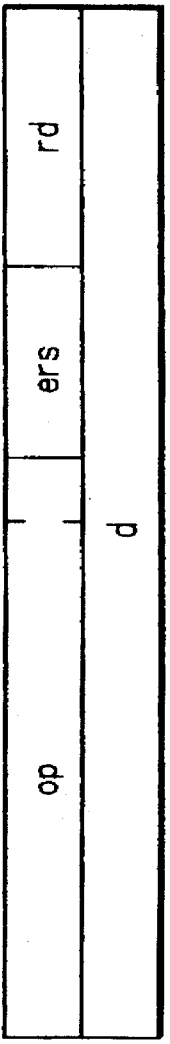
REGISTER INDIRECT WITH DISPLACEMENT
(DISPLACEMENT 16BITS, BYTE·WORD SIZE)
EX. MOV.W @ (d16, ERs), Rd
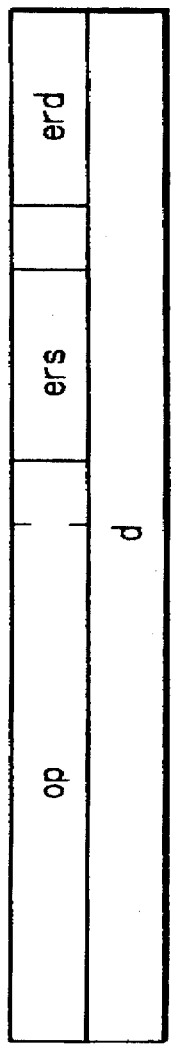
REGISTER INDIRECT WITH DISPLACEMENT
(DISPLACEMENT 16BITS, LONG WORD SIZE)
EX. MOV.L ERd, @ (d:16, ERs)

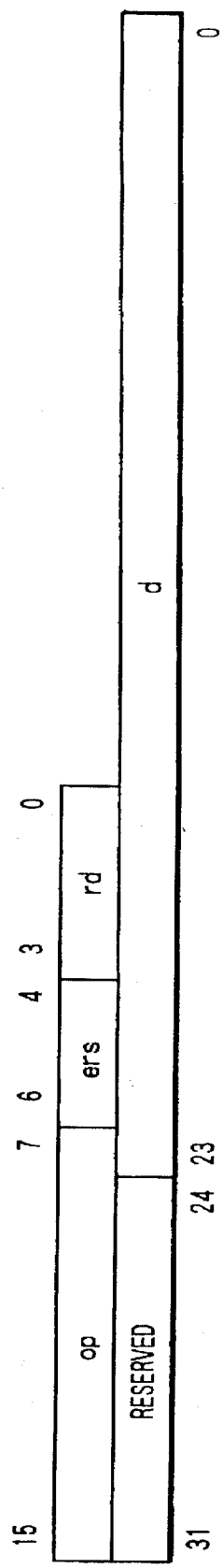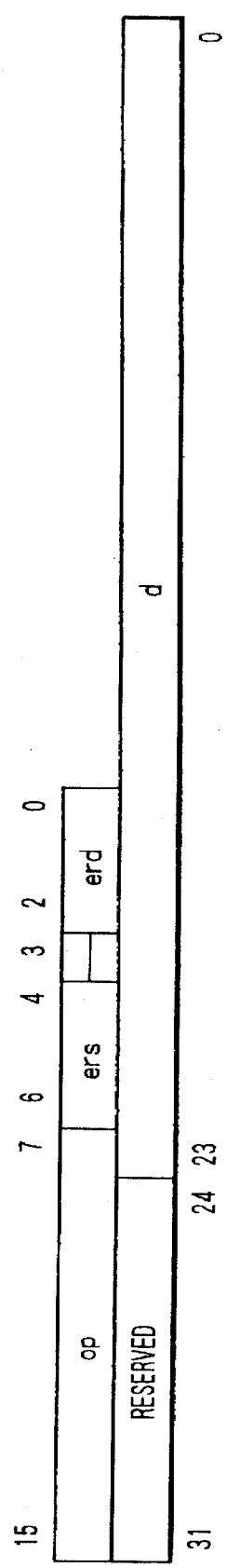
FIG. 45

FIG. 46
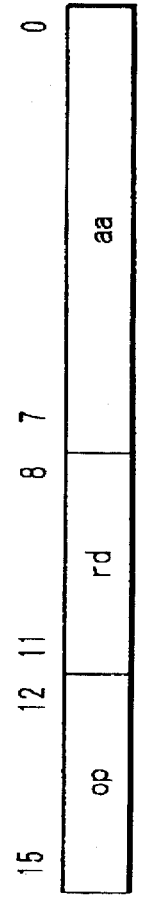
ABSOLUTE ADDRESS (ABSOLUTE ADDRESS 8BITS)
EX. MOV.B @ aa:8, Rd
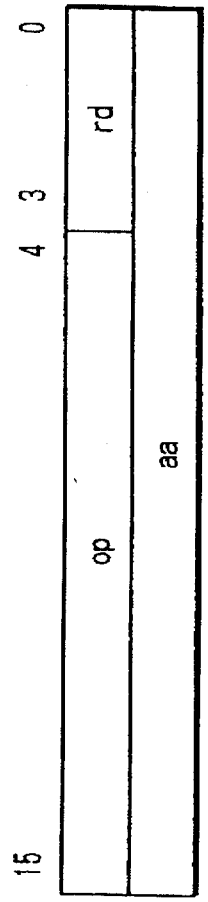
ABSOLUTE ADDRESS (ABSOLUTE ADDRESS 16BITS, BYTE·WORD SIZE)
EX. MOV.W @ aa:16, Rd
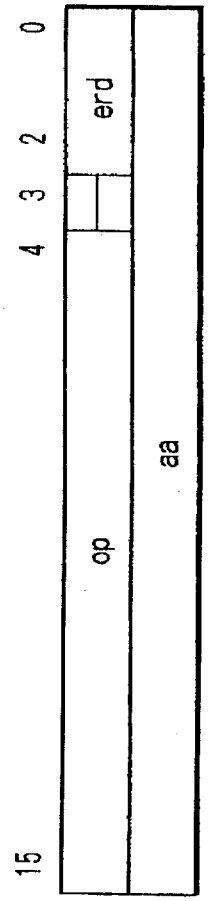
ABSOLUTE ADDRESS (ABSOLUTE ADDRESS 16BITS, LONG WORD SIZE)
EX. MOV.L ERd, @ aa FIG. 47
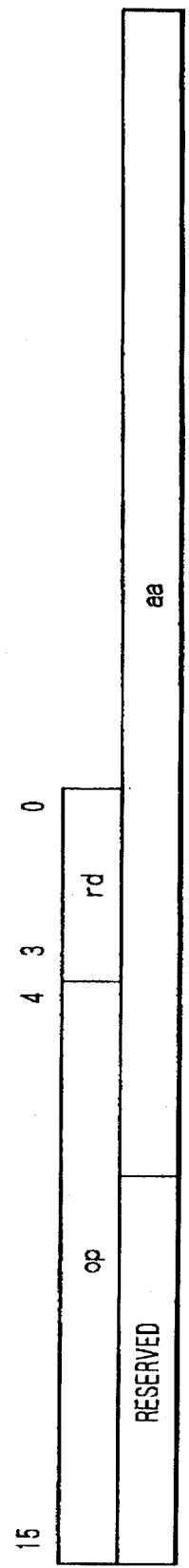
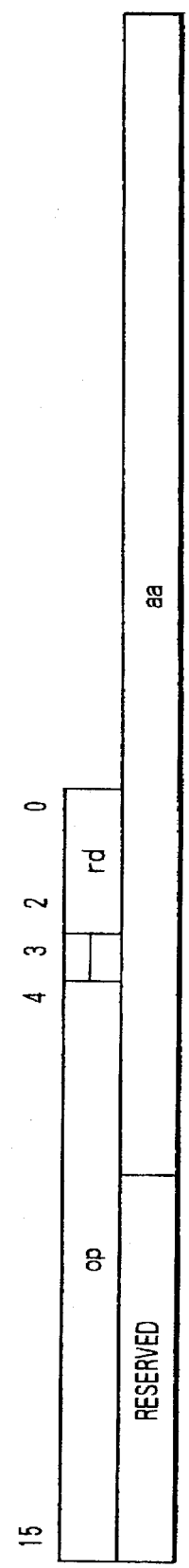

FIG. 48
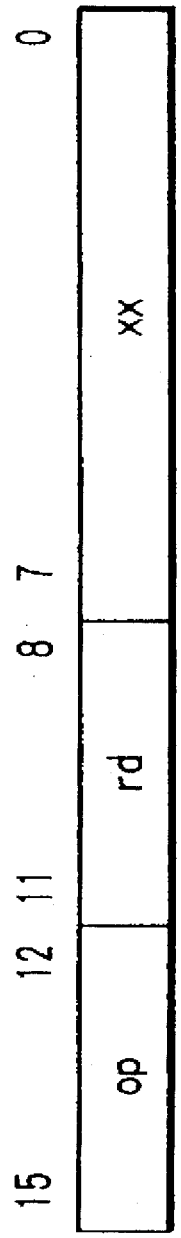
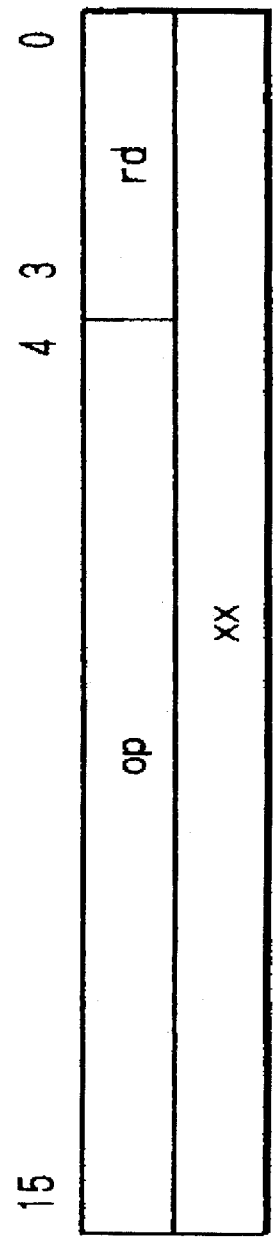
IMMIDIATE (IMMIDIATE 8BITS)
EX. ADD.B @ xx:8, Rd
IMMIDIATE (IMMIDIATE 16BITS)
EX. SUB.W @ xx:16, Rd

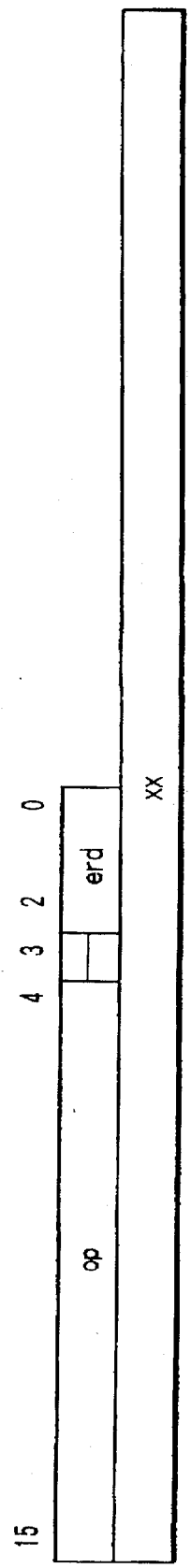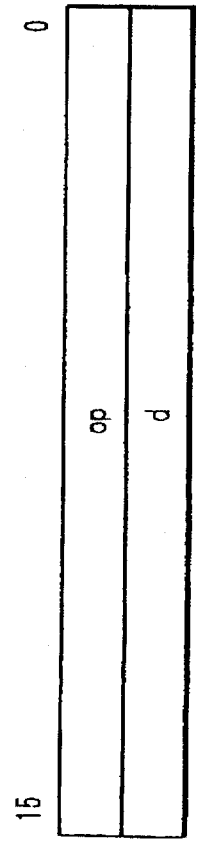
FIG. 49

FIG. 56

| INSTRUCTION (MNEMONIC) | OPERATION | FLAG | | | |
|---|---|---|---|---|---|
| | | N | Z | V | C |
| ADD.B #x:8, Rd | Rd8+#x:8→Rd8 | ↕ | ↕ | ↕ | ↕ |
| ADD.B Rs, Rd | Rd8+Rs8 →Rd8 | ↕ | ↕ | ↕ | ↕ |
| ADD.W #x:16, Rd | Rd16+#x:16→Rd16 | ↕ | ↕ | ↕ | ↕ |
| ADD.W Rs, Rd | Rd16+Rs16 →Rd16 | ↕ | ↕ | ↕ | ↕ |
| ADD.L #x:32, ERd | Ed:Rd16+#x:32 →Ed:Rd16 | ↕ | ↕ | ↕ | ↕ |
| ADD.L ERs, ERd | Ed:Rd16+Es:Rs16 →Ed:Rd16 | ↕ | ↕ | ↕ | ↕ |
| ADDC.B #x:8, Rd | Rd8+#x:8+C→Rd8 | ↕ | ↕ | ↕ | ↕ |
| ADDC.B Rs, Rd | Rd8+Rs8+C →Rd8 | ↕ | ↕ | ↕ | ↕ |
| SUB.B #x:8, Rd | Rd8-#x:8→Rd8 | ↕ | ↕ | ↕ | ↕ |
| SUB.B Rs, Rd | Rd8-Rs8 →Rd8 | ↕ | ↕ | ↕ | ↕ |
| SUB.W #x:16, Rd | Rd16-#x:16→Rd16 | ↕ | ↕ | ↕ | ↕ |
| SUB.W Rs, Rd | Rd16-Rs16 →Rd16 | ↕ | ↕ | ↕ | ↕ |
| SUB.L #x:32, ERd | Ed:Rd16-#x:32 →Ed:Rd16 | ↕ | ↕ | ↕ | ↕ |
| SUB.L ERs, ERd | Ed:Rd16-Es:Rs16 →Ed:Rd16 | ↕ | ↕ | ↕ | ↕ |
| SUBC.B #x:8, Rd | Rd8-#x:8-C→Rd8 | ↕ | ↕ | ↕ | ↕ |
| SUBC.B Rs, Rd | Rd8-Rs8-C →Rd8 | ↕ | ↕ | ↕ | ↕ |
| CMP.B #x:8, Rd | Rd8-#x:8 | ↕ | ↕ | ↕ | ↕ |
| CMP.B Rs, Rd | Rd8-Rs8 | ↕ | ↕ | ↕ | ↕ |
| CMP.W #x:16, Rd | Rd16-#x:16 | ↕ | ↕ | ↕ | ↕ |
| CMP.W Rs, Rd | Rd16-Rs16 | ↕ | ↕ | ↕ | ↕ |
| CMP.L #x:32, ERd | Ed:Rd16-#x:32 | ↕ | ↕ | ↕ | ↕ |
| CMP.L ERs, ERd | Ed:Rd16-Es:Rs16 | ↕ | ↕ | ↕ | ↕ |

FIG. 57

| | # | R | @R | @(d16,R) | @(d24,R) | @-R | @R+ | @a8 | @a16 | @a24 | @(d8,PC) | @(d16,PC) |
|---|---|---|---|---|---|---|---|---|---|---|---|---|
| DATA TRANSFER | BWL | BWL | BWL | BWL | BWL | BWL | BWL | B | BWL | BWL | - | - |
| ADDITION OR SUBTRACTION | BWL | BWL | - | - | - | - | - | - | - | - | - | - |
| ADDITION OR SUBTRACTION WITH CARRY OR BORROW | B | B | - | - | - | - | - | - | - | - | - | - |
| SIGN INVERTION | | BWL | - | - | - | - | - | - | - | - | - | - |
| INCREMENT / DECREMENT ±1 | | BWL | | | | | | | | | | |
| ±2 | | L | | | | | | | | | | |
| ±4 | | L | | | | | | | | | | |
| LOGIC OPERATIONS | BWL | BWL | - | - | - | - | - | - | - | - | - | - |
| SHIFT·ROTATE | | BWL | | | | | | | | | | |
| BIT MANIPULATION | | B | B | - | - | - | - | B | - | - | - | - |

FIG. 62

| REGISTER FIELD OF THE INSTRUCTION CODES | DATA REGISTER | | | ADDRESS REGISTER |
|---|---|---|---|---|
| | BYTE SIZE | WORD SIZE | LONG WORD SIZE | |
| 0000 | R0H | R0 | ER0 | ER0 |
| 0001 | R1H | R1 | ER1 | ER1 |
| 0010 | R2H | R2 | ER2 | ER2 |
| 0011 | R3H | R3 | ER3 | ER3 |
| 0100 | R4H | R4 | ER4 | ER4 |
| 0101 | R5H | R5 | ER5 | ER5 |
| 0110 | R6H | R6 | ER6 | ER6 |
| 0111 | R7H | R7 | ER7 | ER7 |
| 1000 | R0L | E0 | — | — |
| 1001 | R1L | E1 | — | — |
| 1010 | R2L | E2 | — | — |
| 1011 | R3L | E3 | — | — |
| 1100 | R4L | E4 | — | — |
| 1101 | R5L | E5 | — | — |
| 1110 | R6L | E6 | — | — |
| 1111 | R7L | E7 | — | — |

FIG. 78

| | VECTOR | SUB ROUTINE STACK | EXCEPTION-HANDLING STACK | @-R,@R+ RENEWAL OF EXPANSION REGISTER | MAXIMUM BIT NUMBER OF ADDRESS |
|---|---|---|---|---|---|
| MAXIMUM MODE | 4BYTE UNIT | 3BYTE+ 1BYTE (RESERVED) | 3BYTE+CCR | RENEW | 24BITS (16M BYTE) |
| MINIMUM MODE | 2BYTE UNIT | 2BYTE | 2BYTE+RESERVED+ CCR | NOT RENEW | 16BITS (64K BYTE) |

FIG. 79

| | | ADDRESS SPACE | BUS SIZE INITIAL VALUE/MAXIMUN VALUE | ADDRESS OUTPUT INITIAL VALUE/MAXIMUN VALUE |
|---|---|---|---|---|
| MODE 0 | TEST MODE | | | |
| MODE 1 | EXPAND MODE WITHOUT ON-CHIP ROM | 1M BYTE | 8BITS/16BITS | 20BITS/20BITS |
| MODE 2 | | 16M BYTE | 8BITS/16BITS | 24BITS/24BITS |
| MODE 3 | | 1M BYTE | 16BITS/16BITS | 20BITS/20BITS |
| MODE 4 | | 16M BYTE | 16BITS/16BITS | 24BITS/24BITS |
| MODE 5 | EXPAND MODE WITH ON-CHIP ROM | 16M BYTE | 8BITS/16BITS | 0BITS/24BITS |
| MODE 6 | | 64k BYTE | — | — |
| MODE 7 | SINGLE-CHIP MODE | 1M BYTE | — | — |

FIG. 80

| | COMMON PIN FUNCTION | MODE 1 MODE 3 | MODE 2 MODE 4 | MODE 5 | MODE 6 MODE 7 | SELECTION OF PIN FUNCTION IN SELECTABLE MODE |
|---|---|---|---|---|---|---|
| PORT 1 | A0~7 | A0 | | PI/AO | PIO | DEPENDING ON THE BIT SETTINGS IN THE DATA DIRECTION REGISTER PDDR OF EACH PORT INPUT : PI (INITIAL VALUE) OUTPUT : AO |
| PORT 2 | A8~15 | | | | | |
| PORT 3 | A16~19 | PIO | | | | |
| | A20~23 | DIO | AO | | | |
| PORT 4 | D8~15 | DIO | | | | |
| PORT 5 | D0~7 | DIO/PIO | | | | DEPENDING ON THE BIT SETTING IN THE BUS SIZE CONTROL REGISTER BSWCR ALL BITS 0 : PIO (MODE 1・2・5 INITIAL VALUE) EXCEPT ABOVE : DIO (MODE 3・4 INITIAL VALUE) |
| PORT 6 | AS, HRD, LRD HWR, LWR | SO | | | | |
| | WAIT | WI | | | | |
| PORT 7 | ES0~7 | SO/PI | | | | DEPENDING ON THE BIT SETTING IN THE DATA DIRECTION REGISTER OF THIS PORT INPUT : PI (INITIAL VALUE) OUTPUT : ES |

\* : IN MODES 1~4, INITIAL VALUE OF ES0 DESIGNATES A PIN FUNCTION AS AN OUTPUT PIN
A0 : ADDRESS OUTPUT PINS                    WI : WAIT SIGNAL INPUT PIN
DIO : DATA INPUT/OUTPUT PINS                PI : INPUT PORT          PIO : OUTPUT PORT
SO : STROBE SIGNAL OUTPUT PINS

FIG. 82

| | | BITS | BSWCR BUS SIZE SELECT (8/16 BITS) | ASTCR ACCESS STATE SELECT (2/3 STATES) | WSCER WSC ENABLE SELECT (ENEBLE/DISABLE) | MPXCR ADDRESS MULTIPLEX SELECT (MULTIPLEX/NON-MULTIPLEX) |
|---|---|---|---|---|---|---|
| H'000000 – H'1FFFFF | AREA 0 | 0 | BSWC0 | ASTC0 | WSCE0 | MPXC0 |
| H'200000 – H'3FFFFF | AREA 1 | 1 | BSWC1 | ASTC1 | WSCE1 | MPXC1 |
| H'400000 – H'5FFFFF | AREA 2 | 2 | BSWC2 | ASTC2 | WSCE2 | MPXC2 |
| H'600000 – H'7FFFFF | AREA 3 | 3 | BSWC3 | ASTC3 | WSCE3 | MPXC3 |
| H'800000 – H'9FFFFF | AREA 4 | 4 | BSWC4 | ASTC4 | WSCE4 | MPXC4 |
| H'A00000 – H'BFFFFF | AREA 5 | 5 | BSWC5 | ASTC5 | WSCE5 | MPXC5 |
| H'C00000 – H'DFFFFF | AREA 6 | 6 | BSWC6 | ASTC6 | WSCE6 | MPXC6 |
| H'E00000 – H'FFFFFF | AREA 7 | 7 | BSWC7 | ASTC7 | WSCE7 | MPXC7 |

FIG. 88

| SIZE | BUS SIZE | NO. OF STATES | A0 | CONTROL SIGNAL | READ 1ST T1 T2 Tw T3 | READ 2ND T1 T2 Tw T3 | CONTROL SIGNAL | WRITE 1ST T1 T2 Tw T3 | WRITE 2ND T1 T2 Tw T3 |
|---|---|---|---|---|---|---|---|---|---|
| B | 8 | 2 | * | RHH<br>RHL<br>RLH<br>RLL<br>WAIT | L - H H<br>L - L L<br>L - L L<br>L - L L<br>L - L L | - - - -<br>- - - -<br>- - - -<br>- - - -<br>- - - - | WHH<br>WHL<br>WLH<br>WLL<br>WAIT | L H - H<br>L - - -<br>L - - -<br>L - - -<br>L L - L | - - - -<br>- - - -<br>- - - -<br>- - - -<br>- - - - |
| B | 8 | 3 | * | RHH<br>RHL<br>RLH<br>RLL<br>WAIT | L - H H<br>L - L L<br>L - L L<br>L - L L<br>L - L H | - - - -<br>- - - -<br>- - - -<br>- - - -<br>- - - - | WHH<br>WHL<br>WLH<br>WLL<br>WAIT | L H H H L<br>L L L H H<br>L - - - -<br>L - - - -<br>L L L H L | - - - - -<br>- - - - -<br>- - - - -<br>- - - - -<br>- - - - - |
| B | 16 | 2 | 0 | RHH<br>RHL<br>RLH<br>RLL<br>WAIT | L - H H<br>L - H L<br>L - L H<br>L - L L<br>L - L L | - - - -<br>- - - -<br>- - - -<br>- - - -<br>- - - - | WHH<br>WHL<br>WLH<br>WLL<br>WAIT | L H - H<br>L H - L<br>L L - H<br>L L - L<br>L L - L | - - - -<br>- - - -<br>- - - -<br>- - - -<br>- - - - |

FIG. 89

| SIZE | BUS SIZE | NO. OF STATES | A0 | CONTROL SIGNAL | READ 1ST T1 T2 Tw T3 | READ 2ND T1 T2 Tw T3 | CONTROL SIGNAL | WRITE 1ST T1 T2 Tw T3 | WRITE 2ND T1 T2 Tw T3 |
|---|---|---|---|---|---|---|---|---|---|
| B | 16 | 2 | 1 | RHH<br>RHL<br>RLH<br>RLL<br>WAIT | L  - L L<br>L  - L L<br>L  - L H<br>L  - L H<br>L  - L L | - - - -<br>- - - -<br>- - - -<br>- - - -<br>- - - - | WHH<br>WHL<br>WLH<br>WLL<br>WAIT | L H - H L<br>L L - L L<br>L L - L L<br>L H - H L<br>L L - L L | - - - -<br>- - - -<br>- - - -<br>- - - -<br>- - - - |
| B | 16 | 3 | 0 | RHH<br>RHL<br>RLH<br>RLL<br>WAIT | L L L L L<br>L L L L L<br>L L L L L<br>H H H H L<br>L L L H L | - - - -<br>- - - -<br>- - - -<br>- - - -<br>- - - - | WHH<br>WHL<br>WLH<br>WLL<br>WAIT | L H H H L<br>L L L L L<br>L L L L L<br>L H H H L<br>L H H H L | - - - -<br>- - - -<br>- - - -<br>- - - -<br>- - - - |
| B | 16 | 3 | 1 | RHH<br>RHL<br>RLH<br>RLL<br>WAIT | L L L L L<br>L L L L L<br>L H H H L<br>L L L L L<br>L L L H L | - - - -<br>- - - -<br>- - - -<br>- - - -<br>- - - - | WHH<br>WHL<br>WLH<br>WLL<br>WAIT | L H H H L<br>L L L L L<br>L H H H L<br>L L L L L<br>L H H H L | - - - -<br>- - - -<br>- - - -<br>- - - -<br>- - - - |

FIG. 90

| SIZE | BUS SIZE | NO. OF STATES | A0 | CONTROL SIGNAL | READ | | | | WRITE | | | |
|---|---|---|---|---|---|---|---|---|---|---|---|---|
| | | | | | 1ST | | | 2ND | | 1ST | | 2ND |
| | | | | | T1 T2 Tw T3 | | T1 T2 Tw T3 | | T1 T2 Tw T3 | | T1 T2 Tw T3 | |
| W | 8 | 2 | * | RHH<br>RHL<br>RLH<br>RLL<br>WAIT | L  -  -  H<br>L  -  -  L<br>L  -  -  L<br>L  -  -  L<br>H  -  -  H | | L  -  -  L<br>L  -  -  H<br>L  -  -  L<br>L  -  -  L<br>H  -  -  H | | WHH<br>WHL<br>WLH<br>WLL<br>WAIT | LH  H  -  H<br>LH  H  -  H<br>L   L  -  L<br>L   L  -  L<br>H   H  -  H | LH  L  -  L<br>LH  L  -  L<br>L   LH -  H<br>L   LH -  H<br>H   H  -  L | |
| W | 8 | 3 | * | RHH<br>RHL<br>RLH<br>RLL<br>WAIT | L  L  L  H<br>L  L  L  L<br>L  L  L  L<br>L  L  L  L<br>H  H  H  H | | L  L  L  L<br>L  L  L  H<br>L  L  L  L<br>L  L  H  L<br>H  H  H  H | | WHH<br>WHL<br>WLH<br>WLL<br>WAIT | LH H H H<br>LH H H H<br>L  L L L<br>L  L L L<br>H  H H H | L L H H L<br>L L H H L<br>L L H H H<br>L L H H H<br>H H H H H | |

FIG. 91

| SIZE | BUS SIZE | NO. OF STATES | A0 | CONTROL SIGNAL | READ 1ST T1 T2 Tw T3 | READ 2ND T1 T2 Tw T3 | CONTROL SIGNAL | WRITE 1ST T1 T2 Tw T3 | WRITE 2ND T1 T2 Tw T3 |
|---|---|---|---|---|---|---|---|---|---|
| W | 16 | 2 | * | RHH<br>RHL<br>RLH<br>RLL<br>WAIT | L - - H<br>L - - L<br>L - - H<br>L - - L<br>L - - L | - - - -<br>- - - -<br>- - - -<br>- - - -<br>- - - - | WHH<br>WHL<br>WLH<br>WLL<br>WAIT | L H - H<br>L L - L<br>L L - H<br>L H - L<br>L - - L | - - - -<br>- - - -<br>- - - -<br>- - - -<br>- - - - |
| W | 16 | 3 | * | RHH<br>RHL<br>RLH<br>RLL<br>WAIT | L L - H<br>L L - L<br>L L - H<br>L L - L<br>L L H H | - - - -<br>- - - -<br>- - - -<br>- - - -<br>- - - - | WHH<br>WHL<br>WLH<br>WLL<br>WAIT | L H L H<br>L L L L<br>L L L H<br>L H L L<br>L H H L | - - - -<br>- - - -<br>- - - -<br>- - - -<br>- - - - |

5,687,344

1

SINGLE-CHIP MICROCOMPUTER HAVING AN EXPANDABLE ADDRESS AREA

This is a continuation of U.S. patent application Ser. No. 07/877,890, filed Apr. 28, 1992 now abandoned.

BACKGROUND OF THE INVENTION

The present invention relates to a data processing system and a microcomputer and, more particularly, to a technology which is effective when applied to a single-chip microcomputer and its central processing unit (i.e., CPU), for example.

The single-chip microcomputer is classified into microcomputers of 4 bits, 8 bits and 16 bits in accordance with the data lengths to be processed mainly by their central processing unit. Of these, the single-chip microcomputer of 8 bits is most frequently used at present, as packaged in a device for controls. Such 8-bit single-chip microcomputer is disclosed in "Hardware Manual of H8/330 HD6473808 HD6488808" issued in June, 1989 by Hitachi, Ltd.

The central processing unit (as will be shortly referred to as the "8-bit CPU") of the 8-bit single-chip microcomputer processes mainly the data length of 8 bits. Thus, the 8-bit CPU has a register or accumulator of 8-bit length and a register of 16 bits twice as long as 8 bits. This 8-bit CPU uses only the 8-bit or 16-bit register mainly for processing the data and the 16-bit register only as an address register for referring to the memory. The 16-bit register as such address register may be called an index register, a stack pointer or a program counter.

In the aforementioned 8-bit CPU, the minimum unit of instruction is set at 16 bits (or 2 bytes). In case, on the other hand, an instruction or 16-bit data is arranged in the memory, it is so restricted that it is arranged in a region of 2 bytes beginning from an even number. Moreover, the arithmetic instruction of the aforementioned 8-bit CPU is made possible only between the registers in the CPU so that the data arranged in the memory have to be processed in accordance with an arithmetic instruction after they have been once transferred to the register in the CPU. With such restriction, the internal structure of the CPU, especially the structure of a control unit for controlling the state of execution of the CPU is simplified to realize reductions in the logical/physical scales. The effect of the reductions in the logical/physical scales makes it possible to curtail the production cost. As a subsidiary effect, the operation speed can be improved. In other words, a relatively high processing performance can be realized at a relatively low production cost.

In the aforementioned 8 bit CPU, however, the address register has the 16-bit length so that the memory the CPU can refer to is 65,536 bytes ($=2^{16}$ bytes, i.e., 64 Kilobytes). In the application of the device-packaged controls using the 8-bit single-chip microcomputer, on the contrary, programs or data of large capacity have to be processed because of the high performance of the device.

For this requirement, the following CPU can refer to the memory of 64 Kilobytes or more while retaining the advantages of realizing the reduction in the aforementioned logical/physical scale of the CPU and the relatively high processing performance at the relatively low production cost.

The single-chip microcomputer, which is given a referable memory of 16777216 bytes ($=2^{24}$ bytes, i.e., 16 Megabytes) by adding a page register of 8 bits to the 8-bit CPU and by generating addresses by combining it with the 16-bit register, is disclosed in "Hardware Manual H8/532

2

HD6475328 HD6485328" issued in December, 1988 by Hitachi, Ltd. According to this memory referring method, the hardware realizing method is simplified because the page register and the address register are completely independent, but neither carry nor borrow is propagated between the page register and the address register. In case a program or compiler is to be made, care should always be taken so that a group of programs or data may not exceed the page boundary. Specifically, if an Instruction Is executed from a 0 address in the above example, then the program counter is at first H'0000 (wherein H' Indicates a hexadecimal number), and the corresponding page register (as may be referred to as the "code page register") Is H'00. If an arithmetic instruction Is continuously executed without any branch instruction and if a next instruction is then to be executed after an address of 65535 (H'FFFF) has been reached, the program counter overflows by taking H'FFFF → H'0000. The carry at this time is not propagated to the code page register so that the next instruction is returned to the 0 address. Thus, the program Is divided not to exceed 64 Kilobytes, and these divided programs are assigned to different pages. In case the execution is shifted from a program existing in one page to a program in another page, an inter-page branch instruction has to be used. Specifically, in case the branch instruction is used in a program, the In-page branch instruction and the inter-page branch Instruction have to be separately used while being conscious of whether the destination is present In the common page or another page. The has also be so divided and managed as to below 64 Kilobytes. Specifically, in case the contents of the address register are to be updated for each access to the memory as in the so-called "post-increment register indirect mode", no carry is propagated to the corresponding page register (as will be referred to the "data page register") even if the address register overflows as above. In case, on the other hand, the 16-bit displacement is used in the register Indirect with the displacement, the carry or borrow, if any, will not be propagated to the page register by adding the 16-bit displacement is added to the 16-bit address register, so that the result of addition of 16 bits and the page register are combined to generate an address. In other words, the resultant address is H'003FFF in case: the page register is H'00; the address register is H'FFF; and the displacement is H'4000. In the address expanding technology using the page register, therefore, the substantially usable addressing mode is also restricted.

The management of the page register noticing that the program or data should not exceed the page boundary exerts serious restrictions when the compiler is to be formed for automatically transforming the content programmed with the so-called "high-level languages" into the program (i.e., object program) using the so-called "machine languages" so that the design efficiency of the compiler is seriously degraded. Moreover, the scale of the object program to be made is seriously enlarged to drop the execution time of the program.

For applications sufficed by the memory space of 64 Kilobytes or less, moreover, the aforementioned page register cannot be used as the data register to invite logical and physical wastefulness, to the contrary of an object to realize a relatively high processing performance at the aforementioned relatively low production cost.

On the contrary, the 16-bit CPU, as disclosed in "Hitachi 16-Bit Microprocessor HD641016" issued in September, 1987 by Hitachi. Ltd., can use a continuous address space of 16 Megabytes but has a far higher function in the entire CPU, as has a 32-bit register mainly for the data processing, so that the logical scale and the physical scale such as the chip occupying area. As a result, a peripheral function such as a timer necessary in the system structure for the device control application cannot be packaged in one chip together with the aforementioned 16 bit CPU, nor can be packaged a memory of sufficient storage capacity. Thus, we have found a problem that it is difficult to realize the so-called "single-chip microcomputer" by performing the on-chip of a desired system for the device control applications.

SUMMARY OF THE INVENTION

An object of the present invention is to provide a data processing system, which can expand a continuously usable address space while minimizing the increase in the logical and physical scale, that is which can use an address space of 64 Kilobytes or more continuously by using an 8-bit CPU.

Another object of the present invention is to provide a data processing system which can not only use a continuing relatively wide address space without increasing the kinds of instructions relatively drastically but also support relatively various addressing modes matching the area of said address space.

In addition to the aforementioned objects, the present invention has an object to provide a data processing system which can efficiently execute a program prepared of high-level languages.

The foregoing and other objects and novel features of the present invention will become apparent from the following description to be made with reference to the accompanying drawings.

The representatives of the invention to be disclosed will be briefly summarized in the following.

Specifically, the central processing unit (CPU) is provided with predetermined bit number data latch means which is to be used wholly for latching address data and partially for latching data. For example, a memory or the like can be accessed to by adding an address-specified expansion register to an existing 16-bit register packaged In the 8-bit CPU and by grasping the entirety containing the added expansion register as the address data. At this time, the address arithmetic operation is accomplished at a unit of both the expansion register and the corresponding register, and such register is updated together with the aforementioned expansion register when the address data are to be latched. In other words, the entirety including the expansion register grasps the data of one unit to process the carry and borrow which are established in the address arithmetic operation.

In view of the difference between the functions when the aforementioned data latch means is utilized wholly and partially, both the data transfer control for totalizing the entirety of the data latch means and the data transfer control for totalizing the aforementioned portion of the data latch means are made possible. For the arithmetic means, too, there should be accomplished both the arithmetic operation (which may include the shift arithmetic) of the address data by making use of the aforementioned entirety of the aforementioned arithmetic means and the arithmetic and logical operations of the data by making use of the portion of the aforementioned data latch means. For making this address arithmetic operation efficient, the arithmetic means may have an arithmetic bit number capable of executing in a unit machine cycle the arithmetic operation of the entirety of the aforementioned data latch means but need not process the carry or borrow, which are caused in the arithmetic operation of the address data wholly grasped, in another cycle.

A linear address space is expanded by adopting the aforementioned data latch means, as will be described hereinafter. When the addressing mode is then diversified, the combinations of the addressing modes and the instructions are necessarily increased in accordance with the diversity. At this time, in order to suppress the increase in the logical and physical scales of the control means to the minimum even with the increase in the combinations and to prevent the data processing ability from decreasing drastically, it is advisable to disable the aforementioned data latch means and the outside of the data processing system directly in response to one instruction. At this time, the bit operation of a control register by the peripheral circuit had better be executed directly in response to one instruction.

According to the means thus far described, the use of the entirety of the data latch means is restricted to the address data, the bit number of which is expanded more than that of a portion of the data latch means used for latching other data thereby to expand a linearly usable address space. This linear expansion of the address space makes it possible to modify the various address better than the conventional address space expanding technology using the page register thereby to support the relatively various addressing modes in a manner to match the area of the address space. At this time, moreover, the use of the entirety of the aforementioned data latch means has its application restricted to the address generation. This restriction suppresses the increase in the logical and physical scales of the CPU so that the single-chip microcomputer having the peripheral functions and memories necessary for the system structure can be easily realized.

As the register of the CPU, there is adopted data latch means for latching parallel data of a predetermined bit number. This data latch means is used wholly for latching the data, halved one or twice, or used wholly or partially for latching the address data. For example, the register totally of 32 bits, which is prepared by adding an expansion register of 16 bits to a general register of 16 bits of a CPU of 8 bits, is used wholly or partially as the address register or can be used after having been halved into a data register of 16 bits or after having been further halved into a register of 8 bits.

In order to improve the program efficiency by shortening the instruction length when the arithmetic instruction of n-bit data and the arithmetic instruction of 2n-bit data are considered, each of the data latch means may be constructed of the portion, which is used by halving the entirety, and the portion which is used by further halving the half, and the aforementioned data latch means of a plurality of units may be provided to equalize the total number of the portion, which is halved before use, to the total number of the portion which is further halved before use. For example, a plurality of registers totally of 32 bits are provided to equalize the number of the portion usable as the 8-bit register to the number of the portion usable as the 16-bit register.

The unit of an instruction can be made twice as long as that of the data. When the register of the CPU is expanded to 32 bits, for example, the 24-bit absolute address displacement is set to 4 bytes including a preserved region by using the instruction length at the unit of 2 bytes, if the future use of the address space of 4 Gigabytes is considered. Moreover, in order to simplify the structures of the execution means and the control means thereby to make a contribution to the reduction in the logical and physical scales, the least significant bit of the effective address specifying unit in the instruction code is desirably that of the word in the instruction code.

In order to reduce the logical and physical scales of the select circuit for the aforementioned data hold means such as the register, the portion for specifying the data latch means is advisable to adopt the instruction format which is fixed at a portion in the instruction unit. In this case, moreover, the aforementioned specifying portion may be formed of the region for specifying the desired data latch means from the plurality of units and the region for specifying any portion in one data latch means. At this time, the control means can be based on the data size specified in the instruction to determine not only which of the halved portions is to be specified by the region for specifying any portion in the aforementioned data latch means but also which of the further halved portions is to be specified.

In order to simplify the structure of the write buffer means from the data latch means or the like thereby to reduce the logical and physical scales of the data processing system, said write buffer means may be provided with a first portion having a bit number equal to that of the aforementioned data latch means and a second portion having a bit number equal to that of the halved region of the aforementioned data latch means so that the contents of the data latch means may be stored in said first portion on the basis of a data write instruction whereas the data stored in the first portion may be twice transferred and outputted to the second portion. If the data latch means is of 32 bits, for example, the write buffer means is composed of the first portion of 32 bits and the second portion of 18 bits.

In order to simplify the structure of the read buffer means to the data latch means and to reduce the logical and physical scales of the data processing system, the read buffer means wholly has a bit number equal to that of the aforementioned data latch means and is halved to more and less significant portions, of which the less significant side is always stored with the read data when in the read operation and the more significant side is specified whether or not it is to be stored. For example, the read buffer means is composed of a master stage of 32 bits and a slave stage of 32 bits so that the less significant 16 bits may always be inputted when in the read operation whereas the more significant side may be inhibited to input when in the less significant word read operation of the long-word data. Thus, the effective address specifying unit of 24 bits in the instruction code and the long-word data can be similarly processed.

In order to reduce the logical and physical scales of the whole microcomputer in the view point for the bus access, the address space is formed with a region for accesses in a state of different bus widths, and the control of the read/write operations is accomplished by a common bus control system if there is a read/write data transfer unit in addition to the CPU. And, the bus control unit controls the read buffer means and the write buffer means of the CPU or another data transfer unit. If necessary, the CPU or the data transfer unit is held in standby state. According to the means thus far described, the data latch means, which is composed of 32 bits in its entirety by adding the expansion data of 16 bits to the general register of 16 bits of the CPU of 8 bits, can be either used wholly or halved or further halved before use. This structure improves the utility of the data latch means on the software or hardware and further achieves the reduction in the logical and physical scales of the data processing system. In respect of the latch of the address data using the entirety or portion of the data latch means, on the other hand, the expansion of the linearly usable address space is facilitated, and the preparation and compile of the program are made easier than that of the address space expanding technology using the page register.

BRIEF DESCRIPTION OF THE DRAWINGS

FIG. 31 is an explanatory diagram showing the arithmetic operation instructions which can be executed by the aforementioned CPU 1;

FIG. 36 is an explanatory diagram showing a CPU according to one embodiment of the data processing system of the present invention;

FIG. 38 is an explanatory diagram showing one example of the data structure which is managed by the CPU;

FIG. 44 is an explanatory diagram showing still another instruction format of the CPU;

FIG. 45 is an explanatory diagram showing a further instruction format of the CPU;

FIG. 46 is an explanatory diagram showing a further instruction format of the CPU;

FIG. 47 is an explanatory diagram showing a further instruction format of the CPU;

FIG. 48 is an explanatory diagram showing a further instruction format of the CPU;

FIG. 49 is an explanatory diagram showing a remaining portion of the instruction format of the CPU;

FIG. 56 is an explanatory diagram showing arithmetic operation instructions of the CPU;

FIG. 57 is an explanatory diagram showing the combinations of the instructions and addressing modes of the CPU;

FIG. 62 is an explanatory diagram showing the specified modes of the registers;

FIG. 78 is an explanatory diagram showing the operations of the CPU in individual modes;

FIG. 79 is an explanatory diagram showing the operation modes of the single-chip microcomputer;

FIG. 80 is an explanatory diagram showing the terminal functions of the single-chip microcomputer;

FIG. 82 is an address map of a CPU in the single-chip microcomputer of FIG. 81;

FIG. 88 is an explanatory diagram showing one example of the operation of the bus controller;

FIG. 89 is an explanatory diagram showing another example of the operation of the bus controller;

FIG. 90 is an explanatory diagram showing still another example of the operation of the bus controller;

FIG. 91 is an explanatory diagram showing a further example of the operation of the bus controller.

DESCRIPTION OF THE PREFERRED EMBODIMENTS

Figure 1:
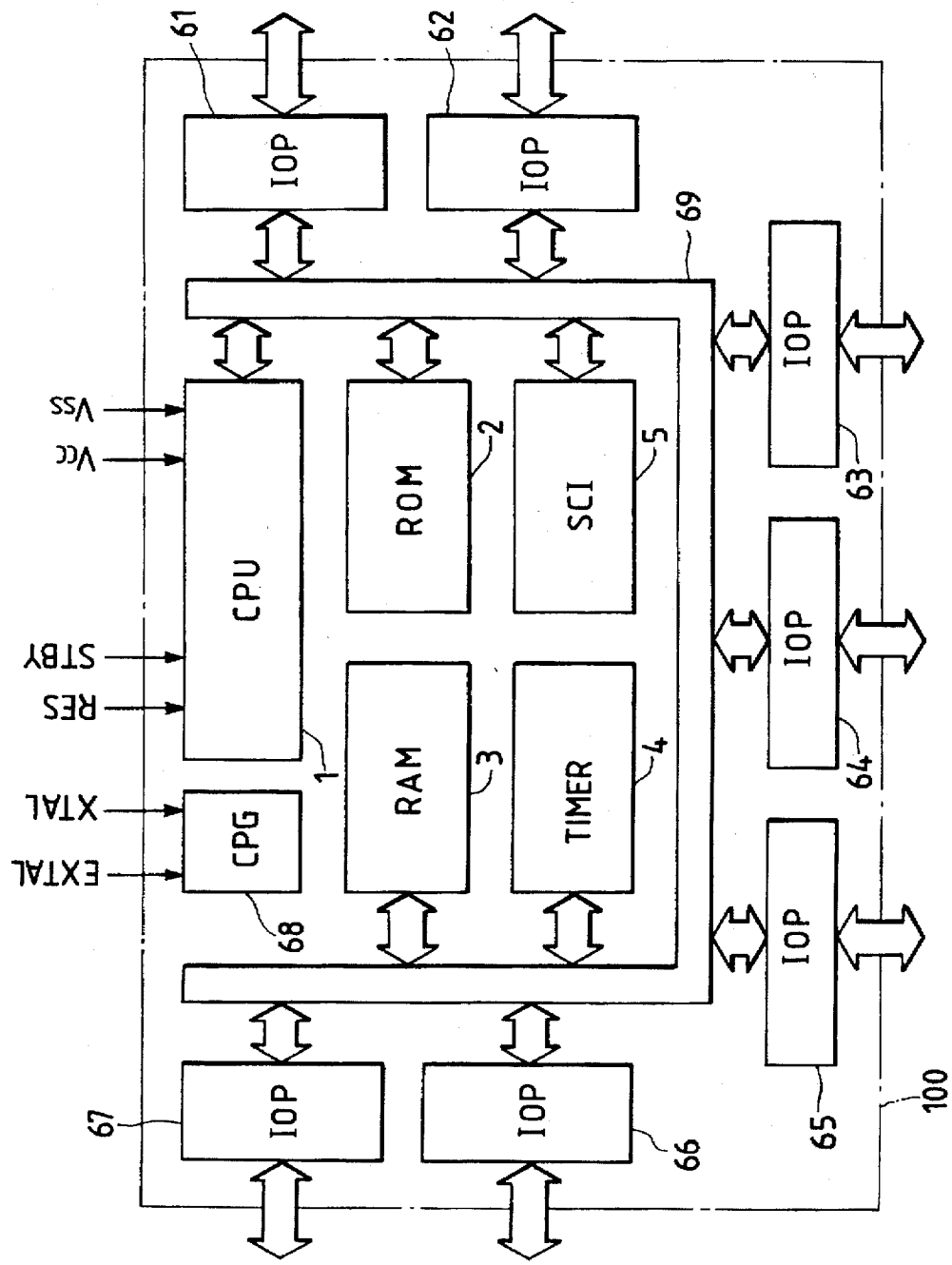
FIG. 1 is a block diagram showing a single-chip microcomputer of one embodiment of the data processing system according to the present invention.

The single-chip microcomputer of the present invention will be described in the following in connection with one embodiment thereof with reference to FIGS. 1 to FIG. 1 shows a single-chip microcomputer exemplifying the microcomputer according to the present invention.

The aforementioned single-chip microcomputer 100 is constructed of function blocks including: a CPU (i.e., Central Processing Unit) 1 for overall controls; a ROM (I.e., Read Only Memory) 2 for storing the operation programs or the like of the CPU 1; a RAM (i.e., Random Access Memory) 3 to be used as the working area of the CPU 1 and as the temporary storage area of data; a timer 4; a serial communication interface (SCI) 5; a clock pulse generator 68; and input/output ports (IOP) 61 to 67. These function blocks are mutually connected by an internal bus 69. This internal bus 69 includes an address bus, a data bus and a control bus, although not especially limitative thereto. Such single-chip microcomputer 100 is formed over one semiconductor substrate such as a silicon substrate by the well-known semiconductor integrated circuit manufacture technology.

The single-chip microcomputer 100 operates in synchronism with a reference clock generated on the basis of the external clock which is inputted either from a crystal oscillator connected with the terminal XTAL and EXTAL of a clock pulse generator CPG or from the outside. This reference clock has the minimum unit called "state". Incidentally, reference letters Vss and Vcc appearing in the Drawing designate power terminals.

When a reset signal RES is fed to the aforementioned CPU 1, the single-chip microcomputer 100 is reset. When this reset state is released, the CPU 1 reads a start address to execute a reset excepting procedure for starting the read of an instruction from the start address. This start address is assumed to be stored at a zero address, although not especially limitative thereto. After this, the CPU 1 sequentially read and decodes instructions from the ROM 2 to either process the data or transfer the data with the RAM 8, the timer 4, the SCI 5 and input/output ports 61 to 67 on the basis of the decoded result, although not especially limitative thereto. Specifically, the CPU 1 processes on the basis of the instruction stored in the ROM 2 with reference to either the data inputted from the input/output ports 61 to 67 or the instruction Inputted from the SCI 5, and uses the input/output ports 61 to 67 and the timer 4 in accordance with the result to output signals to the outside thereby to control a variety of devices. The read/write of the aforementioned ROM 2, RAM 3 and timer 4 are assumed to be executed in two states of bytes (e.g., 8 bits)/word (e.g., 16 bits), although not especially limitative.

Figure 2:
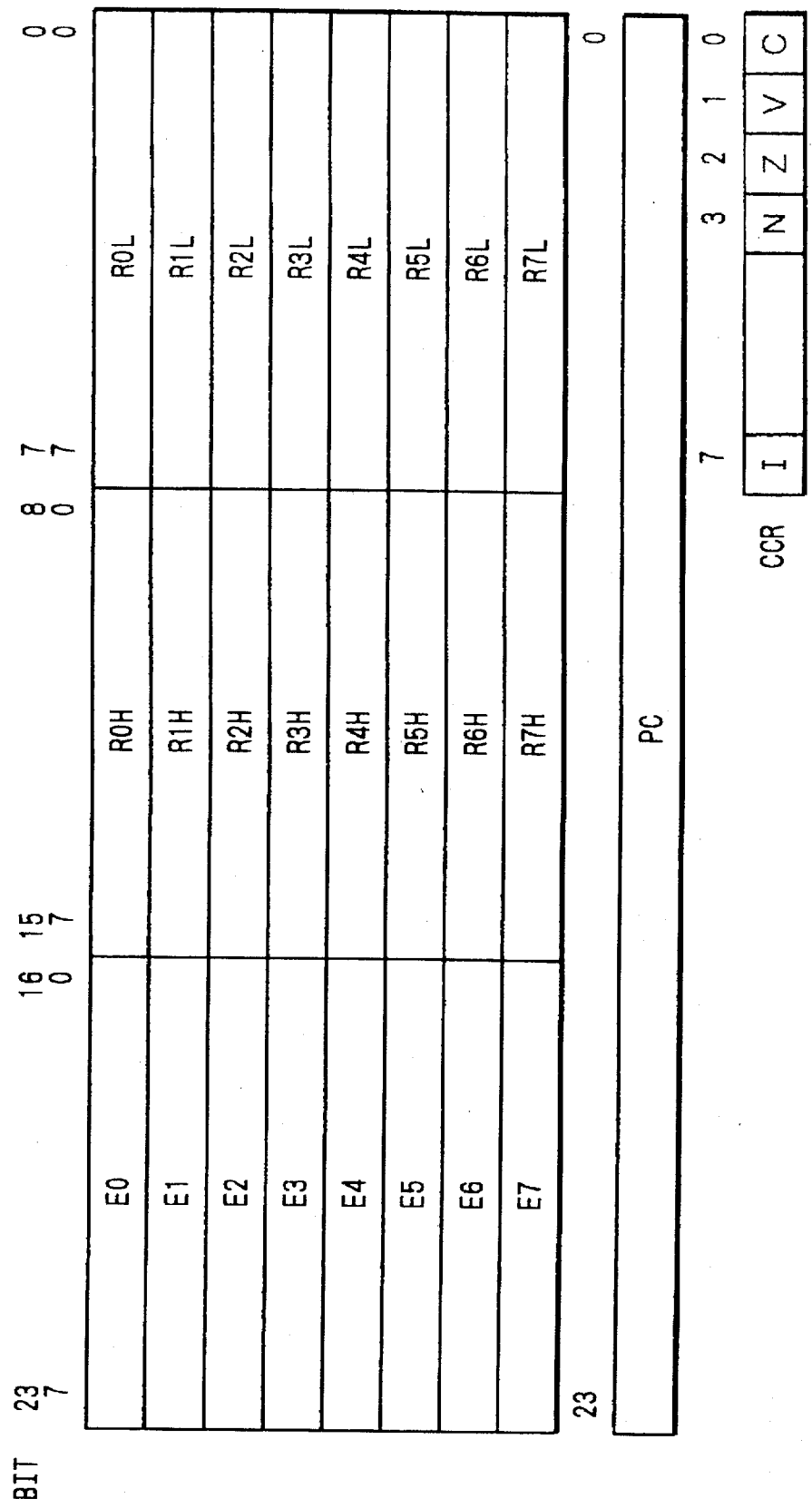
FIG. 2 is an explanatory diagram showing a first structural example of an on-chip register of a CPU 1.

FIG. 2 shows a first example of the structure of a on-chip register of the CPU 1. This CPU 1 is constructed to include: eight general registers R0L and R0H to R7L and R7H each having a length of 16 bits; eight expansion registers E0 to E7 each having a length of 8 bits; a program counter PC having a length of 24 bits; and a condition code register CCR having a length of 8 bits. The general registers R0L and R0H to R7L and R7H can store not only data having a length of 8 bits independently of the more and less significant 8 bits and but also data having a length of 16 bits jointly of the more and less significant 8 bits.

In case the general registers R0L and R0H to R7L and R7H are used as address registers, addresses of totally 24 bits are generated by setting the 16 bits owned by the general registers as the less significant 16 bits of the address and by setting the 8 bits owned by the corresponding expansion register as the more significant 8 bits. In other words, the CPU 1 can utilize the continuous address space which is specified by the address of 24th bit at the maximum. Moreover, the CPU 1 can modify the address of 24th bit in various modes. For example, the CPU 1 add a displacement to the aforementioned 24th bit address, multiply it by a constant number, or add the contents of another register. If, in this modification, a carry or borrow takes place in the calculation of the less significant 16 bits, the more significant 8 bits are carried or borrowed. Simultaneously as this result is latched in the address register, the result of the more significant 8 bits is also latched in the corresponding expansion register.

The expansion registers E0 to E7 are so specified for use as the address registers that they cannot be used as the data registers. These expansion registers E0 to E7 have their operations limited not especially to any but to the load/store case, in which the expansion registers are combined with the expansion registers, and the case, in which the data are transferred between the expansion registers and the general registers. Thus, the expansion registers cannot be operated independently of the general registers. These limits are realized by the control unit for decoding the instruction to be executed by the CPU 1 thereby to generate the control signals.

A program counter PC is a counter of 24 bits and indicate the addresses of instructions to be executed next by the CPU 1. The condition code register CCR includes: an interrupt mask bit (I), a carry flag (C), a zero flag (Z), a negative flag (N) and an overflow flag (V). The interrupt mask bit inhibits an interruption of the CPU 1, when at 1, and allows the interruption when at 0. The remaining flags reflect the operation result.

Figure 3:
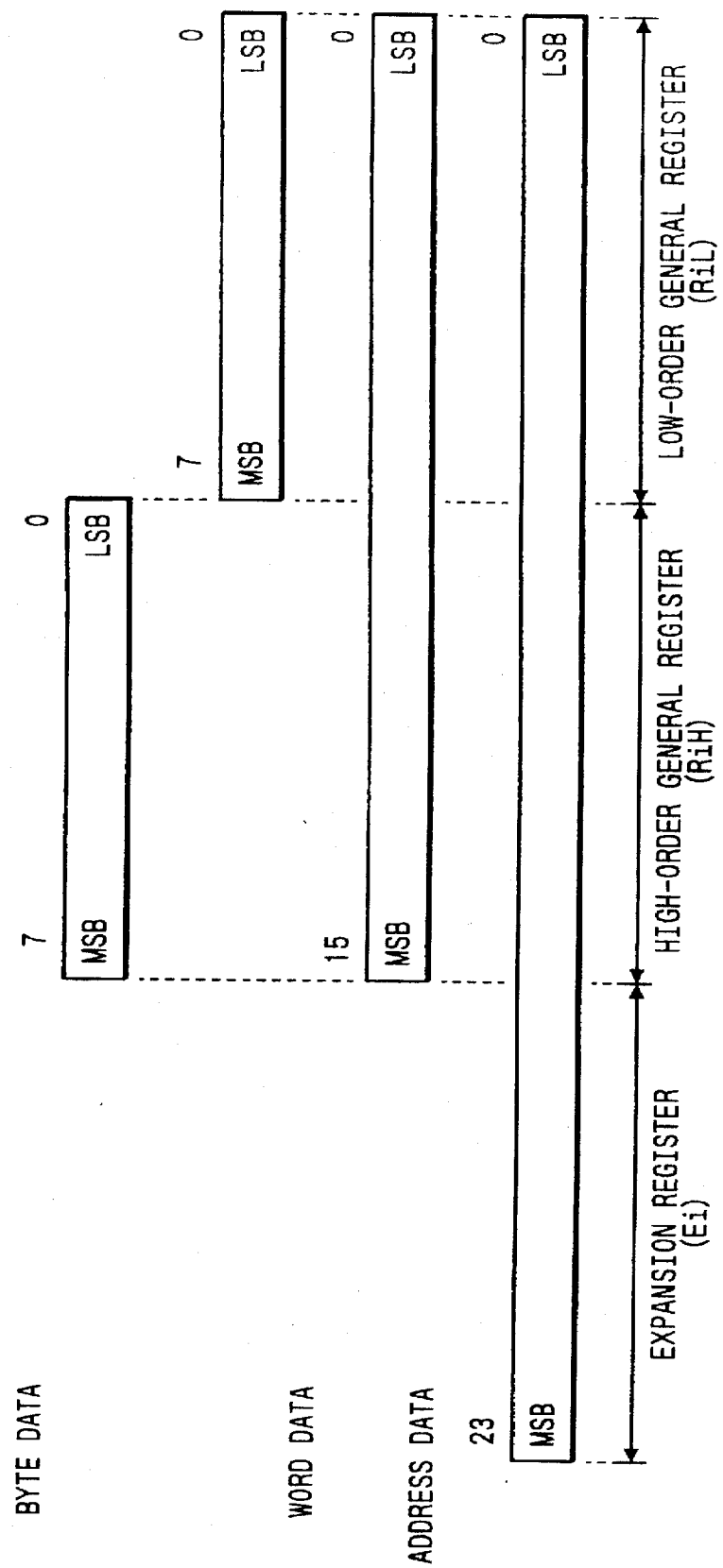
FIG. 3 is an explanatory diagram showing a data structural example of general registers R0L and R0H to R7L and R7H and expansion registers E0 to E7.

FIG. 3 shows an example of the data structures of the general registers R0L and R0H to R7L and R7H and the expansion registers E0 to E7. The byte data handled by the CPU 1 is stored in a high-order register RiH (i=1, 2, - - -, and 7) and a low-order general register RiL. In case the high-order general register RiH is used, the 15th bit corresponds to the most significant bit (MSB), and the 8th bit corresponds the least significant bit (LSB). Likewise, the 7th bit corresponds to the most significant bit, and the 0th bit corresponds to the least significant bit in case the low-order general register RiL. The word data are stored in the general registers RiL and RiH. The 15th bit corresponds to the most significant bit of the data, and the 0th bit corresponds to the least significant bit. The address data is stored in an expansion register Ei and the general registers RiL and RiH. The 7th bit of the expansion register Ei corresponds to the most significant bit of the address data, and the 0th bit of the general register RiL corresponds to the least significant bit.

Additionally, the CPU 1 handles 1-bit data or binary coded decimal data, which will not be described in detail because they have no direct relation to the present invention.

Figure 4:
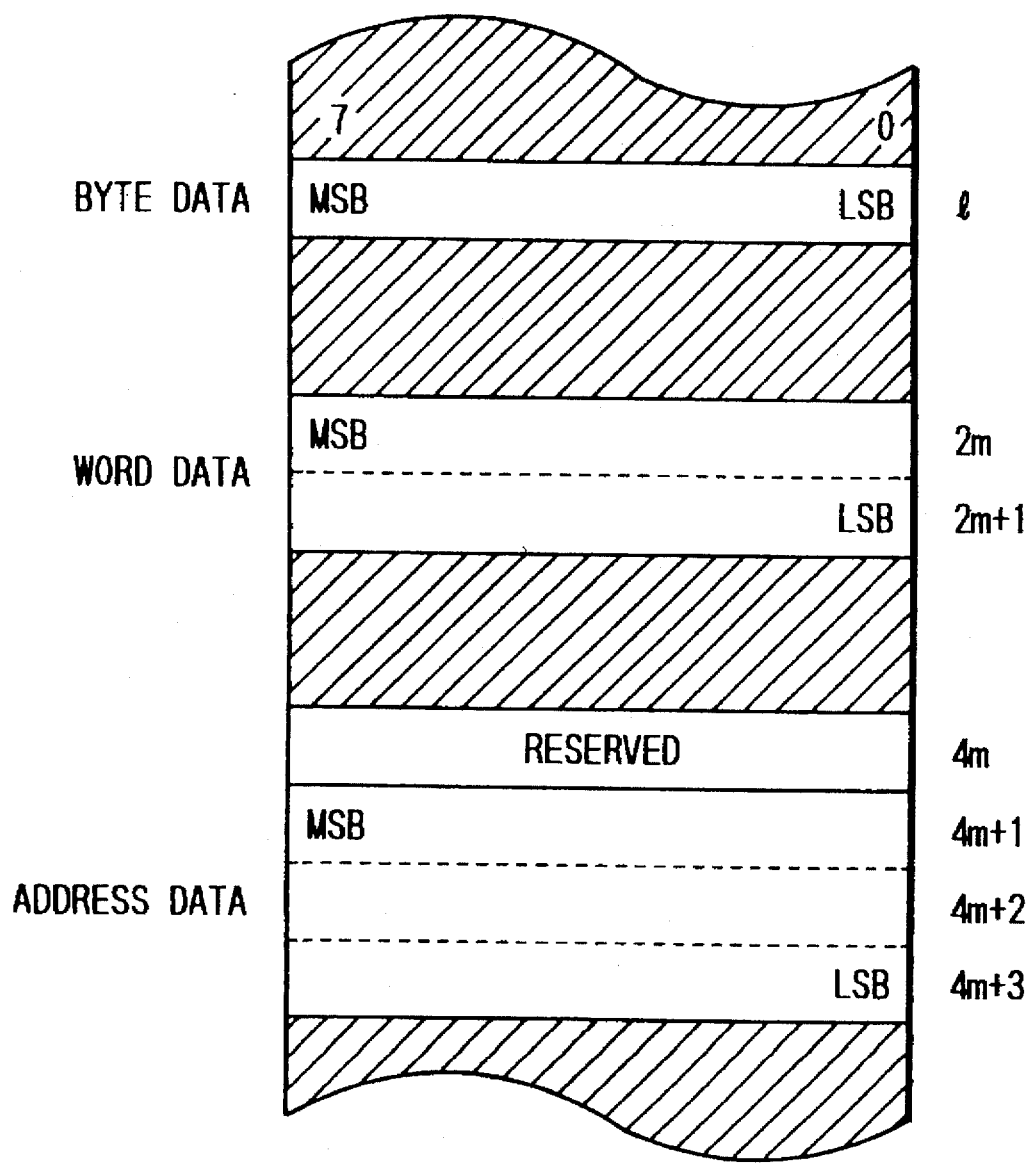
FIG. 4 is an explanatory diagram showing a data structural example of a memory.

FIG. 4 shows an example of the data structure of a memory such as RAM 3 or ROM 2. The memory is addressed at the unit of byte, although not especially limitative thereto. The byte data to be handled by the CPU 1 are stored in each address (1) of the memory. The word data are stored by connecting the even address (2m) and odd address (2m+1) of the memory. The 7th bit of the even address corresponds to the most significant bit, and the 0th bit of the odd address corresponds to the least significant bit. The address data are stored at 4-byte addresses (4m, 4m+1, 4m+2 and 4m+3) beginning from the even address (4m). The 1 byte of the leading even address is reserved for the future expansion on the system and has its usage limited, for example. The 7th bit of the nest odd address corresponds to the most significant bit of the address data, and the 0th bit of the odd address at the 4th byte.

Figure 5:
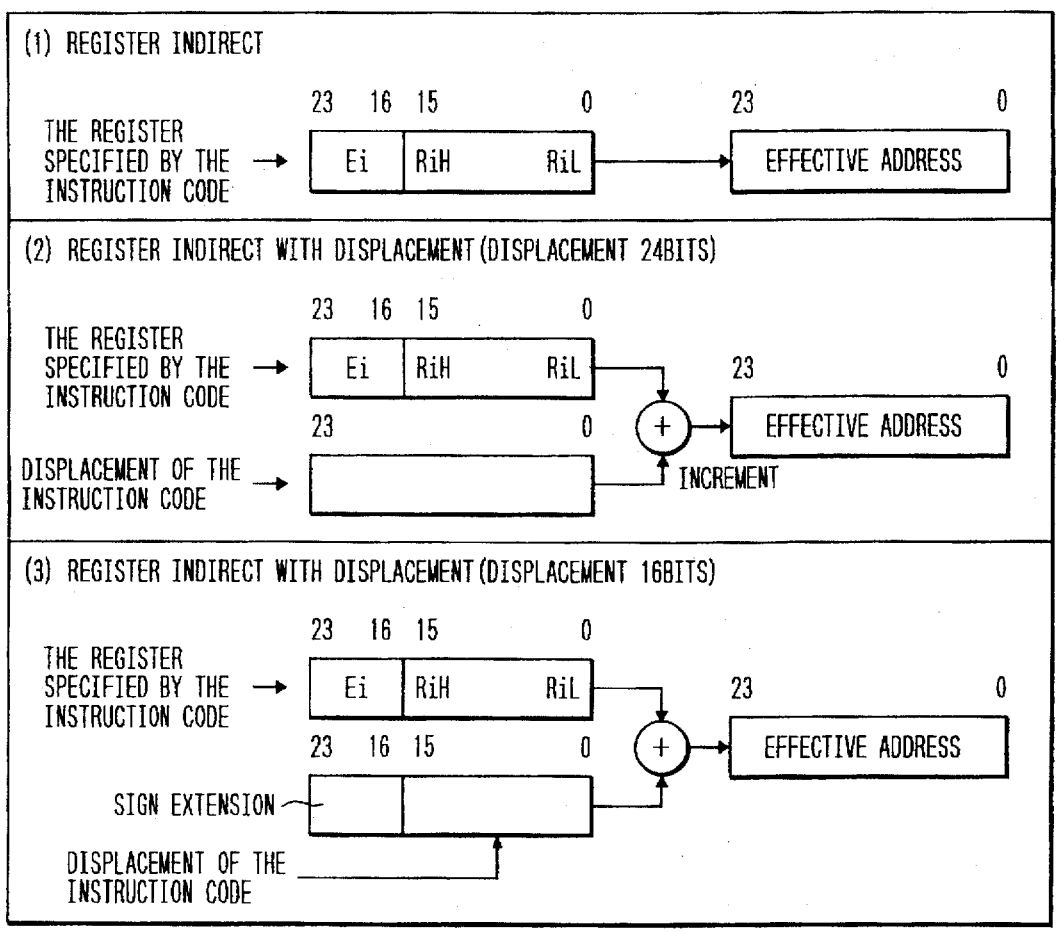
FIG. 5 is an explanatory diagram showing one example of a method of calculating an addressing mode and an effective address of the CPU 1.
Figure 6:
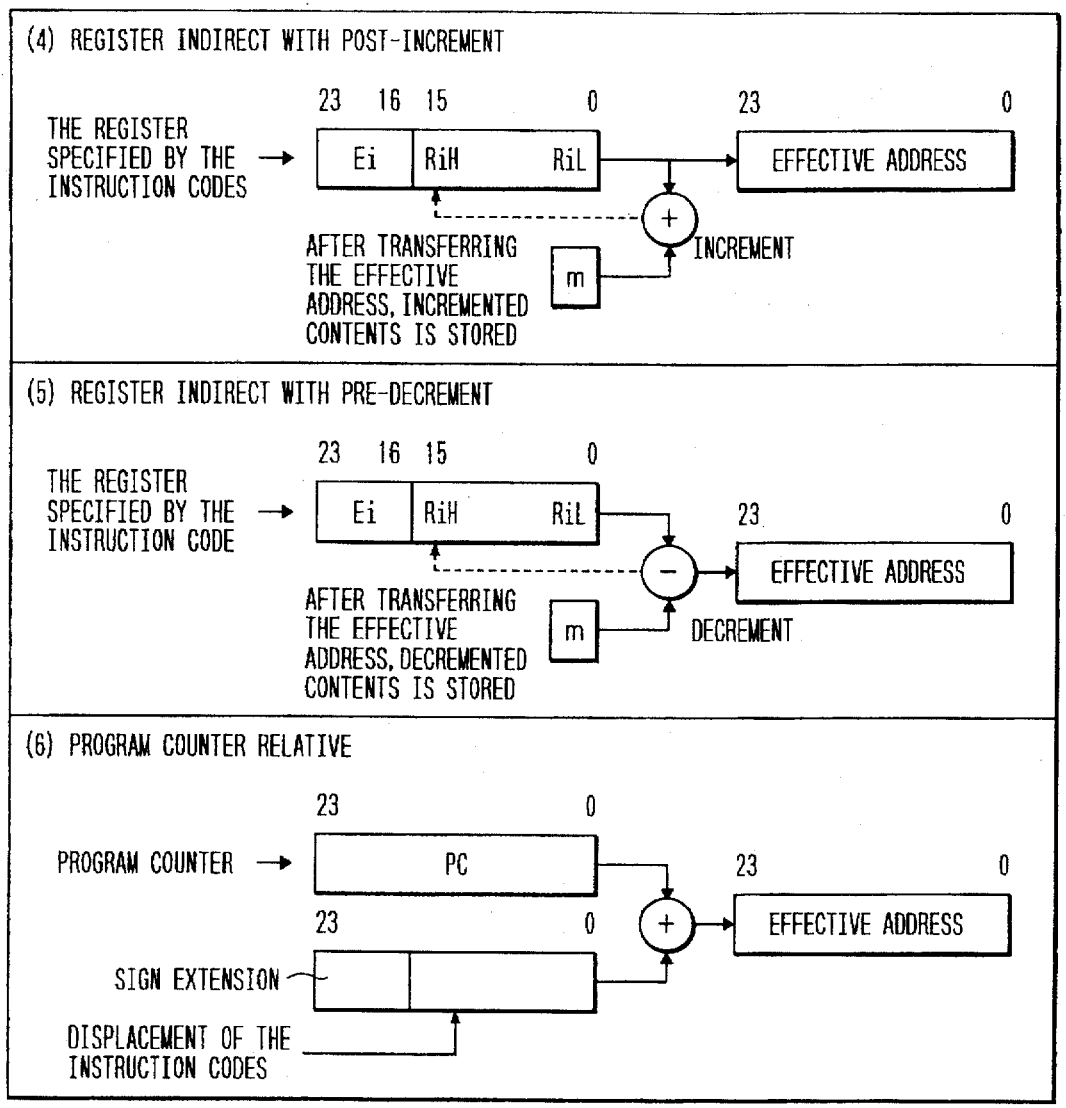
FIG. 6 is an explanatory diagram showing another example of calculating an addressing mode and an effective address of the CPU 1.

FIGS. 5 and 6 show one example of a method of calculating the addressing mode of the CPU 1 and the effective address.

In the register indirect mode, the instruction code contains a portion for specifying the register so that the address on the memory is specified by using as the address the 24 bits which are contained by both the general register specified by that instruction code and the corresponding expansion register.

In the register indirect mode with displacement, the address on the memory is specified by using as the address the result that the displacement contained in the instruction code is added to the address of 24th bit obtained as in the aforementioned register indirect mode. The addition result is used only for specifying the address but is not reflected on the contents of the expansion register Ei and the general purpose registers RiL and RiH. Although not especially limitative thereto, the displacement has 24 bits or 16 bits, and the more significant 8 bits are coded and expanded at the time of addition in case of the 16-bit displacement. Specifically, the addition is executed assuming that the more significant 8 bits of the displacement of totally 24 bits be at the same value as the 15th bit of the 16-bit displacement.

In the post-increment indirect mode, the address on the memory is specified with the 24th bit address obtained as in the aforementioned register indirect mode. After this, the value of 1, 2 or 4 is added to the address, and the result of addition is stored in the expansion register Ei and the general registers RiH and RiL. Specifically: the value 1 is added in case the byte data on the memory are specified; the value 2 is added in case the word data are specified; and the value 4 is added in case the address data are specified.

In the pre-decrement register indirect mode, the address on the memory is specified with the 24th bit address which is obtained by subtracting the value 1, 2 or 4 from the 24th bit address obtained as in the foregoing register indirect mode. After this, the subtraction result is stored in the expansion register Ei and the general registers RiH and RiL. The subtracter is 1 in case the byte data on the memory are specified; and the subtracter is 2 in case the word data are specified; and the subtracter is 4 in case the address data are specified.

In the program counter relative mode, the address on the memory is specified by using as the address the result that the displacement contained in the instruction code is added to the 24th bit address owned by the program counter PC. The addition result is stored in the program counter PC. Although not especially limitative thereto, the displacement is 16th or 8th bit, and the displacement to be added has its more significant 8 bits or 16 bits coded and expanded. Specifically, the addition is executed by assuming that the more significant 8 bit of the displacement of totally 24 bits has the same value as the 15th bit of the 16-bit displacement whereas the more significant 16 bits of the same has the same value as the 7th bit of the 8 bit displacement. The program counter relative is used only in response to a branching instruction.

The CPU 1 additionally executes the addressing modes such as immediate, register direct and absolute address modes, which are not related directly to the present invention so that their detailed descriptions will be omitted.

Figure 7:
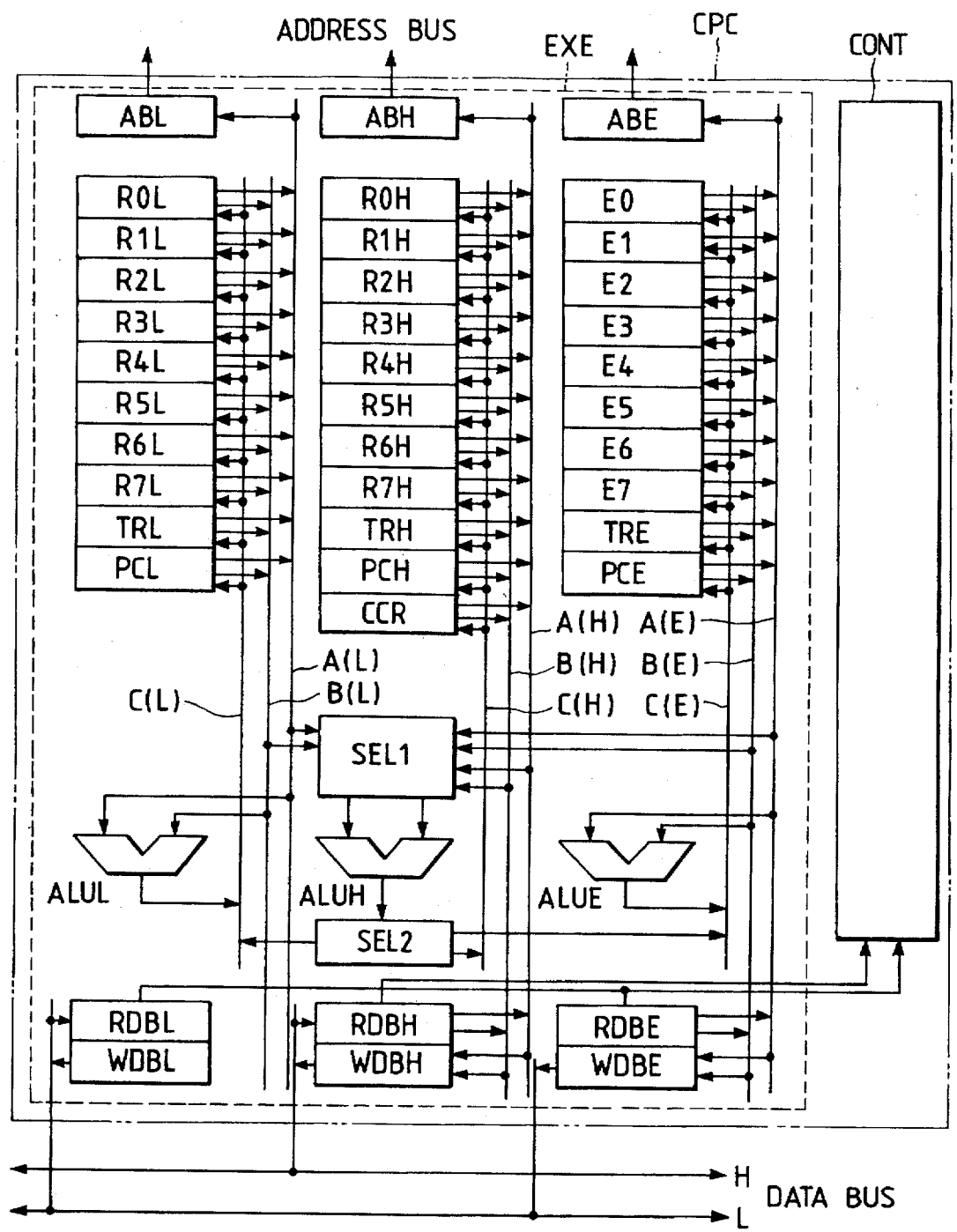
FIG. 7 is a block diagram showing one example of the internal structure of the CPU 1.
Figure 8:
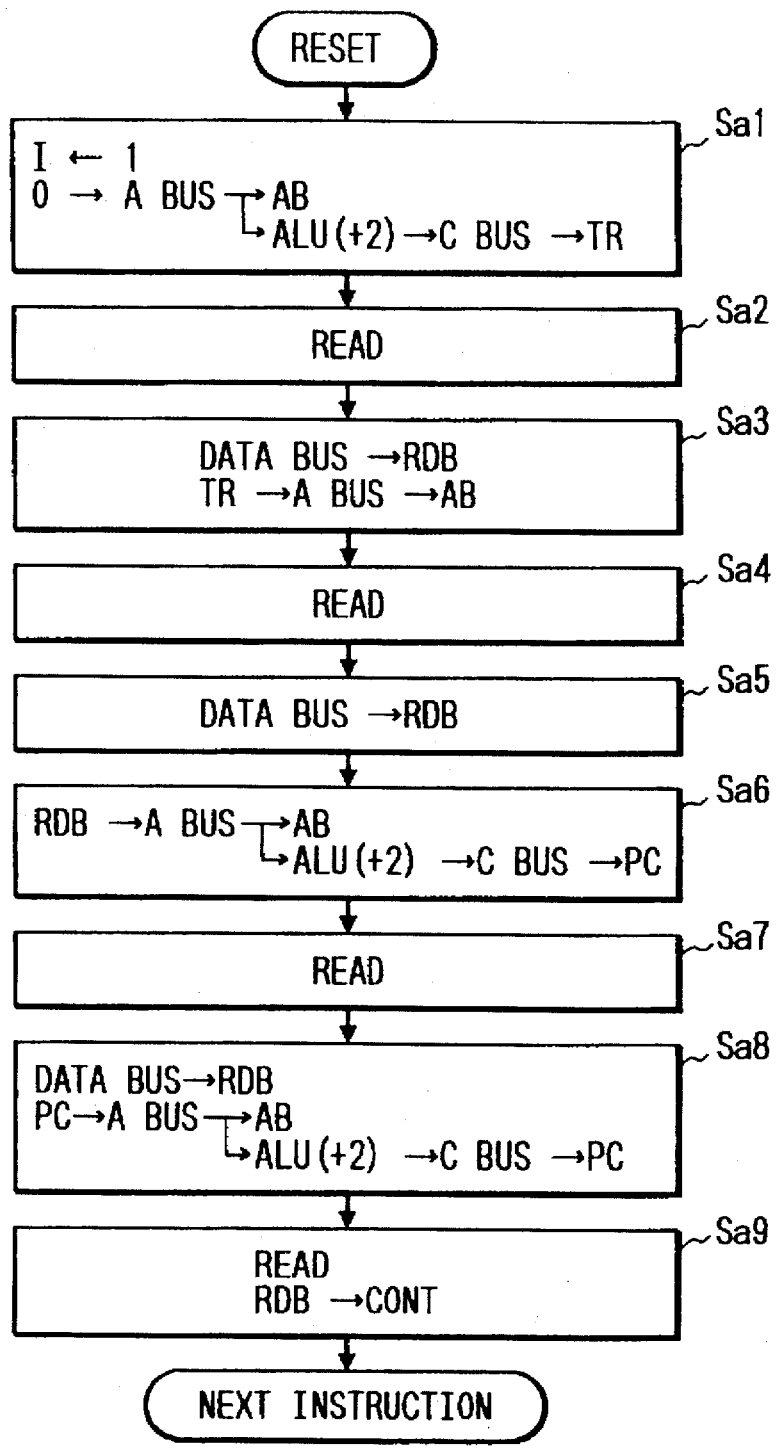
FIG. 8 is a flow chart showing one example of the reset excepting routine by the CPU 1.

FIG. 7 shows one example of the internal block of the CPU 1. This CPU 1 is constructed to include: a control unit CONT composed mainly of a micro ROM or PLA (i.e., Programmable Logic Array); and an execution unit EXE including the aforementioned general registers R0L and R0H to R7L and R7H, the expansion registers E0 to E7, the program counter PC and the condition code register CCR.

The execution unit EXE further includes temporary registers TRL, TRH and TRE, arithmetic logical units ALUL, ALUH and ALUE, read data buffers RDBL, RDBH and RDBE, write data buffers WDBL, WDBH and WDBE, and address buffers ABL, ABH and ABE, all of which are connected through three internal buses A, B and C. The arithmetic logical units ALUL, ALUH and ALUE are used the various arithmetic operations specified by the instructions, the addition of the program counter, and the calculation of the effective address. The read data buffers RDBL, RDBH and RDBE temporarily store the instructions or data which are read from the not-shown external memory, and the write data buffers WDBL, WDBH and WDBE temporarily store the data to be written in the aforementioned ROM 2, RAM 3 or external memory. Thus, the internal operations of the CPU 1 and the read/write operations outside of the CPU 1 are timed. The address buffers ABL, ABH and ABE temporarily store the address to be read/written by the CPU 1.

Each block in the aforementioned execution unit EXE has a unit of 8 bits, although not especially limitative thereto. Specifically, the program counter is divided into three blocks each of 8-bit units, for example. The block PCE corresponds to bits 23 to 16; block PCH corresponds to bits 15 to 8; and the block PCL corresponds to bits 7 to 0. The general registers R0H to R7H correspond to bits 15 to 8; and the general registers R0L to R7L correspond to bits 7 to 0. And, the bits 23 to 16 corresponding to those general registers are the expansion registers E0 to E7. The internal buses A, B and C are three in parallel and correspond to those bits 23 to 16, 15 to 8, and 7 to 0. In addition, the aforementioned temporary registers, ALU and data buffers likewise have a unit of 8 bits. These physical arrangement should not be especially limited.

FIGS. 8 to 11 show one example of the flow chart of the representative instructions and excepting procedure to be processed by the CPU 1 of FIG. 7.

In the reset excepting procedure (of FIG. 8), the CPU 1 reads a start address stored in the addresses of 4 bytes beginning from the zero address. Of these 4 bytes, the 1 byte at the zero address has been reserved for the future expansion, as has been described above, and is ignored. At a first step Sa1, the CPU 1 sets the interruption mask bit I to 1. Simultaneously with this, the CPU 1 generates data 0 on the internal bus A to transfer the data 0 to the address buffers ABL, ABH and ABE (which will be shortly designated at "AB") and to add 2 thereto in the arithmetic logical units ALUL, ALUH and ALUE (which will be shortly designated at "ALU"). The addition result is stored in the temporary registers TRL, TRH and TRE (which will be shortly designated at "TR"). At a second step Sa2, the contents of the aforementioned address buffers AB are used as the addresses to start the read of the word data. At a third step Sa3, the read operation is ended to store the read word data in the data buffers RDBL, RDBH and RDBE (which will be shortly designated at "RDB"). Simultaneously with this, the contents of the temporary registers TR are outputted to the bus A and transferred to the address buffers AB. At a fourth step Sa4, the contents of the aforementioned address buffers AB are used as the addresses to start the read of the word data. At a fifth step Sa5, the read operation is ended, and the read word data are stored in the data buffers RDB. At this time, the data buffers RDB are the so-called "first in first out buffers", although not especially limitative thereto. At a sixth step Sa6, the 24 bits of the data, which are stored in the data buffers RDB at the third step Sa3 and at the fifth step Sa5, are outputted as the start address to the bus A and transferred to the address buffers AB, and the value 2 is added in the ALU. The addition result is stored in the program counter PC. Incidentally, the more significant 8 bits of the data stored in the data buffers RDB at the third step Sa8 are ignored, as has been described above. At a seventh step Sa7, the contents of the aforementioned address buffers AB are used as the addresses to start the read of the leading instruction of the program with the word. At an eighth step Sa8, the read operation is ended, and the read word data are stored in the data buffers RDB. Simultaneously with this, the contents of the program counter PC are outputted to the bus A and transferred to the address buffers AB, and the value 2 is added in the ALU. The addition result is stored in the program counter PC. At a ninth step Sa9, the contents of the aforementioned address buffers AB are used as the addresses to start the read of the instructions of the 3rd and 4th bytes of the program with the word. At the eighth step Sa8, moreover, the instructions stored in the data buffers RDB are transferred to the control unit to start their decoding. At a next step, the operations are started on the basis of the leading instruction of the program, i.e., the instruction at which the decoding is started at the ninth step Sa9. During this execution, the word data started to be read at the ninth step Sa9 are stored in the data buffers RDB.

Figure 9:
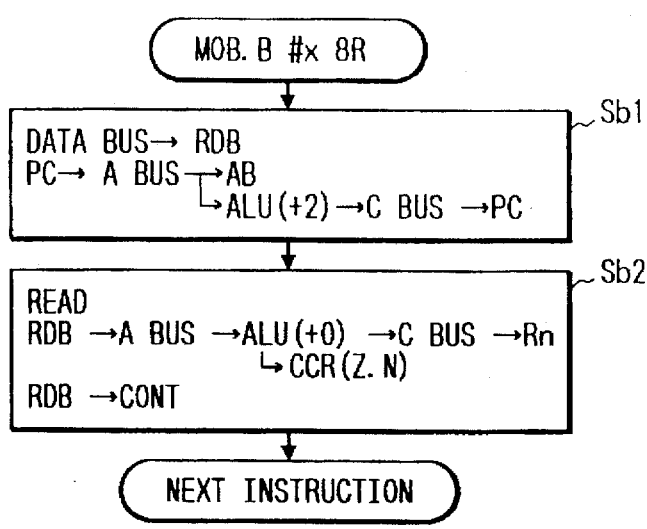
FIG. 9 is a flow chart showing one example of an instruction for transferring immediate data to a register.

The flow chart for processing th instructions to transfer the immediate data to the registers is shown in FIG. 9. The instruction (MOV.B#34, ROL), for example, for transferring immediate data 34 to the general register ROL is assumed to contain the data 34 in the instruction code and to have a length of 2 bytes. At a first step Sb1, the present instruction ends either the instruction, which was executed immediate before or the read operation, which was started at the last step of the excepting procedure, and stores the read word data in the data buffers RDB. Simultaneously with this, the contents of the program counter PC are outputted to the bus A and transferred to the address buffers AB, and the value 2 is added in the ALU. The addition result is stored in the program counter PC. At a second step Sb2, the read of the 3rd and 4th byte instructions from the present instruction is started with the word on the basis of the contents stored in the address buffers AB. Simultaneously with this, the immediate data 34 contained in the present instruction code stored already in the data buffers RDB are outputted to the bus A and further to the bus C through the ALU until they are transferred to the register ROL. The data are inspected, while passing through the ALU, so that they may be reflected on the Z and N flags of the condition code register. Moreover, the instruction stored in the data buffers RDB at the first step Sb1 is transferred to the control unit CONT to start its decoding. At a next step, the operations are started on the basis of the next instruction, i.e., the instruction, the decoding of which was started at the second step Sb2. The word data, the read of which was started at the second step Sb2, are stored in the data buffers RDB while that instruction is being executed.

Figure 10:
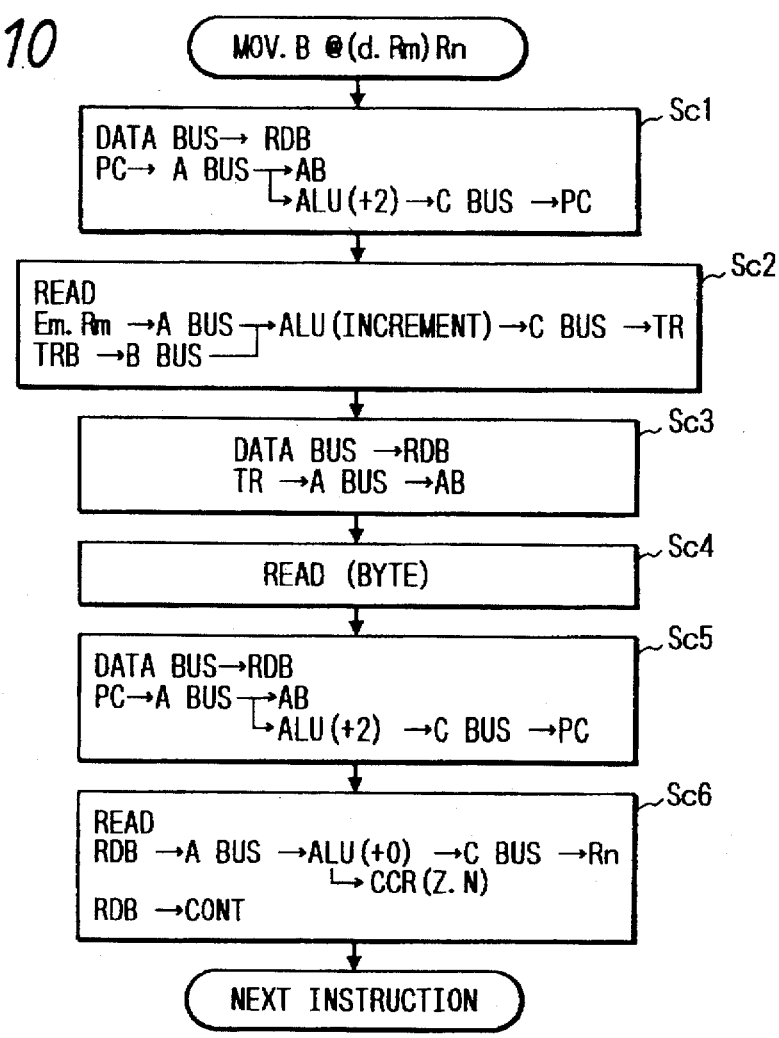
FIG. 10 is a flow chart showing one example of an instruction for register transfer of the content of a memory in a register indirect addressing mode with displacement.

A flow chart for processing the instructions for transferring the contents of the memory to the registers in the addressing mode of the register indirect with the displacement is shown in FIG. 10. For example, the instruction {MOV.B @ (1234, R0), R1H} for instructing the byte data to the general register R1H from the address, which is calculated by adding the relative value 1234 to the address indicated by the registers R0 (R0L, R0H) and the expansion register E0, is assumed to contain the displacement 1234 in the instruction code and to have a length of 4 bytes, although not especially limitative thereto. According to the present instruction, at a first step Sc1, the instruction, which was executed immediately before, or the read operation, which was started at the last step of the excepting procedure, is ended to store the read word data (i.e., the 3rd and 4th bytes of the present instruction) are stored in the data buffers RDB. Simultaneously with this, the content of the program counter PC are outputted to the bus A and transferred to the address buffers AB, and the value 2 is added in the ALU. The addition result is stored in the program counter PC. At a second step Sc2, the read of the next instruction, i.e., the instruction of the 3rd and 4th bytes from the present invention is started with the word on the basis of the contents stored in the address buffers AB. Simultaneously with this, the displacement contained in the present instruction code stored already in the data buffers RDB is outputted to the bus B, and the contents of the general registers R0 and the expansion register E0 are outputted to the bus A. These are added in the ALU and outputted from the ALU to the bus C until they are transferred to the temporary registers TR. At the time of this addition, the displacement is expanded to 001234. At a third step Sc3, the read operation is ended, and the read word data are stored in the data buffer RDB. Simultaneously with this, the contents of the temporary registers TR are outputted to the bus A and transferred to the address buffers AB. At a fourth step Sc4, the contents of the aforementioned address buffers AB are used as the addresses to start the read of the data with the bytes. At a fifth step Sc5, the read operations are ended, and the read byte data are stored in the data buffers RDB. Like before, the contents of the program counter PC are transferred to the address buffers AB, and the value 2 is added. At a sixth step Sc6, the contents of the aforementioned address buffers AB are used as the addresses to start the read of the data with the bytes. The data stored in the data buffers RDB at the fifth step Sc5 are outputted to the bus A and further to the bus C through the ALU until they are transferred to the register R1H. During the passage through the ALU, the data are tested so that they are reflected on the Z and N flags of the condition code register CCR. The instruction stored in the data buffers RDB at the third step Sc3 is transferred to the control unit CONT to start the decoding. From the next step, the operations of the following instruction are started like before.

Figure 11:
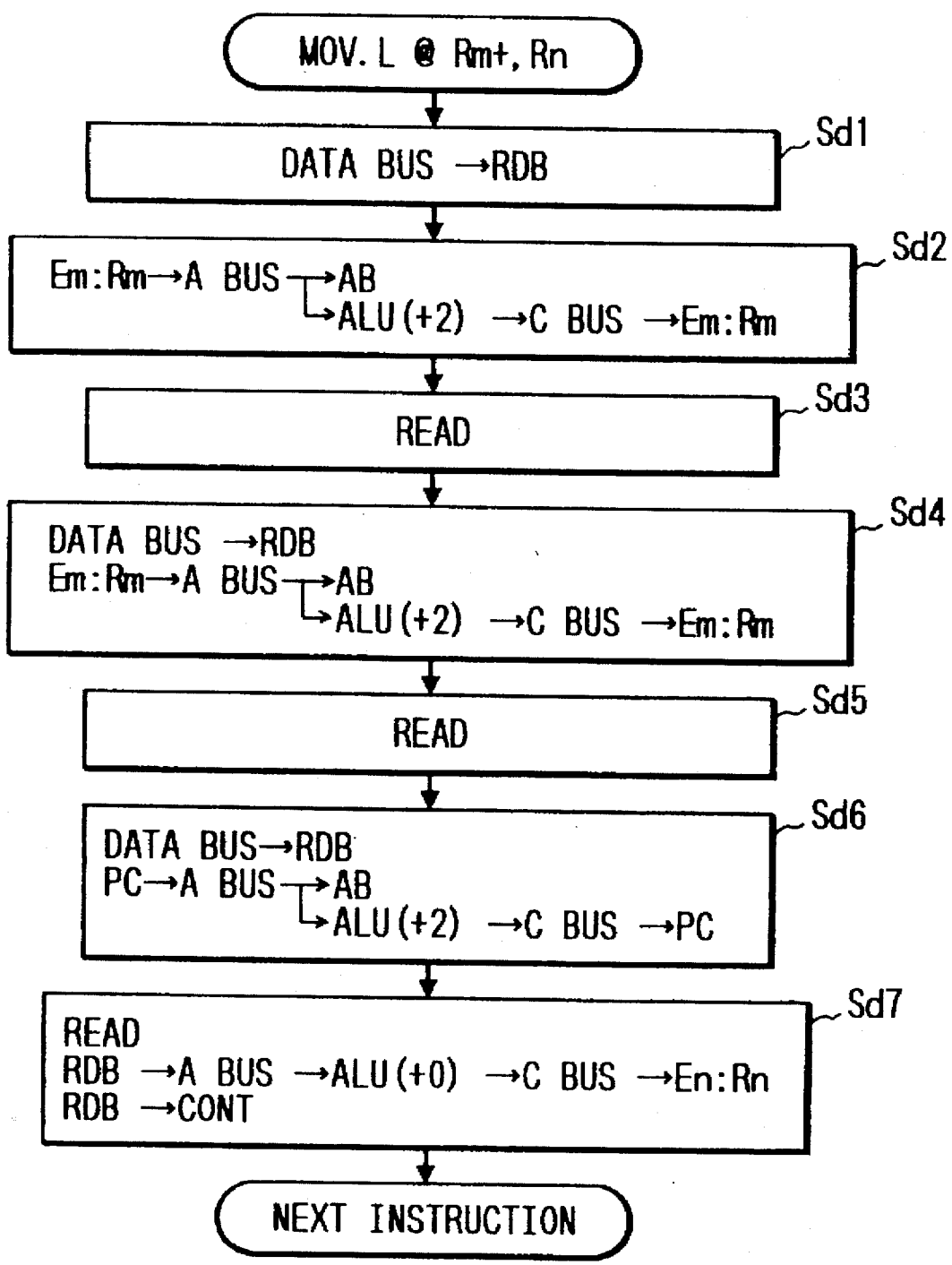
FIG. 11 is a flow chart showing one example of an instruction for register transfer of the content of a memory in a register indirect addressing mode with post-increment.

The flow chart for processing the instructions for register-transferring the contents of the memory in the address mode of the register indirect with post-increment is shown in FIG. 11. For example, the instruction {MOV.L @ R7+, R2} for transferring the expansion data from the address indicated by the general registers R7 (R7L, R7H) and the expansion register E7 to the general registers R2 (R2L, R2H) and the expansion register E2 is assumed to have a length of 2 bytes, although not especially limitative thereto. In response to the present instruction, at a first step Sd1, the instruction executed immediately before or the read operation started at the last step of the excepting procedure is ended, and the read word data are stored in the data buffers RDB. At a second step Sd2, the contents of the registers R7 and the expansion register E7 are outputted to the bus A and transferred to the address buffers AB. Simultaneously with this, the value 2 is added in the ALU, and the result is stored in the general registers R7 and the expansion register E7. At a third step Sd3, the contents of the aforementioned address buffers AB are used as the address to start the read of the data with the word. At a fourth step Sd4, the read operation is ended, and the read word data are stored in the data buffers RDB. Simultaneously with this, the contents of the general registers R7 and the expansion register E7 are outputted to the bus A and transferred to the address buffers AB, and the value 2 is simultaneously added in the ALU. The addition result is stored in the general registers R7 and the expansion register E7. At a fifth step Sd5, the contents of the aforementioned address buffers AB are used as the addresses to start the read of the data with the word. At a sixth step Sd6, the read operation is ended, and the read word data are stored in the data buffers RDB. Like before, the contents of the program counters PC are transferred to the address buffers AB, and the value 2 is added. At a seventh step Sd7, the contents of the aforementioned address buffers AB are used as the addresses to start the read of the data with the word. The 24 bits of the data stored in the data buffers RDB are outputted to the bus A and further to the C through the ALU until they are transferred to the general registers R2 and the expansion register 2. Incidentally, the more significant 8 bits of the data stored in the data buffers RDB at the fourth step Sd4 are ignored. The data are not tested while passing through the ALU so that the flags of the condition code registers CCR do not change. The instructions stored in the data buffers RDB at the first step Sd1 are transferred to the control unit CONT to start their decoding. From the next step, the operations of the following instructions are started like before.

FIG. 31 presents a table of the arithmetic operation instructions which can be executed by the aforementioned CPU 1. Specifically, these arithmetic operations contain additions, subtractions and comparisons.

The additions functionally include ADD, ADDC and ADDE instructions, and the ADD instructions have byte sizes and word sizes. In the ADD instructions, the specified source data (i.e., the immediate or register contents) and the destination data (i.e., the register contents) are added, and the results are stored in the destination registers and are reflected upon the individual flags C, V, Z and N. Neither the direct calculations of the memory contents and the register contents nor the calculations under one instruction are executed, although not especially limitative thereto.

The ADD instructions are characterized as the data calculating instructions to have the byte sizes and the word sizes. The ADDC instructions are similar to the ADD instructions, but their additions are executed together with the carry flag C. The ADDC instructions are desired to have the byte sizes and the word sizes because of their characteristics as the data operating instructions but need not have the word sizes so long as they do not handle data of 25 bits or more. If the ADDC instructions have the byte sizes only, on the contrary, the instruction format and the internal control method of the CPU 1 can be simplified to reduce the logical/physical scales. Considering the aforementioned necessity and scale reduction, the ADDC instructions are restricted to the byte sizes, although not especially limitative thereto. The ADDE instructions should be used for calculating the address data to effect the additions by combining the general registers and the expansion registers. The ADDE instructions are given the address word sizes only because of their characteristics as the address data calculating instructions so that they are inhibited to have the flag change. These discussions also apply to the subtractions.

For the comparisons, the instructions have no carry. The SUBE instructions change only in the carry, zero and negative flags but not in the overflow flag. This is because no consideration need be taken into the code of the address data.

Incidentally: symbols #x:8 and #x:16 designate immediate data of 8 and 16 bits, respectively; symbols Rd8 and Rd16 designate general registers of 8 and 16 bits, respectively; and symbols Ed:Rd:16 designate the contents of the expansion registers and the general registers.

Figure 12:
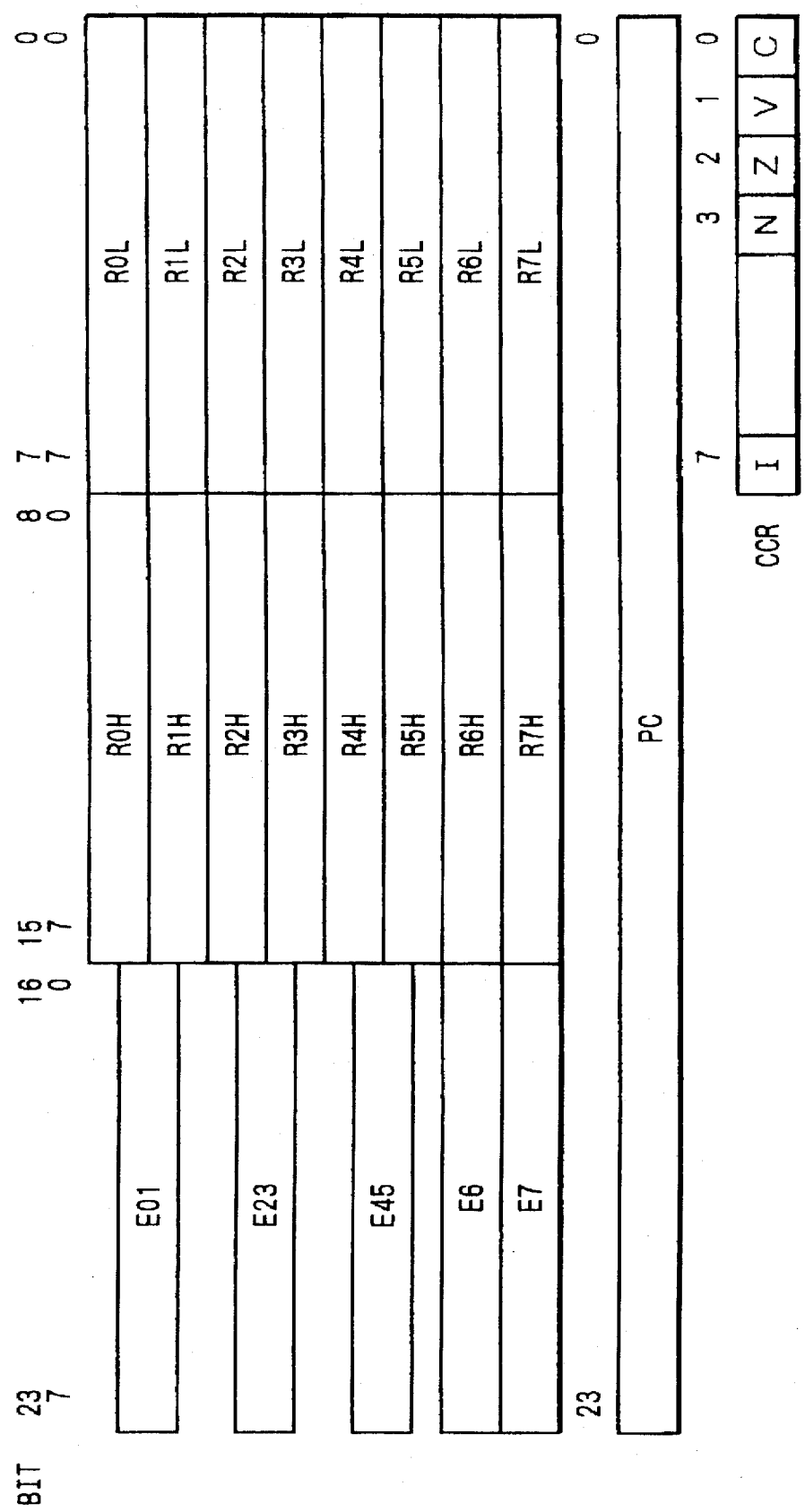
FIG. 12 is an explanatory diagram showing a second example of the register structure of the CPU 1.

FIG. 12 shows a second embodiment of the register structure of the CPU 1. This CPU 1 is constructed to include: eight general registers R0 (R0L, R0H) to R7 (R7L, R7H) each having a length of 16 bits; five expansion registers E01, E23, E45, E6 and E7 each having a length of 8 bits; a program counter PC having a length of 24 bits; and a condition code register CCR having a length of 8 bits.

In case the general registers are used as address registers, addresses of totally 24 bits are generated by setting the contents of 16 bits of the general registers to the less significant 16 bits of the address and the contents of the corresponding expansion registers to the more significant 8 bits of the address. The method of calculating the addressing modes or the effective addresses is similar to that of the first embodiment. In the present embodiment, the general registers R0 and R1, R2 and R3, and R4 and R5 are respectively corresponded to by the expansion registers E01, E23 and E45 so that the number of expansion registers is reduced, as compared with that of the first embodiment. If the register R0 is specified to use the register indirect with post-increment, the contents of the expansion registers E01 and R0 are rewritten. If the register R1 is next specified to use the register indirect with post-increment, the contents of the expansion registers E01 and R1 are written. Thus, the user uses the general register R0 as the data register and the general register R1 as the address register, although not especially limitative thereto. In this case, therefore, the expansion register E01 is always used in combination with the general register R1 but not with the general register R0. In these ways, restrictions are caused when the user makes the program, but are not substantial problems because there seems to exist no application that uses all the general registers as the address registers but not the data registers.

Figure 13:
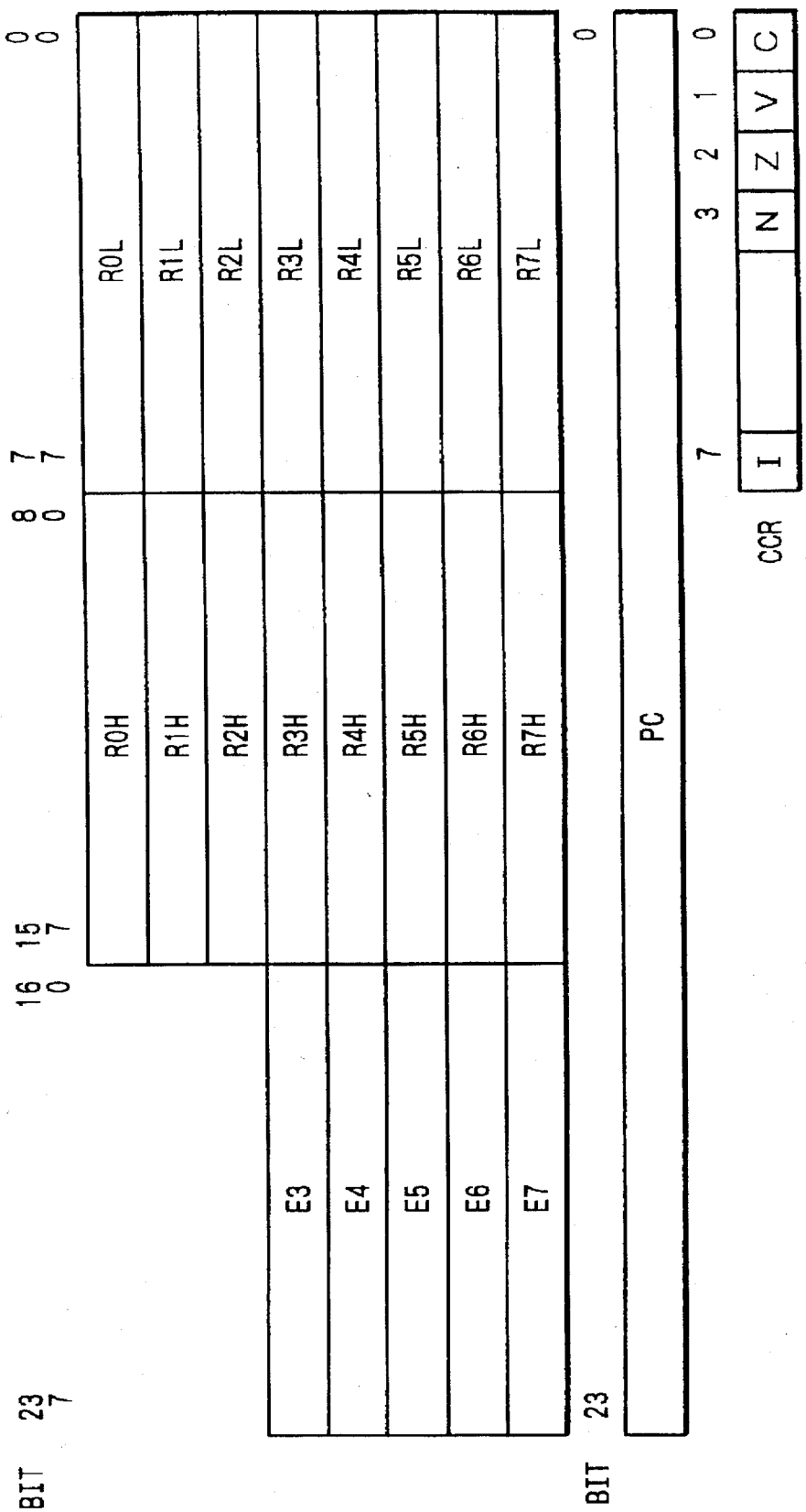
FIG. 13 is an explanatory diagram showing a third example of the register structure of the CPU 1.

FIG. 13 shows a third embodiment of the register structure of the CPU 1. Like the second embodiment, the CPU 1 is constructed to include: eight general registers R0 (R0L, R0H) to R7 (R7L, R7H) each having a length of 16 bits; give expansion registers E3 to E7 each having a length of 8 bits; a program counter PC having a length of 24 bits; and a condition code register CCR having a length of 8 bits.

In case the general registers are used as the address registers, addresses of totally 24 bits are generated by using the 16 bits of the contents of the general registers as the less significant 16 bits of the addresses and the content of the corresponding expansion registers as the more significant 8 bits of the addresses. The method of calculating the address modes or the effective addresses is similar to that of the first embodiment. In the present embodiment, there exist no expansion register corresponding to the general registers R0, R1 and R2. In case these general registers are to be specified as the address registers, the more significant 8 bits are automatically expanded into the addresses of 24 bits. In case of the general register R0, the more significant 8 bits are automatically identical to the contents of the 15th bit of the register R0, although not especially limitative thereto. In case of the general register R1, all the more significant 8 bits automatically change to 0. In case of the general register R2, on the other hand, all the more significant 8 bits automatically change to bit 1.

Figure 14:
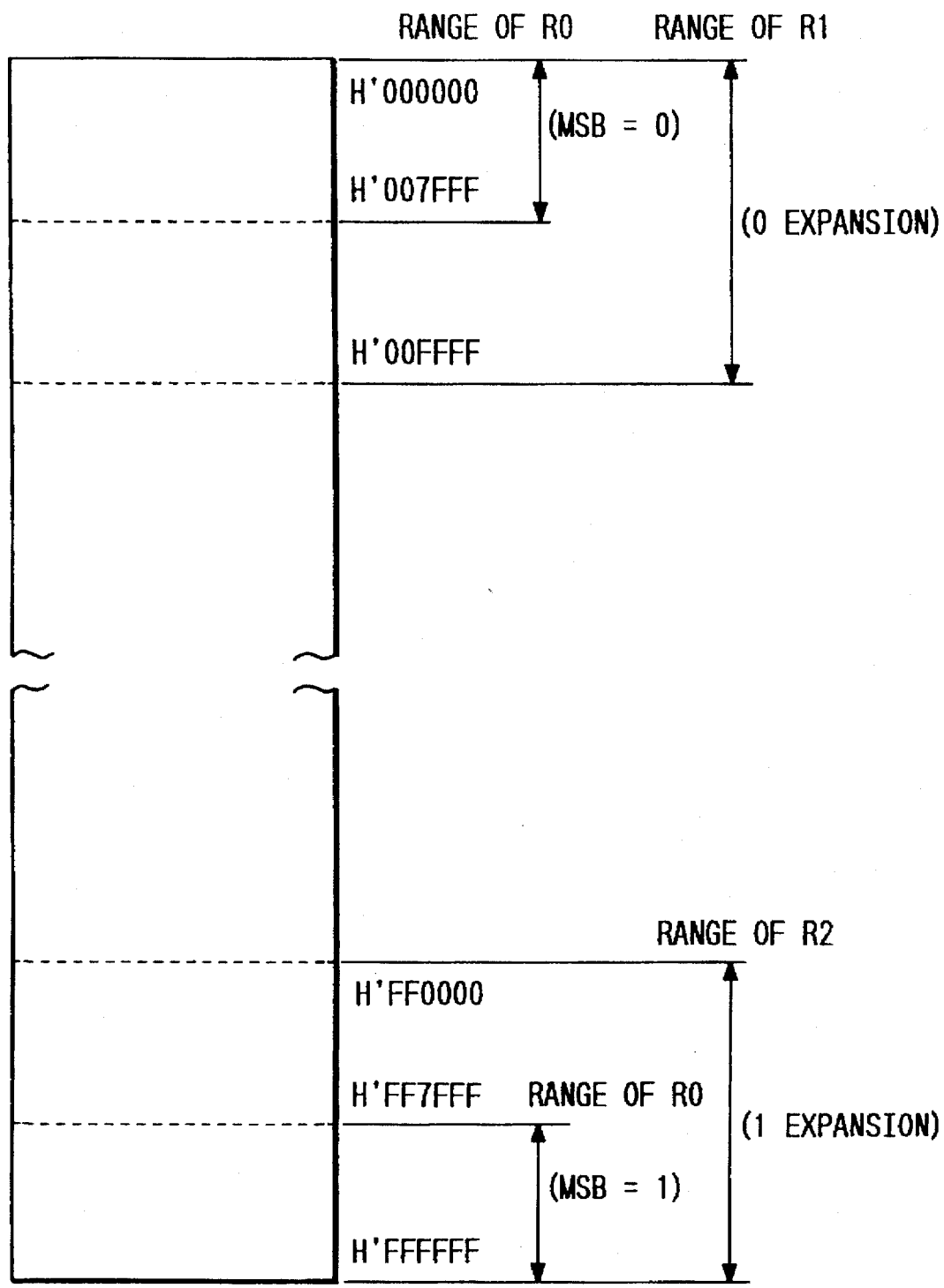
FIG. 14 is an explanatory diagram showing the address expandable range in case the general register in the example of FIG. 13 is specified as an address register.

FIG. 14 shows an expandable range of the addresses in case the general registers R0, R1 and R2 in the embodiment of FIG. 13 are specified as the address registers.

In case of the general register R0, the more significant 8 bits as the address of 24 bits are automatically made identical to the contents of the 15th bit of the register R0 so that the ranges of H'000000 to H'007FFF and H'FF8000 to H'FFFFFF are specified. In case of the general register R1, all the more significant bits are automatically set to 0 so that the range of H'000000 to H'00FFFF is specified. In case of the general register R2, on the other hand, all the more significant 8 bits are automatically set to 1 so that the range of H'FF0000 to H'FFFFFF is specified. The programs and data areas to be highly frequently used for those ranges of H'000000 to H'00FFFF and H'FF0000 to H'FFFFFF can be accessed to, if arranged, within the linear address range.

Figure 15:
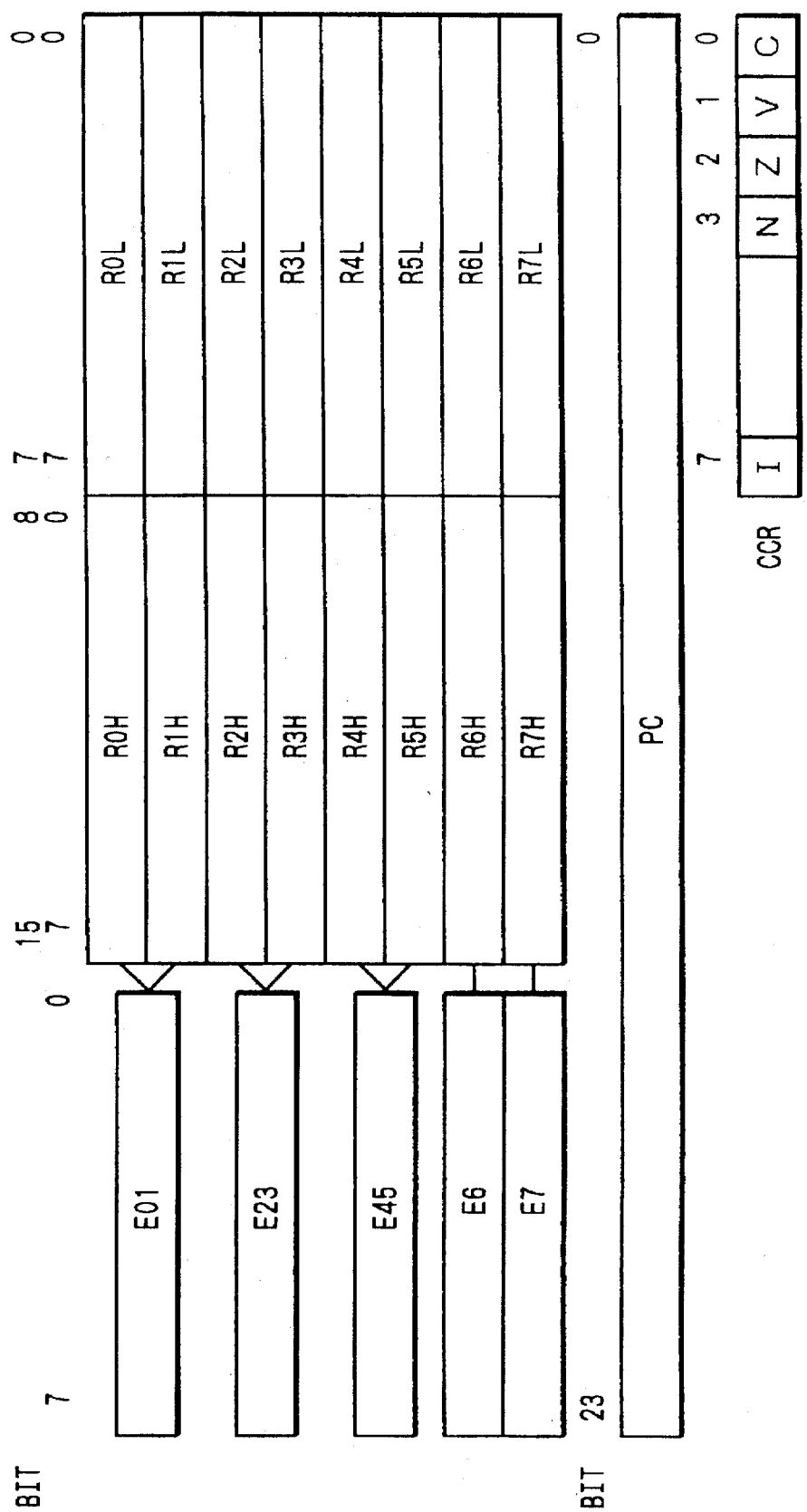
FIG. 15 is an explanatory diagram showing a fourth example of the register structure of the CPU 1.

FIG. 15 shows a fourth embodiment of the register structure of the CPU 1. Like the second embodiment, the CPU 1 is constructed to include: eight general registers R0 (R0L, R0H) to R7 (R7L, R7H) each having a length of 16 bits; five expansion registers E01, E23, E45, E6 and E7 each having a length of 8 bits; a program counter PC having a length of 24 bits; and a condition code register CCR having a length of 8 bits. The general registers and expansion registers of the present embodiment are made independent of one another and inhibited to propagate the carry or borrow when in the address calculating operations. The program counter PC can be used like before as the register of 24 bits.

Since the present embodiment has the program counter PC of 24 bits, no page boundary need be considered as to the program. However, the programmer has to manage that the data may not exceed the page boundary, but the management of the data seems easier than that of the program. Even by making the general registers and the expansion registers independent, relatively long instructions for the displacement of 24 bits or the transfer of absolute data of 24 bits cannot be executed, but the logical/physical scales of the control unit CONT can be reduced.

In case the general register R7 and the expansion register E7 are used as the so-called "stack pointers", the propagations of the carry or borrow may be allowed between them. In case the stack pointers (i.e., the general register R7 and the expansion register E7 are implicitly used for a subroutine call instruction or an interruption, the carry or borrow between the general register R7 and the expansion register E7 is allowed.

In case the general registers and the expansion registers are provided so that an address space of 16 Megabytes can be used, as has been described in connection with the register structures of the aforementioned first to fourth embodiments, it is advisable to make an instruction system, in which the major operations are executed between the registers so that the operations between the memory and the registers may not be directly executed. In order to exploit the address space of 16 Megabytes, the aforementioned complicated address modes are necessary. If most of the arithmetic instructions are enabled to execute such complicated addressing modes, the control unit CONT is complicated contrary to the object of minimizing the logical/physical scales. For accesses to the memory, the data transfer with the registers may be executed in response to the transfer instructions having the various addressing modes so that the data processing such as the arithmetic operation may be executed on the registers. These registers can be used as sixteen ones having 8 bits, and the data necessary for a certain processing can be latched on the registers. At least most of the highly frequent data can be latched on the registers. This makes less frequent the disadvantages such as the increase in the processing programs or the reduction in the execution speed.

Instructions required for operations of the memory include bit operation instructions. These are specified as the n-th bit of the addresses assigned at the unit of byte but are not handled at the unit of byte, and the individual bits have independent functions. In case of a register for controlling the operation of the timer, for example: the clock of the timer is selected at the 0-th and 1st bits; it is specified at the 2nd bit whether or not the timer counter is cleared if the contents of the timer counter and the comparison registers are identical; and It is specified at the 3rd bit whether or not an interruption is to occur if identical as above. These have to be set to 1 at the unit of 1 bit or cleared to 0. Alternatively, the aforementioned data of 1 bit have to be decided in case the processing program of the CPU 1 is different depending upon whether the predetermined 1 bit of the input port is at 0 or 1. These data of 1 bit have directly operated for the aforementioned timer control register. This is because the value of the aforementioned input port may be disadvantageously changed by an interruption between the transfer and the bit operation if this bit operation is executed after once having been transferred at the unit of byte to the registers. Thus, the CPU 1 in the present embodiment supports the bit operation instruction for direct operations between the internal registers such as the general registers and the external registers such as the control registers of the peripheral circuit. Incidentally, the addresses to be operated by such bit operation instruction are fixed but require no complicated addressing mode. In short, the addresses may be sufficient if they can be executed with the absolute addresses and the minimum register indirect. In case of the absolute addresses, moreover, what is necessary is not that the entire address space could be used but that they could be used only in the address range in which the aforementioned timer and input/ output ports are present. It is sufficient that the absolute addresses to be used for specifying such address range have 8 bits. If the absolute addresses have 16 bits, the usable address range could be extended, but the instruction length would be elongated to complicate the control. It therefore seems very rare that the entire space of 16 Megabytes for at least of 24 bits have to be made usable. Thus, even if the operation instruction of 1 bit or several bits is executed directly with the external peripheral circuits, there arises no fear that the scales of the control units and the kinds of the instructions wound drastically increase.

Figure 16:
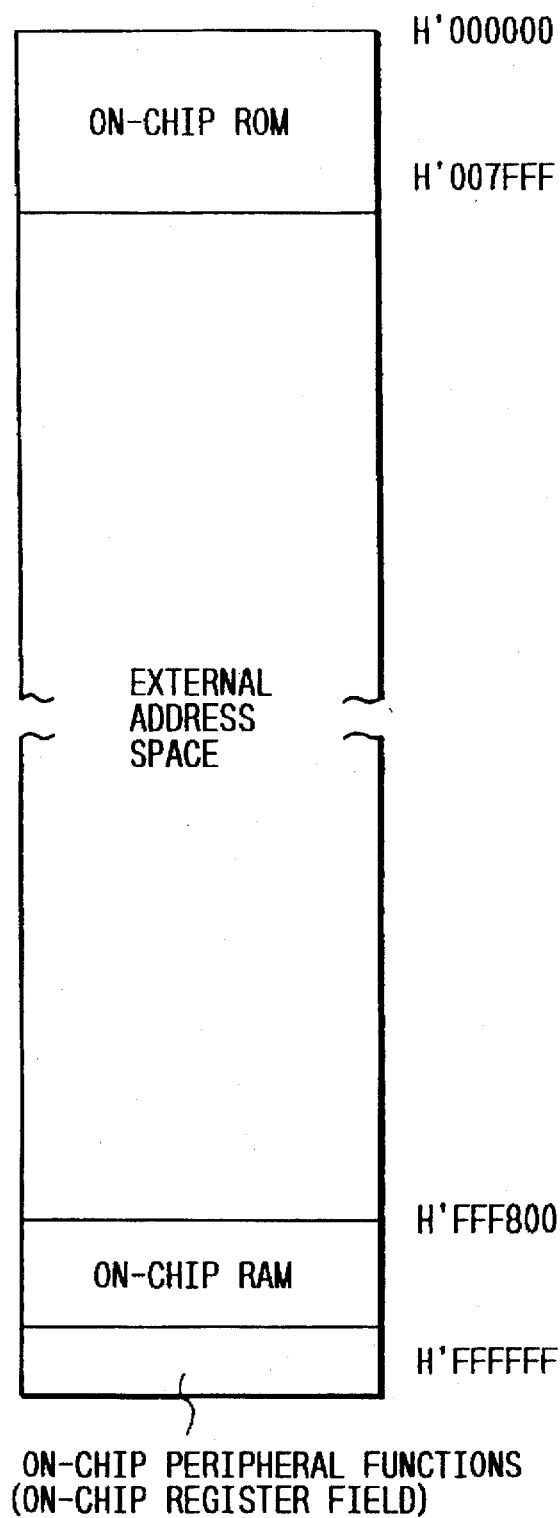
FIG. 16 is one example of an address map in a microcomputer 100 of the present embodiment.

FIG. 16 shows one example of the address map of the microcomputer 100 of the present embodiment. The on-chip ROM 2 is arranged from the address H'00000, and the on-chip peripheral functions (e.g., the timer 4 or the SCI 5) and the on-chip RAM 3 are arranged at and after H'FF800 so that an external address space is left inbetween. The on-chip peripheral functions and the on-chip RAM 3 can be arranged midway of the address space, e.g., at H'0F800 to H'0FFFF. In this case, the external address space is divided into two spaces. Moreover, the program written in the on-chip ROM 2 and the program existing in the external address space cannot be continuously used although contrary to the object of the present invention. Hence, the on-chip ROM 2 to be used mainly as the program region and the on-chip peripheral functions and the on-chip RAM 3 to be used mainly as the data region should be arranged opposite to each other in the address space while leaving a continuous space inbetween. Thus, even if the data region and the program region are enlarged in accordance with the system to which the microcomputer 100 is applied, those regions can be individually easily retained in the continuous address space so that the procedures for managing the data or programs and for accessing them are simplified on the system. Incidentally, the on-chip ROM 2 include a start address for the reset and an address (e.g., a start vector) stored with the start address.

Although the address space is assumed to have 16 Megabytes in the foregoing embodiments, the functions of the CPU 1 can be exemplified by the case, in which the address space of 16 Megabytes is not required but in which many terminals are required for the input/output ports, by combining the individual function blocks in the entirety of the single-chip microcomputer 100 while retaining the address space of 16 Megabyte as the functions of the CPU 1. In this case, it is not advisable to have twenty four address terminals, and the number of address terminals has to be decreased whereas the number of input/output terminals has to be increased. If the number of address terminals is twenty, for example, the address space to be actually used is 1 Megabyte.

Figure 17:
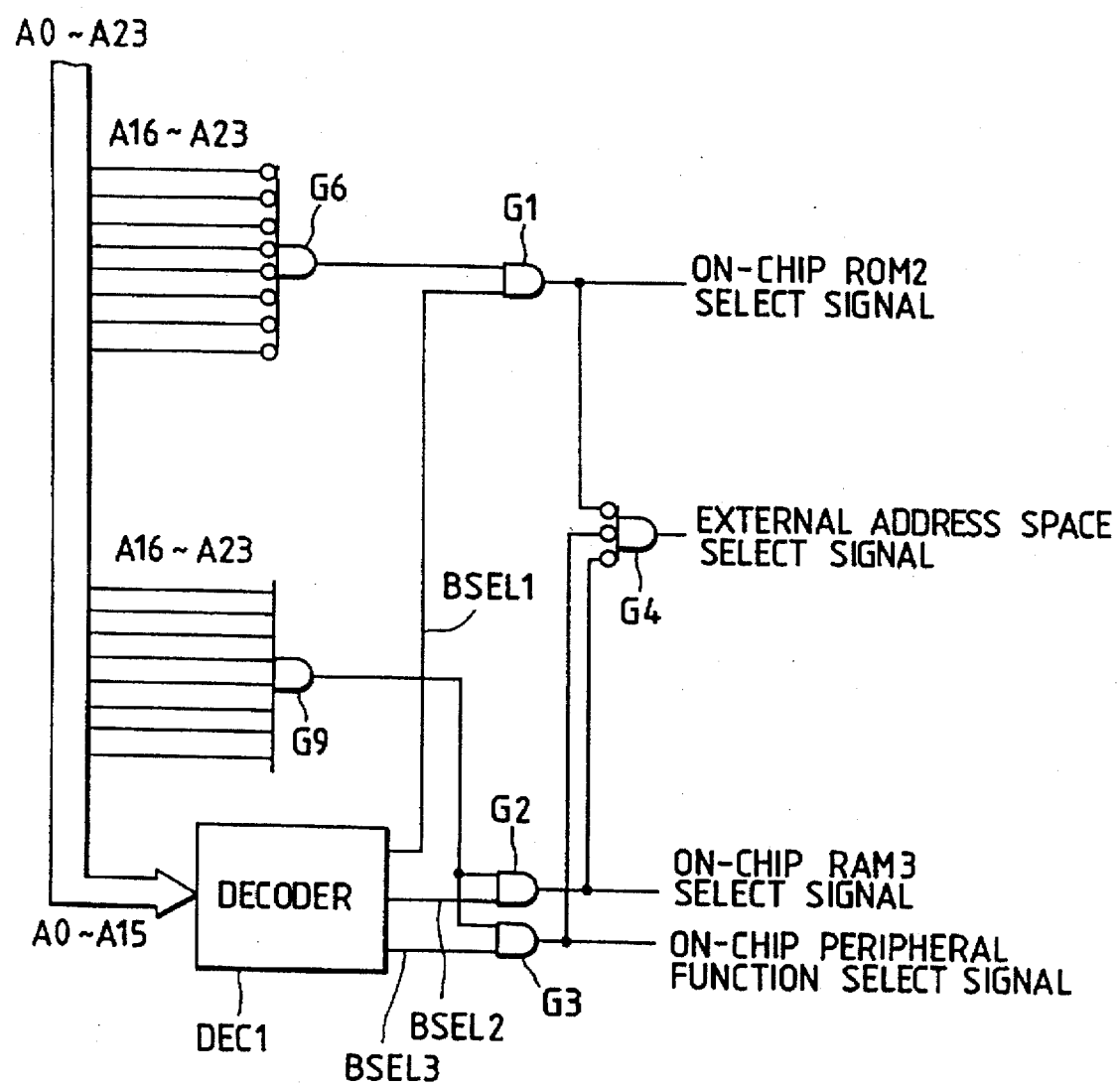
FIG. 17 is a logical diagram showing one example of a logical diagram of a function block select circuit contained in the single-chip microcomputer 100.

FIG. 17 shows one example of the function block selector included in the single-chip microcomputer 100.

The function block selector, as shown, decodes the address signals A0 to A23 of 24 bits, which are outputted from the CPU 1, to generate select signals of the individual function blocks, and is constructed to include gates G1, G2, G3, G4, G6 and G9 and a decoder DEC 1, although not especially limitative thereto. Each of the function blocks contained in the single-chip microcomputer 100 is caused to receive not all the bits of the address signals A0 to A23 but both the function block select signal indicating that said function block is selected and the less significant address bit indicating what of the address of said function block is selected. If the ROM 2 has a capacity of 32 kilobytes, according to the present example, it is caused to receive one function block select signal and the less significant 15 bits of the address signals A0 to A14.

In case the address map of FIG. 16 is realized by the aforementioned function block selector, the BSEL1 signal is set to the level 1 if the range of H'0000 to 7FFF is detected in a decoder DEC1 having received the less significant 16 bits of the addresses. If, moreover, the more significant address in the gate G6 detects H'00, the outputs of the gates G6 and G1, i.e., the select signals of the on-chip ROM 2 takes the level 1 so that the ROM 2 is selected. These operations likewise apply to the RAM 3 and the on-chip peripheral functions. If any of them is not selected, the external address space is selected, although not especially limitative thereto.

Figure 18:
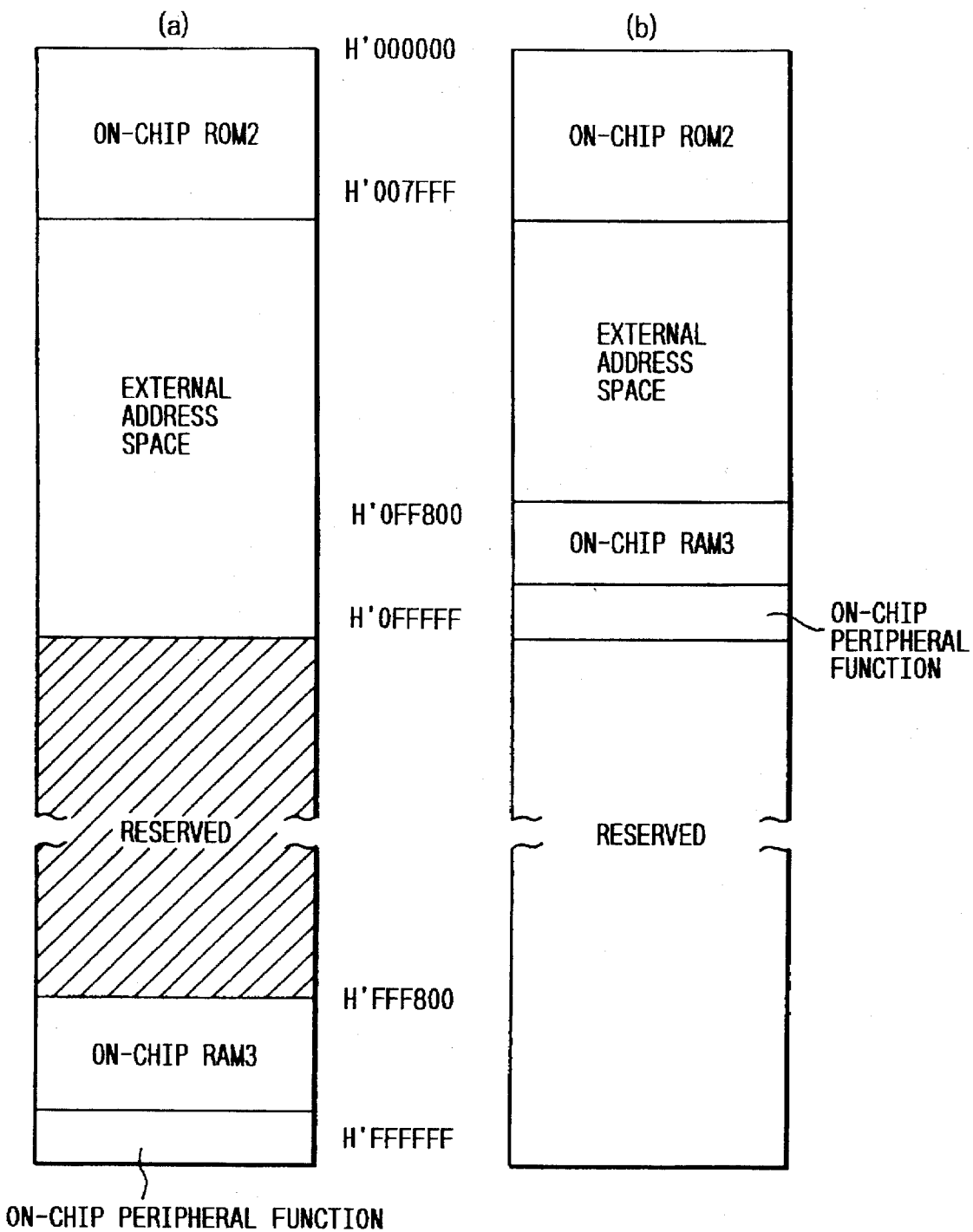
FIG. 18 is an example of an address map showing a microcomputer which has twenty external address terminals so that it can have an actually usable address space of 1 Megabytes.

FIG. 18 shows an address map of the microcomputer, in which twenty external address terminals are provided to give the actually usable address space 1 Megabyte.

In this address map of the single-chip microcomputer, as has been described above, the on-chip ROM 2 to be used mainly as the program region and the on-chip peripheral functions and the on-chip RAM 3 to be used mainly as the data regions are arranged opposite to each other in the address space. The two mappings, as shown at (a) and (b) in FIG. 18, are conceivable for forming a continuous space inbetween. In the case (a), the on-chip peripheral functions and the on-chip RAM are arranged at the side of H'FFFFFF in the space of 16 Megabytes. In the case (b), the on-chip peripheral functions and the on-chip RAM 3 are arranged at the side of H'FFFFF in the space of 1 Megabyte. The arrangement (a) can have a wider external address space to be used, as is apparent from FIG. 18, but the data region is separated by the external address space and the internal address space.

Figure 19:
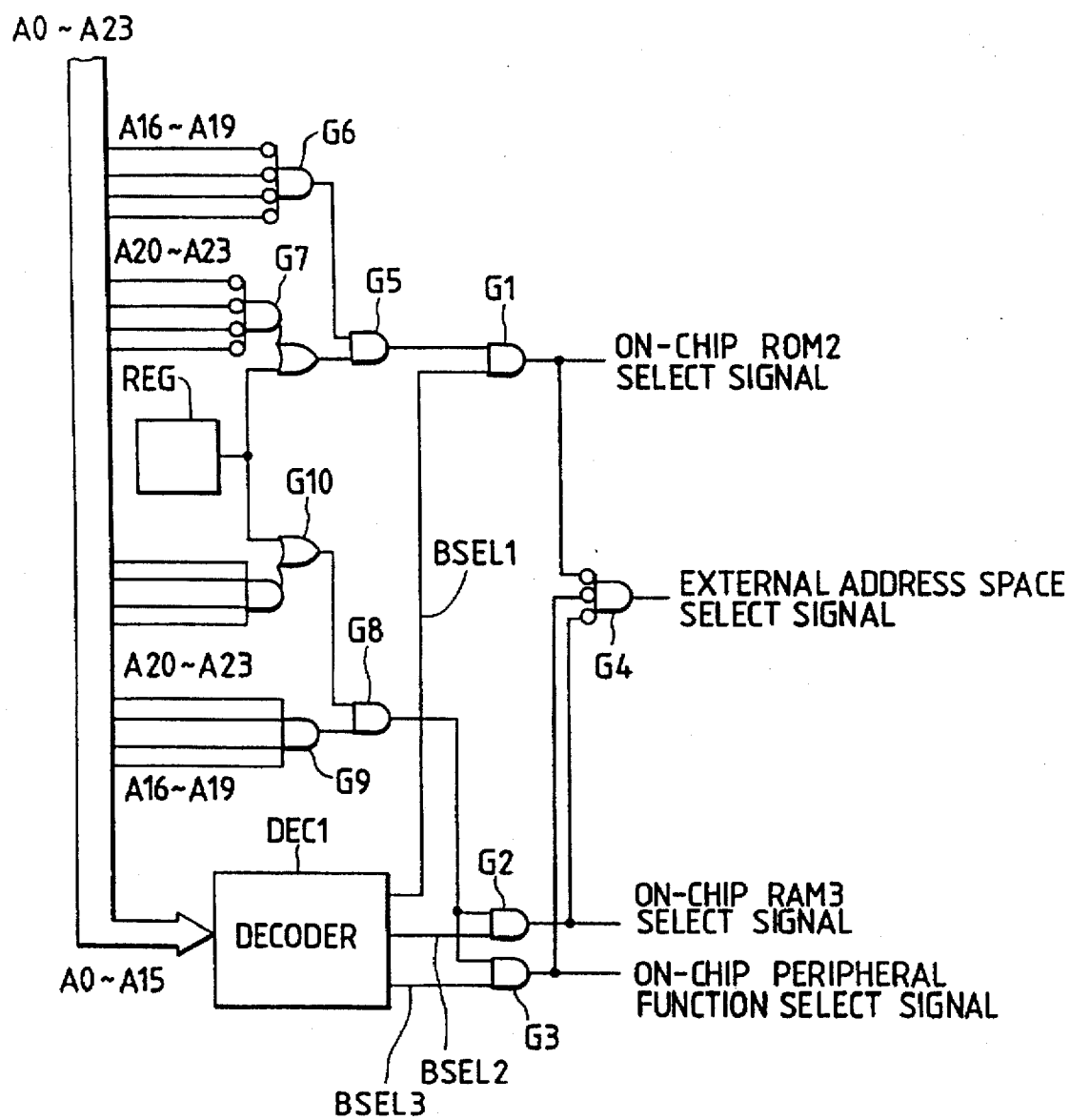
FIG. 19 is a logical diagram showing a function block select circuit for realizing the address map of FIG. 18.

FIG. 19 shows a function block selector for realizing the address map of FIG. 18.

The function block selector, as shown, is constructed to include gates G1 to G10, a decoder DEC1 and a register REG, and selects the two kinds of address maps of (a) and (b) of FIG. 18 in accordance with the contents of the register REG, although not especially limitative thereto. If the register REG has the contents of 1, the gates G7 and G10 always have the output of 1 not depending upon the more significant 4 bits of the address to provide the address map shown at (b) in FIG. 18. If the contents of the register REG is 0, the address map obtained is shown at (a) in FIG. 18. The reserved space of the address map is inhibited to use, although not especially limitative thereto. The register REG may be set by either the CPU 1 enabled to read/write or the external terminals or may be fixedly set by internally connecting it with the power supply.

Figure 20:
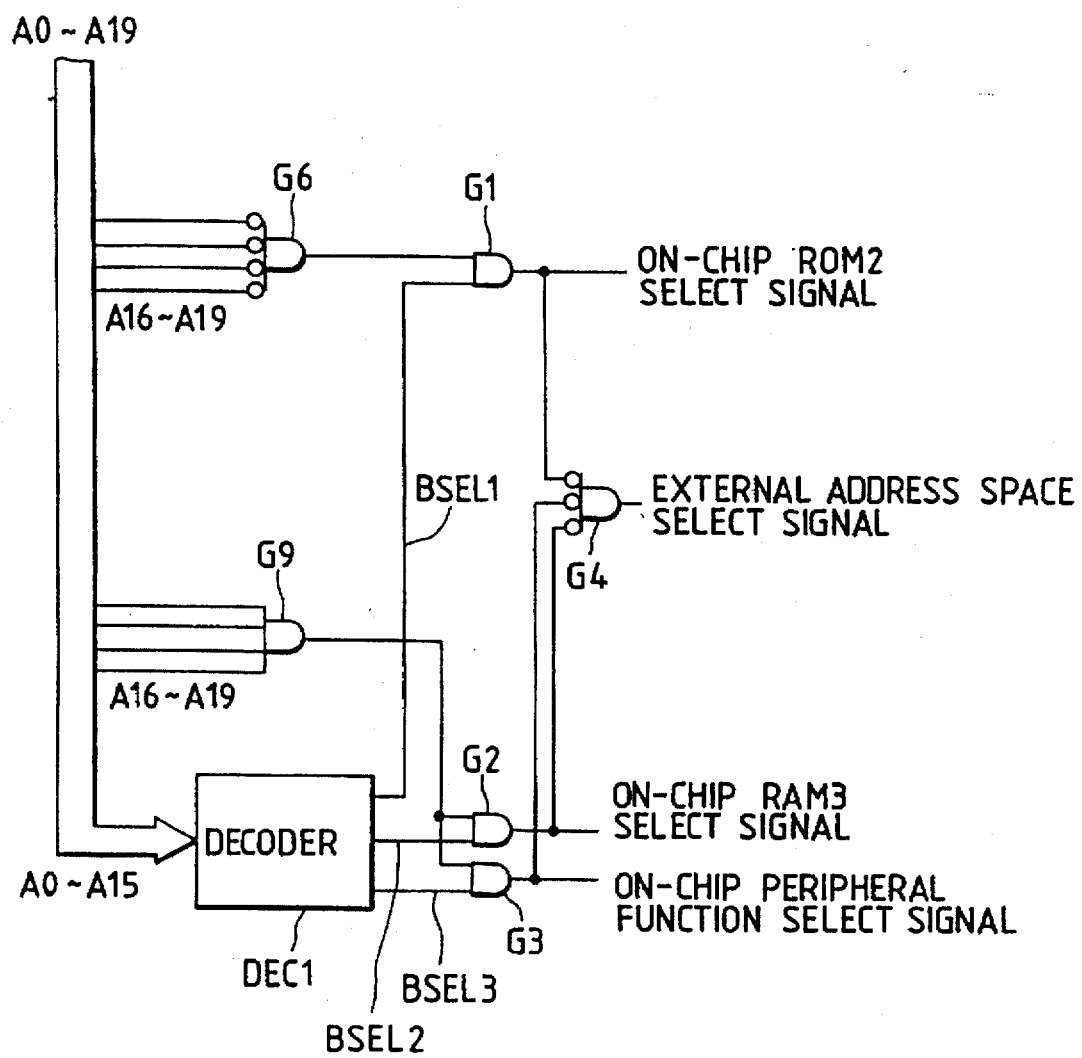
FIG. 20 is a logical diagram showing a function block select circuit for realizing the address map shown at (b) in FIG. 18.

FIG. 20 shows a function block selector for realizing the address map shown at (b) in FIG. 18. This function block selector is equivalent to a structure which is modified from that of FIG. 19 such that the register REG is at the 1 level and that the gates G7 and G10 are eliminated. Thus, the external address space continued to the on-chip RAM 3 can be used. The logical/physical scales can be reduced by eliminating four address buses and the aforementioned gates G5, G7, G8 and G10.

Figure 21:
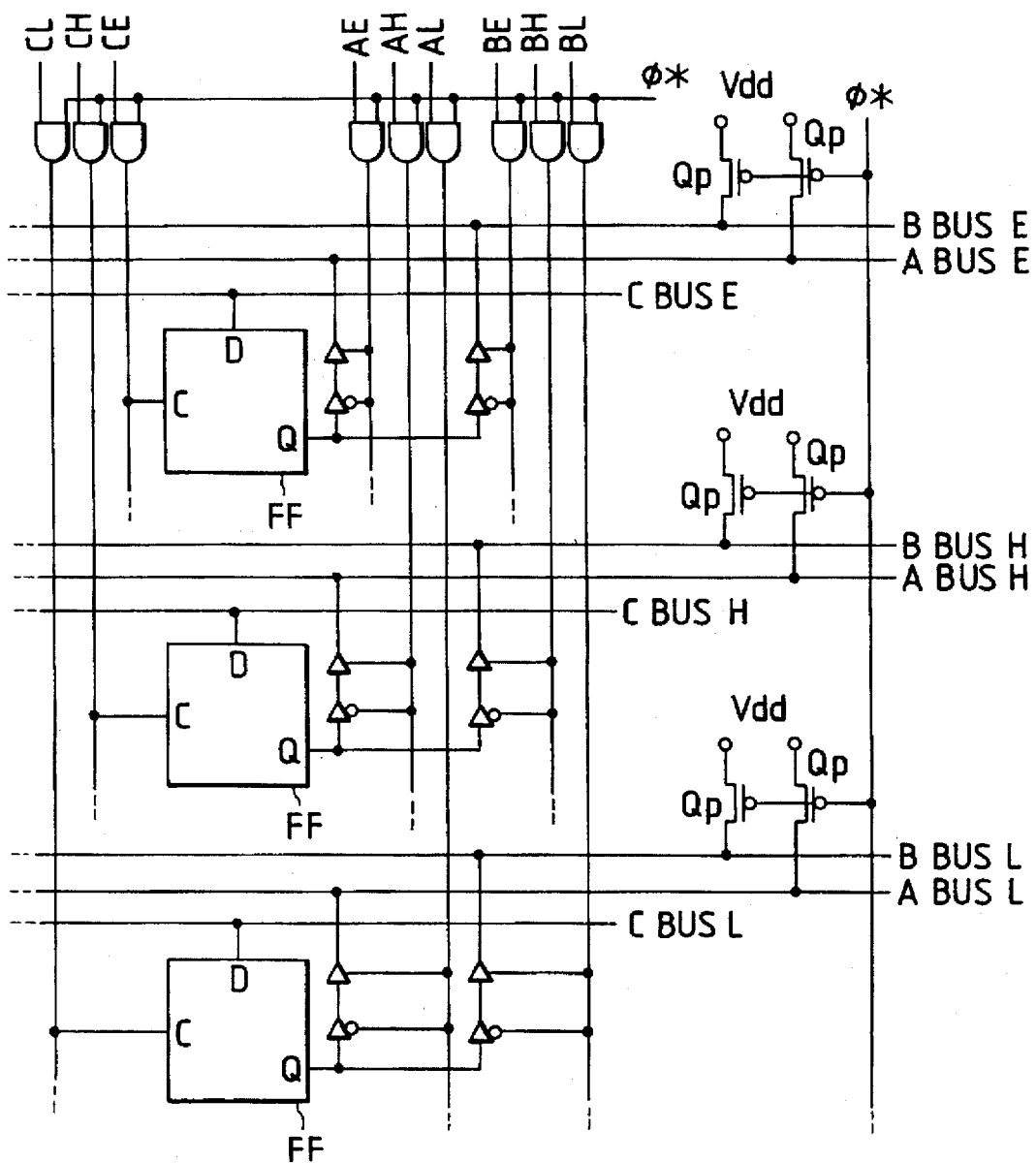
FIG. 21 is a specific logical circuit diagram showing the aforementioned various general registers, expansion registers, program counters and temporary registers.

FIG. 21 shows an example of a specific logical circuit of the aforementioned various general registers, expansion registers, program counters and temporary registers.

FIG. 21 representatively shown the structure of 3 bits. The register is constructed of a flip-flop circuit FF which can input data from the bus C and output them to the buses A and B. The data input/output are carried out on the basis of a signal coming from a control unit while a system clock ø (the asterisk * of which implies the "row enable") is at the low level. The general registers RiH and RiL and the expansion register Ei are individually fed with control signals AH, BH, CH, AL, BL, CL, AE, BE and CE so that they can Input/output independently of one another. Since the program counter PC is fixed at a length of 24 bits, the control signals AE, AH and AL, and BE, BH and BL, and CE, CH and CL are individually fed as common signals APC, BPC and CPC so that the input/output are accomplished as a whole. The temporary register TR is similar to the general registers and the expansion register although dependent upon its using method.

The individual buses A, B and C are given negative logics, although not especially limitative thereto. Moreover, the buses A and B are fixed at the high level (i.e., 0 level) by a P-channel MOS transistor Qp while the system clock ø is at the high level. The high level is fixed unless any block outputs any data while the system clock ø is at the low level.

Figure 22:
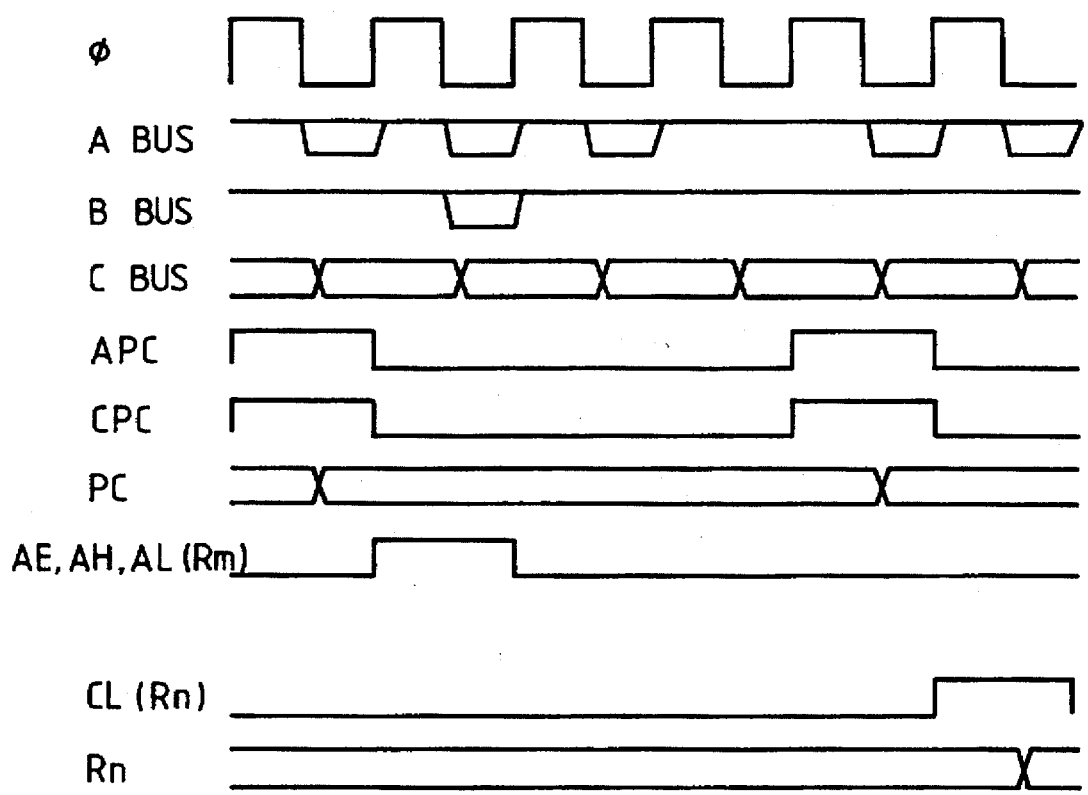
FIG. 22 is an operation timing chart showing one example of a general register and an expansion register executing an instruction {MOV.B @ (1234,R0), R1H} shown in FIG. 10.

FIG. 22 shows a timing chart of one example of the operations of the general registers and the expansion registers at the time of executing the aforementioned {MOV.B @ (1234, R0), R1H instruction}, as has been described with reference to FIG. 10.

The control signal APC is set to the 1 level at the aforementioned first step Sc1, i.e., the first cycle synchronized with the system clock ø and at the fifth step Sc5 as the fifth cycle so that the contents of the program counter PC are outputted to the A bus. Simultaneously with this, the control signal CPC takes the 1 level so that the contents of the C bus are inputted to the program counter PC. Since the output of the program counter PC is the so-called "master/slave", although not especially limitative thereto, not the contents of the C bus but the contents of the program counter PC immediately before are outputted to the A bus. At the second step Sc2, the control signals AE0, AH0 and AL0 of the expansion register E0 and the general register R0 are set to the 1 level so that the contents of the expansion register E0 and the general register R0 are outputted to the A bus. At the sixth step Sc6, the control signal AH1 of the general register R1 is set to the 1 level so that the contents of the C bus are outputted to the general register R1H. The control signals AE1 and AL1 are at the 0 level so that the contents of the expansion register E1 and the general register R1L are latched.

Figure 23:
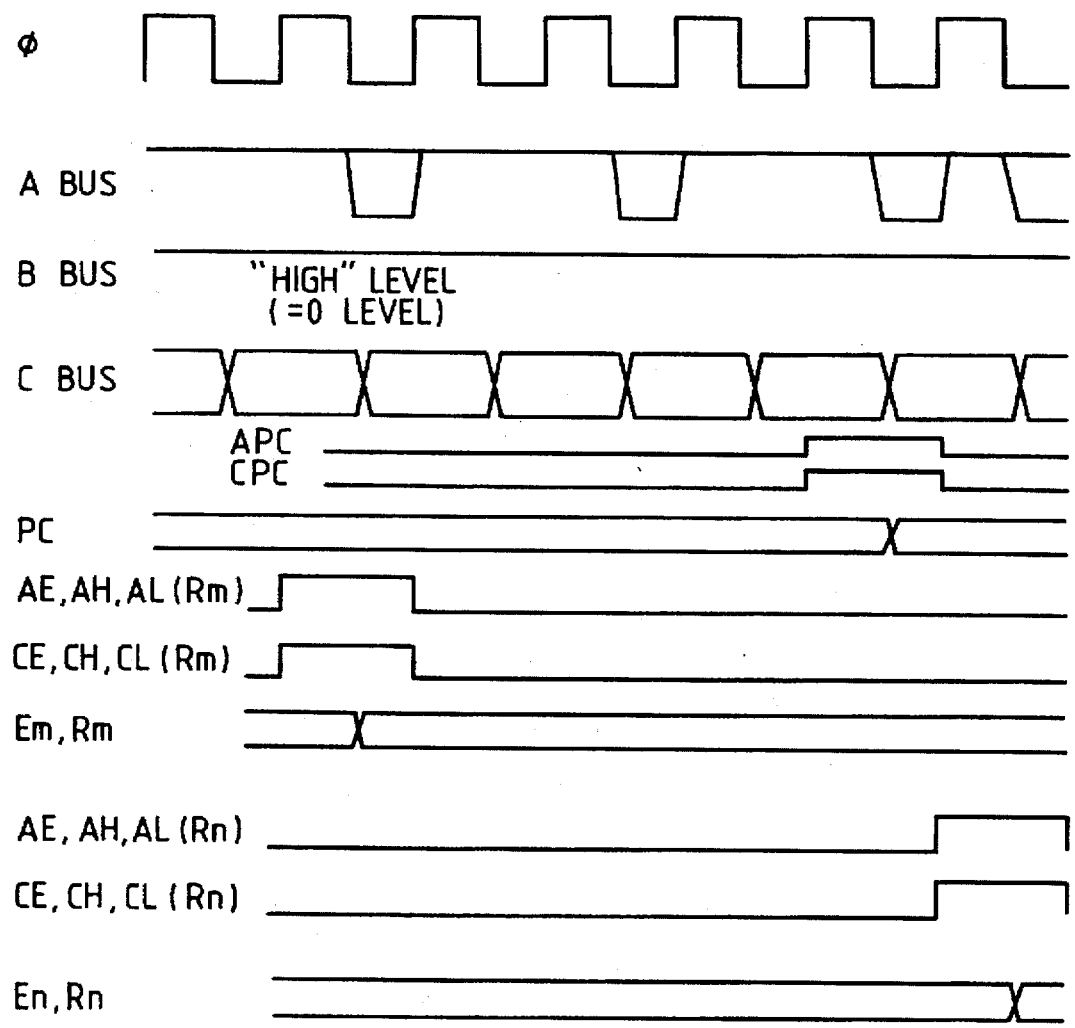
FIG. 23 is an operation timing chart showing one example of a general register executing an instruction {MOV.L @ R7+, R2} shown in FIG. 11.

FIG. 23 shows a timing chart of one example of the operations of the general registers at the time of executing the aforementioned {MOV.L @ R7+, R2} shown in FIG. 11.

At the second step Sd2 as the second cycle synchronized with the system clock ø, the control signals AE7, AH7 and AL7 of the expansion register E7 and the general register R7 are set to the 1 level so that the contents of the expansion register E7 and the general register R7 are outputted to the A bus. Simultaneously with this, the control signals CE7, CH7 and CL7 are set to the 1 level so that the contents of the C bus are inputted to the expansion register E7 and the general register R7. Since the outputs of the general registers are the so-called "master/slave" like before, not the contents of the C bus but the contents of the program counter PC immediately before are outputted to the A bus. At the sixth step Sd6, the control signal APC is set to the 1 level so that the contents of the program counter PC are outputted to the A bus. Simultaneously with this, the control signal CPC is set to the 1 level so that the contents of the C bus are inputted to the program counter PC. At the seventh step Sd7, the control signals CE2, CH2 and the CL2 of the expansion register E2 and the general register R2 are set to the 1 level so that the contents of the C bus are inputted to the expansion register E2 and the general register R2.

Figure 24:
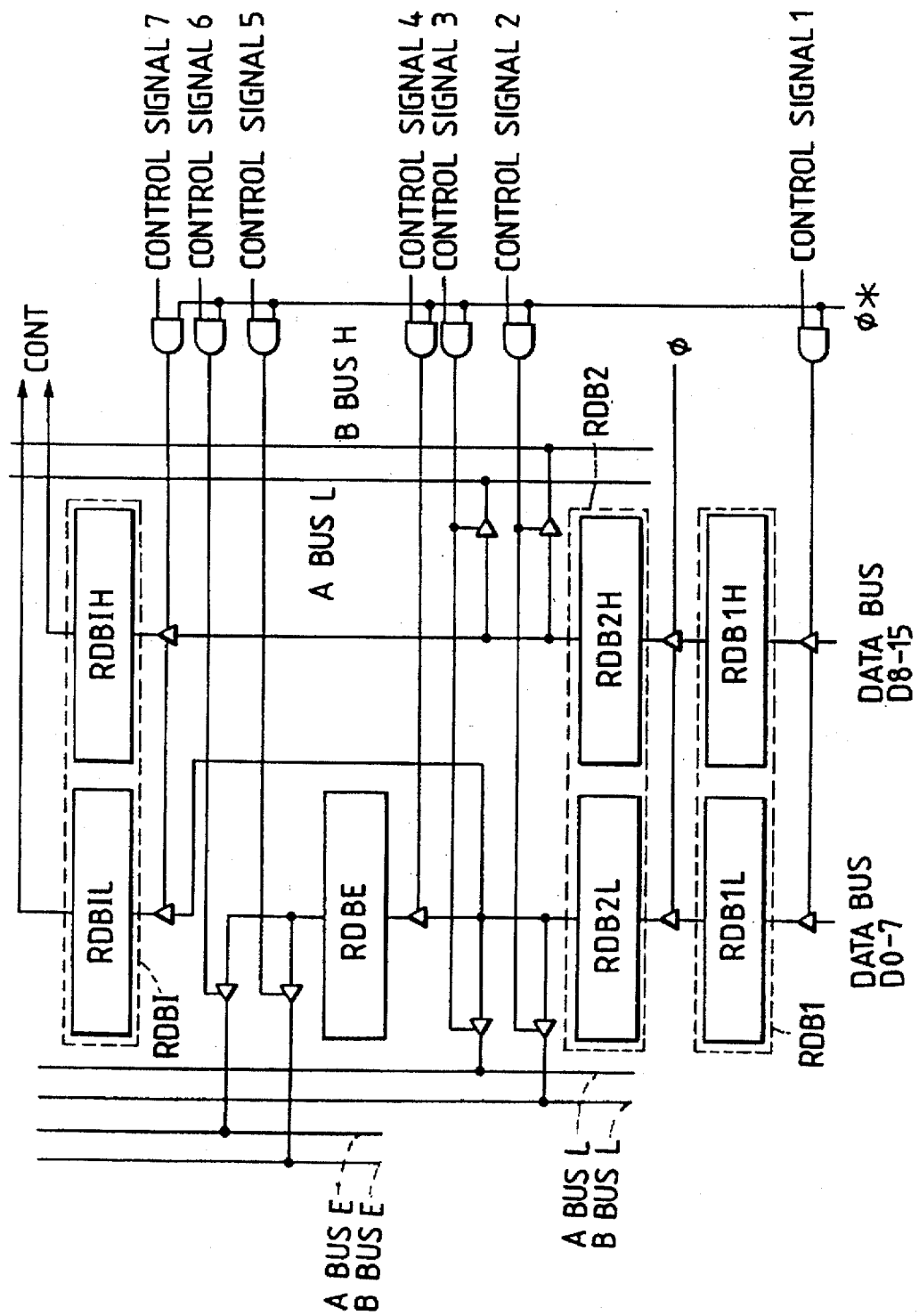
FIG. 24 is a logical circuit showing one specific example of a read data buffer RDB shown in FIG. 7.

FIG. 24 is a logical circuit diagram showing one specific example of the read data buffers RDB (RDBL, RDBH, RDBE) shown in FIG. 7.

The read data buffer is constructed to include: a first read buffer portion RDB1 (RDB1L, RDB1H) coupled to the buses A and B and internal data buses L (D0 to D7) and H (D8 to D15) contained in the single-chip microcomputer 100; a second read buffer portion RDB2 (RDB2L, RDB2H) coupled to the buses A and B and the first read buffer portion RDB1; an expansion read buffer portion RDBE coupled to the buses A and B and the second read buffer portion RDB2; and an instruction read buffer portion RDBI (RDBIL, RDBIH) coupled to the control unit CONT of the CPU 1 and the second read buffer portion RDB2. All of the first read buffer portion RDB1, the second read buffer portion RDB2 and the instruction read buffer portion RDBI have 16 bits. The expansion read buffer portion RDBE have 8 bits. The first read buffer portion RDB1 and the second read buffer portion RDB2 are connected with the buses A and B and the bits 15 to 0. The expansion read buffer portion RDBE is connected with the buses A and B, the bits 23 to 26 and the bits 7 to 0. The data thus read are at first latched in the first read buffer portion RDB1 while the system clock ø is at the low level, and are then transferred to the second read buffer portion RDB2 while the system clock ø is at the high level. In case the read data are required later, they are transferred from the aforementioned second read buffer portion RDB2 to the expansion read buffer portion RDBE or the instruction read buffer portion RDBI and are latched therein before the next data are read.

Figure 25:
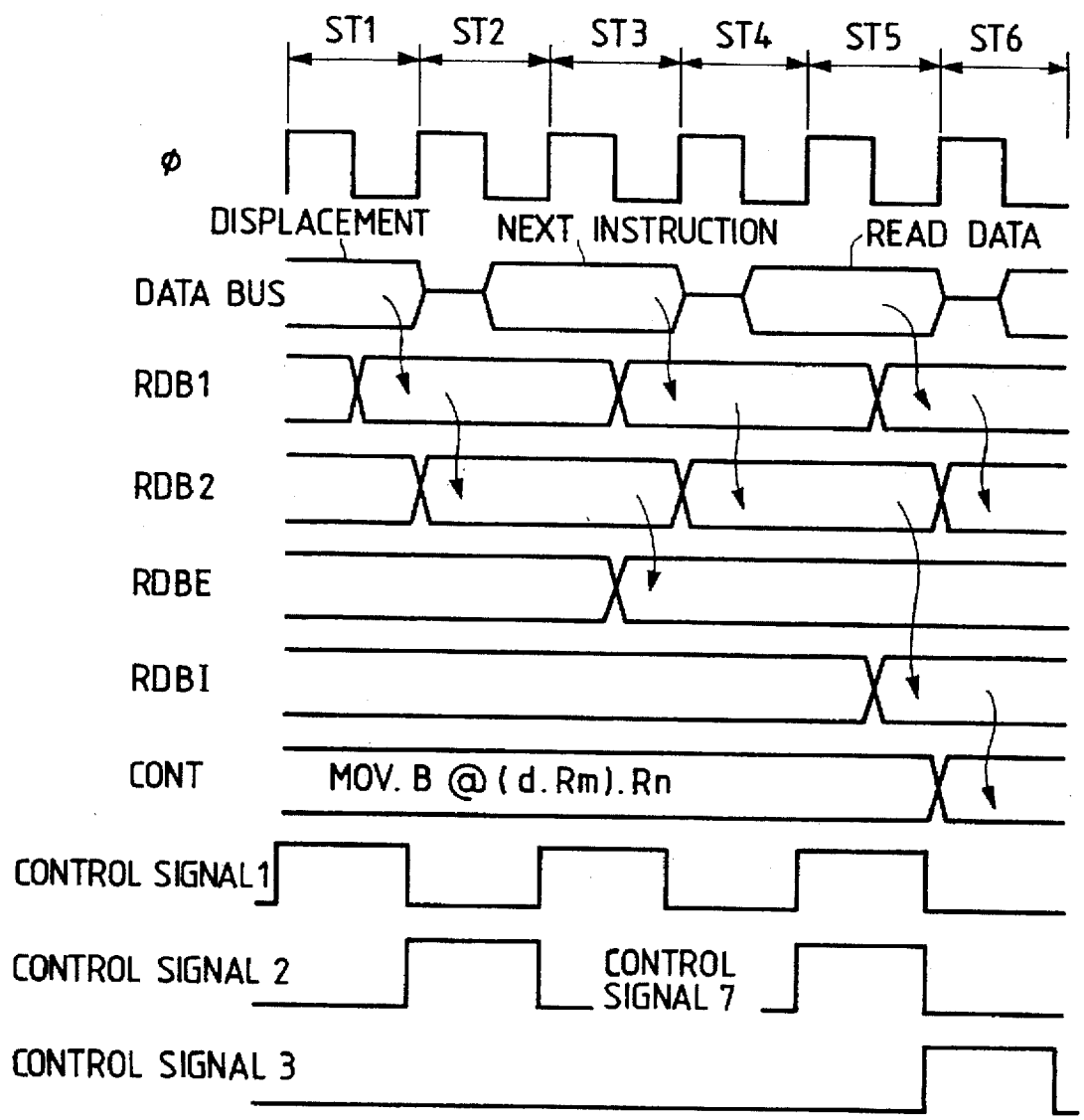
FIG. 25 is an operation timing chart showing one example of a read data buffer executing an instruction {MOV.B @ (1234,R0), R1H} shown in FIG. 10.

FIG. 25 is a timing chart showing one example of the operations of the read data buffer at the time of executing the aforementioned instruction {MOV.B @ (1234, R0), R1H} described with reference to FIG. 10.

At a first step ST1, a third step ST3 and a fifth step ST5, the control signal 1 is set to the 1 level so that the contents of the data buses D0 to D15 are latched in the first read buffer portion RDB1. These contents are transferred at the next step to the second read buffer portion RDB2. At a second step ST2, the control signal 2 is set to the 1 level so that the displacement latched in the second read buffer portion RDB2 is outputted to the B bus. At the third step ST3, the control signal 4 is set to the 1 level so that the contents of the less significant 8 bits of the next instruction latched in the second read buffer portion RDB2 are transferred to the expansion read buffer portion RDBE. At the step ST5, the control signal 7 is set to the 1 level so that the contents of the next instruction latched in the second read buffer portion RDB2 are transferred to the instruction read buffer portion RDBI. From a sixth step ST6, the control unit CONT uses those contents to start the decoding of the next instruction. At the sixth step ST6, the control signal 3 is set to the 1 level so that the read data latched in the second read buffer portion RDB2 are outputted to the A bus.

Figure 26:
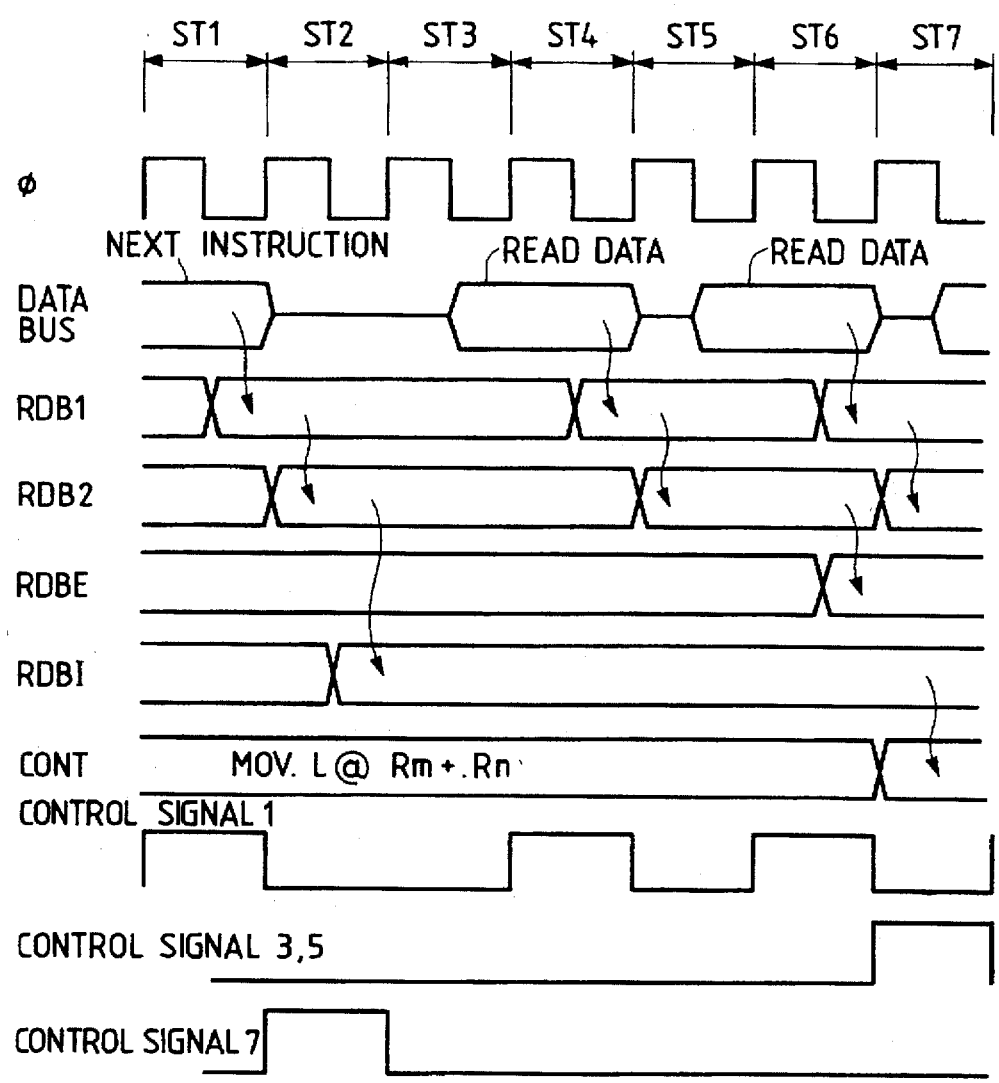
FIG. 26 is an operation timing chart showing one example of the read data buffer of FIG. 24 executing an instruction {MOV.L @ R7+, R2} shown in FIG. 11.

FIG. 26 is a timing chart showing one example of the operations of the read data buffer of FIG. 24 at the time of executing the aforementioned instruction {MOV.L @ R7+, R2} described with reference to FIG. 11.

At the first step ST1, the fourth step ST4 and the sixth step ST6, the control signal 1 is set to the 1 level so that the contents of the data buses D0 to D15 are stored in the first read buffer portion RDB1. These contents are transferred at the next step to the second read buffer portion RDB2. At the second step ST2, the control signal 7 is set to the 1 level so that the contents of the next instruction latched in the second read buffer portion RDB2 are transferred to the instruction read buffer portion RDB1. From a seventh step ST7, the control unit CONT uses those contents to start the decoding of the next instruction. At the sixth step ST6, the control signal 4 is set to the 1 level so that the read data latched in the second read buffer portion RDB2 are transferred to the expansion read buffer portion RDBE. At the seventh step ST7, the control signals 3 and 5 are set to the 1 level so that the read data of 24 bits latched In the second read buffer portion RDB2 and the expansion read buffer portion RDBE are outputted to the A bus.

Figure 27:
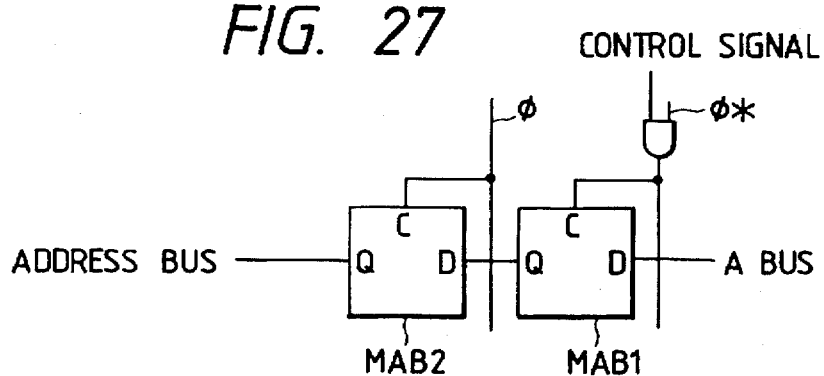
FIG. 27 is a logical circuit showing one specific example of an address buffer AB.

FIG. 27 shows a logical circuit of a specific example of the address buffer AB (ABL, ABH, ABE). In the same FIGURE, each bit of the address buffer AB is constructed to include flip-flop circuits MAB1 and MAB2, of which the flip-flop circuit MAB1 is connected with the bus A and the flip-flop circuit MAB2 and this flip-flop circuit MAB2 is connected with the flip-flop circuit MAB1 and the address bus. The input of the data of the flip-flop circuit MAB1 from the A bus is carried out when the control signal is at the 1 level while the system clock ø is at the low level. The contents of the flip-flop circuit MAB1 are transferred to the flip-flop circuit MAB2, while the system clock ø is at the high level, and are outputted to the address bus.

Figure 28:
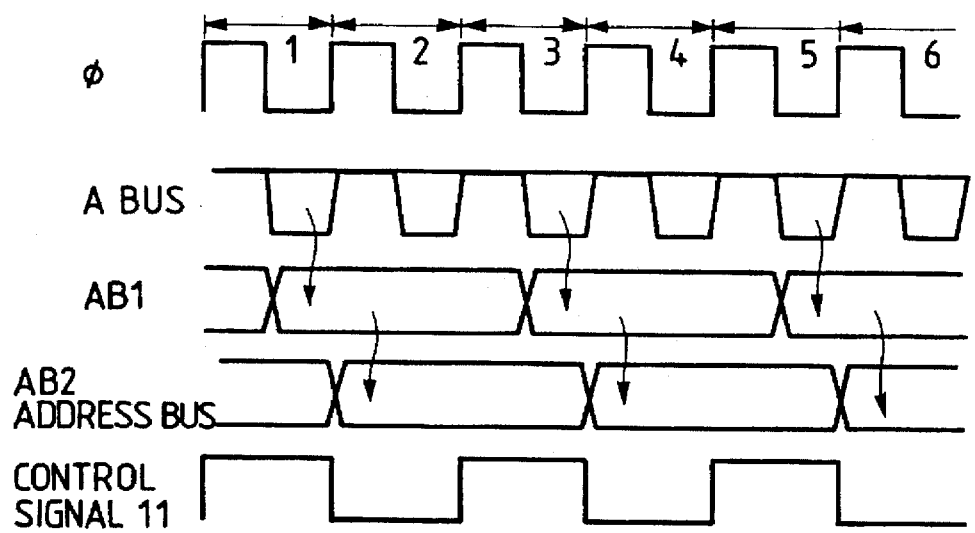
FIG. 28 is an operation timing chart showing one example of the address buffer of FIG. 27 executing an instruction {MOV.B @ (1234,R0), R1H} shown in FIG. 10.

FIG. 28 shows a timing chart of one example of the operations of the address buffer of FIG. 27 at the time of executing the aforementioned instruction {MOV.B @ (1234, R0), R1H} described with reference to FIG. 10. At the first step, the third step and the fifth step, the control signal is set to the 1 level so that the contents of the A bus are latched in the flip-flop circuit MAB1. These contents are transferred at the next step to the flip-flop circuit MAB2 and are outputted to the address bus.

Figure 29:
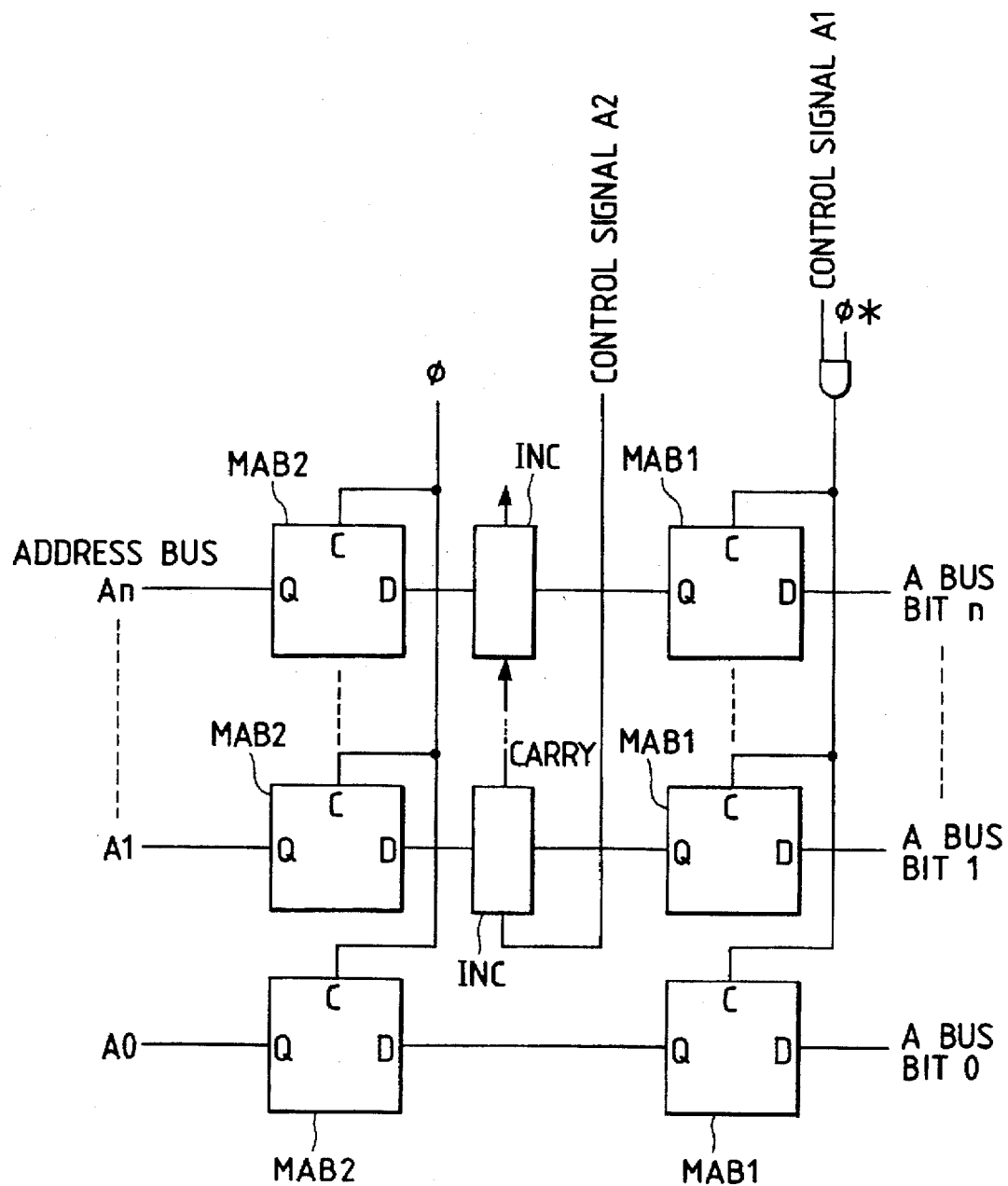
FIG. 29 is a logical circuit showing a modification of the address buffer AB.

FIG. 29 shows a modification of the address buffer AB. As is different from the address buffer of FIG. 27, an adder such as an incrementer INC is added between the flip-flop circuits MAB1 and MAB2 so that it can add a constant value of 2. Since the access of the unit of 16 bits is divided into two times so as to access the data of 24 bits, the value of 2 has to be added to the address after the first access. For this addition, the aforementioned incrementer INC is used. Although the hardware scale is enlarged more than that of the case in which the general ALU is used, the scale of the control unit CONT can be reduced by omitting the following troubles. The address calculated once when the general arithmetic unit is used has to be temporarily latched in a temporary register or the like. After this, the contents of the temporary register have to be read, and the value of 2 has to be added to the contents by the ALU. The, the addition result has to be transferred to the address buffer. Thus, scale of the control unit CONT can be reduced. The type of those address buffers may be selected on the basis of the overall structure of the CPU. For example, the address buffer of FIG. 29 may be adopted in case the scale of the control unit CONT is so larger than that of the execution unit EXE that It is not desirable on the chip layout.

Figure 30:
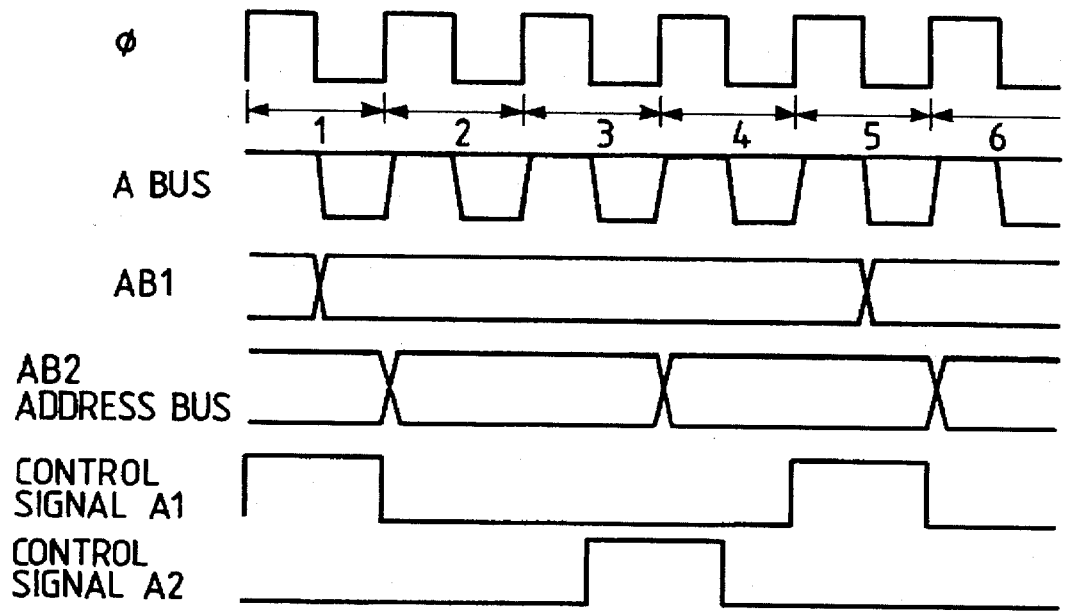
FIG. 30 is an operation timing chart showing one example of the address buffer of FIG. 29 executing an instruction {MOV.B @ (1234,R0), R1H} shown in FIG. 10.

FIG. 30 shows a timing chart of one example of the operations of the address buffer of FIG. 29 at the time of executing the aforementioned instruction {MOV.B @ (1234, R0), R1H} described with reference to FIG. 10. At the first step and the fifth step, the control signal A1 is set to the 1 level so that the contents of the A bus are latched in the flip-flop circuit MAB1. These contents are transferred at the next step to the flip-flop circuit MAB2 and outputted to the address bus. At the later half of the third step, the control signal A2 is set to the 1 level so that the contents of adding 2 to the flip-flop circuit MAB1 are transferred at the fourth step to the flip-flop circuit MAB2 and outputted to the address bus.

According to the embodiments thus far described, the following effects can be achieved.

(1) The expansion registers specified for addressing are added to the general registers of 16 bits existing on-chip in the CPU 1 of 8 bits so that the entirety including the added expansion registers can be grasped as the address data to access the memory or the like. At this time, the addressing is executed at a unit of both the expansion registers and the corresponding general registers, and the updating of the general registers for latching the address data is executed together with the corresponding expansion register. Moreover, the entirety including the expansion registers is grasped at a unit to process the carry and borrow which are generated in the addressing. Thus, the address space to be linearly used can be expanded from the 64 Kilobytes to 16 Megabytes at the maximum, as compared with the case using the address register of 16 bits. As compared with the conventional address space expansion technology using the page registers, the programs and compilers can be easily made, and the various address modifications can be made so that relatively rich addressing modes can be supported to match the area of the address space.

(2) Since, moreover, the aforementioned expansion registers have their applications limited to address generations, the number of kinds or combinations of the executable instructions can be reduced without inviting a serious reduction in the data processing ability to suppress the increase in the logical and physical scales of the CPU.

(3) When the addressing modes are diversified as the linear address space is extended, the combinations of the addressing modes and the instructions are also necessarily increased with the diversity. At this time, the general registers for latching the data other than the address data and the outside of the CPU are disabled to perform direct calculations except the bit operation in response to one instruction so that the logical and physical scales of the CPU can be suppressed as much as possible even with the increase in the aforementioned combinations while suppressing the serious reduction in the processing ability of the CPU.

(4) Thanks to the foregoing effects, the peripheral functions such as timers or memories necessary for the system structure in the applications for the device controls can be packaged on one chip, while expanding the address space like the CPU of 16 bits, so that the desired system for the device control applications can be made on-chip to realize the so-called "single-chip microcomputer" easily.

(5) in view of the difference in the functions between when all the aforementioned expansion registers and general registers are used for the address data and when the same are used for other data, both the data transfer control of totally 24 bits for all the expansion registers and the general registers and the data transfer control of totally 16 bits for all the aforementioned general registers are made possible inside and outside of the CPU. At this time, the addresses outside of the CPU are specified on the basis of the address data latched by a group of the aforementioned expansion registers and general registers, so that the data transfer control can be accomplished between other general registers and the outside of the CPU.

(6) The arithmetic logical operator executes the arithmetic operations (including the shifting operations in the present embodiment), the logical operations and the comparisons for the contents of the expansion registers and the general registers. The arithmetic logical operator has an operational bit number of 24 bits capable executing the arithmetic operations of the address data of 24 bits for all the aforementioned expansion registers and general registers in one machine cycle. As a result, the address operations can be efficiently executed without processing the carry and borrow, which are caused in the operations of the address data to be grasped as a whole, by means of another machine cycle.

Although our invention has been specifically described in connection with the embodiments thereof, it should not be restricted thereto but can naturally be modified in various manners within the scope thereof.

For example, no restriction is exerted upon the examples of the block structure, register structure and specific logical circuits of the CPU 1. The bit number of the registers or the number of the registers themselves can be arbitrarily selected. The addressing mode and the method of calculating the effective address to be used can be modified in various manners. Although the ALU is constructed to have 24 bits, the physical scale can be reduced if the ALU is constructed to have 16 bits and if the data of 24 bits are calculated by dividing them into the less significant 16 bits and the more significant 8 bits. The expansion registers may have a length of 16 bits. In the foregoing embodiments, moreover, the data can be mutually transferred between the expansion registers and the general registers.

In the foregoing description, our invention has been described mainly in case it is applied to the single-chip microcomputer providing the background of its application. Despite of this description, however, the present invention should not be restricted thereto but can be widely applied to other data processing systems under the condition that the scale of the processible data or programs are preferred to the data processing ability or that the address space is effectively expanded while suppressing the increase in the logical and physical scales of the CPU.

The effects to be obtainable from the representatives of the invention to be disclosed herein will be briefly described in the following.

Since the central processing unit (CPU) is provided with the data latching means of a predetermined bit number to be wholly used for latching the address data and partially used for latching the data, the linearly usable address space can be expanded, and the program and compiler can be easily made, as compared with the conventional address space expanding technology using the page register. Moreover, a variety of address modifications can be accomplished to support the relatively rich address modes matching the area of the address space. Since, still moreover, the entire use of the data latching means has its application restricted to that for address generations, the number of kinds of executable instructions and their combinations can be reduced without inviting a serious reduction of the data processing ability, to suppress the increase in the logical and physical scales of the CPU.

Between the general registers for latching the data other than the address data and the outside of the CPU, a direct calculation except the bit operation cannot be accomplished in response to one instruction thereby to suppress the logical and physical scales of the CPU to the minimum.

In case the scales of the data and programs are preferred to the data processing ability, the peripheral functions such as the timers or memories necessary for the system structure in the application of the device control can be packaged in one chip so that the system necessary for the application of the device control can be built on chip to realize the so-called "single-chip microcomputer".

Another embodiment of the single-chip microcomputer according to the present invention will be described in the following with reference to FIGS. 32 to 92. Incidentally, reference numerals and symbols appearing in FIGS. 32 to 92 should be understood to be different from those used in FIGS. 1 to 31 although they are partially overlapped.

[1] Entirety of Single-Chip Microcomputer

Figure 32:
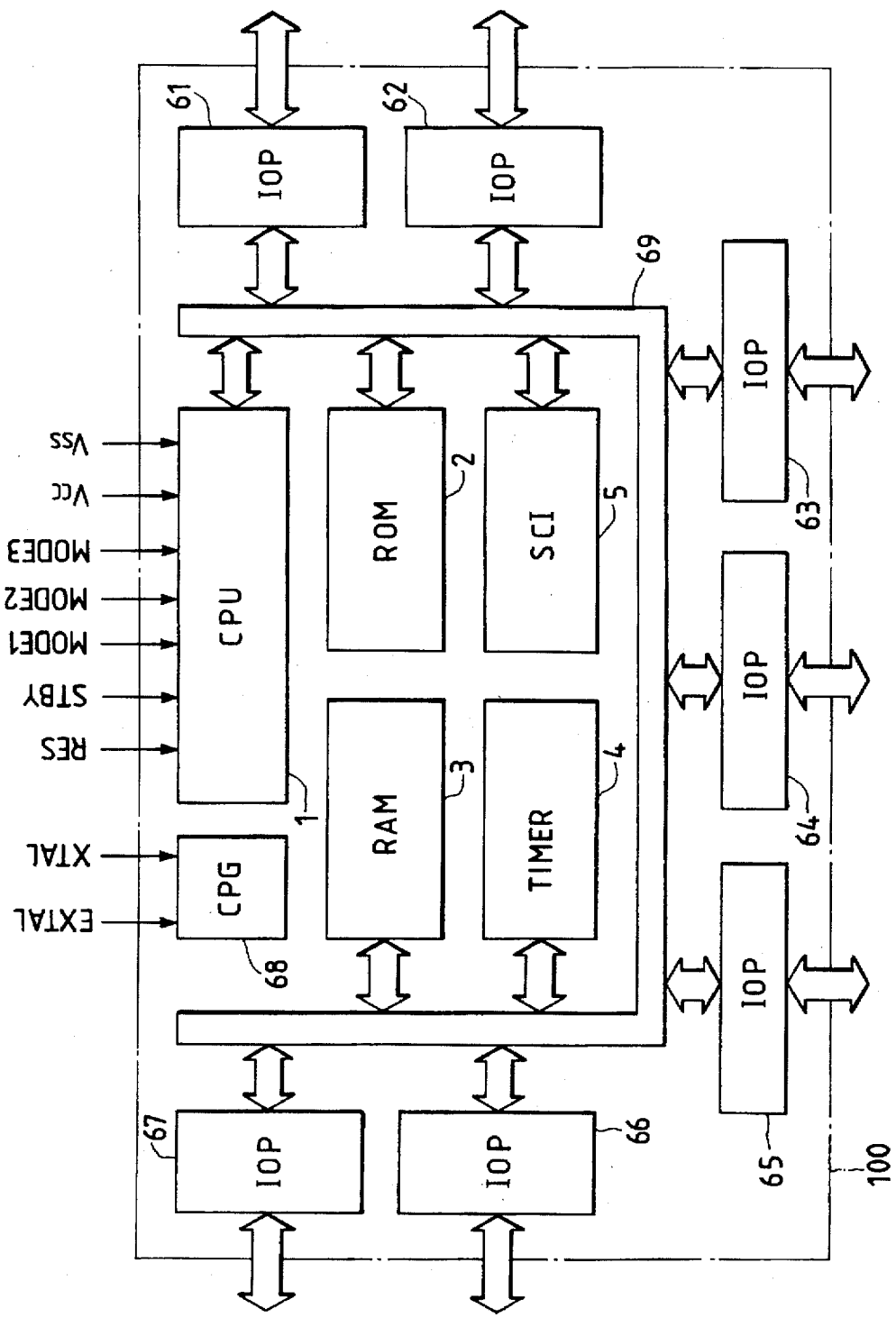
FIG. 32 is a block diagram showing a single-chip microcomputer according to a first embodiment of the present invention.

FIG. 32 shows a single-chip microcomputer according to a first embodiment of the data processing system of the present invention. The single-chip microcomputer 100, as shown in the same FIGURE, is constructed of function blocks including: a CPU (i.e., Central Processing Unit) for overall controls; a ROM (i.e., Read Only Memory) 2 for storing the operation programs or the like of the CPU 1; a RAM (i.e., Random Access Memory) 3 to be used as the working area of the CPU 1 and as the temporary storage area of data; a timer 4; a serial communication interface (SCI) 5; a clock pulse generator 68; and input/output ports (IOP) 61 to 67. These function blocks are mutually connected by an internal bus 69. This internal bus 69 includes an address bus, a data bus and a control bus, although not especially limitative thereto. Such single-chip microcomputer 100 is formed over one semiconductor substrate such as a silicon substrate by the well-known semiconductor integrated circuit manufacture technology.

The single-chip microcomputer 100 operates in synchronism with a reference clock generated on the basis of the external block which is inputted either from a crystal oscillator connected with the terminal XTAL and EXTAL of a clock pulse generator CPG or from the outside. This reference clock has the minimum unit called "state". Incidentally, reference letters Vss and Vcc appearing in the Drawing designate power terminals. Reference characters MODE1 to MODE3 designate mode signals for the CPU 1.

When a reset signal RES is fed to the aforementioned CPU 1, the single-chip microcomputer 100 is reset. When this reset state is released, the CPU 1 reads a start address to execute a reset exception handling for starting the read of an instruction from the start address. This start address is assumed to be stored at a zero address, although not especially limitative thereto. After this, the CPU 1 sequentially read and decodes instructions from the ROM 2 to either process the data or transfer the data with the RAM 3, the timer 4, the SCI 5 and input/output ports 61 to 67 on the basis of the decoded result, although not especially limitative thereto. Specifically, the CPU 1 processes on the basis of the instruction stored in the ROM 2 with reference to either the data inputted from the input/output ports 61 to 67 or the instruction inputted from the SCI 5, and uses the input/output ports 61 to 67 and the timer 4 in accordance with the result to output signals to the outside thereby to control a variety of devices. The read/write of the aforementioned ROM 2, RAM 3 and timer 4 are assumed to be executed in two states of bytes (e.g., 8 bits)/word (e.g., 16 bits), although not especially limitative.

The instructions of such CPU 1 have the minimum unit of 2 bytes, and the instructions or data of 16 bits are arranged, if in the memory, in a continuous region of 2 bytes beginning from an even number.

[2] Example of Structure of 8-Bit Expansion Register+ 16-Bit General Register

FIG. 33 shows a first example of the structure of a register built on-chip in the aforementioned CPU 1. This CPU 1 is constructed to include: eight general registers R0L and R0H to R7L and R7H each having a length of 16 bits; eight expansion registers E0 to E7 each having a length of 8 bits; a program counter PC having a length of 24 bits; and a condition code register CCR having a length of 8 bits. The general registers R0L and R0H to R7L and R7H can store not only data having a length of 8 bits independently of the more and less significant 8 bits and but also data having a length of 16 bits jointly of the more and less significant 8 bits.

In case the general registers R0L and R0H to R7L and R7H are used as address registers, addresses of totally 24 bits are generated by setting the 16 bits owned by the general registers as the less significant 16 bits of the address and by setting the 8 bits owned by the corresponding expansion register as the more significant 8 bits. In other words, the CPU 1 can utilize the continuous address space which is specified by the address of 24th bit at the maximum. Moreover, the CPU 1 can modify the address of 24th bit in various modes. For example, the CPU 1 adds a displacement to the aforementioned 24th bit address, multiplies it by a constant number, or increments the contents of another register. If, in this modification, a carry or borrow takes place in the calculation of the less significant 16 bits, the more significant 8 bits are carried or borrowed. Simultaneously as this result is latched in the address register, the result of the more significant 8 bits is also latched in the corresponding expansion register.

The expansion registers E0 to E7 can be used like the general registers as the data registers. In other words, the data can be processed between the expansion registers and between the expansion registers and the general registers.

A program counter PC is a counter of 24 bits and indicate the addresses of instructions to be executed next by the CPU 1. The condition code register CCR includes: an interrupt mask bit (I), a carry flag (C), a zero flag (Z), a negative flag (N) and an overflow flag (V). The interrupt mask bit I disables an interruption of the CPU 1, when at 1, and enables the interruption when at 0. The remaining flags reflect the operation result.

Figure 34:
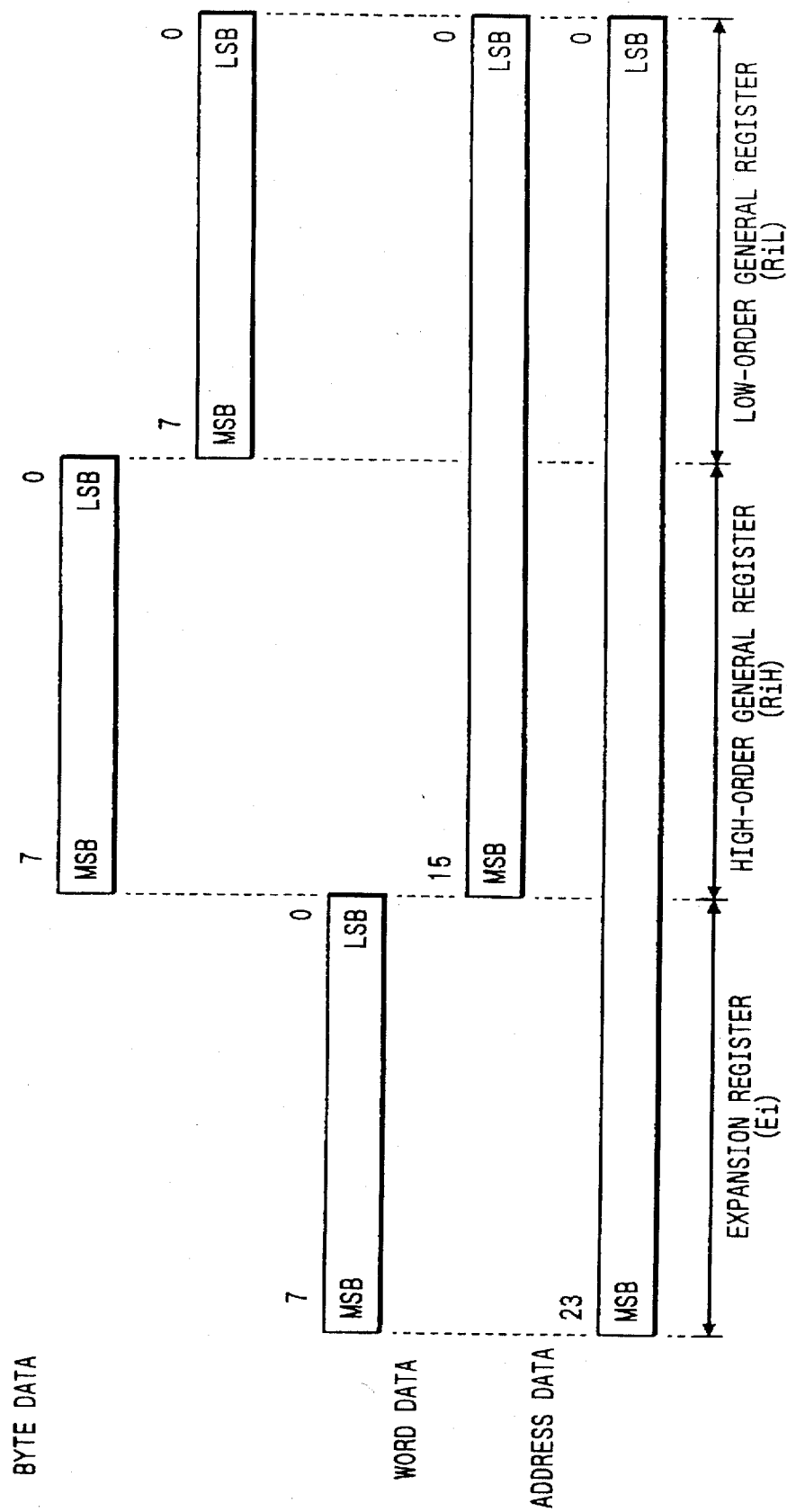
FIG. 34 is a data structure diagram of the register structure of FIG. 33.

FIG. 34 shows an example of the data structures of the general registers R0L and R0H to R7L and R7H and the expansion registers E0 to E7. The byte data handled by the CPU 1 is stored in a high-order register RiH (i=0, 1, - - -, and 7) or a low-order general register RiL, or an expansion register Ei. In case the high-order general register RiH is used, the 15th bit corresponds to the most significant bit (MSB), and the 8th bit corresponds the least significant bit (LSB). Likewise, the 7th bit corresponds to the most significant bit, and the 0th bit corresponds to the least significant bit in case the low-order general register RiL. In case the expansion register Ei is used in the byte data, the 23rd bit corresponds to the most significant bit, and the 16th bit corresponds to the least significant bit. The word data are stored in the general registers Ri (RiL and RiH). At this time, the 15th bit corresponds to the most significant bit of the data, and the 0th bit corresponds to the least significant bit. The address data is stored in an expansion register Ei and the general registers RiL and RiH. The 7th bit of the expansion register Ei corresponds to the most significant bit of the address data, and the 0th bit of the general register RiL corresponds to the least significant bit. Incidentally, the CPU 1 handles 1-bit data or binary coded decimal data, which will not be described in detail because they have no direct relation to the present invention.

Figure 35:
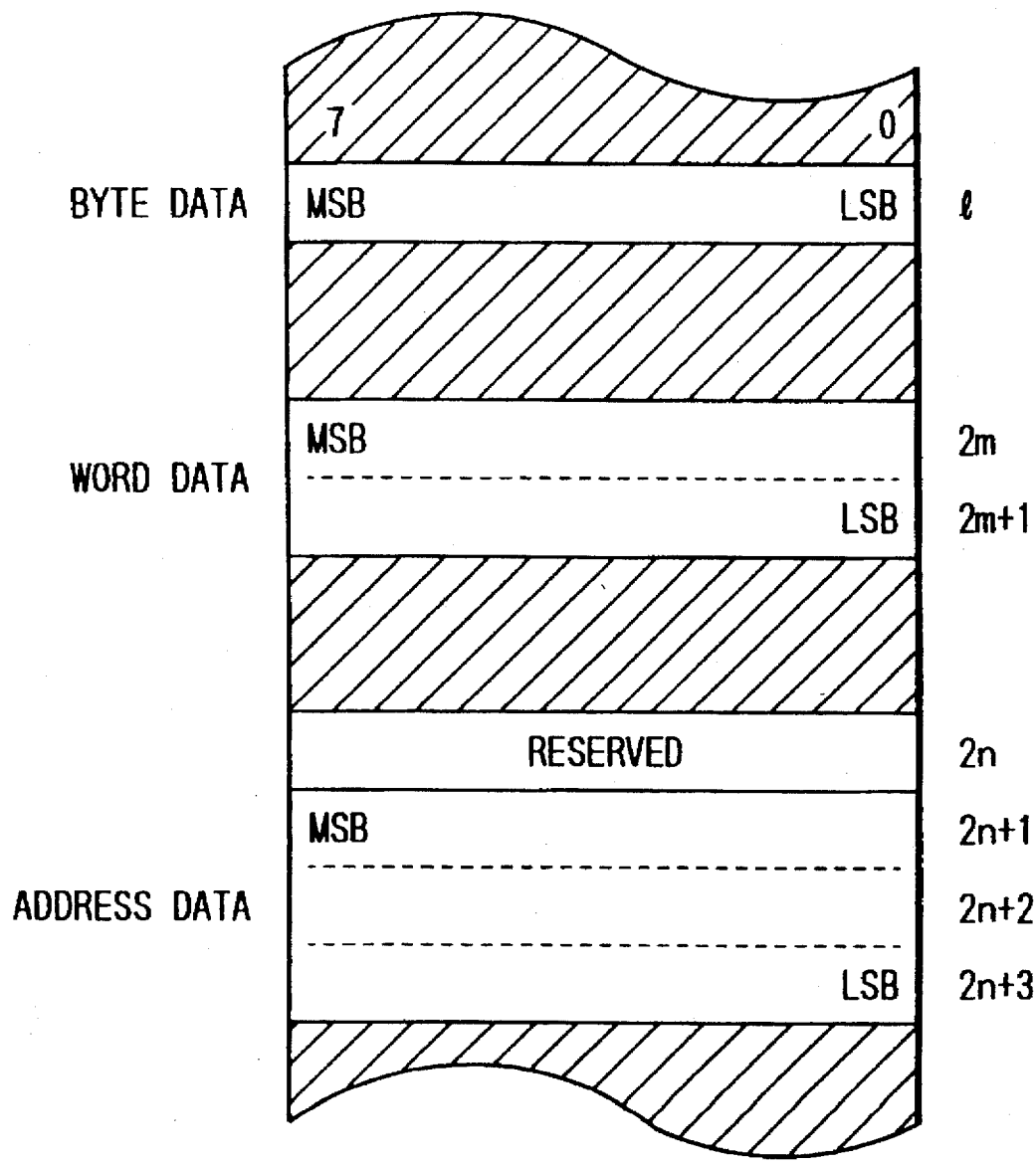
FIG. 35 is a diagram showing a data structure on a memory in case the register structure of FIG. 33 is adopted.

FIG. 35 shows an example of the data structure of a memory such as RAM 3 or ROM 2. The memory is addressed at the unit of byte, although not especially limitative thereto. The byte data to be handled by the CPU 1 are stored in each address (1) of the memory. The word data are stored by connecting the even address (2m) and odd address (2m+1) of the memory. The 7th bit of the even address corresponds to the most significant bit, and the 0th bit of the odd address corresponds to the least significant bit. The address data are stored at 4-byte addresses (4m, 4m+1, 4m+2 and 4m+3) beginning from the even address (4m). The 1 byte of the leading even address is reserved for the future expansion on the system. The 7th bit of the nest odd address corresponds to the most significant bit of the address data, and the 0th bit of the odd address at the 4th byte.

[3] Problems of Example of Structure of 8-Bit Expansion Register+16-Bit General Register The expansion registers Ei are incremented to the general registers Ri of 16 bits of the aforementioned CPU 1 of 8 bits so that the entirety including the incremented expansion registers can be grasped as the address data to access the memory or the like. At this time, the addressing grasps a unit of address at both the expansion registers and the corresponding general registers to process the carry and borrow which are generated in the addressing. Thus, the address space to be linearly used can be expanded from the 64 Kilobytes to 16 Megabytes at the maximum, as compared with the case using the address register of 16 bits. In this case, however, we have found out that the following problems are still included.

At first, the aforementioned register structure can use twenty four registers of 8 bits, eight registers of 16 bits or eight registers of 24 bits in its entirety. In case of an increment of 8 bits, for example, 5 bits are individually required for specifying an addend (or source register) and an augend (or destination register). Since the instruction length is at a unit of 2 bytes, the minimum instruction length is not obtained for the arithmetic of 8 bits unless the specification of the operation is 6 bits. For the arithmetic of 16 bits, on the other hand, the specification of the register may be 3 bits. In this respect, it is difficult or not advisable to make the aforementioned 8-bit arithmetic and instruction format common. Moreover, it is wasteful to use 5 bits for specifying the twenty four registers. In other words, the 5 bits could specify the desired one of the thirty two registers intrinsically.

Secondly, the reserved region, as described in FIG. 35, is required to drop the memory using efficiency in case the data of 24-bit length is arranged in the memory. If the reserved region is eliminated, it is difficult for the data of 16 bits and the data of 24 bits to exist together on the memory. In case the data of at least 16 bits are arranged on the memory, their arrangement is limited to the continuous region of 2 bytes beginning from an even number. Thus, this limit deteriorates the purposes of simplifying the internal structure of the CPU to reduce the logical and physical scales, to reduce the production cost and to improve the operating speed.

Thirdly, the data of 24-bit length is difficult to handle because they have a length of odd bytes excepting that they are used as the address. The conventional microcomputer handles the data of 8 bits or 16 bits, as has been described hereinbefore, if the conventional microcomputer is used together and can store the word data, two word data cannot be stored in one register of the CPU 1 when the data are to be transferred. When the word data are transferred thereto, the contents of the one register of the CPU 1 have to be divided into the data of 16 bits and the data of 8 bits. In case the aforementioned compiler is to be made, moreover, the so-called "host computer" finds it difficult to handle the data of 24 bits like before to drop the design efficiency and performance of the compiler.

[4] Example of Structure of 16-Bit Expansion Register+16-Bit General Register

An example of the register structure capable of solving the problem described in the foregoing item [3] will be further described in the following.

FIG. 36 shows a second example of the structure of registers built on-chip in the CPU 1. This CPU 1 is constructed to include: eight general registers R0L and R0H to R7L and R7H each having a length of 16 bits; eight expansion registers E0 to E7 each having a length of 16 bits; a program counter PC having a length of 24 bits; and a condition code register CCR having a length of 8 bits. The general registers R0L and R0H to R7L and R7H can latch not only the data of 8-bit length while having their more significant 8 bits and less significant 8 bits independently of each other but also the data of 16 bit length while having their more and less significant bits connected to each other. The expansion registers Ei cannot be divided into 8 bits and used independently of each other.

In case the general registers RiL and RiH are used as address registers, addresses of totally 32 bits are generated by setting the 16 bits contained in the general registers RiH and RiL to the less significant 16 bits of the address and the contents of the corresponding expansion registers Ei to the more significant 16 bits of the address, and addresses of 24 bits are generated by ignoring the more significant 8 bits of the expansion registers Ei. The CPU 1 can utilize the continuous address space which is specified by the address of 24 bits or 32 bits. Moreover, this address of 32 bits or 24 bits can be modified in various manners, as has been described hereinbefore. In this modification, the high-order expansion registers Ei are carried or borrowed in case the carry or borrow occurs in the calculations of the less significant 16 bits. Incidentally, the address data is assumed to have 24 bits in the following description. Accordingly, the bit length of the program counter PC of FIG. 36 is set to 24 bits. The bit length of the program counter PC may be set to 32 bits.

The expansion registers E0 to E7 can be used, like the general registers, as 16-bit registers for the data registers. In other words, the data can be calculated between the expansion registers and between the expansion registers and the general registers. Incidentally, the condition code register CCR is similar to the aforementioned one, and its detailed description will be omitted.

Figure 37:
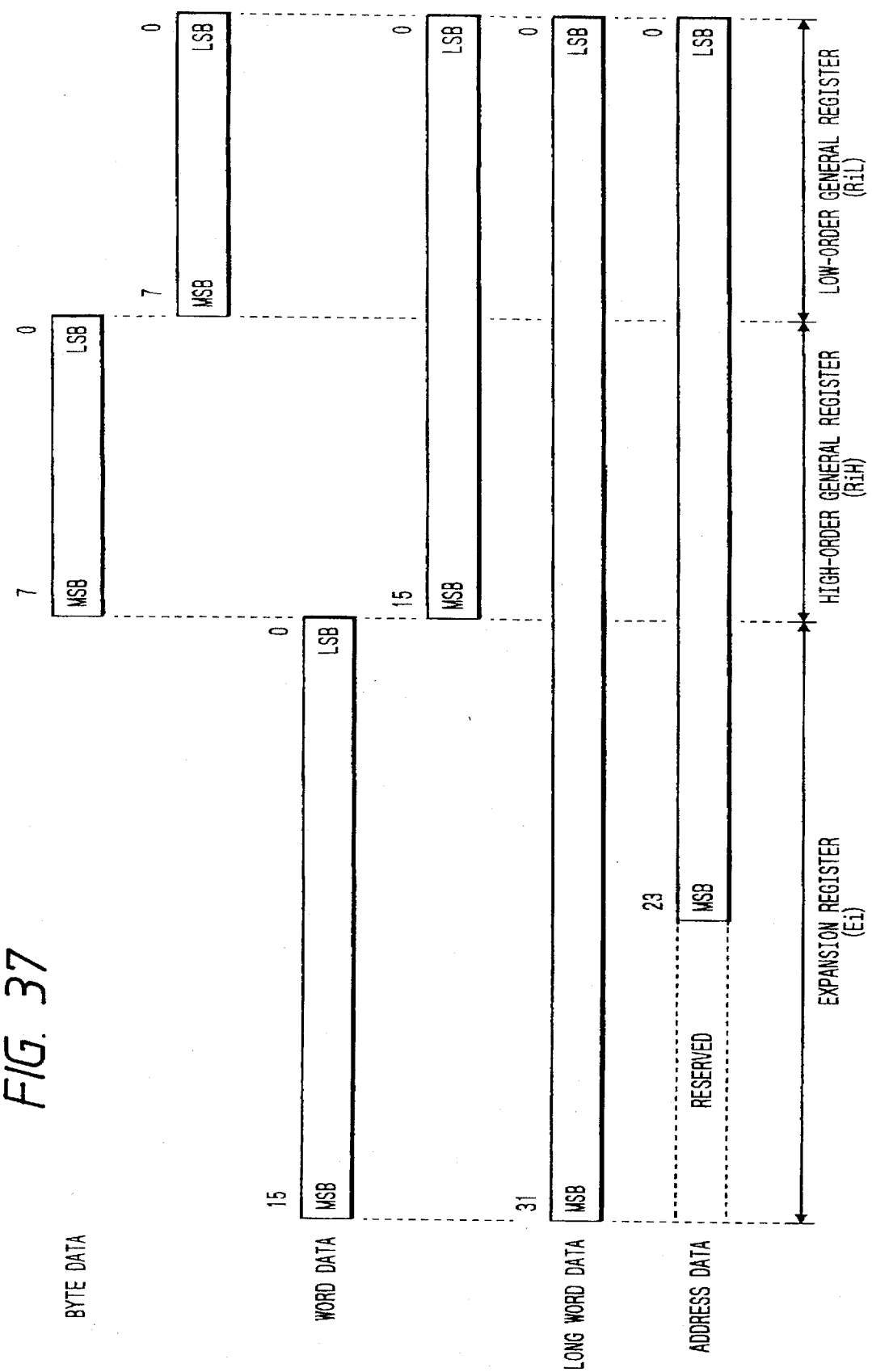
FIG. 37 is a diagram showing a data structure on registers of the CPU.
Figure 38:
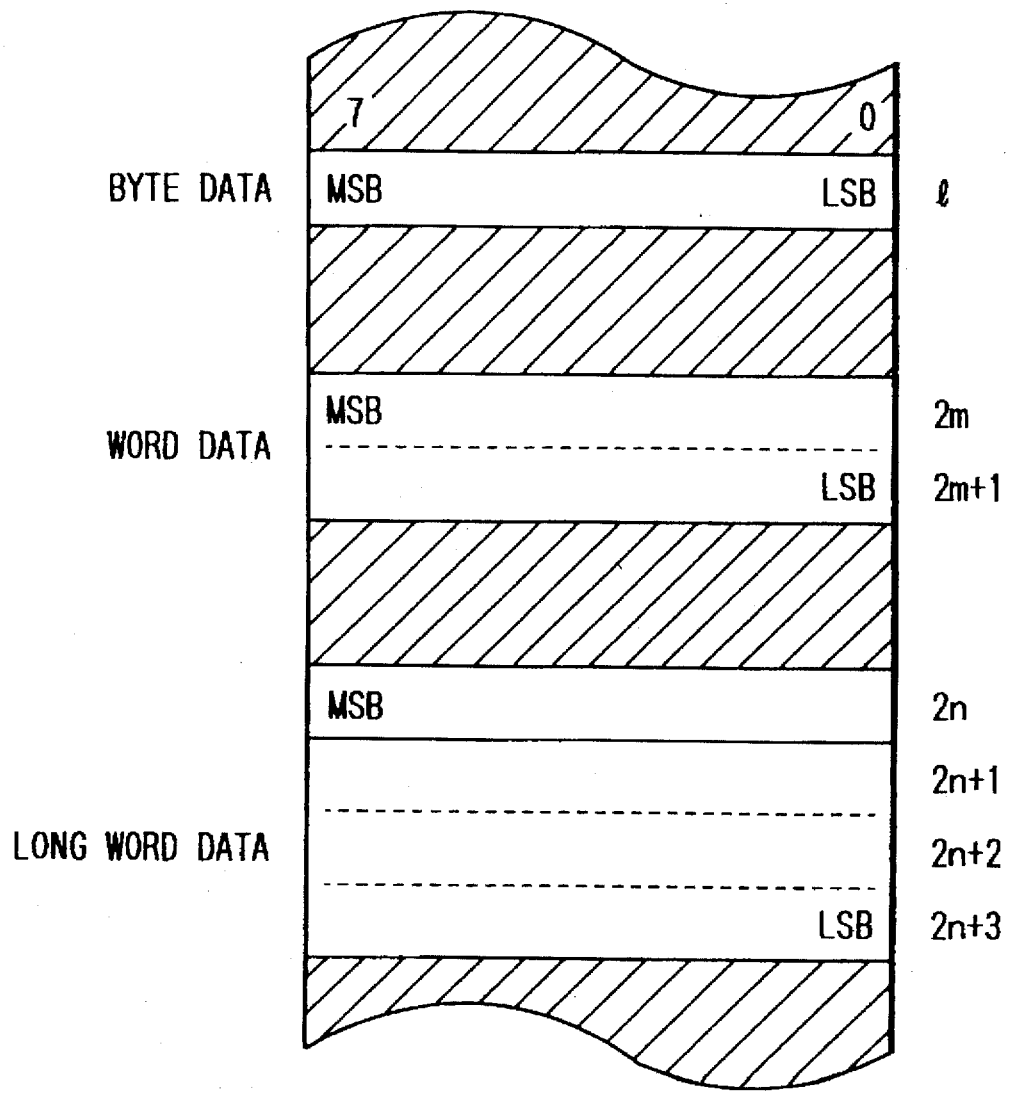
FIG. 38 is an explanatory diagram showing the register structure which has been examined by us.

FIG. 37 shows an example of the data structure of the general registers R0L and R0H to R7L and R7H and the expansion registers E0 to E7. The byte data to be handled by the CPU 1 are latched in the high-order general registers RiH (i=0, 1, - - -, and 7) or the low-order general registers RiL. At this time, the 15th bit corresponds to the most significant bit of the data, and the 0th bit corresponds to the least significant bit. The long word data of 32 bits are latched in the general registers Ri and the expansion registers Ei. The address data of 24 bits are latched as the long word data in the expansion registers Ei and the general registers Ri. At this time, the more significant 8 bits of the expansion registers Ei are used as the reserved region. Incidentally, the reserved address data of 8 bits and 24 bits are also merely called together as the "long word address data".

FIG. 88 shows an example of the data structure of a memory such as RAM 3 or ROM 2. As before, the memory is addressed at the unit of byte. The byte data to be handled by the CPU 1 are stored in each address (1) of the memory. The word data are stored by connecting the even address (2m) and odd address (2m+1) of the memory. The 7th bit of the even address corresponds to the most significant bit, and the 0th bit of the odd address corresponds to the least significant bit. The long word data are stored at 4-byte addresses (2n, 2n+1, 2n+2 and 2n+3) beginning from the even address. The 7th bit of the leading even address corresponds to the most significant bit, and the 0th bit of the odd address of the fourth byte corresponds to the least significant bit.

[5] Advantages of Example of Structure of 16-Bit Expansion Register+16-Bit General Register At first, the entirety of the aforementioned register structure uses sixteen 8 bit registers, sixteen 16-bit registers and eight 24-bit registers. For the 8-bit and 16 bit calculations, the specification of the registers is 4 bits so that the instruction format can be shared. Since, moreover, 4 bits are used for specifying a desired register from the sixteen registers, the information bit number for the specification is not wasted.

Secondly, in case the long word data are arranged in the memory, no reserved region is required. In case the address may have a length of 24 bits, wastefulness will likewise occur. However, no wastefulness occurs at least in case other long word data are to be latched.

Thirdly, the long word data can be easily handled as data even in case they are not used as the address. The data transfer with the conventional microcomputer is also easy but not wasteful. Moreover, the host computer of the compiler will not drop the designing efficiency and performance of the compiler.

Fourthly, the register structure of FIG. 36 has its bit number increased to about 4/3 times as large as that of the register structure of FIG. 33, and the logical and physical scales of the CPU 1 may be accordingly increased. As has been described before, however, the program scale can be reduced for an identical processing by improving the using efficiency of the memory and the performance of the compiler. Thus, the capacity and physical scale of the memory such as the ROM can be reduced to raise no obstruction to the reduction in the physical scale of the single-chip microcomputer in its entirety. As a result, the CPU has its internal structure simplified to reduce the logical and physical scales and the production cost and to improve the operating speed. Incidentally, the description to be made in the following corresponds to the case in which the register structure of FIG. 36 is adopted.

[6] Example of Calculations of Addressing Mode and Effective Address

Figure 41:
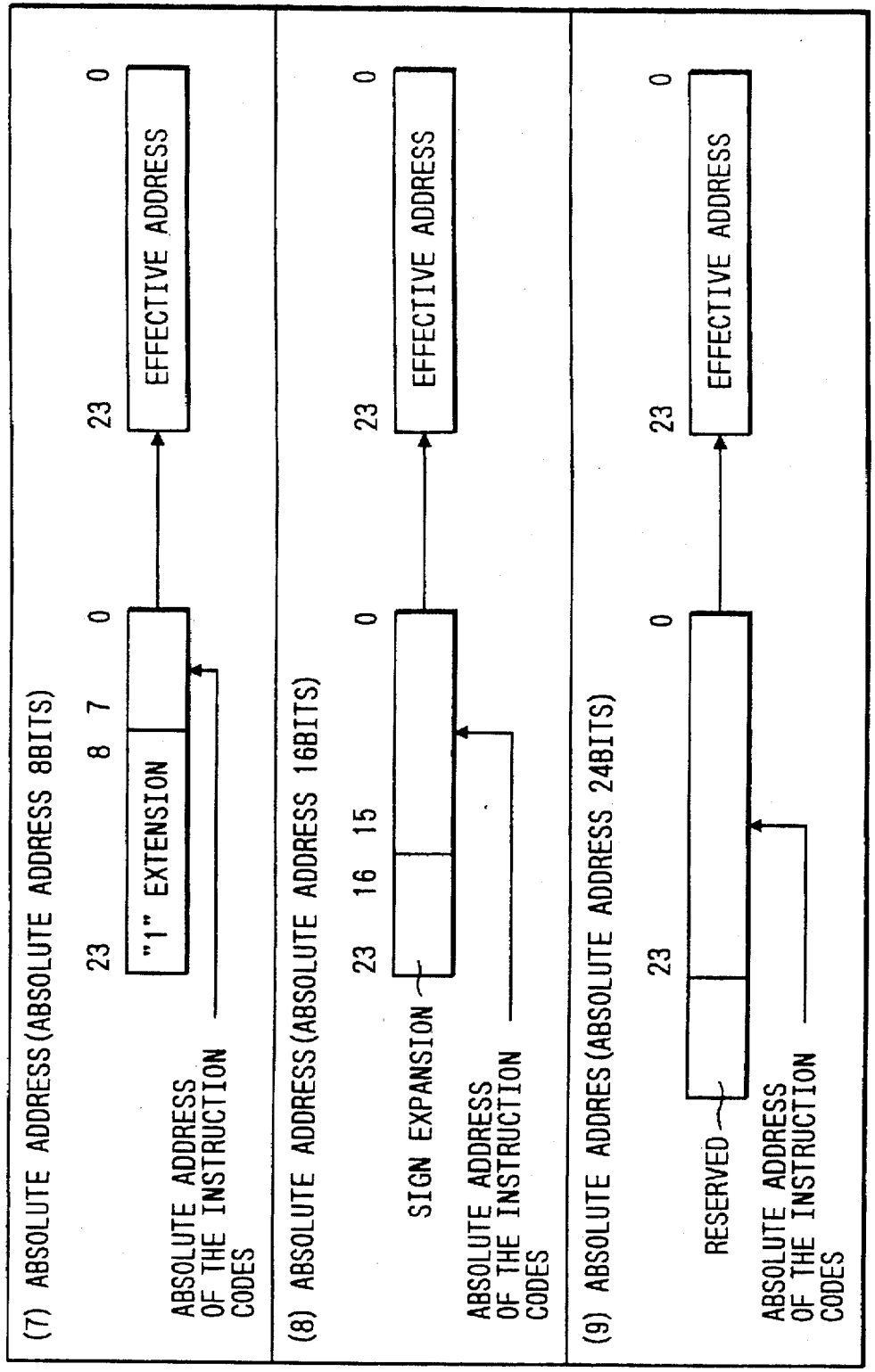
FIG. 41 is an explanatory diagram showing still another example of the effective address calculating method by the CPU.
Figure 42:
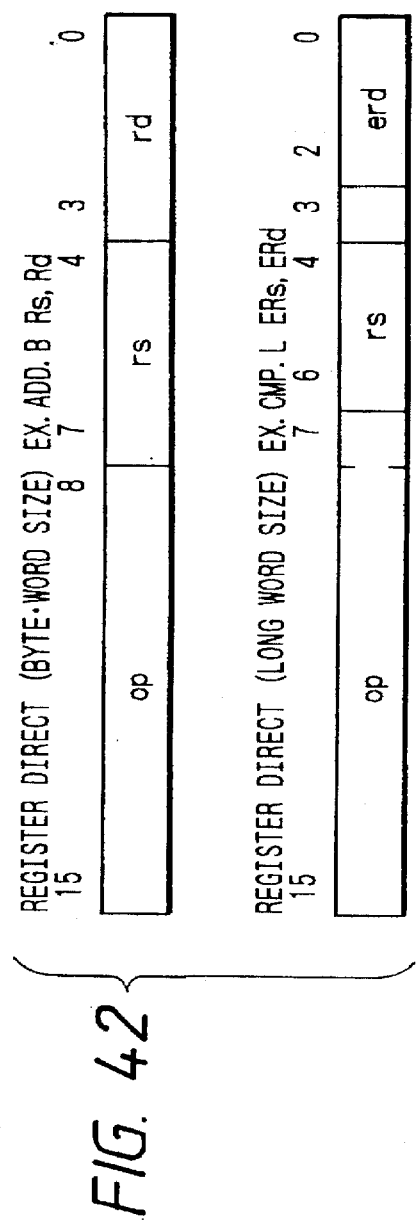
FIG. 42 is an explanatory diagram showing one example of the instruction format of the CPU.
Figure 43:
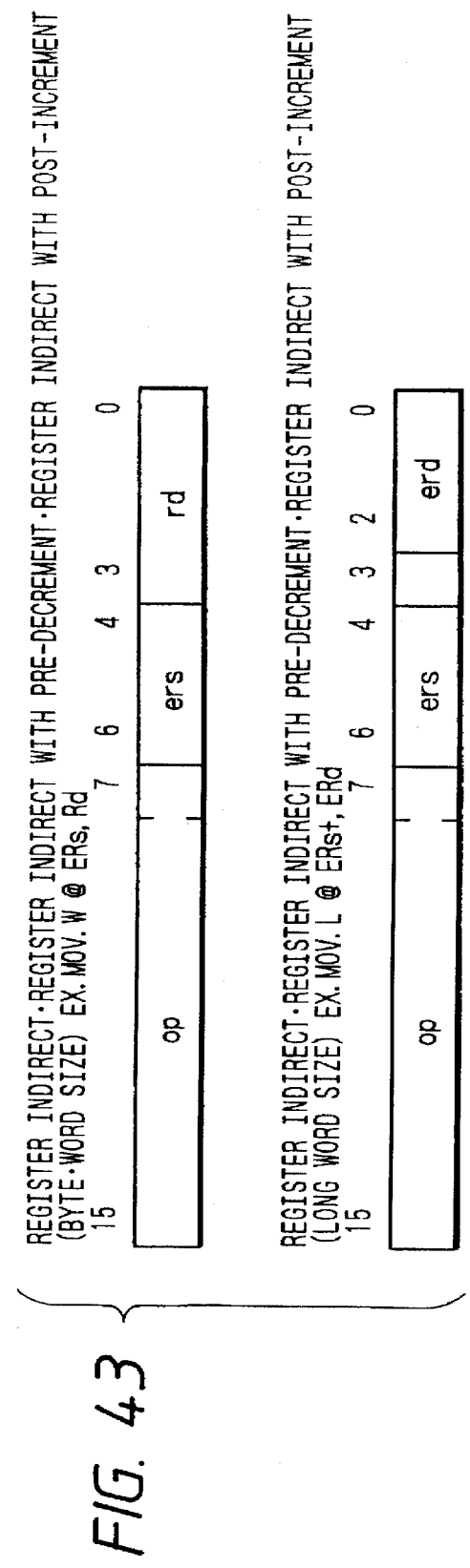
FIG. 43 is an explanatory diagram showing another instruction format of the CPU.

FIGS. 89 to 41 show one example of the method of calculating the addressing mode and effective address of the CPU 1.

The register indirect, as shown at (1) in FIG. 89, contains a portion for specifying the register in the instruction codes, and the address on the memory is specified by using as the address the totally 24 bits of the contents of the register specified with the instruction codes and the corresponding expansion register. The more significant 8 bits are ignored because the address may have 24 bits.

Figure 39:
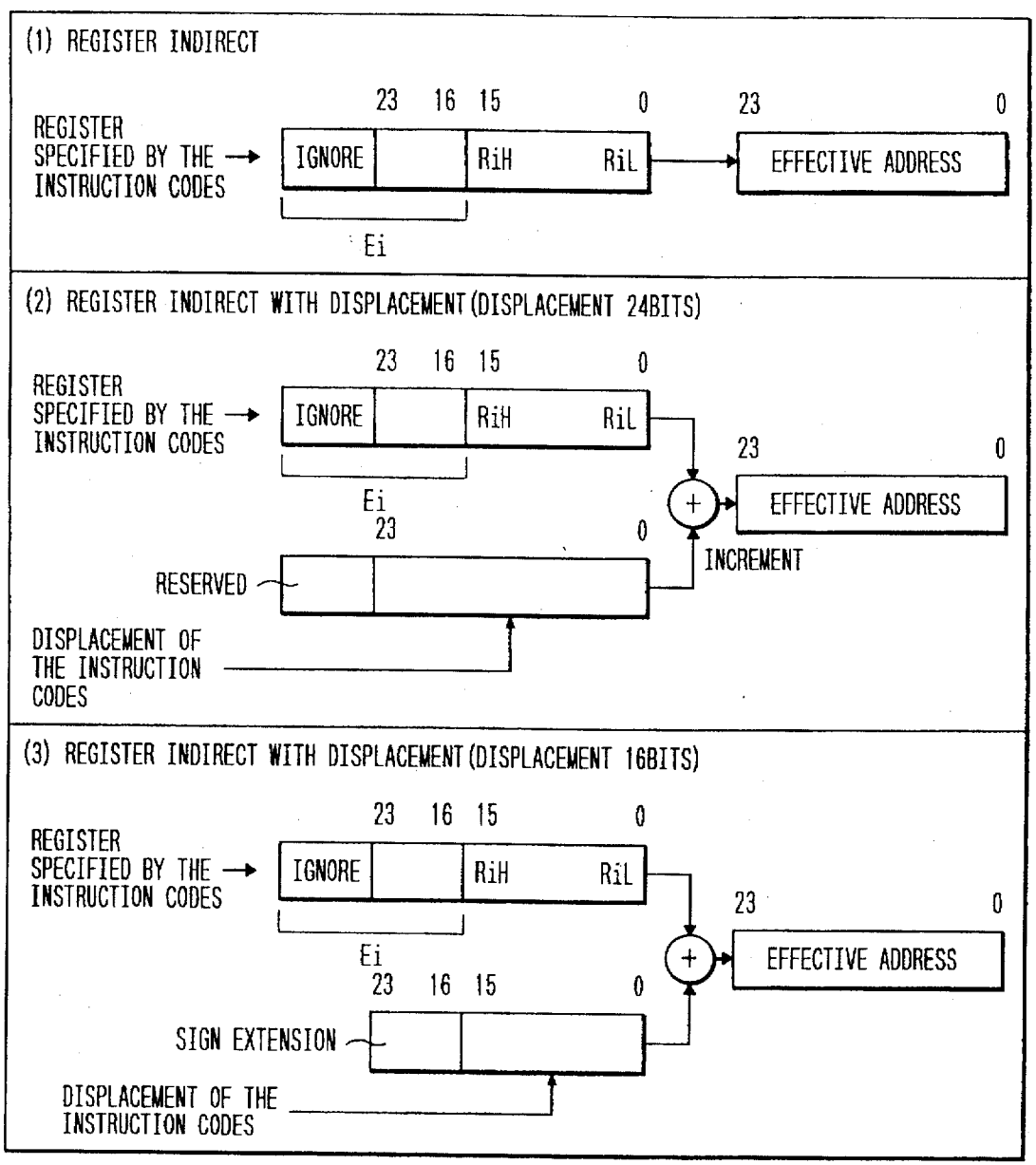
FIG. 39 is an explanatory diagram showing one example of an effective address calculating method by the CPU.

The register indirect with displacement, as shown at (2) and (3) in FIG. 39, specifies the address on the memory by using as the address the result of incrementing the displacement contained in the instruction codes to the 24-bit address obtained as in the aforementioned register indirect. The increment result is used only for the address specification but Is not reflected on the contents of the expansion register Ei and the general register Ri. The displacement is 24 bits or 16 bits, although not especially limitative thereto, and the 16-bit displacement has its more significant 16 bits expanded in codes when in the increment. Specifically, the increment is accomplished with an assumption that the more significant 16 bits of the displacement be at the same value as the 15th bit of the 16-bit displacement. In this case, the more significant 8 bits of the 24-bit displacement contains a 32-bit displacement specifying portion together with the reserved region in the instruction codes while being prepared for the instructions having a unit of 2 bytes and for the future expansion.

Figure 40:
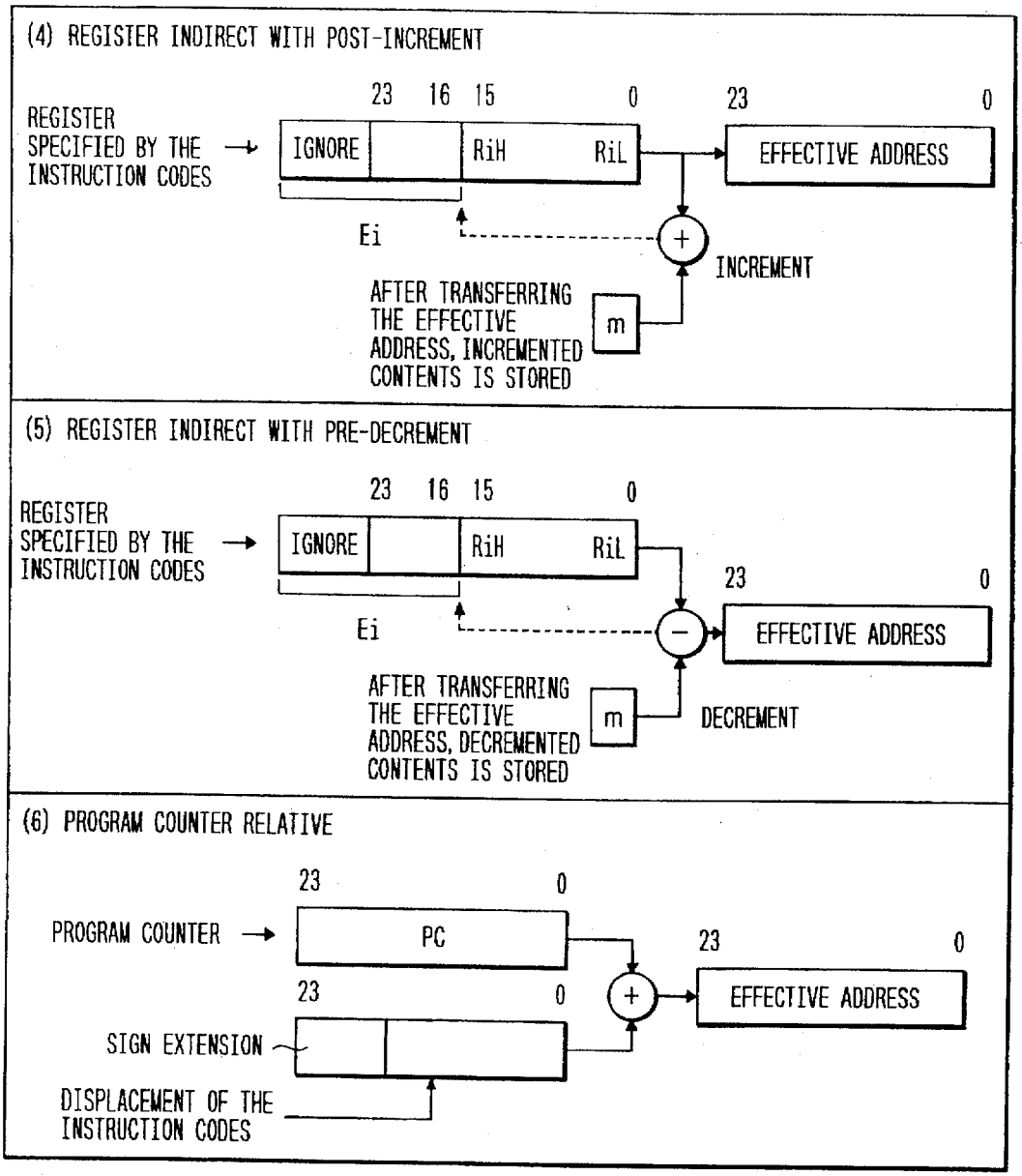
FIG. 40 is an explanatory diagram showing another example of the effective address calculating method by the CPU.

The register indirect with post-increment, as shown at (4) in FIG. 40, specifies the address on the memory with the 24-bit address as in the aforementioned register indirect. After this, the specified address is incremented by 1, 2 or 4 so that the increment result is latched in the expansion registers and general registers. The value 1 is incremented in case the byte data on the memory are specified; the value 2 is incremented in case the word data are specified; and the value 4 are incremented in case the address data are specified. The more significant 8 bits of the increment result are also latched in the expansion registers.

The absolute address, as shown in FIG. 41, specifies the address on the memory by using the 8-, 16- or 24-bit absolute address as the address. The 8-bit absolute address has its more significant 16 bits expanded by 1. In other words, all the bits 23 to 8 of the address are set to 1. Thus, the usable address has 256 bytes of H'FFFF00 to H'FFFFFF. Moreover, the 16-bit absolute address has its more significant 8 bits extended in signs. Specifically, all the bits 23 to 16 are set to 0 if the bit 15 of the 16-bit absolute address is 0, and all the bits 23 to 16 of the address are set to 1 if the bit 15 is 1. Thus, the usable address is 64 Kilobytes of H'000000 to H'007FFF and H'FF8000 to H'FFFFFF.

The register indirect with pre-decrement, as shown at (5) in FIG. 40, specifies the address on the memory with the 24-bit address of the result that the 24-bit address is decremented by 1, 2 or 4, as in the aforementioned register indirect. After this, the decrement result is latched in the expansion registers and general registers. The value 1 is decremented in case the byte data on the memory are specified; the value 2 is decremented in case the word data are specified; and the value 4 is decremented in case the address data are specified. In case the address may be 24 bits, as in the above, the more significant 8 bits of the decrement result are latched in the expansion registers, although not especially limitative thereto.

The program-counter relative, as shown at (6) in FIG. 40, specifies the address on the memory by using as the address the increment result that the 24-bit address contained in the program-counter is incremented by the displacement contained in the instruction codes. The increment result is latched in the program-counter. The displacement is 16 bits or 8 bits, and the more significant 8 bits or 16 bits have their signs extended in case the displacement is incremented. In other words, the increment is executed with the assumption that the more significant 8 bits of the displacement are equal to the bit 15 of the 16-bit displacement or that the more significant 16 bits are equal to the bit 7 of the 8-bit displacement. The program-counter relative is used with the branch instructions only.

In addition, the CPU 1 executes the addressing modes of the immediate and register direct, all of which are not related directly to the present invention so that their detailed description will be omitted.

[7] Instruction Format of Main Address Modes

FIGS. 42 to 49 show the instruction formats of instructions of main addressing modes. Each of the instruction formats includes: an operation code op for indicating the functions and addressing modes of each instruction; a register field (rs, rd, ers, erd) for specifying a register to be used in accordance with the operation code of the operation code portion op; an absolute address (aa); a displacement (d); or an immediate (xx). The instruction format is composed of a unit of 2 bytes and has its register field contained in the bits 7 to 4 or bits 3 to 0 of the first word of the instruction code, or in the bits 11 to 8 in a special form. The aforementioned register field rs specifies the source register of byte or word size, and the aforementioned register field rd specifies the destination register of byte or word size. Whether the register to be specified has the byte size or the word size is determined by the operation codes of the operation code portion. Specifically, in accordance with the operation codes accompanied by the calculation of 18 bits, the less significant 3 bits of the register fields rs and rd specify what of the eight registers R0 to R7, and which of the expansion register or the general register of the specified registers is to be used is specified by the remaining more significant 1 bit of said register fields. In accordance with the operation codes accompanied by the calculation of 8 bits, the less significant 3 bits of the register fields rs and rd specify what of the eight registers R0 to R7, and which of the high- or low-order general registers of the specified registers is to be used is determined by the remaining more significant 1 bit of said register fields. The register field ers specifies the source register of long word size, and the aforementioned register field erd specifies the destination register of long word size. The most significant 1 bit of the retained 4 bits of the register fields ers and erd is substantially ignored at the instruction decoding time.

The absolute address aa, the displacement d and the immediate xx in the instruction format are so contained in the instruction codes that the least significant bit may be the bit 0 at the order of an even number. In other words, the absolute address aa, displacement d and immediate xx of 16 bits or more are contained at the unit of 2 bytes. Thus, the absolute address aa and displacement d of 24 bits are given 4 bytes by containing a reserved portion of a predetermined bit number in the region of their leading (at the more significant) 1 byte. The absolute address aa, displacement d and immediate xx of 8 bits are contained in the bits 7 to 0 of the first word.

The following effects can be obtained according to the aforementioned instruction formats:

(1) The portion in the instruction format for specifying the registers is fixed in one portion of the first word of an instruction so that the decoding logical structure of the instruction is simplified.

(2) What of the eight registers is to be specified is determined by the less significant 3 bits of the register field. What region of one specified register is to be used is determined by the more significant 1 bit. The size of the region to be determined by said 1 bit is determined by the data size specified in the instruction, i.e., by the operation code of the operation code portion. Thus, the bit number of the register field can be suppressed to the minimum even if the data to be latched in the registers and the address data cover several kinds of bytes, words and long words.

[8] Internal Block of CPU

Figure 50:
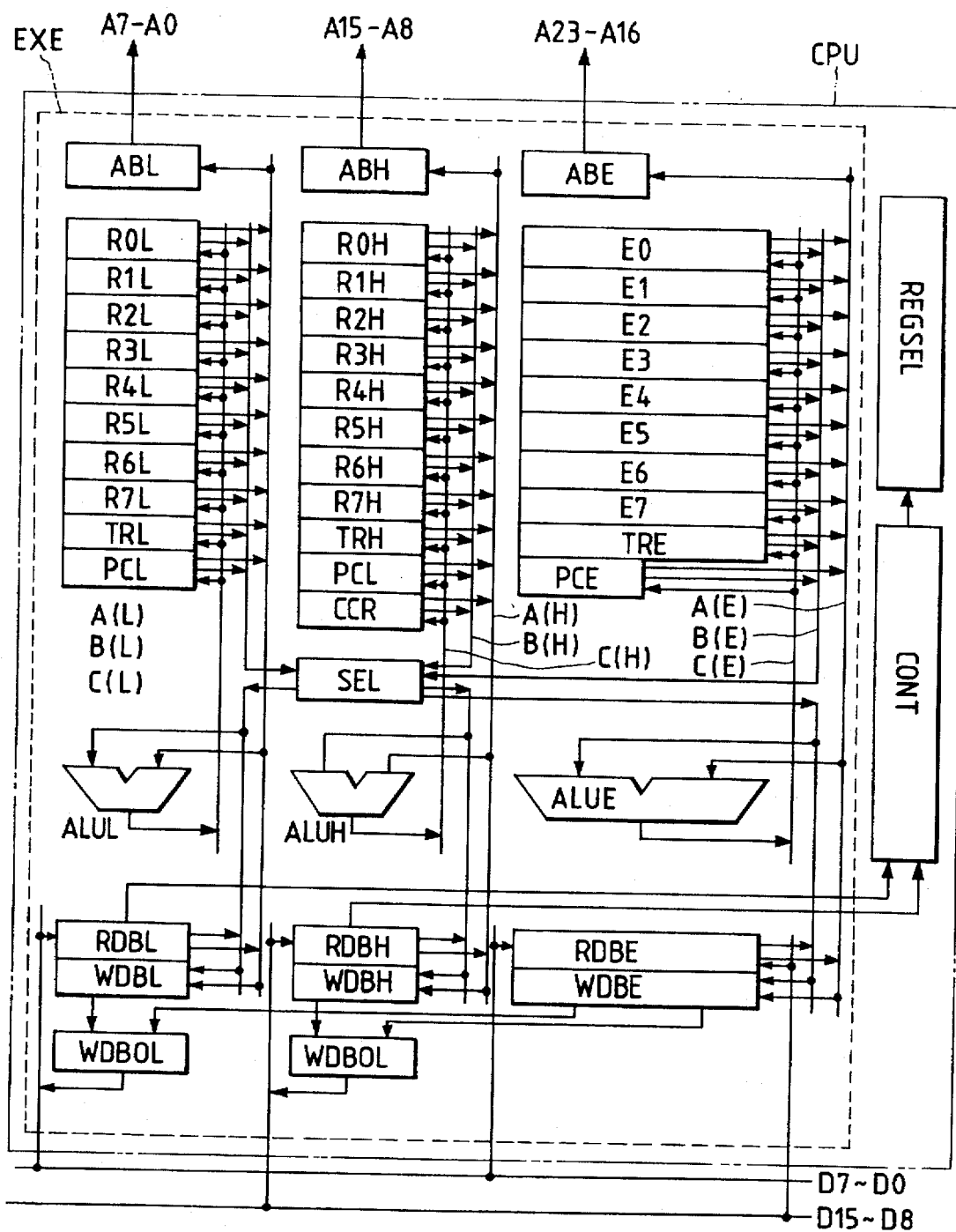
FIG. 50 is a block diagram showing one embodiment of the CPU.

FIG. 50 shows one example of the internal block of the CPU 1. This CPU 1 is constructed to include: a control unit CONT composed mainly of a micro ROM or PLA (i.e., Programmable Logic Array); an execution unit EXE including the aforementioned general registers E0 to ET, the program counters PC (PCL, PCH and PCE) and the condition code register CCR; and a register select unit REGSEL. The control unit CONT fetches and decodes an instruction to generate various control signals necessary for executing the instruction or to control the executing procedure of the instruction. The register select unit REGSEL generates register select signals in accordance with the decoded result of the aforementioned instruction.

The execution unit EXE further includes temporary registers TRL, TRH and TRE, arithmetic logical units ALUL, ALUH and ALUE, read data buffers RDBL, RDBH and RDBE, write data buffers WDBL, WDBH and WDBE, and address buffers ABL, ABH and ABE, all of which are connected through three internal buses A (L, H, E), B (L, H, E) and C (L, H, E) and a selector circuit unit SEL. The read data buffers RDBL, RDBH and RDBE are connected with external data buses D7 to D0 and D15 to D8. The write data buffers WDBL, WDBH and WDBE are connected through write data output buffers WDBOL and WDBOH with the aforementioned data buses D7 to D0 and D15 to D8. The arithmetic logical units ALUL, ALUH and ALUE are used the various arithmetic operations specified by the instructions, the addition of the program counter PC, and the calculation of the effective address. The read data buffers RDBL, RDBH and RDBE temporarily store the instructions or data which are read from the not-shown external memory, and the write data buffers WDBL, WDBH and WDBE temporarily store the data to be written in the aforementioned ROM 2, RAM 3 or external memory. Thus, the internal operations of the CPU 1 and the read/write operations outside of the CPU 1 are timed. The address buffers ABL, ABH and ABE temporarily store the address to be read/write by the CPU 1.

Basically, the each of the circuit blocks in the aforementioned execution unit EXE is composed of two blocks of 8 bits and one block of 16 bits, although not especially limitative thereto. The general registers are composed of two blocks of 8 bits such that the registers R0H to R7H correspond to the bits 15 to 8 whereas the registers R0L to R7L corresponds to the bits 7 to 0. The far more significant bits of the general registers, i.e., the bits 31 to 16 correspond to the expansion registers E0 to E7 of one block of 16 bits. The A, B and C numbers of internal buses are arranged in parallel in a manner to correspond to those bits 31 to 16, bits 15 to 8 and bits 7 to 0. In addition, similar arrangements apply to the aforementioned temporary register TR, ALU, read data buffer and write data buffer. No restriction is exerted upon those physical arrangements.

[9] Example of instruction Execution and Exception Handling by CPU

The representative instruction execution and exception handling of the CPU 1 will be described on the basis of the flow charts shown in FIGS. 51 to 55.

Figure 51:
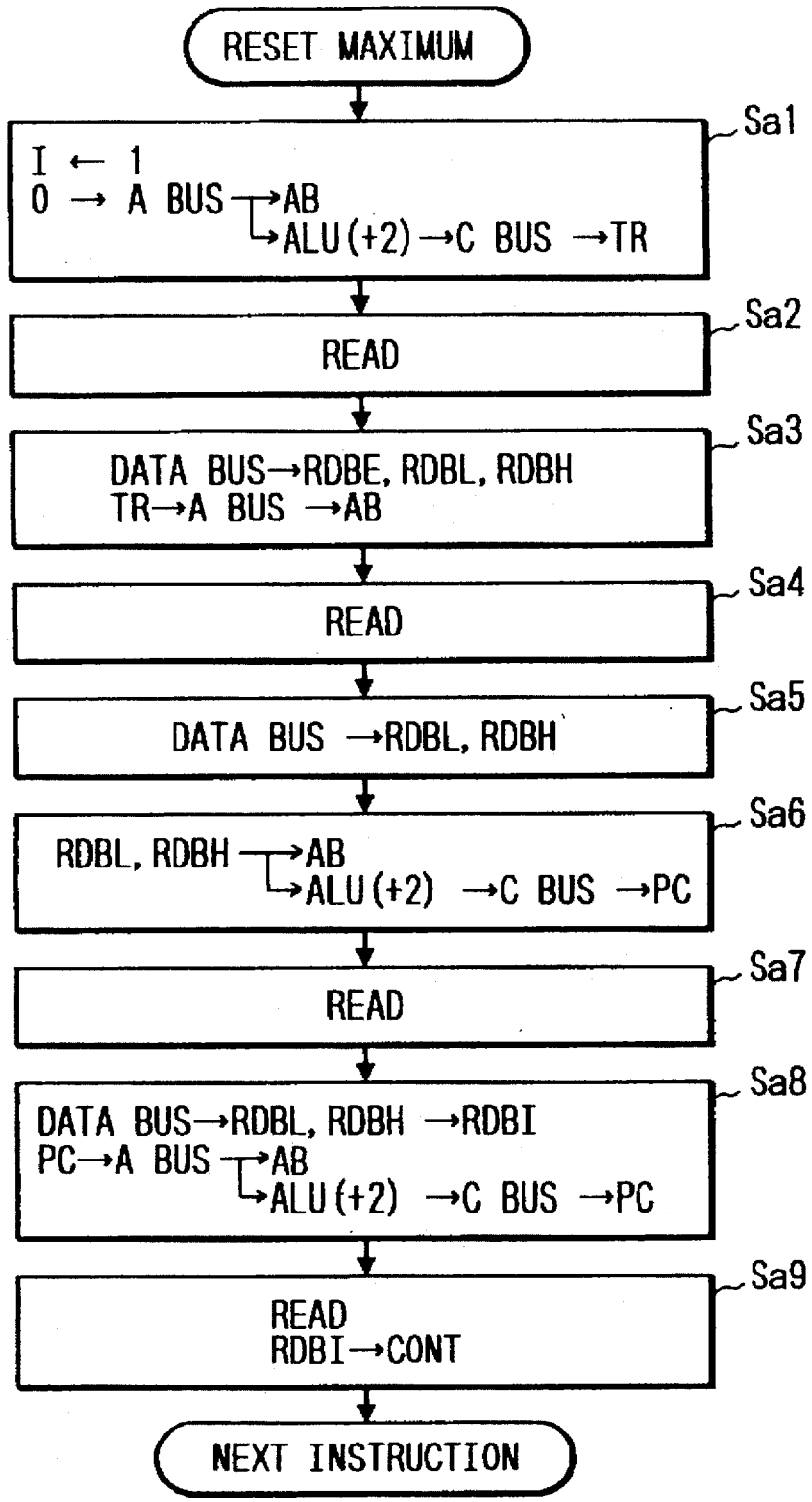
FIG. 51 is an explanatory diagram showing one example of an internal operation flow chart of the CPU.

At the time of the reset exception handling shown in FIG. 51, the CPU 1 reads a start address stored in the addresses of 4 bytes beginning from the zero address. Of these 4 bytes, the 1 byte at the zero address has been reserved for the future expansion, as has been described above, and is ignored. At a first step, the CPU 1 sets the interruption mask bit I to 1. Simultaneously with this, the CPU 1 generates data 0 on the internal bus A to transfer the data 0 to the address buffers ABL, ABH and ABE (which will be shortly designated at "AB") and to add 2 thereto in the arithmetic logical units ALUL, ALUH and ALUE (which will be shortly designated at "ALU"). The addition result is stored through the C bus in the temporary registers TRL, TRH and TRE (which will be shortly designated at "TR"). At a second step Sa2, the contents of the aforementioned address buffers AB are used as the address to start the read of the word data. At a third step Sa3, the read operation is ended to store the read word data in the read data buffers RDBE, RDBL and RDBH. Simultaneously with this, the contents of the temporary registers TR are outputted to the bus A and transferred to the address buffers AB. At a fourth step Sa4, the contents of the aforementioned address buffers AB are used as the addresses to start the read of the word data. At a fifth step Sa5, the read operation is ended, and the read word data are stored in the data buffers RDBL and RDBH. At this time, the read data buffers are caused to latch the data the so-called "first in first out method", although not especially limitative thereto. At a sixth step Sa6, the 32 bits of the data, which are stored in the read data buffers RDBE, RDBH and RDBL at the third step Sa3 and at the fifth step Sa5, are outputted as the start address to the bus A and transferred to the address buffers AB, and the value 2 is added in the ALU. The addition result is stored in the program counter PC (PCL, PCH, PCE) by way of the bus C. Incidentally, the more significant 8 bits of the data stored in the data buffer RDBE at the third step Sa3 are ignored, as has been described above. At a seventh step Sa7, the contents of the aforementioned address buffers AB are used as the addresses to start the read of the leading instruction of the program at the unit of word. At an eighth step Sa8, the read operation is ended, and the read word data are stored in the data buffers RDBL and RDBH. As a matter of fact, the word data are further transferred to the instruction read data buffer RDBI shown in FIG. 35. Simultaneously with this, the contents of the program counter PC are outputted to the bus A and transferred to the address buffers AB, and the value 2 is added in the ALU. The addition result is stored in the program counter PC. At a ninth step Sa9, the contents of the aforementioned address buffers AB are used as the addresses to start the read of the instructions of the 3rd and 4th bytes of the program with the word. At the eighth step Sa8, moreover, the instructions stored in the data buffers RDBL and RDBH (i.e., the instructions latched in the instruction read data buffer RDBI) are transferred to the control unit CONT to start their decoding. At a next step, the operations are started on the basis of the leading instruction of the program, i.e., the instruction at which the decoding is started at the ninth step Sa9. During this execution, the word data started to be read at the ninth step Sa9 are stored in a predetermined read data buffer.

Figure 52:
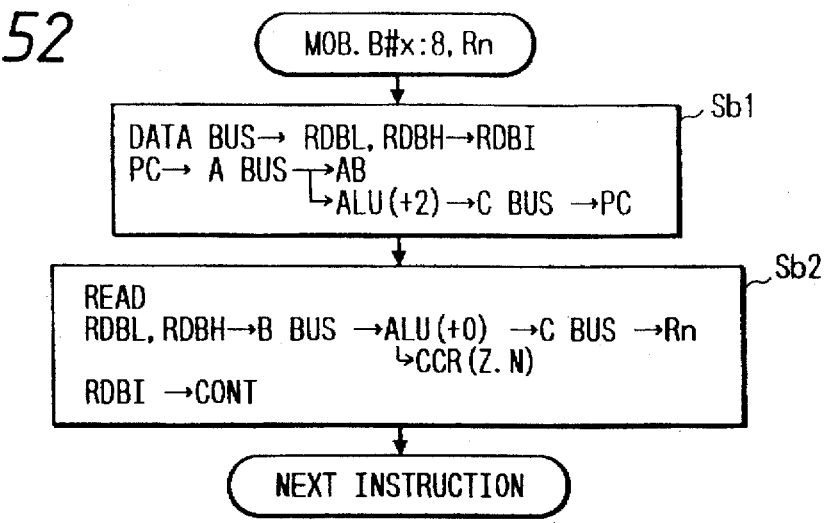
FIG. 52 is a flow chart showing another internal operation of the CPU.

The flow chart for processing th instructions to transfer the Immediate data to the registers is shown in FIG. 52. The instruction (MOV.B#34, R0L), for example, for transferring immediate data 34 to the general register R0L is assumed to contain the data 34 in the instruction code and to have a length of 2 bytes, as has been described hereinbefore. At a first step Sb1, the present instruction ends either the instruction, which was executed immediate before or the read operation, which was started at the last step of the exception handling, and stores the read word data in the data buffers RDBH, RDBL (or RDBI). Simultaneously with this, the contents of the program counter PC are outputted to the bus A and transferred to the address buffers AB, and the value 2 is added in the ALU. The addition result is stored in the program counter PC. At a second step Sb2, the read of the 3rd and 4th byte instructions from the present instruction is started with the word on the basis of the contents stored in the address buffers AB. Simultaneously with this, the immediate data 34 contained in the present instruction code stored already in the data buffers RDBH and RDBL are outputted to the bus A and further to the bus C through the ALU until they are transferred to the register R0L. The data are inspected, while passing through the ALU, so that they may be reflected on the Z and N flags of the condition code register CCR. Moreover, the instruction stored in the read data buffer RDBI at the first step Sb1 is transferred to the control unit CONT to start its decoding. At a next step, the operations are started on the basis of the next instruction, i.e., the instruction, the decoding of which was started at the second step Sb2. The word data, the read of which was started at the second step Sb2, are stored in the predetermined data buffer while that instruction is being executed.

Figure 53:
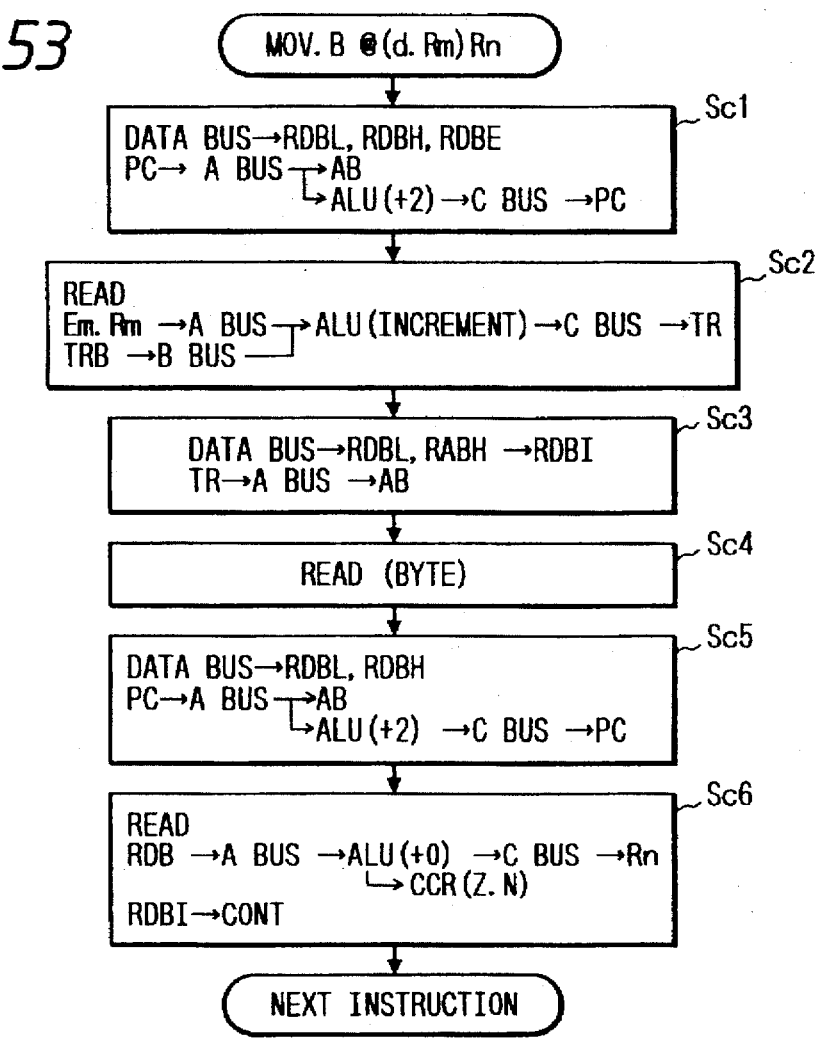
FIG. 53 is a flow chart showing still another internal operation of the CPU.

The instructions for transferring the contents of the memory to the registers in the addressing mode of the register indirect with the displacement is shown In FIG. 53. For example, the instruction {MOV.B @ (1234, ER0), R1H} for instructing the byte data to the general register R1H from the address, which is calculated by adding the relative value 1234 to the address indicated by the registers R0 and the expansion register E0, is assumed to contain the displacement 1234 in the instruction code and to have a length of 4 bytes, as has been described hereinbefore, although not especially limitative thereto. According to the present instruction, at a first step Sc1, the instruction, which was executed immediately before, or the read operation, which was started at the last step of the exception handling, is ended to store the read word data (i.e., the 3rd and 4th bytes of the present instruction) are stored in the read data buffers RDBE, RDBH and RDBL. Simultaneously with this, the content of the program counter PC are outputted to the bus A and transferred to the address buffers AB, and the value 2 is added in the ALU. The addition result is stored in the program counter PC. At a second step Sc2, the read of the next instruction, i.e., the instruction of the 3rd and 4th bytes from the present invention is started with the word on the basis of the contents stored in the address buffers AB. Simultaneously with this, the displacement contained in the present instruction code stored already in the data buffers RDBH and RDBL is outputted to the bus B, and the contents of the general registers R0 and the expansion register E0 are outputted to the bus A. These are added in the ALU and outputted from the ALU to the bus C until they are transferred to the temporary registers. At the time of this addition, the displacement is expanded to 00001234. At a third step Sc3, the read operation is ended, and the read word data are stored in the read data buffers RDBH and RDBL and the instruction read data buffer RDBI. Simultaneously with this, the contents of the temporary registers TR are outputted to the bus A and transferred to the address buffers AB. At a fourth step Sc4, the contents of the aforementioned address buffers AB are used as the addresses to start the read of the data with the bytes. At a fifth step Sc5, the read operations are ended, and the read byte data are stored in the read data buffers. Like before, the contents of the program counter PC are transferred to the address buffers AB, and the value 2 is added. At a sixth step Sc6, the contents of the aforementioned address buffers AB are used as the addresses to start the read of the data with the bytes. The data stored in the data buffers at the fifth step Sc5 are outputted to the bus A and further to the bus C through the ALU until they are transferred to the register R1H. During the passage through the ALU, the data are tested so that they are reflected on the Z and N flags of the condition code register CCR. The instruction stored in the read data buffer RDBI at the third step Sc3 is transferred to the control unit CONT to start the decoding. From the next step, the operations of the following instruction are started like before.

Figure 54:
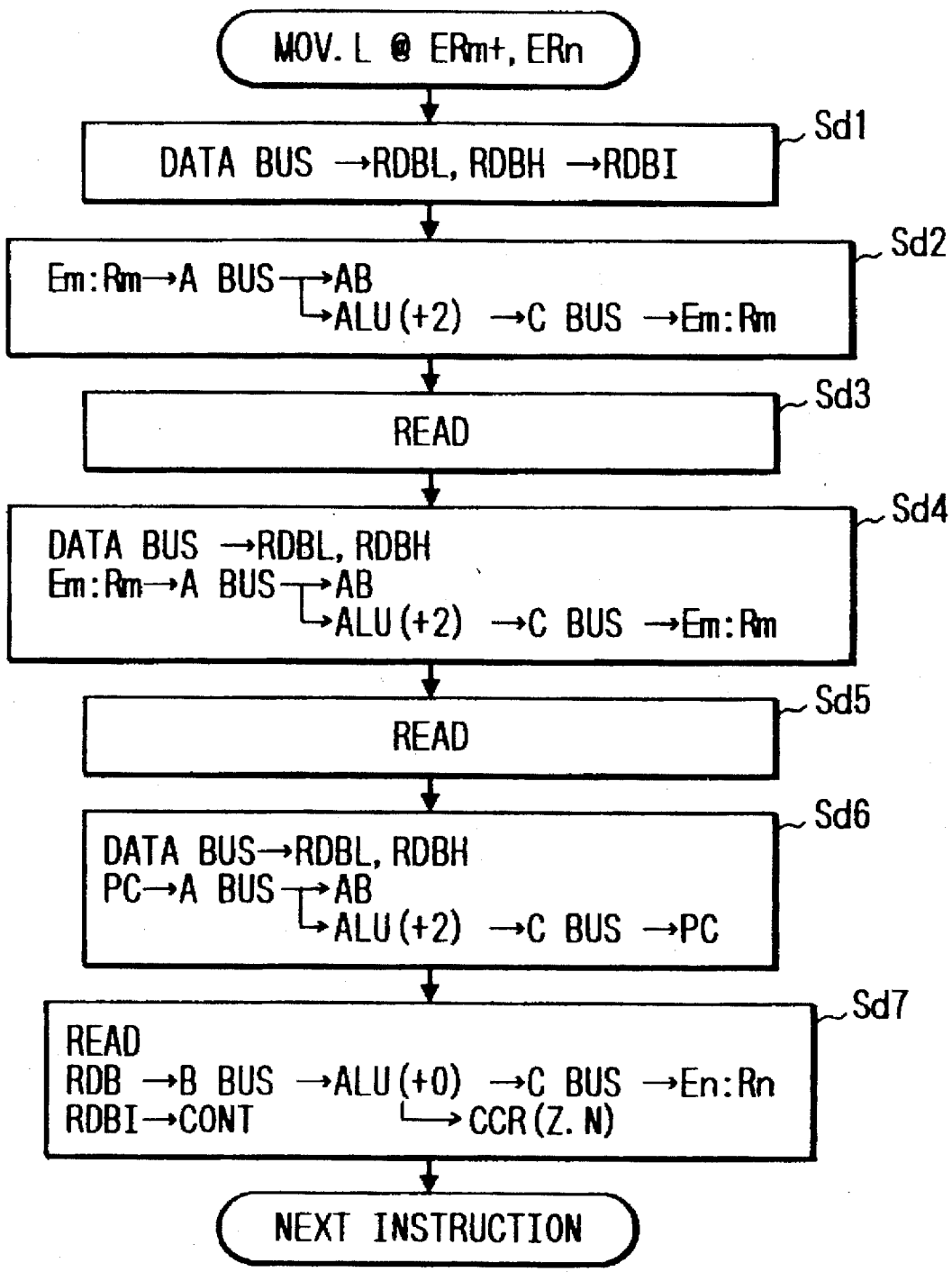
FIG. 54 is a flow chart showing a further instruction operation of the CPU.

One example of the flow chart for processing the instructions for register-transferring the contents of the memory in the address mode of the register indirect with post-increment is shown in FIG. 54. For example, the instruction {MOV.L @ ER7+, ER2} for transferring the expansion data from the address indicated by the general registers R7 and the expansion register E7 to the general registers R2 and the expansion register E2 is assumed to have a length of 2 bytes, although not especially limitative thereto. In response to the present instruction, at a first step Sd1, the instruction executed immediately before or the read operation started at the last step of the exception handling is ended, and the read word data are stored in the data buffers RDBH and RDBL and the instruction read data buffer RDBI. At a second step Sd2, the contents of the registers R7 and the expansion register E7 are outputted to the bus A and transferred to the address buffers AB. Simultaneously with this, the value 2 is added in the ALU, and the result is stored in the general registers R7 and the expansion register E7. At a third step Sd3, the contents of the aforementioned address buffers AB are used as the address to start the read of the data with the word. At a fourth step Sd4, the read operation is ended, and the read word data are stored in the data buffers RDBH and RDBL. Simultaneously with this, the contents of the general registers R7 and the expansion register E7 are outputted to the bus A and transferred to the address buffers AB, and the value 2 is simultaneously added in the ALU. The addition result is stored in the general registers R7 and the expansion register E7. At a fifth step Sd5, the contents of the aforementioned address buffers AB are used as the addresses to start the read of the data with the word. At a sixth step Sd6, the read operation is ended, and the read word data are stored in the data buffers RDBH and RDBL. Like before, the contents of the program counters PC are transferred to the address buffers AB, and the value 2 is added. At a seventh step Sd7, the contents of the aforementioned address buffers AB are used as the addresses to start the read of the data with the word. The data stored in the data buffers RDBH and RDBL are outputted to the bus A and further to the C through the ALU until they are transferred to the general registers R2 and the expansion register E2. The data are tested while passing through the ALU so that the flags Z and N of the condition code registers CCR are reflected. The instructions stored in the data buffer RDBI at the first step Sd1 are transferred to the control unit CONT to start their decoding. From the next step, the operations of the following instructions are started like before.

Figure 55:
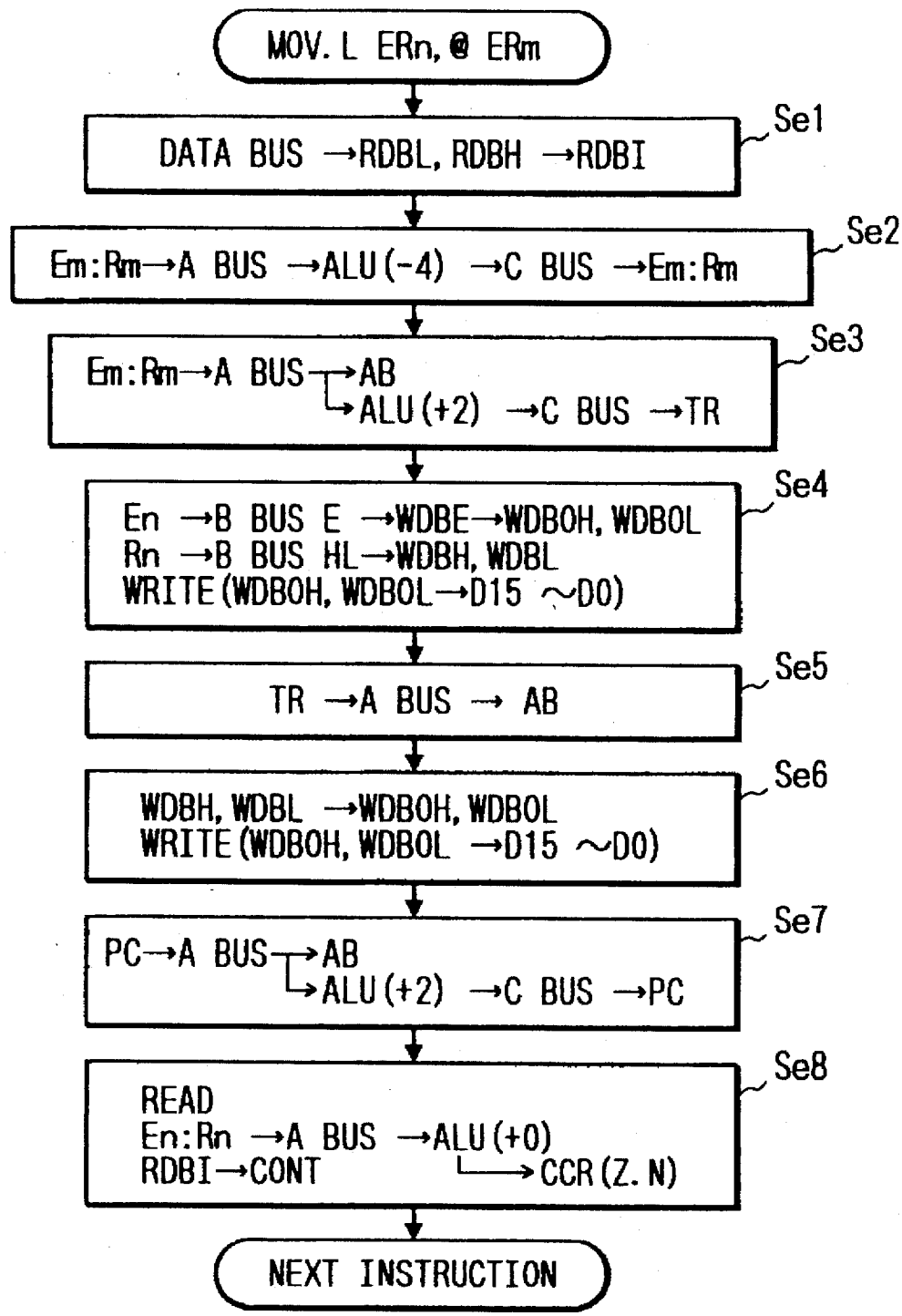
FIG. 55 is a flow chart showing a further instruction operation of the CPU.

One example of the flow chart for processing the instructions for transferring the contents of the register to the memory in the address mode of the register indirect with pre-decrement is shown in FIG. 55. For example, the instruction (MOV.L ER2, @−ER7) for transferring the expansion data from the address indicated by the general registers R7 and the expansion register E7 to the general registers R2 and the expansion register E2 is assumed to have a length of 2 bytes, although not especially limitative thereto. In response to the present instruction, at a first step Se1, the instruction executed immediately before or the read operation started at the last step of the exception handling is ended, and the read word data are stored in the read data buffers RDBH and RDBL and the instruction read data buffer RDBI. At a second step Se2, the contents of the registers R7 and the expansion register E7 are outputted to the bus A and are decremented by 4 at the ALU until the result is latched in the general registers R7 and the expansion register E7. At a third step Se3, the contents of the registers R7 and the expansion register E7 are outputted to the bus A and transferred to the address buffer AB. Simultaneously with this, the contents are incremented by 2 in the ALU, and the result is latched in the temporary register TR. At a fourth step Se4, the contents of the general registers R2 and the expansion register E2 are outputted to the bus B and are latched in the write data buffers WDBE, WDBH and WDBL. The write of the data is started with the word. The more significant 16 bits are simultaneously transferred to the write data output buffers WDBOH WDBOL and outputted to the data buses D15 to D0. At a fifth step Se5, the write operation is ended, and the contents of the temporary registers TR are outputted to the bus A and transferred to the address buffer AB. At a sixth step, the write of the data is started with the word. The less significant 16 bits of the write data buffers WDBH and WDBL are transferred to the write data output buffers WDBOH and WDBOL and outputted to the data buses D15 to D0. At the sixth step Se6, the write operation is ended, and the read word data are latched in the read data buffers RDBH and RDBL. Like before, the contents of the program counter PC are transferred to the address buffer AB and are incremented by 2. At a seventh step Se7, the contents of the aforementioned address buffer AB are used as the address to start the read of the data with the word. The contents of the general registers R2 and the expansion register E2 are outputted to the bus A to pass through the ALU. The data are tested when they pass through the ALU and are reflected on the Z and N flags of the condition code register CCR. The instructions stored in the data buffers RDBI at the first step Se1 are transferred to the control unit CONT to start their decoding. From the next step, the operations of the following instructions are started like before.

[10] Table of Arithmetic Operation instructions of CPU

FIG. 56 presents a table of the arithmetic operation instructions of the CPU 1. These arithmetic operations contain additions, subtractions and comparisons.

The adding instructions functionally include ADD and ADDC instructions, and the ADD instructions have byte sizes, word and long word sizes. In the ADD instructions, the specified source data (i.e., the immediate or register contents) and the destination data (i.e., the register contents) are added, and the results are stored in the destination registers and are reflected upon the individual flags C, V, Z and N. The calculations of the memory contents and the register contents are not executed, although not especially limitative thereto.

The ADD instructions are characterized as the data calculating instructions to have the byte sizes, the word sizes and the long word sizes. The ADDC instructions are similar to the ADD instructions, but their additions are executed together with the carry flag C. The ADDC instructions are desired to have the byte sizes, the word sizes and the long word sizes because of their characteristics as the data operating instructions, but need not have the word sizes and the long word sizes so long as they do not handle data of 33 bits or more. If the ADDC instructions have the byte sizes only, on the contrary, the instruction format and the internal control method of the CPU 1 can be simplified to reduce the logical/physical scales. Considering the aforementioned necessity and scale reduction, the ADDC instructions are restricted to the byte sizes, although not especially limitative thereto. The long word sizes are used for calculating the address data and are added in combination with the general registers and the expansion registers.

The comparing instructions include the CMP instructions, but none of them includes any carry. The subtracting instructions functionally include SUB instructions and SUBC instructions, which are different from the aforementioned adding instructions only in the function of subtraction.

In FIG. 56: symbols #x:8 and #x:16 designate immediate data of 8 and 16 bits, respectively; symbols Rd8 and Rd16 designate general registers of 8 and 16 bits, respectively; and symbols Ed:Rd:16 designate the contents of the expansion registers and the general registers.

In case the general registers Ri and the expansion registers Ei are provided so that an address space of 16 Megabytes can be used, as has been described hereinbefore, it is advisable to make an instruction system, in which the major operations are executed between the registers so that the operations between the memory and the registers may not be directly executed (i.e., not with one instruction). In order to exploit the address space of 16 Megabytes, the aforementioned complicated address modes are necessary. If most of the arithmetic instructions are enabled to execute such complicated addressing modes, the control unit CONT is complicated contrary to the object of minimizing the logical/physical scales. For accesses to the memory, the data transfer with the registers may be executed in response to the transfer instructions having the aforementioned various addressing modes so that the data processing such as the arithmetic operation may be executed on the registers. These general registers Ri can be used as sixteen, at the maximum, ones having a 8-bit length, and the general registers Ri and the expansion registers Ei can be used as sixteen, at the maximum, ones having a 16-bit length. The data necessary for a certain processing can be latched on the registers. Alternatively, at least most of the highly frequent data can be latched on the registers. This makes less frequent the disadvantages such as the increase in the processing programs or the reduction in the execution speed.

Instructions required for operations of the memory include bit operation instructions. These are specified as the n-th bit of the addresses assigned at the unit of byte but are not handled at the unit of byte, and the individual bits have independent functions. In case of a register for controlling the operation of the timer, for example: the clock of the timer is selected at the 0-th and 1st bits; It is specified at the 2nd bit whether or not the timer counter is cleared if the contents of the timer counter and the comparison registers are identical; and it is specified at the 3rd bit whether or not an interruption is to occur if identical as above. These have to be set to 1 at the unit of 1 bit or cleared to 0. Alternatively, the aforementioned data of 1 bit have to be decided in case the processing program of the CPU 1 is different depending upon whether the predetermined 1 bit of the input port is at 0 or 1. These data of 1 bit have directly operated for the memory or the aforementioned timer control register. This is because the value of the aforementioned input port may be disadvantageously changed by an interruption between the transfer and the bit operation if this bit operation is executed after once having been transferred at the unit of byte to the registers. Thus, the CPU 1 in the present embodiment supports the bit operation instruction for direct operations between the internal registers such as the general registers and the external registers such as the control registers of the peripheral circuit. Incidentally, the addresses to be operated by such bit operation instruction are fixed but require no complicated addressing mode. In short, the addresses may be sufficient if they can be executed with the absolute addresses and the minimum register indirect. In case of the absolute addresses, moreover, what is necessary is not that the entire address space could be used but that they could be used only in the address range in which the aforementioned timer and input/output ports are present. It is sufficient that the absolute addresses to be used for specifying such address range have 8 bits. If the absolute addresses have 16 bits, the usable address range could be extended, but the instruction length would be elongated to complicate the control. It therefore seems very rare that the entire space of 16 Megabytes for at least of 24 bits have to be made usable. Thus, even if the operation instruction of 1 bit or several bits is executed directly with the external peripheral circuits, there arises no fear that the scales of the control units and the kinds of the instructions wound drastically increase.

[11] Table of Combinations of Functions of Instructions and Addressing Modes

FIG. 57 shows one example of the relations between the functions of instructions and the addressing modes. In the same FIGURE: symbol # designates the addressing mode of an immediate; letter R the addressing mode of a register direct; symbols @ R the addressing mode of a register indirect; symbols @ (d16, R) and @ (d24, R) the addressing modes of registers indirect with displacement; symbols @–R the addressing mode of a register indirect with predecrement; symbols @ R+ the addressing mode of a register indirect with post-increment; symbols @ a8, @ a16 and @ a24 the addressing modes of absolute addresses; and symbols @ (d8, PC) and @ (d16, PC) the addressing modes of a program-counter relative. In the same FIGURE, moreover: letter B designates the byte; letter W the word; and letter L the long word. The program counter relative is especially for a branch instruction. The remaining addressing modes can be used with a transfer instruction. The arithmetic instruction can use the immediate and the register direct. However, the single column arithmetic is only for the register direct. The arithmetic operation instruction can use the byte, the word and the long word, as has been described hereinbefore, but the addition or subtraction with carry can be used only for the byte size. The increment and decrement can be used for counting the registers, but numbers ±1 can use the byte, word and long word. However, numbers ±2 and ±4 can use only the long word because they are for address calculations. The logical arithmetic instruction and the shift/rotate can use the byte, word and long word, although not especially limitative thereto. This is because those instructions are thought to be frequently used for processing letter data of a printer for white/black inversion or for italics in case the letter data are to be handled as one application using the address space of 16 Megabytes.

[12] Example of Circuit Structure of Register

Figure 58:
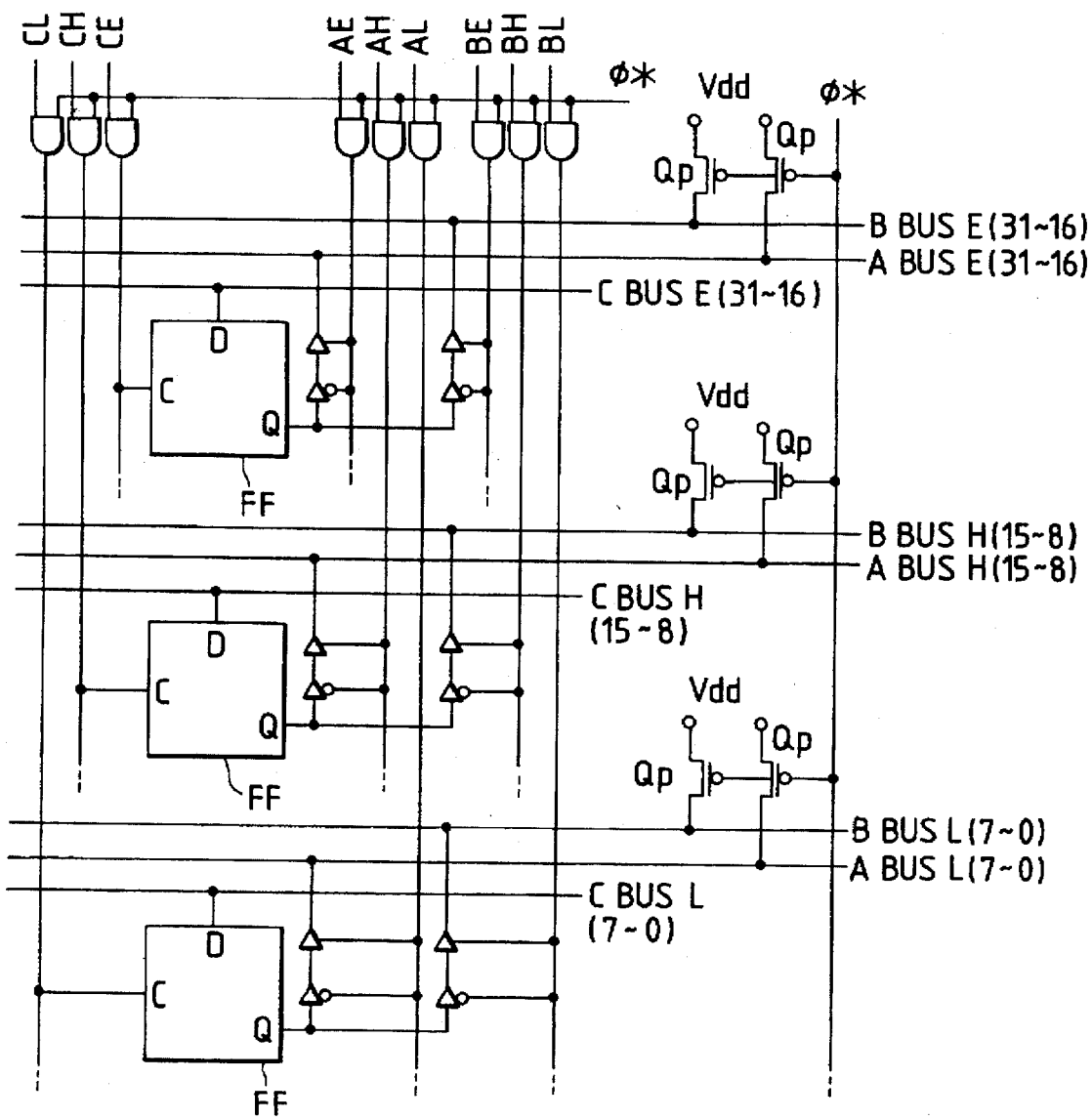
FIG. 58 is a specific circuit diagram showing a register of the CPU.

FIG. 58 shows an example of a specific logical circuit of the general registers, expansion registers, program counters and temporary registers. In the same FIGURE, there is representatively shown the structure of 3 bits. The register is constructed of a flip-flop circuit FF which can input data from the bus C and output them to the buses A and B. The data input/output are carried out on the basis of a signal coming from the register select unit REGSEL while a system clock ø (the asterisk * of which implies the "row enable") is at the low level. The general registers RiH and RiL and the expansion register Ei are individually fed with control signals AH, BH, CH, AL, BL, CL, AE, BE and CE so that they can input/output independently of one another. Since the program counter PC has a length of 24 bits, the control signals AE, AH and AL, and BE, BH and BL, and CE, CH and CL are individually fed as common signals (i.e., APC, BPC and CPC, as will be later described) so that the input/output are accomplished as a whole. The temporary register TR is similar to the general registers and the expansion register although dependent upon its using method.

The individual buses A, B and C are given negative logics, although not especially limitative thereto. Moreover, the buses A and B are fixed at the high level (i.e., 0 level) by a P-channel MOS transistor Qp while the system clock ø is at the high level. The high level is fixed unless any block outputs any data while the system clock ø is at the low level.

[13] Example of Operations of General Register and Expansion Register

Figure 59:
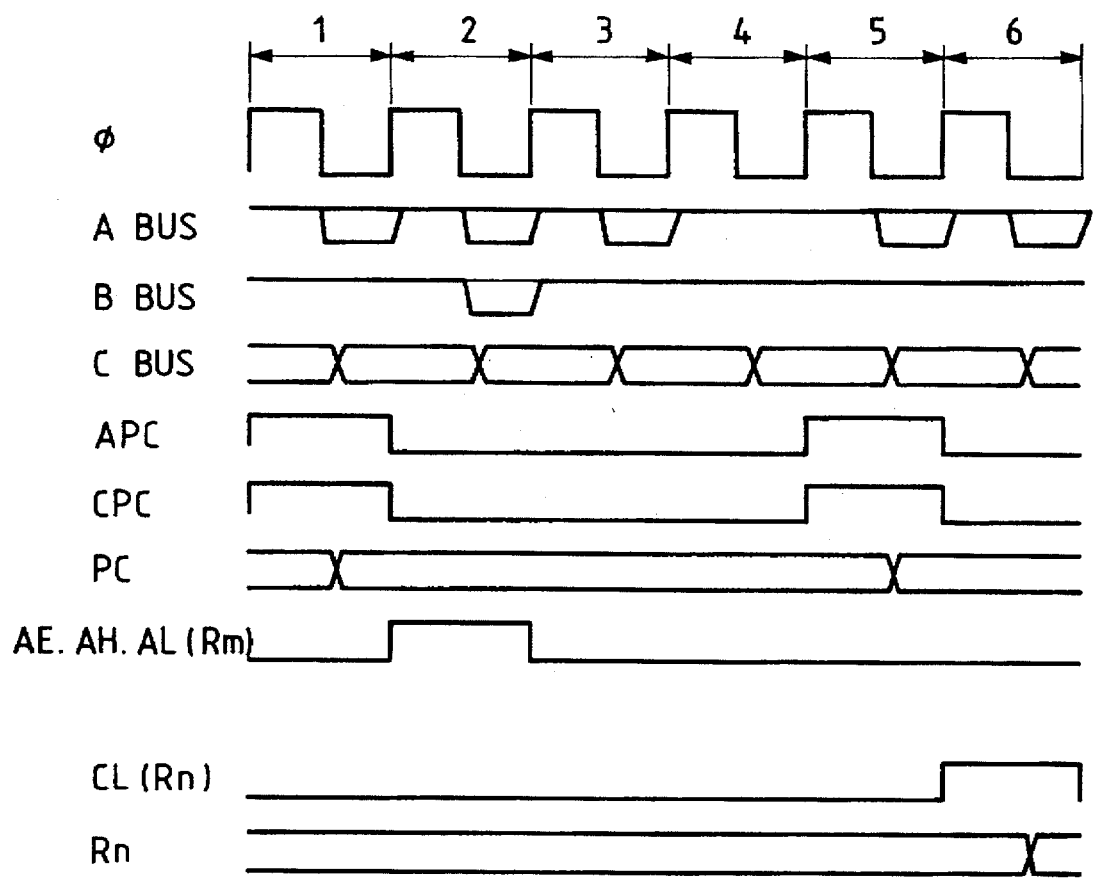
FIG. 59 is a timing chart showing one example of the operation of the register of the CPU.

FIG. 59 shows a timing chart of one example of the operations of the general registers and the expansion registers at the time of executing the aforementioned {MOV.B @ (1234, ER0), R1H} instruction, as has been described with reference to FIG. 53.

The control signal APC is set to the 1 level in a first cycle (corresponding to the aforementioned first step Sc1) synchronized with the system clock ø and in a fifth cycle (corresponding to the fifth step Sc5) so that the contents of the program counter PC are outputted to the A bus. Simultaneously with this, the control signal CPC takes the 1 level so that the contents of the C bus are inputted to the program counter PC. Since the output of the program counter PC is the so-called "master/slave", although not especially limitative thereto, not the contents of the C bus but the contents of the program counter PC immediately before are outputted to the A bus. In a second cycle (corresponding to the second step Sc2), the control signals AE0, AH0 and AL0 of the expansion register E0 and the general register R0 are set to the 1 level so that the contents of the expansion register E0 and the general register R0 are outputted to the A bus. In a sixth cycle (corresponding to the sixth step Sc6), the control signal AH1 of the general register R1 is set to the 1 level so that the contents of the C bus are outputted to the general register R1H. The control signals AE1 and AL1 are at the 0 level so that the contents of the expansion register E1 and the general register RiL are latched.

Figure 60:
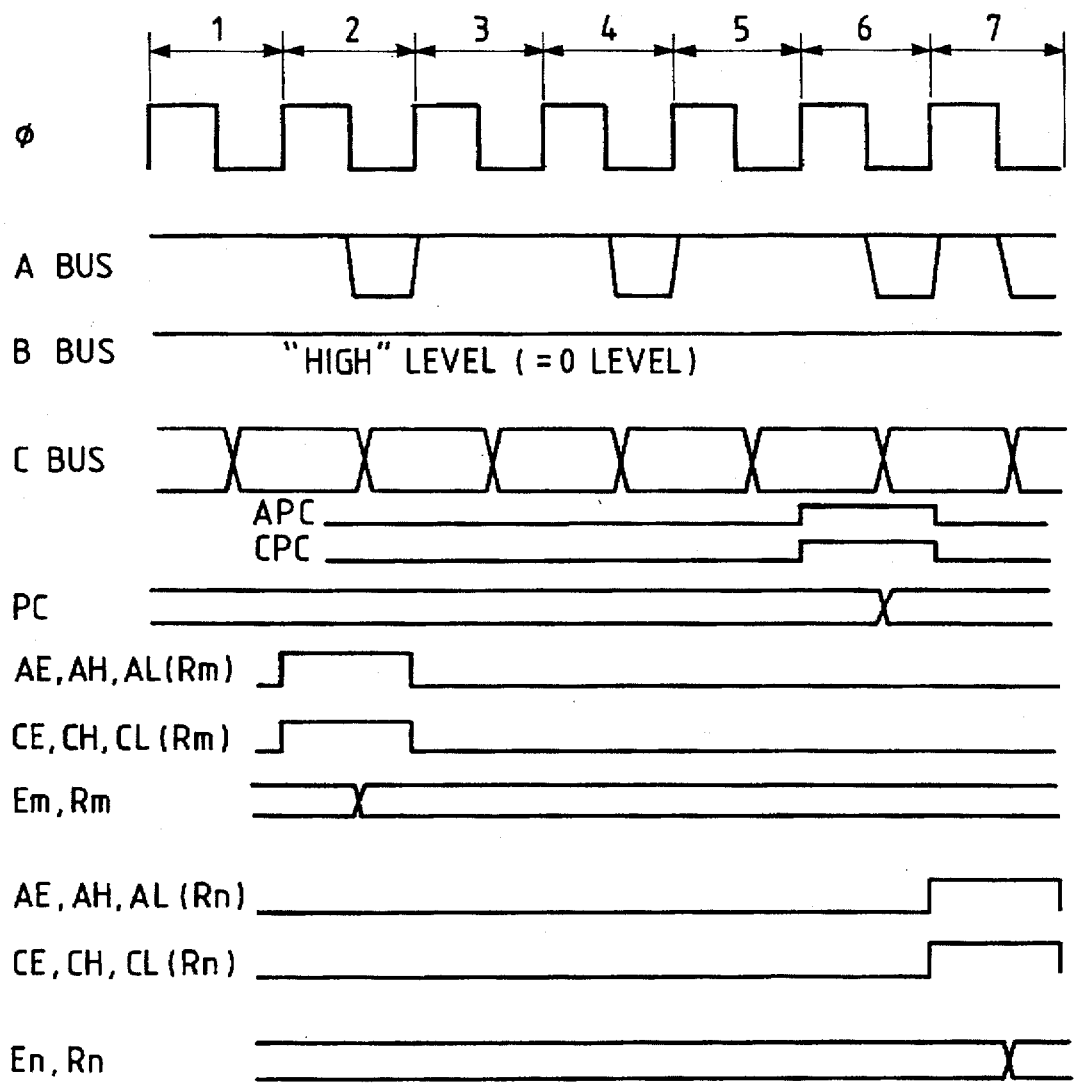
FIG. 60 is an explanatory diagram of another operation timing chart of the register of the CPU.

FIG. 60 shows a timing chart of one example of the operations of the general registers at the time of executing the aforementioned (MOV.L @ ER7+, ER2) shown in FIG. 54.

In a second cycle (corresponding to the second step Sd2) synchronized with the system clock ø, the control signals AE7, AH7 and AL7 of the expansion register E7 and the general register R7 are set to the 1 level so that the contents of the expansion register E7 and the general register R7 are outputted to the A bus. Simultaneously with this, the control signals CE7, CH7 and CL7 are set to the 1 level so that the contents of the C bus are inputted to the expansion register E7 and the general register R7. Since the outputs of the general registers are the so-called "master/slave" like before, not the contents of the C bus but the contents of the program counter PC immediately before are outputted. In sixth cycle (corresponding to the sixth step Sd6), the control signal APC is set to the 1 level so that the contents of the program counter PC are outputted to the A bus. Simultaneously with this, the control signal CPC is set to the 1 level so that the contents of the C bus are inputted to the program counter PC. In a seventh cycle (corresponding to the seventh step Sd7), the control signals CE2, CH2 and the CL2 of the expansion register E2 and the general register R2 are set to the 1 level so that the contents of the C bus are inputted to the expansion register E2 and the general register R2.

[14] Example of Structure of Register Selector

Figure 61:
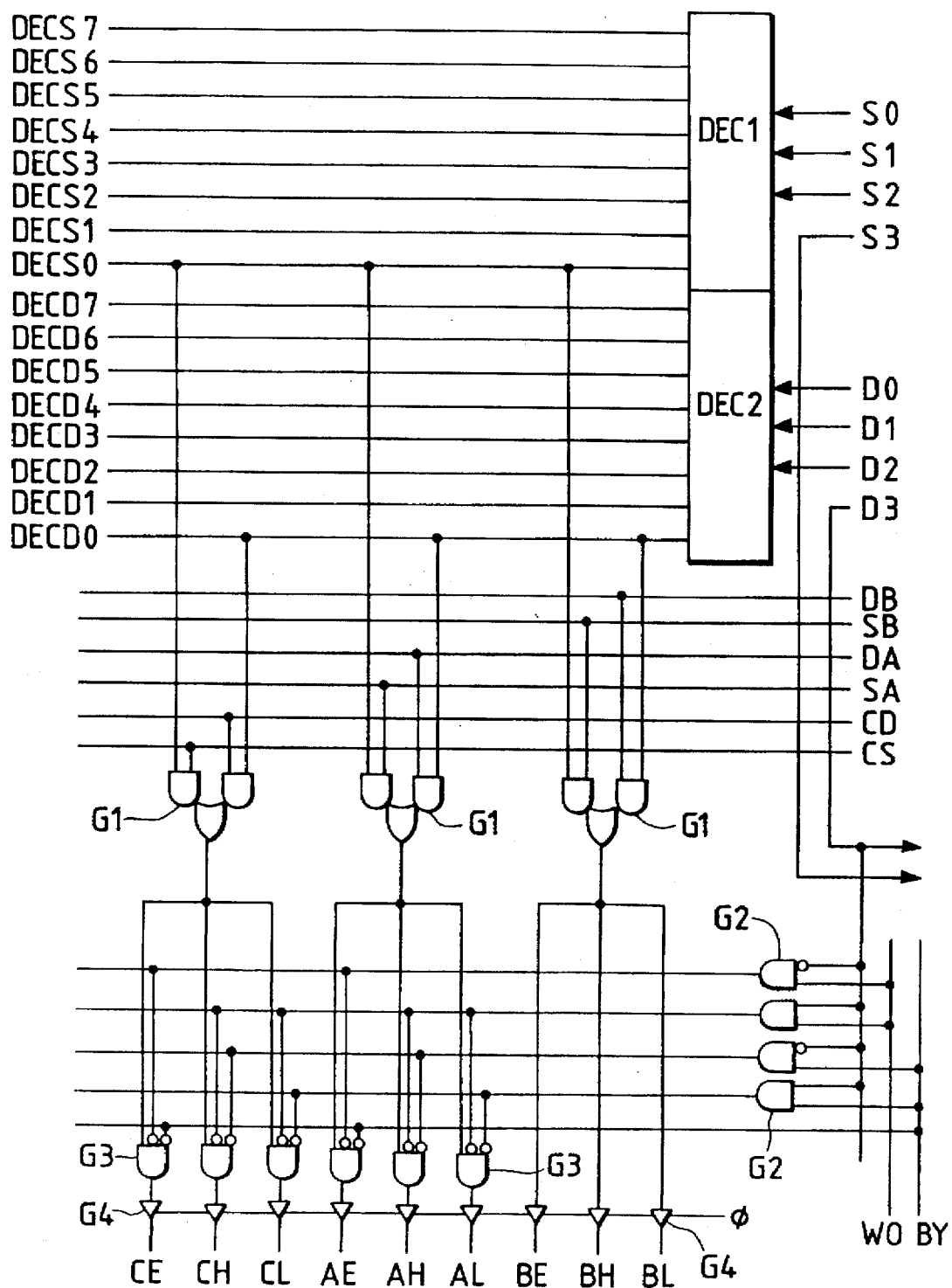
FIG. 61 is an explanatory circuit diagram showing a register selector contained in the CPU.

FIG. 61 shows a block diagram of one example for specifying the general registers and the expansion registers in the aforementioned register select unit REGSEL. The register field is constructed to include: decoders DEC1 and DEC2; three AND/OR gates G1; four AND gates G2; six AND gates G3; and nine output control gates G4 such as clocked inverters. The decoder DEC1 decodes control signals S0 to S2, and the decoder DEC2 decodes control signals D0 to D2. The AND/OR gate G1 receives the predetermined output signals of the decoders DEC1 and DEC2 and predetermined ones of control signals DB, SB, DA, SA, CD and CS. The AND gate G2 receives and takes an AND of predetermined two of the control signals D3, BY and WO. The gate G3 receives and takes an AND of predetermined three of the output of the aforementioned AND/OR gate G1, the output of the aforementioned AND gate G2 and the control signal BY. The output gate G4 feeds the output of the corresponding AND gate G3 and the output of the AND/OR gate G1 in synchronism with the clock signal ø.

The control signal DB instructs the register, specified by the register field rd in the instruction format, to be outputted to the B bus, and the control signal CS instructs the content of the C to be inputted to the register which is specified by the register field rd in the instruction format. The control signal DA instructs the register, which is specified by the register field rd, to be outputted to the A but. The control signal SB instructs the register, which is specified by the register field rs, to be outputted to the B bus. The control signal SA instructs the register, which is specified by the register field rs, to be outputted to the A bus. The control signal CD instructs the content of the C bus to be inputted to the register which is specified by the register field in the instruction format. The control signals BY and WO instruct the individual operations to be executed by the byte sizes and the word sizes. The data corresponding to the register to be selected are fed to the control signals S0 to S2 or the control signals D0 to D2, and the control signals DB, SB, DA, SA, CD and CS and the control signals BY, WO and D3 are fed with predetermined signals so that one or more of the aforementioned control signals AE, BE, CE, AH, BH, CH, AL, BL and CL are activated.

FIG. 62 shows an example of the correspondence between the data of the register field in the instruction format and the register specified by the data.

The register field specifies the register numbers (0 to 7) with the bits 0 to 2 and further specifies whether the general register is at the high- or low-order side (H/L) with the byte size for the bit 3 and whether the register is of general or expansion type with the word size. Incidentally, the bit 3 is ignored so that it is substantially absent, as has been described hereinbefore, when in the application of the long word size data and the address register. For example, the control signal AH of the general register is set to the 1 level when the control signals D0 to D3 are B'0000 and when the control signal DA and the control signal BY are set to the 1 level.

Figure 63:
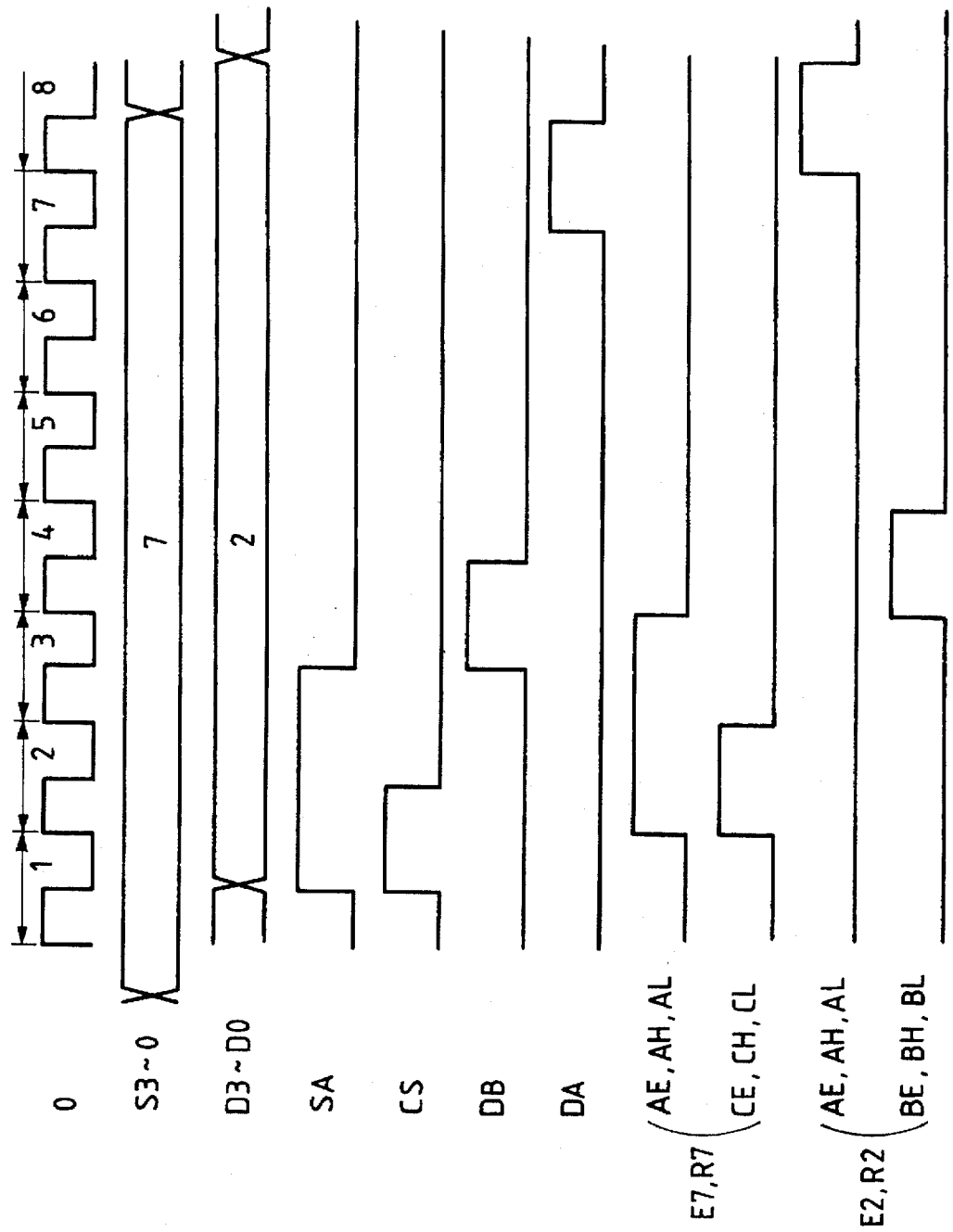
FIG. 63 is an timing chart showing one example of the operation of the register selector.

FIG. 63 shows an operation timing chart of the register field when the aforementioned (MOV.L R2, @-ER7) instruction described with reference to FIG. 55 is to be executed.

At the second step, the expansion register E7 and the general register R7 have their control signals AE7, AH7 and AL7 set to the 1 level so that their contents are outputted to the A bus. Simultaneously with this, the control signals CE7, CH7 and CL7 are set to the 1 level so that the contents of the C bus are inputted to the expansion register E7 and the general register RT. Since the output of the general register is the so-called "master/slave" like before, not the contents of the C bus but the contents of the expansion register E7 and the general register R7 immediately before are outputted to the A bus. At the sixth step, the control signal APC is set to the 1 level so that the contents of the program counter PC are outputted to the A bus. Simultaneously with this, the control signal CPC is set to the 1 level so that the contents of the C bus are inputted to the program counter PC. At the seventh step, the expansion register E2 and the general register R2 have their control signals AE, AH and AL set to the 1 level so that their contents are outputted to the C bus.

Figure 64:
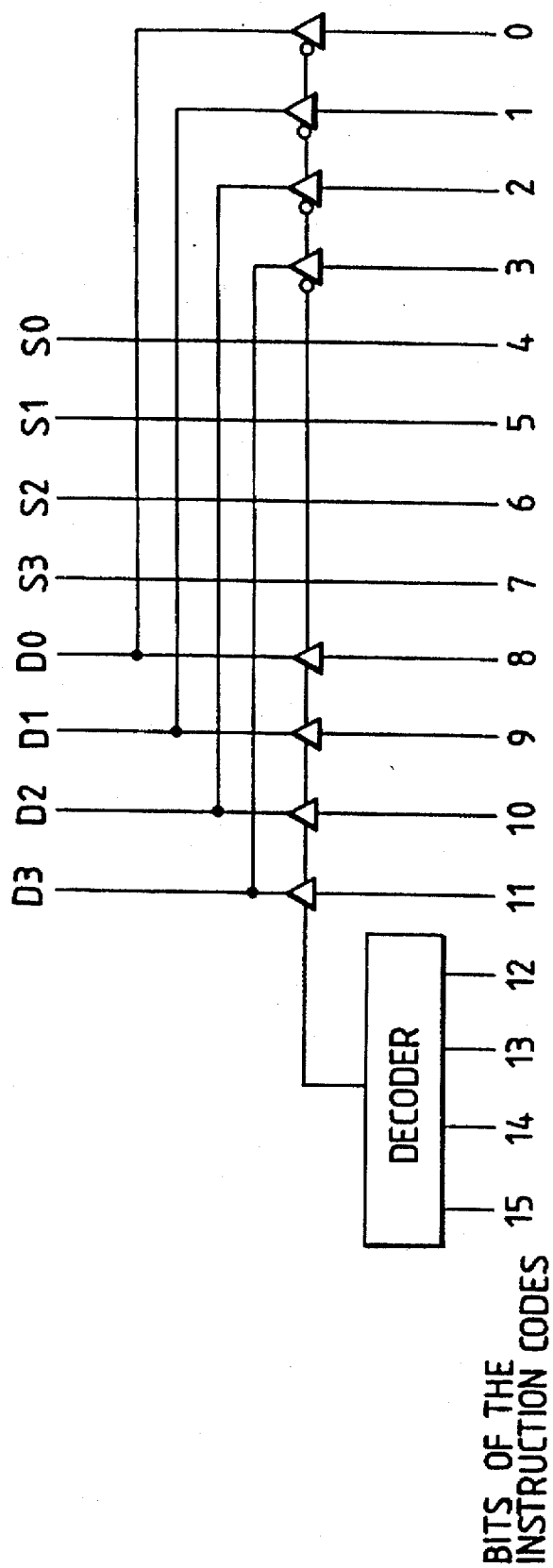
FIG. 64 is an explanatory diagram showing one example of the structure of the register selector.

FIG. 64 shows one example of the signal generating logics for generating the aforementioned control signals S0 to S2 and D0 to D3 as the register select signal.

Since the register field rs is the bits 7 to 4 of the instruction codes, as has been described hereinbefore, the contents of the bits 7 to 4 are direct control signals S0 to S3. Since, moreover, the register field rd is the bits 3 to 0 or 12 to 8 of the instruction codes, any of the contents of the bits 3 to 0 or 11 to 8 is selected to the control signals D0 to D3. The signals for the selections are generated by decoding the bits 15 to 12 of the instruction codes. In case the bits 11 to 8 are the register field rd, the operation codes are bits 15 to 12 so that whether or not the register field rd is the bits 11 to 8 can be decided by decoding the bits 15 to 12. Not only in case the register field rd is not the bits 11 to 8 but also in case the register field is absent, the bits 3 to 0 are the control signals D0 to D3.

[15] Selector Circuit Unit

Figure 65:
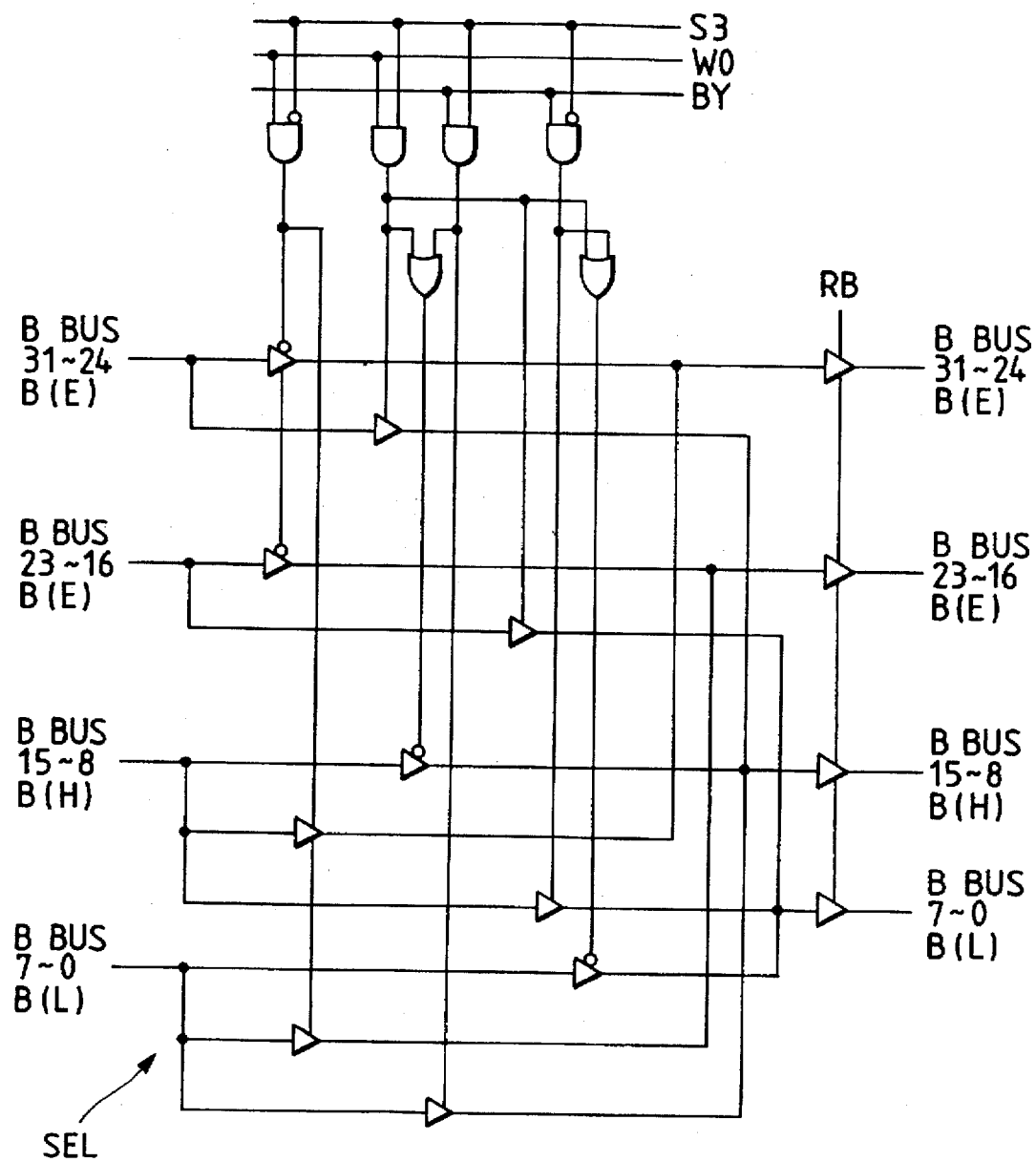
FIG. 65 is a circuit diagram showing one example of the selector of the internal buses contained in the CPU.

FIG. 65 shows a circuit noting the B bus as one example of the aforementioned selector circuit unit SEL shown in FIG. 50.

In case of the byte size addition between the general registers R0H and R1L, the general register R0H is connected with the A bus H, the B bus H and the C bus H (i.e., the bits 15 to 8), and the general register R1L is connected with the A bus L, the B bus L and the C bus L (i.e., the bits 7 to 0), so that they are not directly connected with the same bits of the ALU. At this time, the selector circuit SEL outputs the contents of the general register R1L, which are outputted to the B bus L, to the B bus H. If, in case of the byte size, the control signal BY is at the 1 level whereas the control signal S3 is at the 1 level, the data are outputted from the general register specified by the register field rs to the B bus L so that they are accordingly outputted through the selector circuit SEL to the B bus H. As a result, the common data are outputted to the B bus H and the B bus L so that the data of the registers of different blocks can be inputted for operations to the same bits of the ALU no matter what general register might be specified by the register field rd. The expansion register is not used as the register for the byte size so that no output is fed to the B bus E. Likewise, if the control signal BY is at the 1 level whereas the control signal S3 is at the 0 level, the data are outputted from the general register specified by the register field rs to the B bus H so that they can be outputted to the B bus L.

If, in case of the word size, the control signal WO is at the 1 level whereas the control signal S3 is at the 1 level, the data are outputted from the expansion register specified by the register field rs to the B bus E so that they are outputted through the select circuit SEL to the B bus H and the B bus L. As a result, the common data are outputted to the B bus E (i.e., the bits 31 to 16) and the B bus H and B bus L (i.e., the bits 15 to 0) so that they can be inputted for the operations to the same bits of the ALU no matter which of the expansion register and the general register might be specified in the register field rd. Likewise, if the control signal WO is at the 1 level whereas the control signal S3 is at the 0 level, the data are outputted from the general register specified by the register field rs to the B bus H and the B bus L so that they can be outputted to the B bus E.

[16] Read Data Buffer

Figure 66:
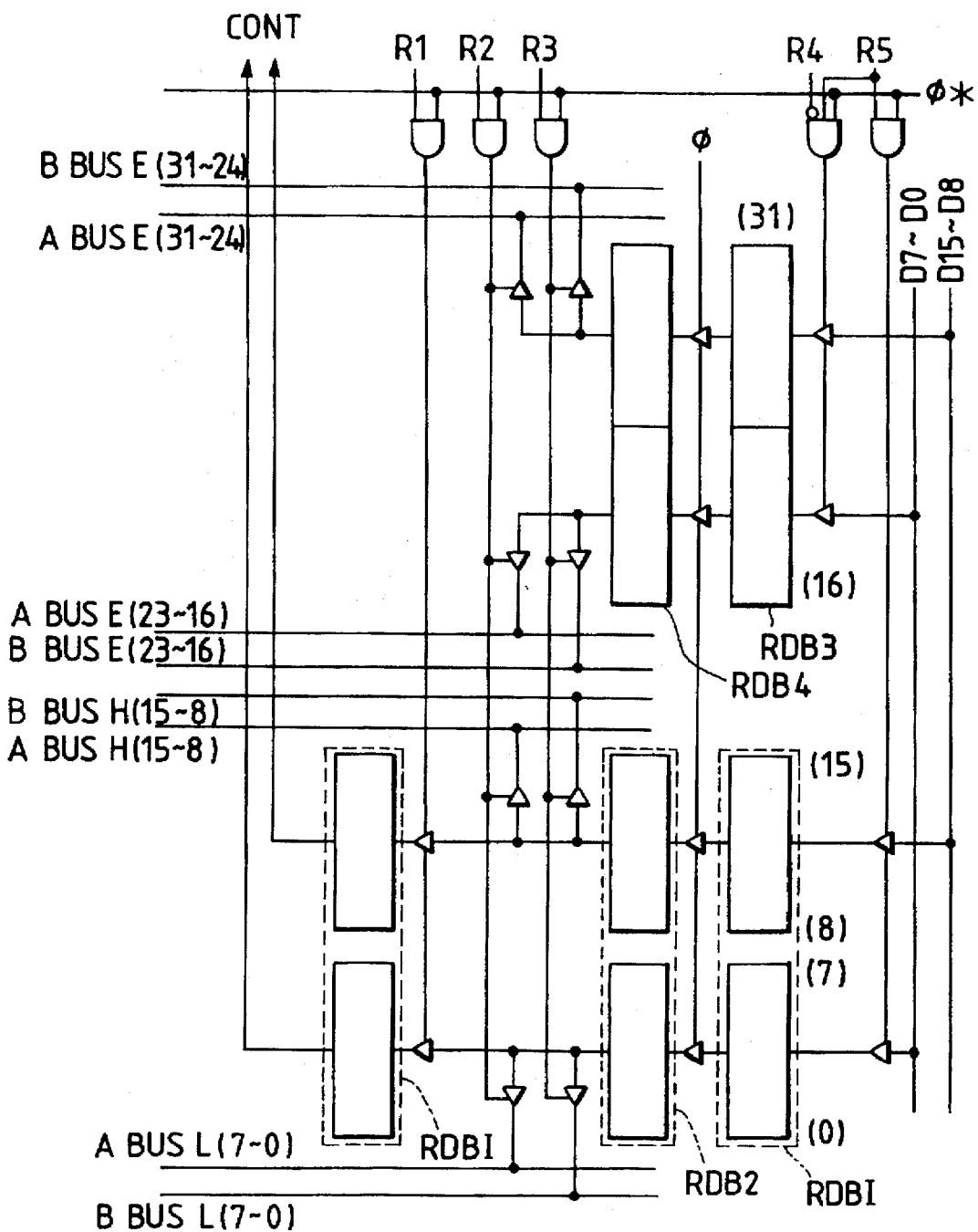
FIG. 66 is a circuit diagram showing a read data buffer.

FIG. 66 shows a specific circuit example of the read data buffers RDBE, RDBH and RDBL.

In the same FIGURE, the read data buffers RDBL and RDBH are composed of a first read buffer portion RDB1 and a second read buffer portion RDB2. The read data buffer RDBE is composed of a first read buffer portion RDB3 and a second read buffer portion RDB4. The first read buffer portions RDB1 and RDB3 are coupled through a gate circuit to the internal data buses D0 to D15 included in the single-chip microcomputer 100 and have their outputs connected through a gate circuit to the inputs of the second read buffer portions RDB2 and RDB4. The second read buffer portions RDB2 and RDB4 have their outputs connected through gates to the A bus and the B bus. Moreover, the second read buffer portion RDB2 also has its output connected through a gate with the input of the instruction read data buffer (which will also be referred to as the instruction read buffer portion) RDBI. The output of the instruction read buffer portion RDBI is fed to a control unit CONT. All of the aforementioned first read buffer portions RDB1 and RDB3, second read buffer portions RDB2 and RDB4 and instruction read buffer portion RDBI have 16 bits. In the same FIGURE: the "B bus E" corresponds to the "B(E)" of FIG. 50; the "A bus E" corresponds to the "A(E)" of FIG. 50; the "B bus H" corresponds to "B(H)" of FIG. 50; the "A bus H" corresponds to "A(H)" of FIG. 50; the "B bus L" corresponds to "B(L)" of FIG. 50; and the "A bus L" corresponds to "A(L)" of FIG. 50.

When the control signal R4 and the control signal R5 shown in FIG. 66 are at the 0 and 1 levels, respectively, and when the system clock ø * (wherein symbol * implies the inversion or the row enable) is at the 1 level, the aforementioned first read data buffer portions RDB1 and RDB3 individually fetch the data. If the control signal R4 is then at the 1 level, one read buffer portion RDB3 does not fetch the data. The first read data buffer portions RDB1 and RDB3 and the second read data buffer portions RDB2 and RDB4 are operated in the master/slave so that the data are transferred in synchronism with the 1 level of the system clock ø from the first read data buffer portions RDB1 and RDB3 to the second read data buffer portions RDB2 and RDB4. The data latched by the second read data buffer portions RDB2 and RDB4 are fed to the B bus on the basis of the 1 level of the control signal R3, to the A bus on the basis of the 1 level of the control signal R2 and to the instruction read data buffer portion RDBI on the basis of the 1 level of the control signal R1.

The read data buffer of FIG. 66 is composed of: the second read data buffer portions RDB2 and RDB4 of 32 bits connected with the internal buses; and the first read data buffer portions RDB1 and RDB31 of 32 bits connected with the data buses D0 to D15. The first read data buffer portion RDB1 at the less significant bits are always stored with the read data when in the reading operation, and the first read data buffer portion RDB3 at the more significant bits is specified by the control signal R4 on whether it Is stored with the data. At this time, the less significant 16 bits are always enabled to be inputted when in the reading operation, and the more significant 16 bits are disabled to be inputted when in the low-order word reading operation (as the read of the high-order word data is previously executed) of the long word data. As a result, the effective address field of 24 bits in the instruction codes can be likewise handled with the long word data to simplify the structure of the read data buffer and to reduce the logical and physical scales.

Figure 67:
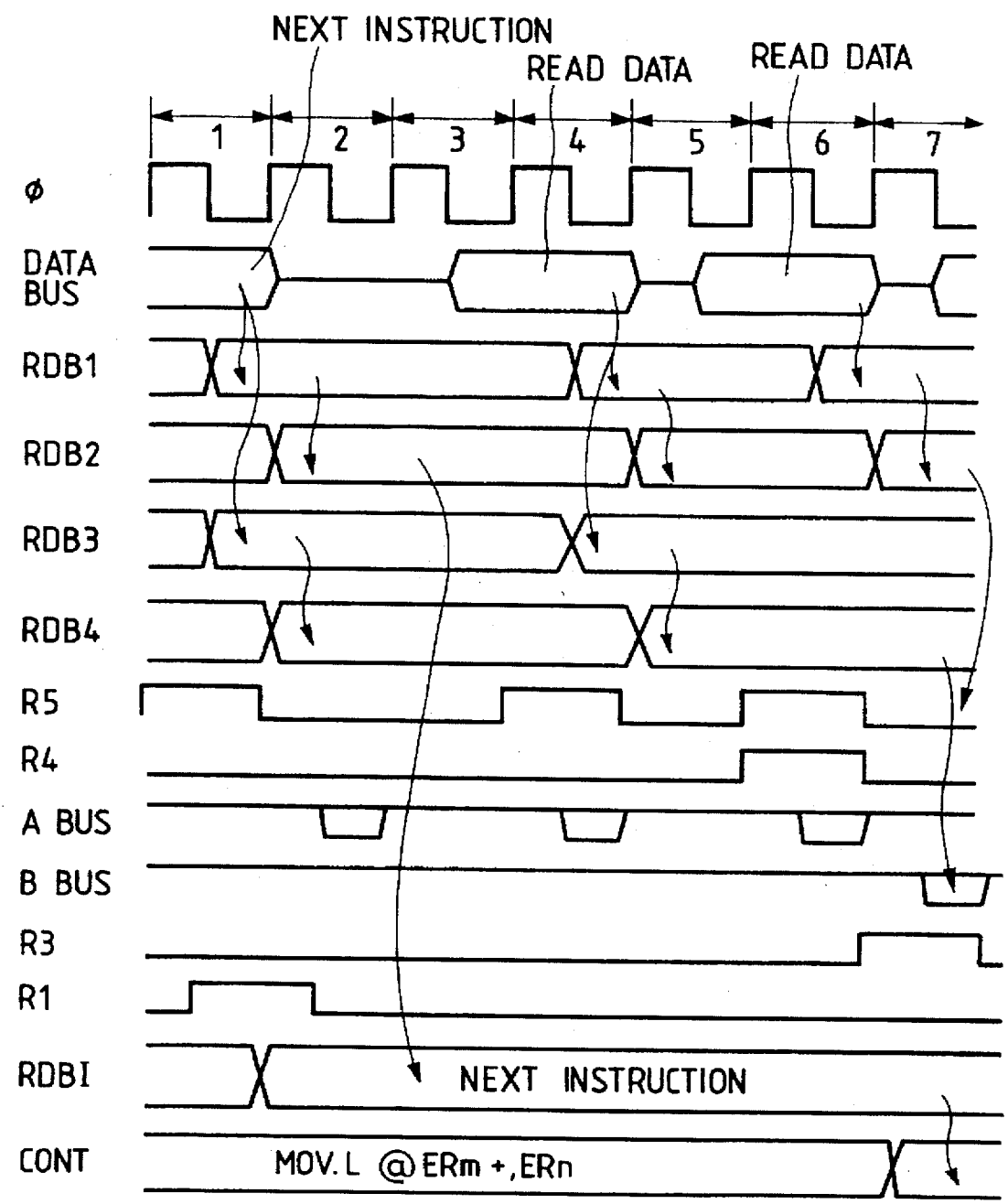
FIG. 67 is a timing chart showing the operation of the read data buffer.

FIG. 67 shows an operation timing chart of the read data buffer of FIG. 66 when the aforementioned instruction (MOV.L @ ER7+, ER2) is executed.

In the first, fourth and sixth cycles, the control signal R5 takes the 1 level so that the contents of the data buses D15 to D0 are stored in the first read buffer portions RDB1 and RDB3. In the sixth cycle, however, the control signal R4 is set to the 1 level so that no data stored in the first read data buffer portion RDB3. In the next cycle, these contents are transferred to the second read buffer portions RDB2 and RDB4. In the second cycle, the control signal R1 takes the 1 level so that the next instruction latched in the second read buffer portion RDB2 is transferred to the instruction read buffer portion RDBI. The control unit CONT uses those contents from the seventh cycle to start the decoding of the next instruction. In the seventh cycle, the control signal R3 takes the 1 level so that the read data of 32 bits latched in the second read buffer portions RDB2 and RDB4 are outputted to the B bus.

[17] Write Data Buffer

Figure 68:
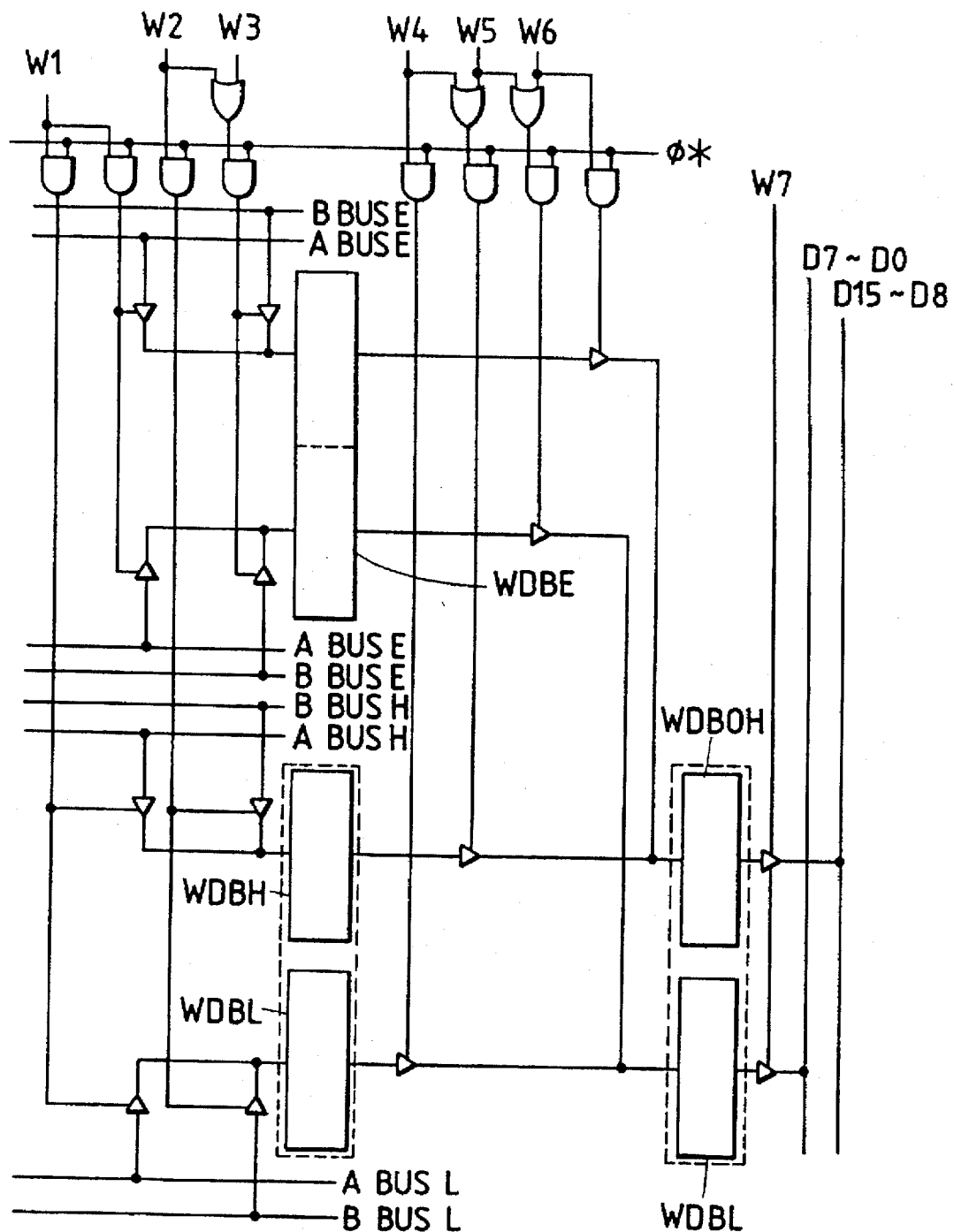
FIG. 68 is a circuit diagram showing one example of a write data buffer.

FIG. 68 shows a specific example of the circuit of the write data buffer. The write data buffer WDBE receives the data from the B bus E of 16 bits or the A bus E of 16 bits. The write data buffer WDBH receives the data from the B bus H of 8 bits or the A bus H of 8 bits. The write data buffer WDBL receives the data from the B bus L of 8 bits or the A bus L of 8 bits. The write data output buffers WDBOL and WDBOH receive outputs of the write data buffer WDBE or the write data buffers WDBL and WDBOH and output them to the data buses D0 to D15. The data to be written are outputted at first to the A bus or B bus, while the system clock ø is at the low level, and are then stored in the write data buffers WDBL, WDBH and WDBE in accordance with the levels of control signals W1, W2 and W3. The data stored in the write data buffers are transferred, while the system clock ø is at the low level, to the write data output buffers WDBOL and WDBOH in accordance with the levels of control signals W4, W5 and W6.

Figure 69:
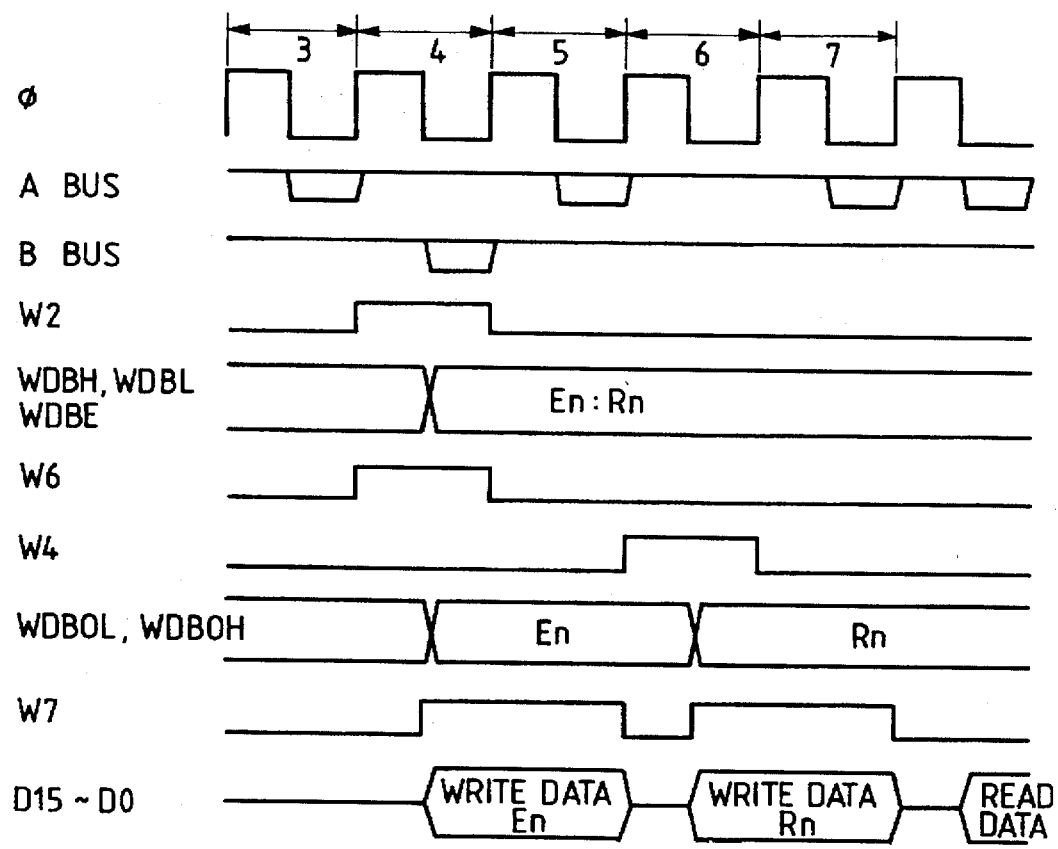
FIG. 69 is a timing chart showing the operation of the read data buffer.

FIG. 69 shows an operation timing chart of one example of the write data buffer when the aforementioned instruction (MOV.L ER2, @-ER7) described with reference to FIG. 55 is executed. In the fourth cycle (corresponding to the fourth step Se4), the control signal W2 takes the 1 level so that the contents of the registers E2 and R2 outputted to the B bus are latched in the write data buffers WDBE, WDBH and WDBL. Simultaneously with this, the control signal W6 takes the 1 level so that those of 16 bits of the contents corresponding to the latched data of the register E2 are transferred from the write data buffer WDBE to the write data output buffers WDBOL and WDBOH. Moreover, the control signal W7 takes the 1 level so that the data are outputted to the internal data buses D0 to D15. In the sixth cycle (corresponding to the sixth step Se6), the control signals W4 and W7 take the 1 level so that the contents of 16 bits latched in the write data buffers WDBH and WDBL and corresponding to the register R2 are transferred to the write data output buffers WDBOH and WDBOL and outputted to the internal data buses D0 to D15. The contents of the next instruction are transferred to the instruction read buffer portion.

[18] Address Buffer

Figure 70:
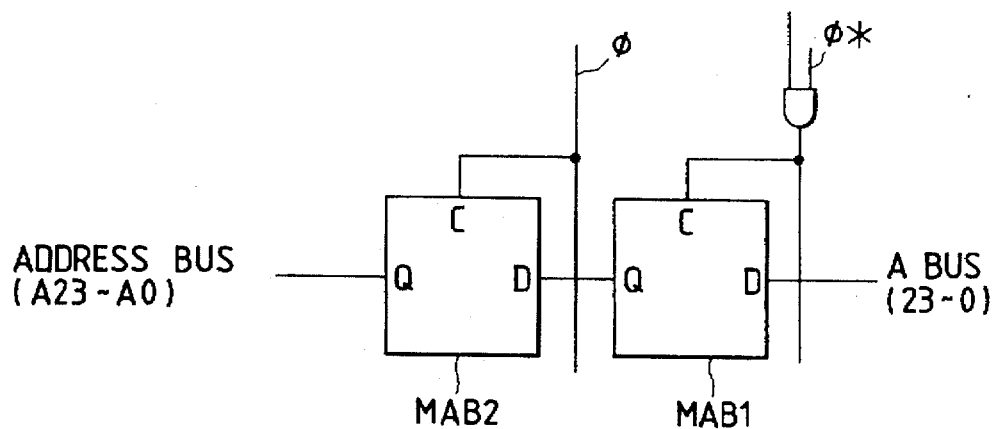
FIG. 70 is a circuit diagram showing one example of an address buffer.

FIG. 70 representatively shows the structure of 1 bit as the specific example of a logical circuit of the address buffer. The address buffer is constructed to include flip-flop circuits MAB1 and MAB2, of which the flip-flop circuit MAB1 is connected with the bus A and the flip-flop circuit MAB2 and this flip-flop circuit MAB2 is connected with the flip-flop circuit MAB1 and the address bus. The input of the data of the flip-flop circuit MAB1 from the A bus is carried out when the control signal is at the 1 level while the system clock ø is at the low level. The contents of the flip-flop circuit MAB1 are transferred to the flip-flop circuit MAB2, while the system clock ø is at the high level, and are outputted to the address bus.

Figure 71:
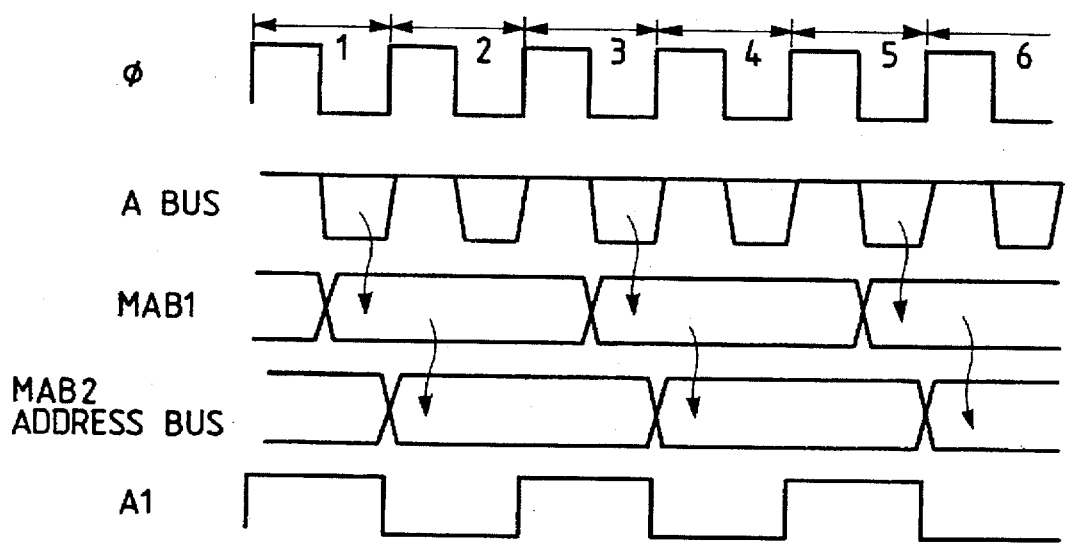
FIG. 71 is a timing chart showing the operation of the address buffer.

FIG. 71 shows an operation timing chart of the address buffer of FIG. 70 at the time of executing the aforementioned instruction {MOV.B @ (1234, ER0), R1H} described with reference to FIG. 53. In the first cycle (corresponding to the first step Sc1), the third cycle (corresponding to the third step Sc3) and the fifth cycle (corresponding to the fifth step Sc5), the control signal is set to the 1 level so that the contents of the A bus are latched in the flip-flop circuit MAB1. These contents are transferred at the next step to the flip-flop circuit MAB2 and are outputted to the address bus.

Figure 72:
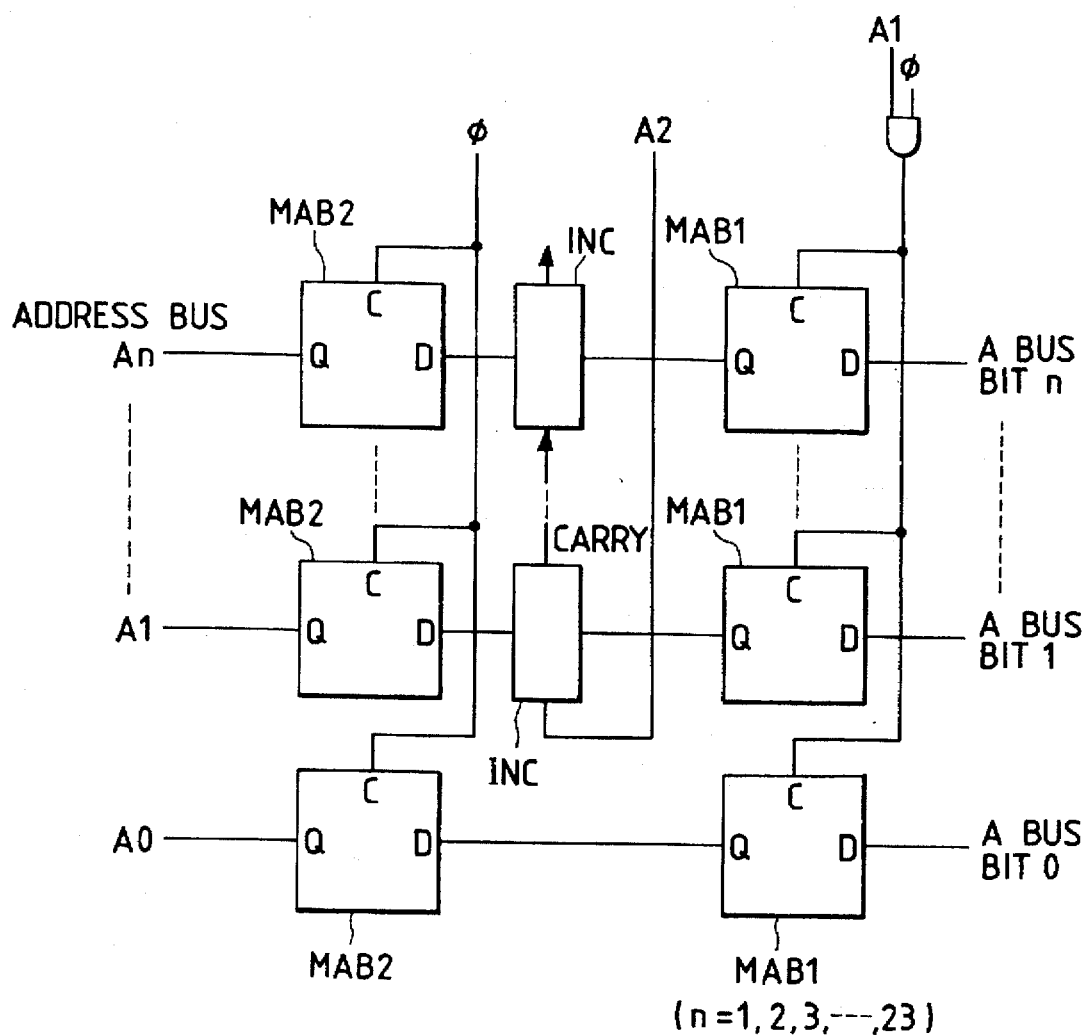
FIG. 72 is an explanatory diagram showing the structure of another example of the address buffer.
Figure 73:
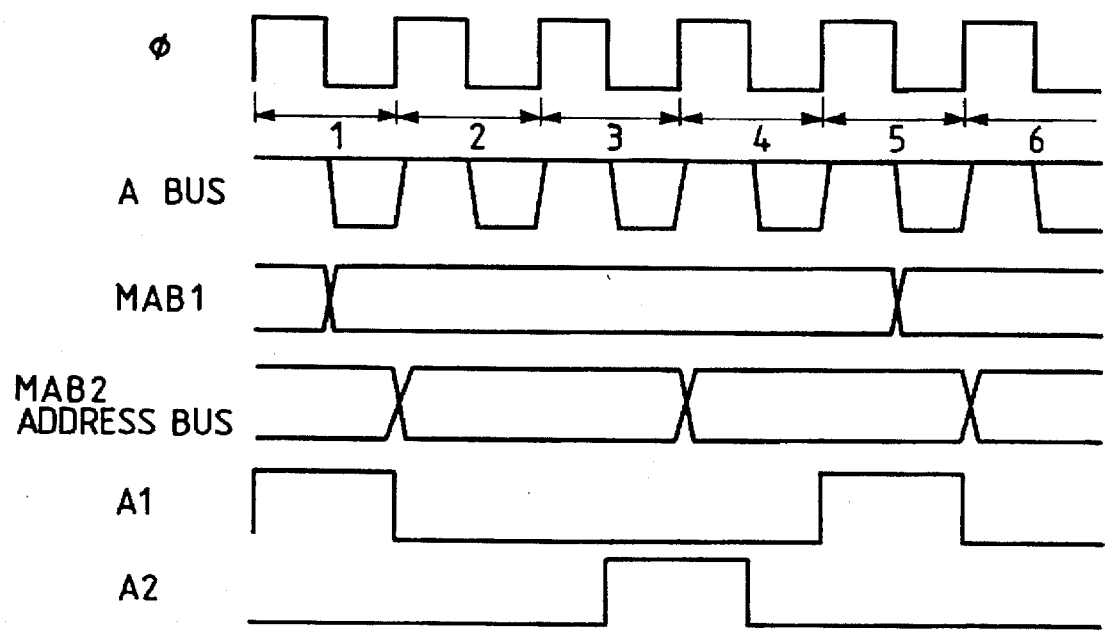
FIG. 73 is a timing chart showing the operation of the address buffer of FIG. 72.

FIG. 72 shows a modification of the address buffer AB. As is different from the address buffer of FIG. 70, an adder such as an incrementer INC is added between the flip-flop circuits MAB1 and MAB2 so that it can add a constant value of 2. Since the access of the unit of 16 bits is divided into two times so as to access the data of 24 bits, the value of 2 has to be added to the address after the first access. For this addition, the aforementioned incrementer INC is used. Although the hardware scale is enlarged more than that of the case in which the general ALU is used, the scale of the control unit CONT can be reduced by omitting the following troubles. The address calculated once when the general arithmetic unit is used has to be temporarily latched in a temporary register or the like. After this, the contents of the temporary register have to be read, and the value of 2 has to be added to the contents by the ALU. The, the addition result has to be transferred to the address buffer. Thus, scale of the control unit CONT can be reduced. The type of those address buffers may be selected on the basis of the overall structure of the CPU. For example, the address buffer of FIG. 72 may be adopted in case the scale of the control unit CONT is so larger than that of the execution unit EXE that it is not desirable on the chip layout.

FIG. 78 shows an operation timing chart of the address buffer of FIG. 72 at the time of executing the aforementioned instruction (MOV.L @ ER7+, ER2) described with reference to FIG. 54. In the first cycle (corresponding to the first step Sd1) and the fifth cycle (corresponding to the fifth step Sd5), the control signal A1 is set to the 1 level so that the contents of the A bus are latched in the flip-flop circuit MAB1. These contents are transferred at the next step to the flip-flop circuit MAB2 and outputted to the address bus. At the later half of the third cycle (corresponding to the third step Sd3), the control signal A2 is set to the 1 level so that the contents of adding 2 to the flip-flop circuit MAB1 are transferred at the fourth step to the flip-flop circuit MAB2 and outputted to the address bus. At this time, the operation of the second step of FIG. 54 is an increment of +4, and the operation of the register is not executed at the fifth step.

[19] Address Map of Microcomputer

Figure 74:
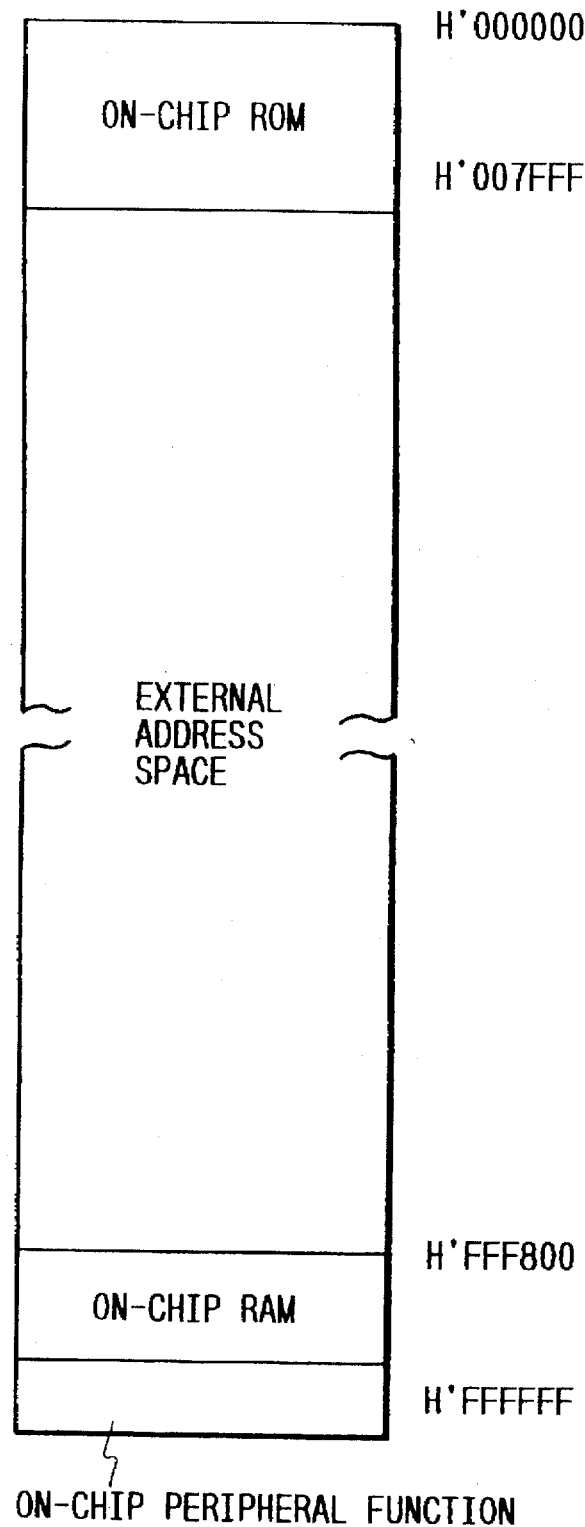
FIG. 74 is one example of the address map of the CPU.

FIG. 74 shows one example of the address map of the microcomputer 100 of the present embodiment.

The on-chip ROM 2 is arranged from the address H'00000, and the on-chip peripheral functions (e.g., the timer 4 or the SCI 5) and the on-chip RAM 3 are arranged at and after H'FF800 so that an external address space is left inbetween. The on-chip peripheral functions and the on-chip RAM 3 can be arranged midway of the address space, e.g., at H'0F800 to H'0FFFF. In this case, the external address space is divided Into two spaces. Moreover, the program written in the on-chip ROM 2 and the program existing in the external address space cannot be continuously used although contrary to the object of the present invention. Hence, the on-chip ROM 2 to be used mainly as the program region and the on-chip peripheral functions and the on-chip RAM 3 to be used mainly as the data region should be arranged opposite to each other in the address space while leaving a continuous space inbetween. Thus, even if the data region and the program region are enlarged in accordance with the system to which the microcomputer 100 is applied, those regions can be individually easily retained in the continuous address space so that the procedures for managing the data or programs and for accessing them are simplified on the system. Incidentally, the on-chip ROM 2 include a start address for the reset and an address (e.g., a start vector) stored with the start address.

At this time, the 8-bit absolute address can use H'FFFF00 to H'FFFFFF, as has been described hereinbefore, so that it can be used for the on-chip peripheral function regions. The bit operation instructions can also be used in such regions.

Since the absolute address of 16 bits can use H'000000 to H'007FFF and H'FF8000 to H'FFFFFF, it can be used for the on-chip ROM, the on-chip RAM and the on-chip peripheral functions. These on-chip regions can be highly frequently used, and the relatively short instructions can be used to improve the code efficiency and the effective time.

The fixed address seems to be hardly used for the external space. In case the external space and the fixed address are used, they may be arranged in the regions H'FF80000 to H'FFFFFF or H'FFFF00 to H'FFFFFF.

[20] Minimum Mode and Maximum Mode

In the description thus far made, the address space is made to have 16 Megabytes. However, the CPU 1 is thought to require not the address space of 16 Megabytes but a number of external terminals of input/output ports by combining the individual function blocks as the single-chip microcomputer 100 in its entirety although it has the address space of 16 Megabytes as the function of the CPU 1. In this case, it is not advisable to have twenty four address terminals, but the number of input/output port terminals has to be increased by decreasing the address terminals. If the address terminals are twenty, for example, the address space to be actually used is 1 Megabyte. Moreover, an application may be sufficient with the identical CPU even if the address space has 64 Kilobytes as in the prior art. For example, in case not the external space but all the terminals of the single-chip microcomputer are used as the input/output ports to reduce the packaging area of the applied system, the address space may have 64 Kilobytes without any problem, as in the prior art, if the total of the on-chip region is no more than 64 Kilobytes.

In this application, the read of the vector or the stack of the program counter may be accomplished at 16 bits, i.e., at a unit of 2 bytes, and the aforementioned access of 4 bytes is wasteful to drop the execution time and the using efficiency of the memory.

Figure 75:
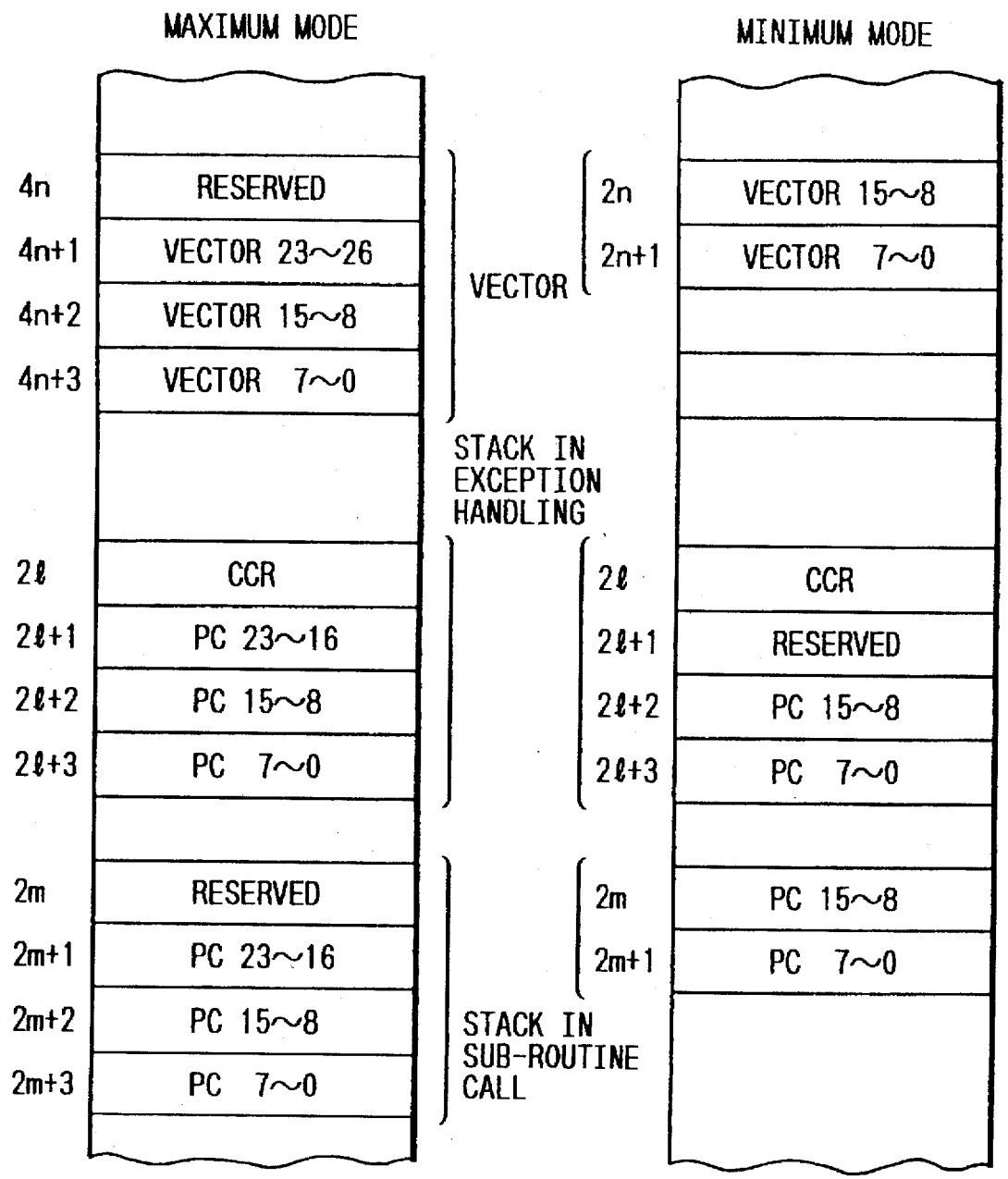
FIG. 75 is an explanatory diagram showing data structures on the memory in individual modes.

FIG. 75 shows one example of the Individual data array formats on the memory in the minimum mode and the maximum mode. The mode for operations in the address space of 64 Kilobytes is the minimum mode, and the mode for operations in the address space of 64 Kilobytes or more is the maximum mode, although not especially limitative thereto.

In the maximum mode, the vector is arranged such that its leading address of multiples of 4 is at the unit of 4 bytes. The leading 1 byte is for a reserved region, and the remaining 3 bytes are used as the start address. The stack is arranged with its even address leading at the unit of 4 bytes not only in the exception handling but also in the sub-routine call.

In the minimum mode, the vector is arranged such that its even address leads at the unit of 2 bytes. These are used as the start address (i.e., the less significant 16 bits although the more significant 8 bits are deemed as 0). The stack is arranged in the exception handling such that its even address leads at the unit of 4 bytes to latch the reserved region of the condition code register CCR and the less significant 16 bits of the program counter PC. At the time of the sub-routine, the less significant 16 bits of the PC are latched at the unit of 2 bytes and with the leading even address.

Figure 76:
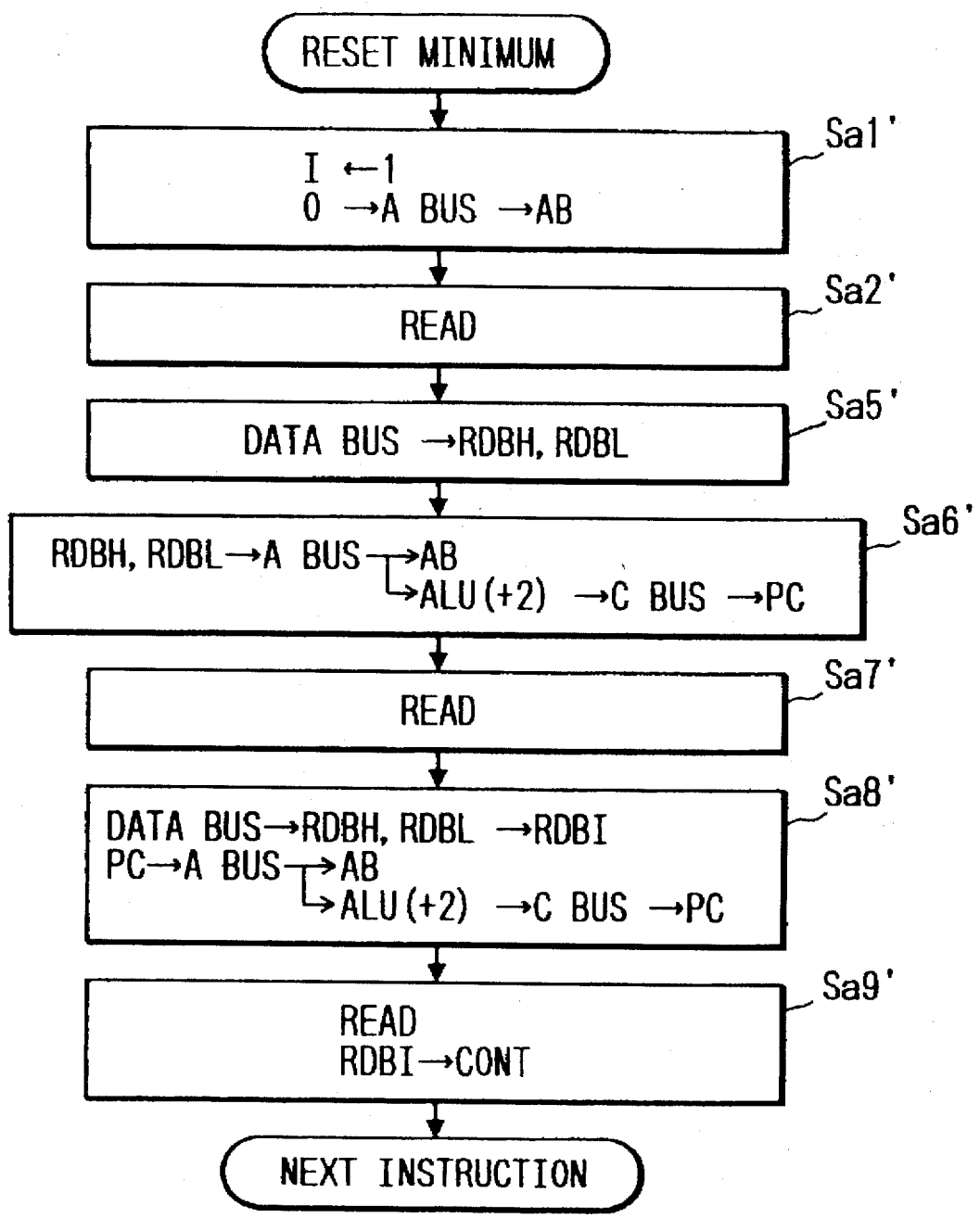
FIG. 76 is a flow chart showing one example of the operation in the CPU in the minimum mode.

FIG. 76 shows a flow chart of the reset sequence in the minimum mode. This is basically identical except that the third step Sa3 and the fourth step Sa4 of FIG. 51 are omitted, and the contents of the aforementioned vector are outputted at a sixth step Sa6' to the less significant 16 bits of the A bus. The more significant bits are at arbitrary values but are fixed to zero by the address buffer AB, although not especially limitative thereto. In this case, the expansion register Ei is desired not be influenced at the time of calculating the effective address. This is because the expansion register Ei can be arbitrarily used.

Figure 77:
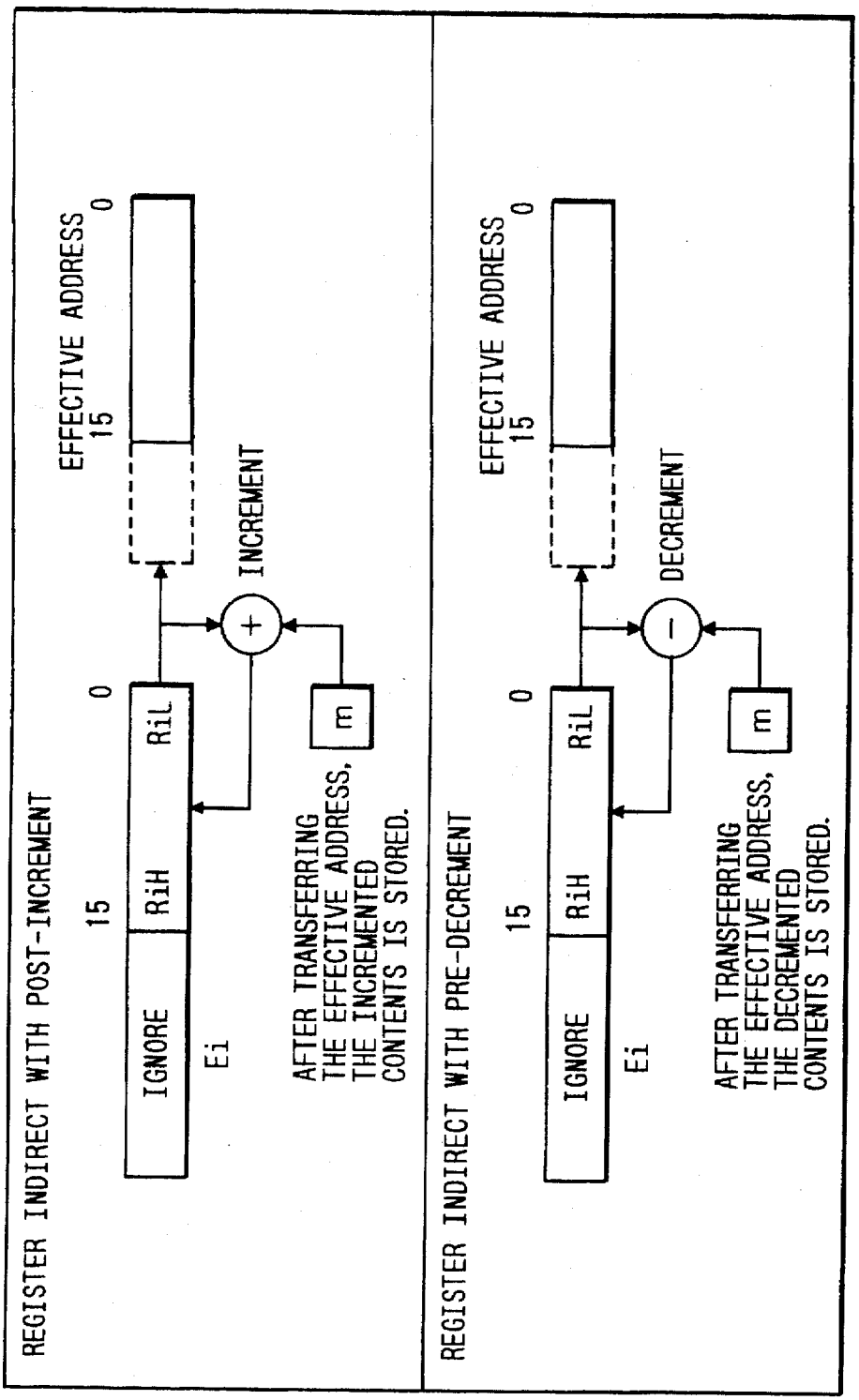
FIG. 77 is an explanatory diagram showing one example of the effective address calculating method in the minimum mode.

FIG. 77 shows an example of the method of calculating the effective address in the minimum mode. When in the register indirect with post-increment and the register indirect with pre-decrement, after transferring the increment and decrement results are stored only in the general registers RiH and RiL. The expansion register Ei is not influenced even if the carry and borrow are caused by the increment and decrement. The remaining modes may be identical to the maximum mode, because the registers used for the address calculation are not renewed, and the more significant bits may be fixed to zero by the address buffer AB.

FIG. 78 shows the difference between the operations of the CPU 1 in the minimum mode and the maximum mode. In the maximum mode, as has been described hereinbefore, the maximum bit of the address is 24 bits, and all the vector, the exception-handling stack and the subroutine stack contain 24 bits of address at the unit of 4 bytes. In the minimum mode, the maximum bit of the address is 16 bits, and both the vector and the subroutine call stack are reduced to 2 bytes corresponding to the 16 bits of the address. In the register indirect with post-increment and the register indirect with pre-decrement, on the other hand, the expansion address used for the address calculation is not renewed.

[21] Operation Mode of Single-Chip Microcomputer

FIG. 79 shows the operation modes of the single-chip microcomputer 100. The operation modes shown here are specified by the operation mode signals MODE1 to MODE3 shown in FIG. 32.

There are three address spaces of 16 Megabytes, 1 Megabyte and 64 Kilobytes, as has been described hereinbefore. In the expansion mode without on-chip ROM, a wide address space is used to handle many data so that the address spaces of 16 Megabytes and 1 Megabyte can be used to determine the bit number of the address output (i.e., the bit of the output address signal) accordingly. Moreover, the bus width to be used immediately after the reset can be selected in accordance with the mode. Thus, there are four expansion modes without on-chip ROM. Incidentally, the bus width can be reset in the software by setting the bus width control register (BSWCR), as has been described hereinbefore. The 8 bit bus uses the high-order data bus, although not especially limitative thereto.

Since, in the expansion mode with on-chip ROM, the CPU is operated immediately after the reset by the on-chip ROM 2, the address bit number and the bus width can be set by the software on the on-chip ROM 2 so that the mode is set to one.

The single-chip mode may be one if the total of the on-chip region is 64 Kilobytes or less. Since the operation of the CPU 1 is changed, as has been described hereinbefore, there are two modes for the future expansion in case the software is desired to be identical to that of the expansion mode without on-chip ROM.

FIG. 80 shows one example of the terminal functions in the different modes of the single-chip microcomputer 100.

Although not especially limitative: a first port IOP61 (i.e., port 1) acts as addresses 0 to 7; a second port IOP62 (i.e., port 2) acts as addresses 8 to 15; a third port IOP63 (i.e., port 3) acts as addresses 16 to 23; a fourth port IOP64 (i.e., port 4) acts as addresses 8 to 15; a fifth port IOP65 (i.e., port 5) acts as addresses 0 to 7; a sixth port IOP 66 (i.e., port 6) acts as bus control signals; and a seventh port IOP 67 (i.e., port 7) acts as address decode signals. These ports have different functions depending upon the settings of the operation mode and the registers, e.g., the data direction register (PDDR) or the bus size control register (BSWCR). For example, all the predetermined addresses are the outputs in the expansion mode without on-chip ROM. In the expansion mode with on-chip ROM, however, the addresses are not the outputs immediately after reset but the address outputs if the predetermined data direction (PDDR) is written with 1 by the software and is caused to output it.

The address decode signal divides the address space into eight such that the address space of 16 Megabytes is divided into those having a unit of 2 Megabytes or such that the address space of 1 Megabyte is divided into those having a unit of 128 Kilobytes. Each of these is assigned and activated when the address read or writes such region. This is effective when in the expansion mode so that the value 1 is the address decode output when it is written in the register (PDDR) by the software and outputted. In the expansion mode without on-chip ROM, however, the address decode signal corresponding to the first region, i.e., the region containing the vector region is outputted immediately after the resetting. Thus, if the head of the reset vector or the software is set in such region, the address decode signal can be used immediately after the reset to omit the address decode circuit of the outside.

[22] Single-Chip Microcomputer with On-Chip DMA

Considering that the time of processing the data only by the CPU 1 would be elongated more than necessary, we have examined that the especial data transfer system is packaged in the chip. Specifically, in case the so-called block transfer of data is executed by the CPU 1 in response to the transfer instruction, the instruction reading time is required in addition to the read/write of the data. If the register indirect with post-Increment and the transfer instruction of the long word are used, for example, the execution time takes 14 states to deteriorate the efficiency even with the transfer time of 8 states If an instruction having a length of 2 bytes and an execution time of seven states is used twice.

Figure 81:
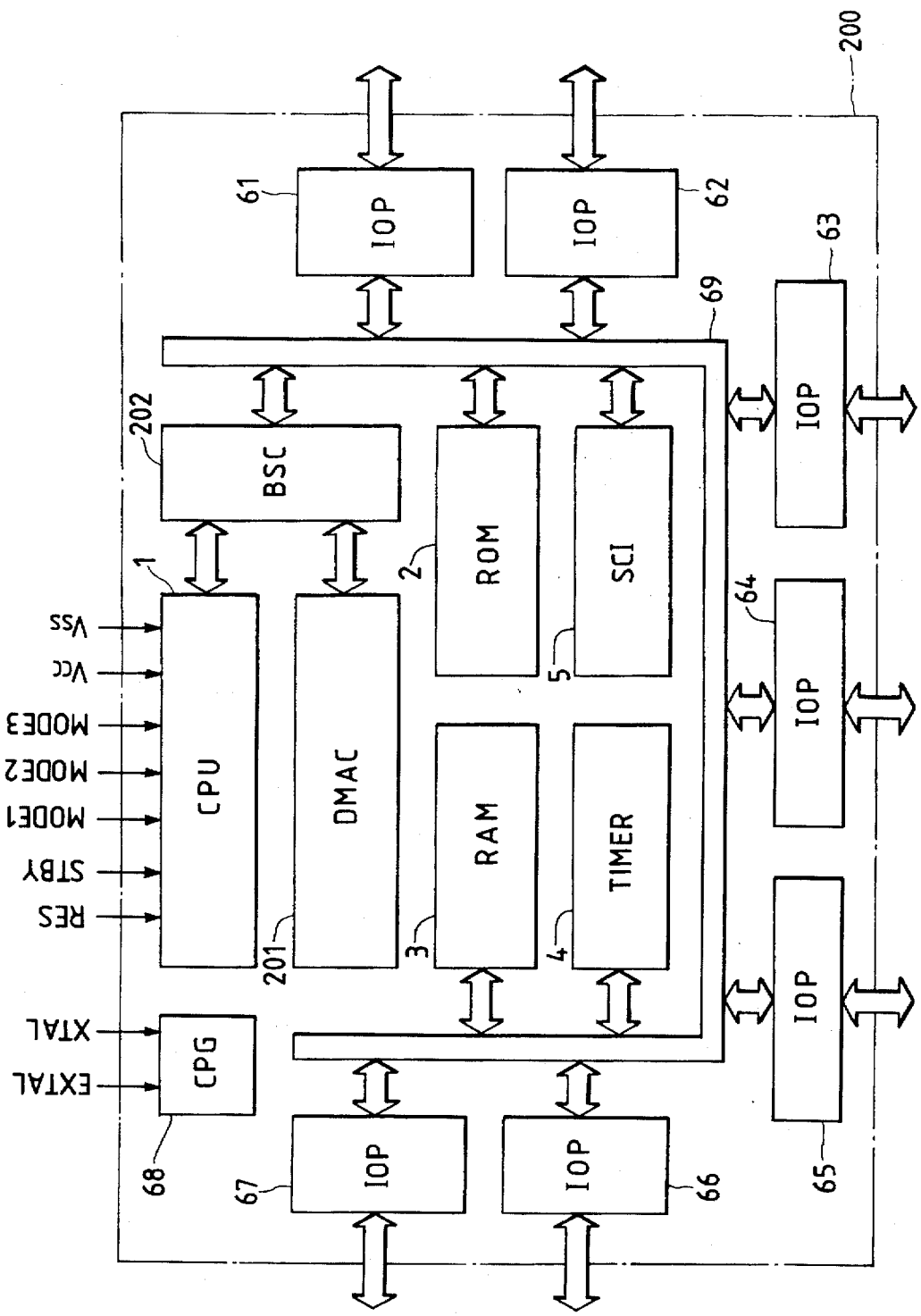
FIG. 81 is a block diagram showing a single-chip microcomputer according to a second embodiment of the present invention.

FIG. 81 shows a block diagram of a single-chip microcomputer 200 according to another embodiment investigated by us. The single-chip microcomputer 200, as shown in the same FIGURE, includes a direct memory access controller (DMAC) 201 in addition to the single-chip microcomputer 100 of FIG. 32, and the CPU 1 and the DMAC 201 are connected through a bus controller (BSC) 202 with the internal bus 69. The DMAC 201 is a data transfer system for reading/writing the data in accordance with the instruction of the CPU 1, and the internal bus 69 is used by either the CPU 1 or the DMAC 201 by the administration of the bus controller 202. In other words, the aforementioned computer 200 is formed over a single semiconductor substrate.

FIG. 82 shows an address map of the single-chip microcomputer 200. As has been described hereinbefore, the address map is divided into the eight areas each having 2 Kilobytes, and the methods of accessing to the individual areas are selected by four registers BSWCR, ASTCR, WSCER and MPXCR contained in the bus controller 202. At first, it is selected which of the bus of 8 bits or 16 bits the bus width select register BSWCR uses. In case the not-shown memory connected with the external space of area 0 is constructed to have 16 bits, for example, the BSWCO bit may be set to 1. In case the not-shown input/output circuit to be connected with the external space of area 7 is constructed to have 8 bits, the BSWCR7 bit may be cleared to 0. Likewise, the access state select register ASTCR selects which of the 2 states or 8 states or more one access is to be executed in. The wait state control enable select register WSCER selects whether the wait request by the wait state controller (WSC) included in the bus controller 202 is to be disabled or or enabled. The address multiplex select register MPXCR selects the non-multiplex of the address or the multiplex of the address for connecting the dynamic random access memory. However, the wait and address multiplex are disabled in case the access has two states, although not especially limitative thereto. Thus, the attributes to be selected by the aforementioned registers are ten. These attributes may be decided by the CPU 1 and the DMAC 201 to determine the access method. Then, the processing is so complicated that the CPU 1 and the DMAC 201 have to be composed of similar logics and circuits doubly, thus falling to satisfy the object of the present invention sufficiently. Therefore, it is advisable to cause the bus controller 202 to execute such controls.

Figure 83:
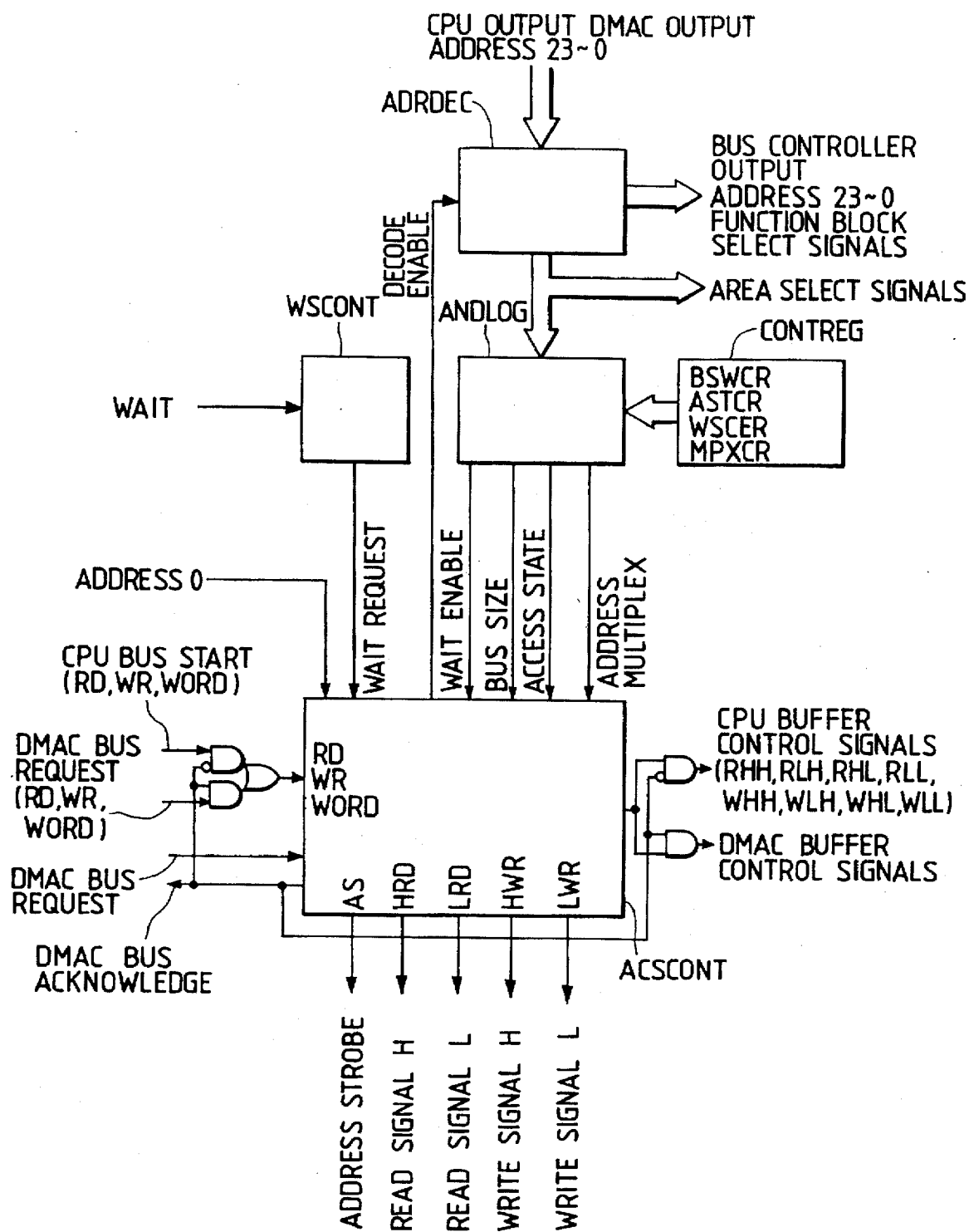
FIG. 83 is a block diagram showing a bus controller contained in the single-chip microcomputer of FIG. 81.

FIG. 83 shows a block diagram of one example of the bus controller 202. This bus controller 202 is constructed to include an address decoder ADRDEC, an AND circuit ANDLOG, a control register CONTREG, a wait control circuit WSCONT, and an access control circuit ACSCONT. The address decoder ADRDEC inputs the address signal outputted from the CPU 1 or the DMAC 201 to generate a select signal for selecting an on-chip function block and to output an address signal. The control register CONTREG is equipped with the aforementioned bus width select register BSWCR, the access state select register ASTCR, the wait state control acknowledge select register WSCER, and the address multiplex select register MPXCR so that Its contents are arbitrarily selected under the control of the CPU 1. The AND circuit ANDLOG generates control signals for the wait acknowledge, the bus width, the access state and the address multiplex and feed them to the access control circuit ACSCONT on the basis of both the address signal fed through the address decoder ADRDEC and the values of the registers BSWCR, ASTCR, WSCER and MPXCR Included in the control register CONTREG. The wait control circuit WSCONT receives the wait signal issued from the on-chip function block and feeds the access control circuit ACSCONT with the wait request corresponding to the desires state number. The access control circuit ACSCONT receives the signals, which are fed from the aforementioned AND circuit ANDLOG and wait control circuit WSCONT, to generate various strobe signals AS, HRD, LRD, HWR and LWR for the access controls and buffer control signals for the CPU 1 and the DMAC 201.

When a data transfer starting factor arises in the DMAC 201, the DMAC bus request signal is set to the 1 level. In response to this bus request, the bus controller 202 enables the DMAC 201 at a predetermined timing to use the bus thereby to set the signal of the DMAC bus enable signal to the 1 level. In other operations, the CPU 1 can use the bus. The bus start signal and the address input are multiplexed between the outputs of the CPU 1 and the DMAC 201. Specifically, if the DMAC bus enable signal is at the 1 level, the bus start signal and the address input are received from the DMAC 201. Otherwise, the bus start signal and the address input are received from the CPU 1. The internal operations of the bus controller 202 are made identical no matter whether the access might be caused by the CPU 1 or the DMAC 201. The buffer control signal to be fed to the CPU 1/the DMAC 201 during the read/write operations is also multiplexed.

Figure 84:
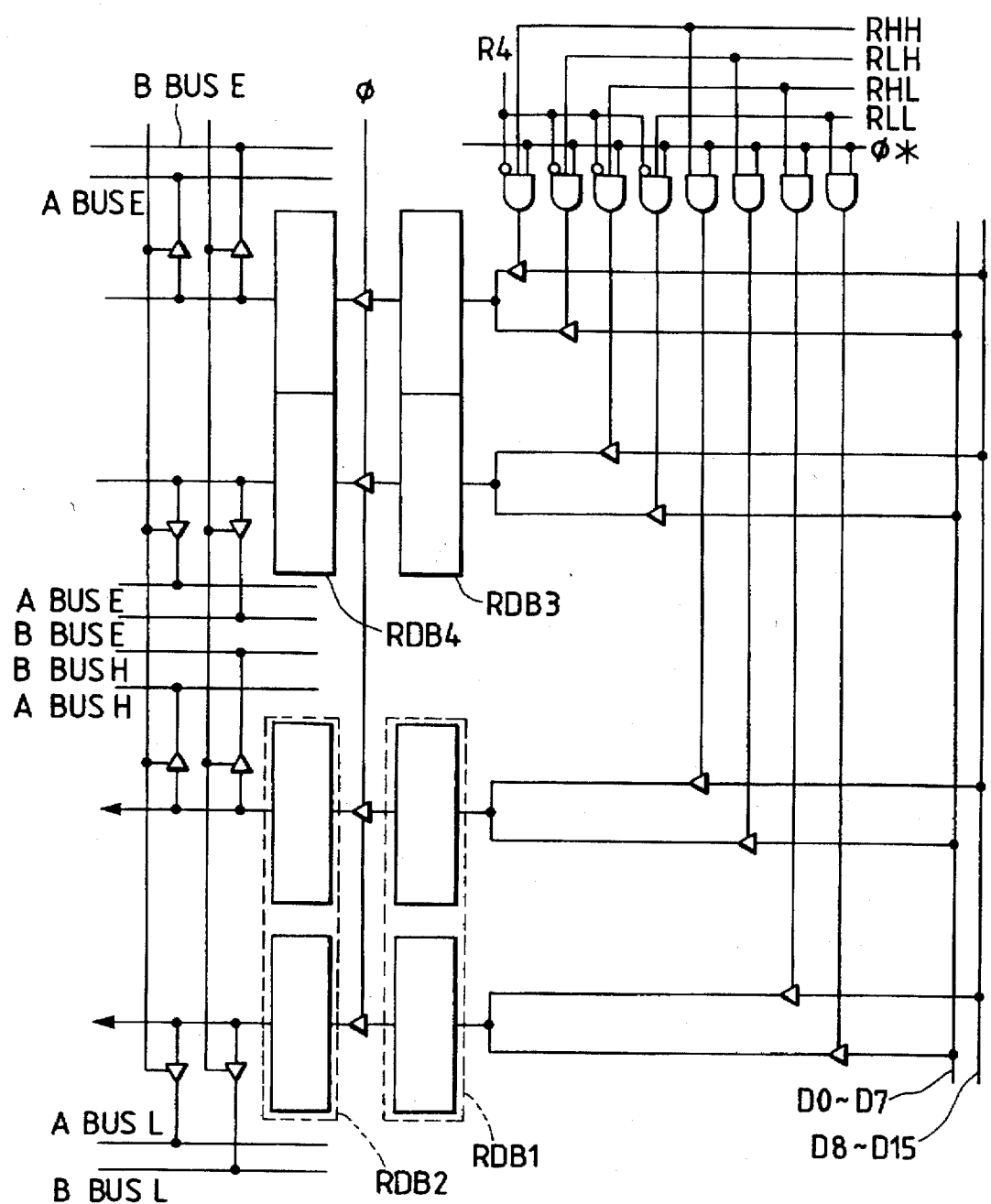
FIG. 84 is an explanatory diagram showing one example of the read data buffer which is applied to the CPU of FIG. 81.

FIG. 84 shows one example of the read data buffer to be controlled by the bus controller 202. What is different from FIG. 66 resides in the structure for feeding the data from the data buses D15 to D0 to the first data buffer portions RDB1 and RDB3. Which of the high-order data buses D15 to D8 or the low-order data buses D7 to D0 the data are to be latched in the read data buffer of the CPU 1 is controlled at the unit of byte in accordance with control signals RHH, RLH and RHL and RLL outputted by the bus controller 202.

Figure 85:
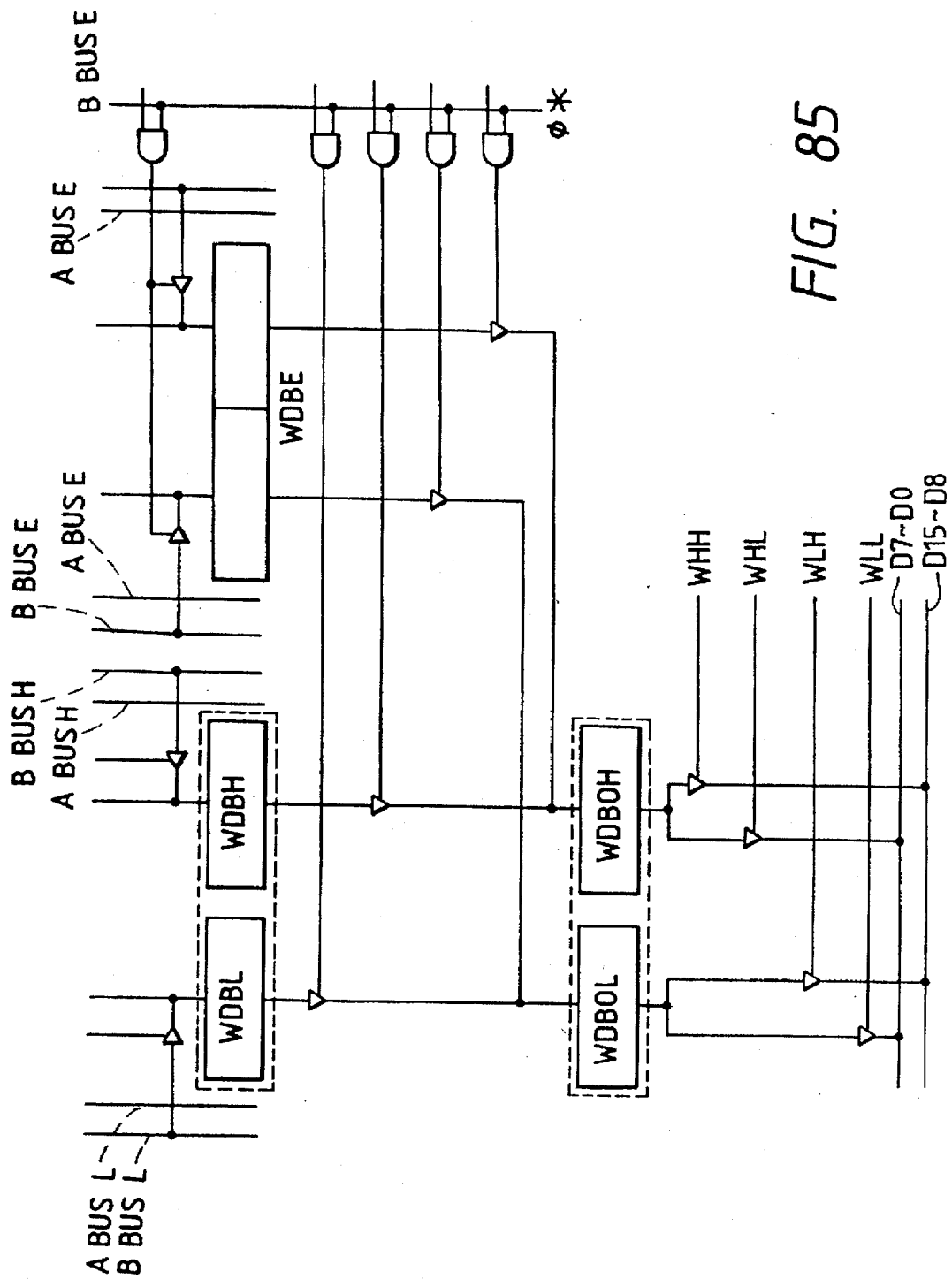
FIG. 85 is an explanatory diagram showing one example of the write data buffer which is applied to the CPU of FIG. 81.

FIG. 85 shows one example of the write data buffer to be controlled by the bus controller 202. What is different from FIG. 68 is the structure for outputting the data from the write data output buffers WDBOL and WDBOH to the data buses D15 to D0. Specifically, what of the high-order data buses D15 to D8 and the low-order data buses D7 to D0 the contents of the write data buffers WDBOL and WDBOH are to be outputted to is controlled at the unit of byte in accordance with control signals WHH, WLH, WHL and WLL.

Figure 86:
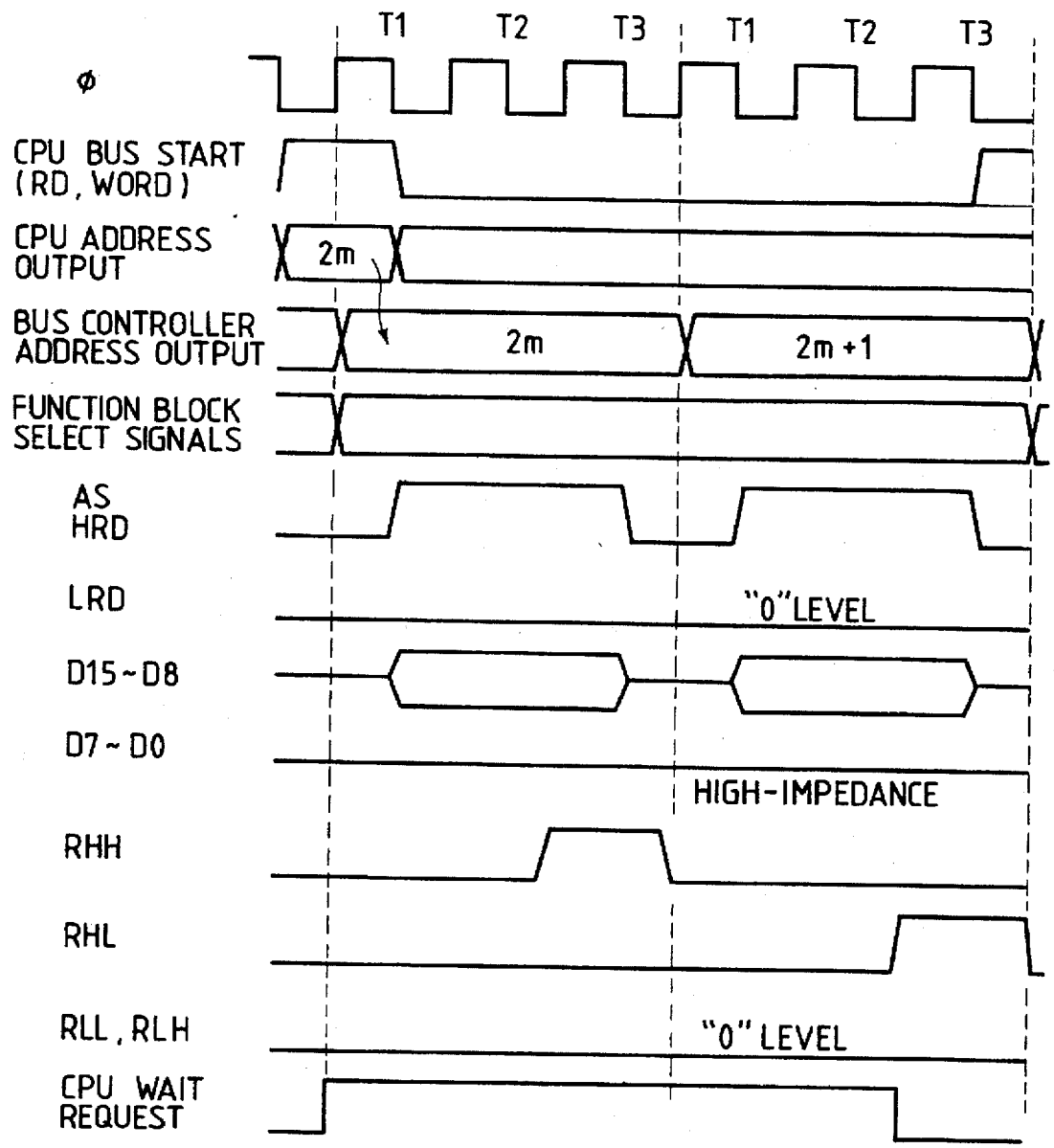
FIG. 86 is a timing chart showing one example of the operations of the bus controller and the CPU.

FIG. 86 shows one example of the operation timing chart of the read data buffer shown in FIG. 84. This is the case, in which the word data are read for the 6-bit bus and 8-state regions. The bus controller 202 is started by a read signal RD and a word signal WORD outputted from the CPU 1. In accordance with this example, the bus accesses are twice read operations each at 1 byte and are accomplished in the order of even and odd numbers. At the first read time, the data are latched in the high-order read data buffer from the high-order data buses D15 to D8. At the second read time, the data are latched in the low-order read data buffer from the high-order of the data buses D15 to D8. In this meanwhile, the wait request takes the 1 level so that the CPU 1 is brought into a wait state, and the word data are stored in the read data buffer when the wait state is released. The CPU 1 is enabled to execute the operations, as have been described with reference to FIGS. 51 to 55, by using the word data.

Figure 87:
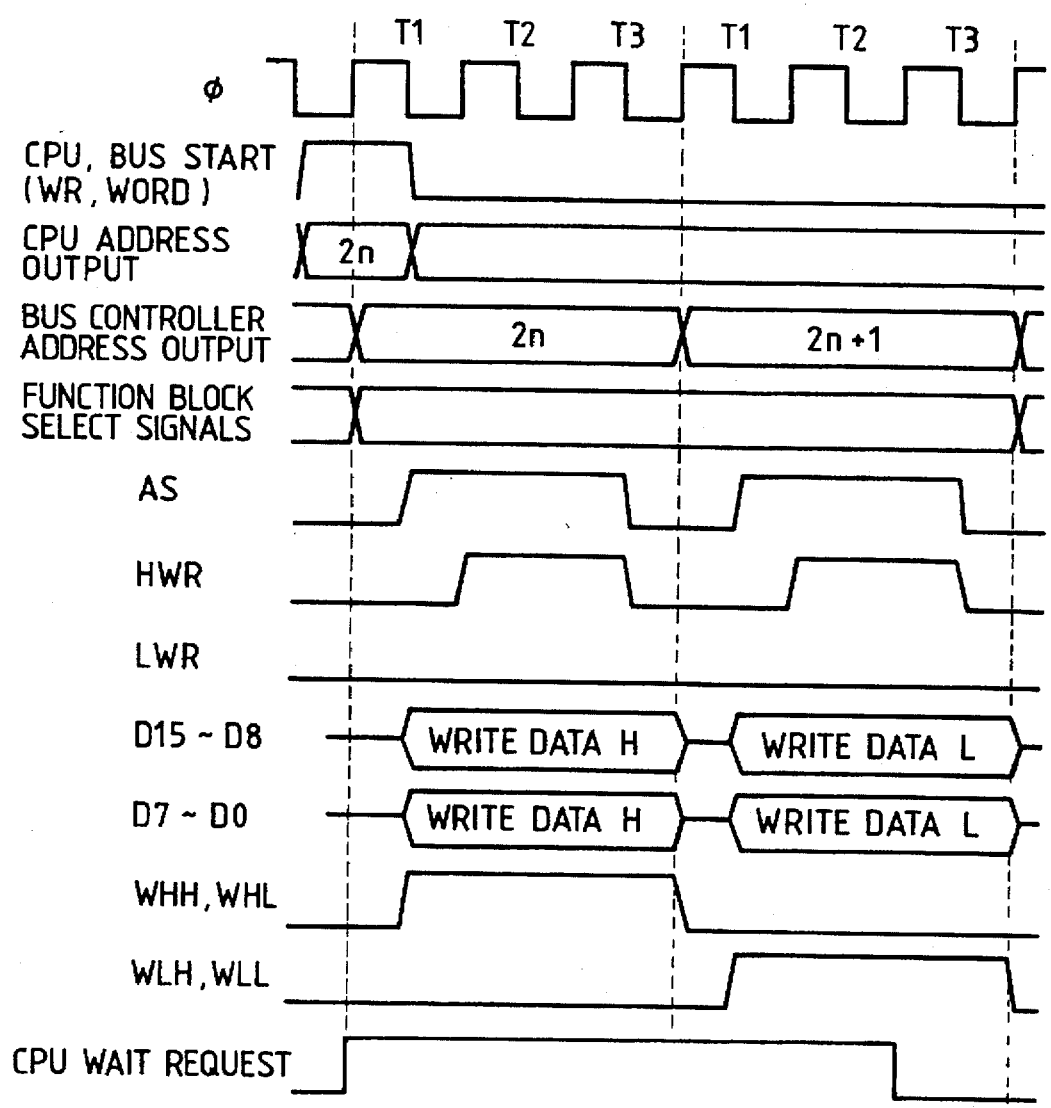
FIG. 87 is a timing chart showing another example of the operations of the bus controller and the CPU.

FIG. 87 shows one example of the operation timing chart of the write data buffer shown in FIG. 85. This is the case, in which the word data are written for the 8-bit and 3-state region. The bus controller 202 is started by a write signal WR and a word signal WORD outputted by the CPU 1. In accordance with this example, the bus accesses are twice write operations each at 1 byte and are accomplished in the order of even and odd numbers. The output data of the CPU are latched at a first state in the write data buffer WDBH, WDBL or WDBE. At a first write time, the data are outputted from the high-order write data output buffer WDBOH to the data buses D15 to D0. At a second write time, the data are outputted from the low-order write data output buffer WDBOL to the data buses D15 to D0. In this meanwhile, the wait request takes the 1 value so that the CPU 1 is in the wait state.

FIGS. 88 to 91 show one example of the output specifications of the control signals RHH, RHL, RLH and RLL and the control signals WHH, WHL, WLH and WLL. In the same FIGURE, the size B is the byte, and the size W is the word. Moreover: reference characters T1 designate a first state; reference characters T2 a second state; reference characters T3 a third state; and reference letters Tw a wait state. Moreover, sign—appearing in the FIGURE implies that no corresponding state exists. Incidentally, the specifications shown in the same FIGURE are made similar to those of the case in which the DMAC 201 executes the read/write operations.

[23] Modification of CPU

Figure 92:
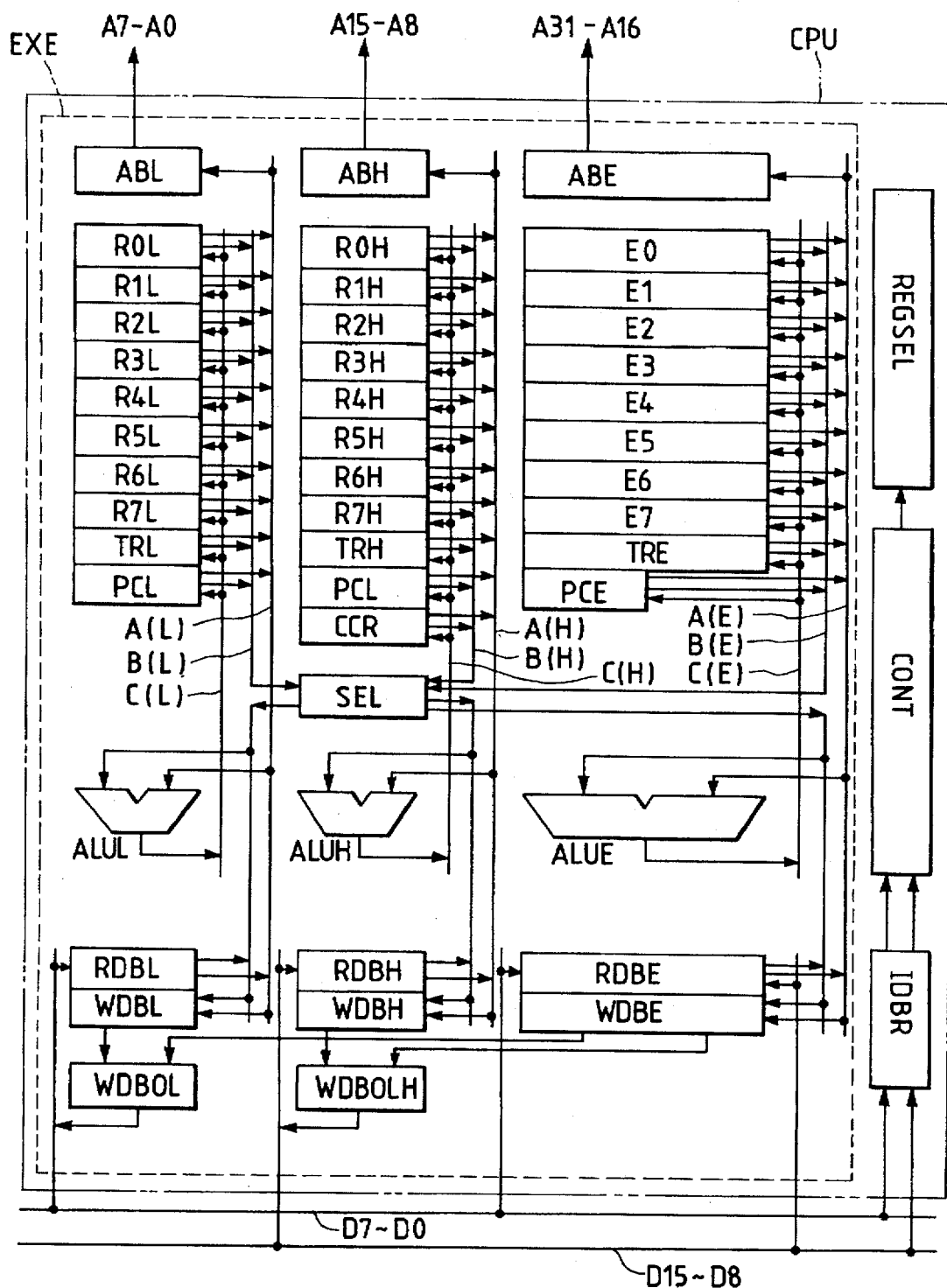
FIG. 92 is a block diagram showing another example of the CPU.

FIG. 92 shows another embodiment of the CPU. This CPU, as shown, is modified from the CPU 1 of FIG. 50 such that the address buffer AB (ABL, ABH, ABE) is expanded to 32 bits and such that it is equipped with an instruction coding read data buffer IDBR. The instruction select portion (op) of the instruction codes and the register select portion (rs, rd) are latched in the read data buffer IDBR for the instruction codes, and the effective address portion (d, aa, xx) is latched like before in the read data buffers RDBL, RDBH and RDBE in the EXEC. As the address buffer AB is expanded to 32 bits, the displacement in the instruction codes and the leading reserved region (as shown in FIGS. 45 and 47) of the absolute address are used so that all the 32 bits of the general register Ri and the expansion register Ei can be used as the address register. Since these operations can be easily realized from the description thus far made, their detailed description will be omitted.

In FIG. 92, the program counters PCL, PCH and PCE are given 24 bits, although not especially limitative thereto. However, there arises no problem because it seems seldom to prepare a program exceeding 16 Megabytes in the single-chip microcomputer. Especially in case the program counter is expanded to 32 bits, it is sufficient not only to expand the program counter PC in the EXEC to 32 bits but also to give 4 bytes to the vector region and the stack at the sub-routine call, or to give 6 bytes to the stack at the exception-handling time by giving 4 bytes to the program counter PC and 1 byte to the condition code register CCR.

[24] Effects of Embodiment (1) A wide address space of 16 Megabytes can be used while making the data processing efficient by using the registers Ri and Ei having 32 bits totally or partially as the address registers, by halving the register into two data registers of 16 bits and by enabling one of the data registers of 16 bits as a register of 8 bits.

(2) An address space of 4 Gigabytes can be used in the future by setting the instruction length to the unit of 2 bytes and by giving 4 bytes to the absolute address displacement of 24 bits including the reserved region.

(3) The instruction length can be shortened to improve the program efficiency by equalizing the number of registers to be used as registers of 8 bits and the number of registers to be used as registers of 16 bits.

(4) The logical and physical scales of a register select circuit can be reduced by constructing the register select portion in the instruction code of 8 bits selecting the register wholly and 1 bit selecting the register partially.

(5) The structures of the execution unit and the control unit can be simplified to reduce the logical and physical scales by setting the least significant bit of the effective address select portion in the instruction codes to the least significant bit of the word in the instruction codes.

(6) The structure of the write data buffer can be simplified to reduce the logical and physical scales by constructing the write data buffer of 82 bits connected with the internal bus and 16 bits connected with the data bus.

(7) The effective address select portion of 24 bits in the instruction codes and the long word data can be similarly handled to simplify the structure of the read data buffer thereby to reduce the logical and physical scales by constructing the read data buffer of 82 bits connected with the internal bus and 82 bits connected with the data bus, and by enabling the less significant 16 bits to input always at the reading time and by disabling the more significant 16 bits to input at the time of reading the less significant words of the long word data.

(8) The logical and physical scales of the entirety of the single-chip microcomputer can be reduced by controlling the read/write by the common bus control, in case the address space has regions of different accesses and in case the data transfer system for the read/write is provided in addition to the CPU, by causing the bus control system to control the read data buffer and the write data buffer of the CPU or the other data transfer system, and by bringing the CPU or the other data transfer system, if necessary, into the wait state.

(9) An address of 64 Kilobytes or more can be used by minimizing the logical and physical scales of the single-chip microcomputer.

Our invention has should not be restricted upon the foregoing embodiments but can naturally be modified in various manners within the scope thereof. For example, no restriction is exerted upon the examples of the block structure, register structure and specific logical circuits of the CPU 1. The bit number of the registers or the number of the registers themselves can be arbitrarily selected. The addressing mode and the method of calculating the effective address to be used can be modified in various manners.

In the description thus far made, our invention has been described mainly in case it is applied to the single-chip microcomputer backgrounding it. However, the invention should not be limited thereto but can be applied to another data processing system in which the data scale is more important than the data processing performance.

The effects obtainable from the representatives of the invention disclosed herein will be briefly described in the following.

The data latch means, which is constructed to have 82 bits in its entirety by adding the expansion register of 18 bits to the general register of 18 bits of the 8-bit CPU, can be used for the data latch in its entirety, by its halved one or by its twice halved one, so that it can be excellently used on the software and the hardware to achieve a reduction in the logical and physical scales of the data processing system. In respect of the latch of the address data using the data latching means wholly or partially, the linearly usable address space can be easily facilitated, and the program can be prepared and compiled more easily than the address space expanding technology using the page register. As a result, the program made of high level languages can be efficiently executed.

The instruction length can be shortened to improve the program efficiency by constructing each data latch means such that the portion to be used is formed by halving the entirety and by halving the once halved portion when the arithmetic instructions of n-bit data and 2n-bit data are considered, and by providing a plurality units of data latch means such that the total number of the portions halved for use is equalized to the total number of the portions twice halved for use.

The future expansion of the address space can be easily effected by doubling the instruction unit the unit of the data. Moreover, the structures of the execution means and the control means can be simplified to contribute to the reduction in the logical and physical scales by using the least significant bit of the effective address select portion in the instruction codes as the least significant bit of the word in the instruction codes.

The logical and physical scales of the select circuit or the instruction decode circuit for the aforementioned data latch means such as the register can be reduced by adopting the instruction format, in which the portion for selecting the data latch means is fixed in a portion of the unit of the instruction. In this case, moreover, the bit number of the register select portion in the instruction format can be minimized, even if the data to be latched in the data latch means and the address data extend over several kinds of bytes, words and long words, by composing the aforementioned select portion of the region for selecting a desired data latch means from the plurality of units and the region for selecting any portion of one data latch means, and by determining which of the halved portions or which of the twice halved portions is selected on the basis of the data size selected in the instruction by the region for selecting any portion in the aforementioned data latch means.

The structure of the write buffer means can be simplified to contribute to the reduction in the logical and physical scales of the data processing system by forming the write buffer means from the data latch means with the first portion of bit number coincident with the bit number of the aforementioned data latch means and the second portion of bit number coincident with the halved region of the aforementioned data latch means, and by latching the contents of the data latch means wholly in the aforementioned first portion on the basis of the instruction of the data write and by transferring and outputting the data latched in the first portion twice to the second portion.

The structure of the read buffer means can be simplified to contribute to the reduction in the logical and physical scales of the data processing system by giving the bit number coincident with the data latch means to the read buffer means such as the aforementioned data latch means and by halving It Into the high- and low-order portions so that the low-order portion may always latch the read data on the basis of the instruction of the data read whereas the high-order portion may be selected to latch it or not.

In respect of the structure for the bus access, the logical and physical scales of the whole microcomputer can be reduced by controlling the read/write of the data transfer system, if any in addition to the data processing system such as the CPU, which has the regions for accessing in different states in the address space, by the common bus control system, by enabling the bus control system to control the CPU or the read buffer means or the write buffer means contained in the other data transfer system, and by bringing the CPU or the other data transfer system, if necessary, into the wait state.

What is claimed is:

1. A single chip data processing device comprising:
   a register which includes a first register portion having a predetermined first bit length and a second register portion having a predetermined second bit length;
   an arithmetic and logic operation section coupled to the register and including a first arithmetic and logic unit coupled to the first register portion for executing an arithmetic and logic operation and a second arithmetic and logic unit coupled to the second register portion for executing an arithmetic operation; and
   a condition code register having a plurality of bits whose contents are changed in accordance with an operation of the arithmetic and logic operation section,
   wherein the arithmetic and logic operation section executes an address operation between address data stored in the first and the second register portions and first data provided from another location by using the first arithmetic and logic unit and the second arithmetic and logic unit to execute the address operation, and
   wherein the arithmetic and logic operation section executes a data operation between second data stored in the first register portion and third data by using the first arithmetic and logic unit to execute the data operation.

2. The single chip data processing device according to claim 1, wherein the arithmetic and logic operation section is controlled by decoding an instruction.

3. The single chip data processing device according to claim 2, wherein the address data obtained by the address operation is used in addressing a memory, and wherein the first data which is provided to the arithmetic and logic operation section during the data operation is provided from the memory.

4. The single chip data processing device according to claim 1, wherein the plurality of bits in the condition code register includes an overflow bit which is changed in response to occurrence of an overflow in the data operation performed by the first arithmetic and logic unit and which is not changed in the address operation performed by the first arithmetic and logic unit and the second arithmetic and logic unit.

5. The single chip data processing device according to claim 1, wherein, in the address operation, carry/borrow data which is generated in the arithmetic operation with the first register portion and the first arithmetic and logic unit is transferred by the arithmetic operation to the second register portion and the second arithmetic and logic unit.

6. The single chip data processing device according to claim 1, wherein a bit length of the register is equal to a bit length of data to be operated on by the arithmetic and logic operation section.

7. The single chip data processing device according to claim 6, wherein in the address operation, carry/borrow data which is generated in the arithmetic operation performed by the first arithmetic and logic unit is transferred to the second register portion and the second arithmetic and logic unit for use in the arithmetic operation performed by the second arithmetic and logic unit.

8. The single chip data processing device according to claim 7, wherein the plurality of bits in the condition code register includes an overflow bit which overflow bit is:
   changed in response to occurrence of an overflow in the data operation by the first arithmetic and logic unit, and
   not changed in the address operation by the first and second arithmetic and logic units.

9. The single chip data processing device according to claim 1, further comprising a plurality of first registers, a plurality of second registers, and a selecting circuit which selects one of the plurality of first registers as the register.

10. A single chip data processing device comprising:
    an address register which includes a first register portion having a predetermined first bit length and a second register portion having a predetermined second bit length;
    an arithmetic and logic section coupled to the register and including a first arithmetic and logic unit which executes an arithmetic operation and a second arithmetic and logic unit which executes an arithmetic operation, the arithmetic and logic section performing:
    an address operation in which the first and second arithmetic and logic units combined to operate on address data from the first and second register portions as a unit and other received data;
    a data operation in which the first arithmetic and logic unit operates separately from the second arithmetic and logic unit on data stored in the first register portion and other received data; and,
    a condition code register having a plurality of bits whose contents are changed in accordance with the operation of the arithmetic and logic unit section.

11. The single chip data processing device according to claim 10, wherein the plurality of bits in the condition code register includes an overflow bit which is changed in response to occurrence of an overflow in the data operation by the first arithmetic and logic unit and the overflow bit which is not changed in the address operation by the first arithmetic and logic unit and the second arithmetic and logic unit.

12. The single chip data processing device according to claim 10, wherein in the address operation, carry/borrow data which is generated in the arithmetic operation from the first register portion and the first arithmetic and logic unit is transferred to the arithmetic operation by the second register portion and the second arithmetic and logic unit.

13. The single chip data processing device according to claim 10, wherein a bit length of the register is equal to a bit length of data to be operated on by the arithmetic and logic operation section.

14. A method of processing data and addresses with a single chip data processing device that includes a register having a first register portion for storing addresses or data of a first bit length and a second register portion for storing addresses or data of a second bit length, the first and second register portions being operable in tandem to store addresses or data of a third bit length equal to the sum of the first and second bit lengths, an arithmetic and logic section having a first arithmetic and logic unit for executing an arithmetic and logic operation and a second arithmetic and logic unit for executing an arithmetic operation, and a condition code register whose contents change in accordance with operations performed by the arithmetic and logic section, the method comprising:

performing an address operation to generate a new address, the address operation including:
retrieving a first address portion from the first register portion and a second address portion from the second register portion,
cooperatively (i) operating on the first address portion and other provided data with the first arithmetic and logic unit and (ii) operating on the second address portion and the other provided data with the second arithmetic and logic unit to cooperatively generate the new address;

performing a data operation, the data operation including:
retrieving data of the first bit length from the first register portion,
performing the arithmetic and logic operation on the first bit length data and other provided data with the first arithmetic and logic unit alone;

updating the conditional code register contents in accordance with the address and data operations.

15. The method of processing data and addresses with single chip data processing device according to claim 14, wherein the plurality of bits in the condition code register includes an overflow bit and further including:

changing the overflow bit in response to occurrence of an overflow in the data operation, and not changing the overflow bit in the address operation.

16. The method of processing data and addresses with single chip data processing device according to claim 14, further including:

generating carry/borrow data in the address operation;

storing the carry/borrow data in the second register portion; and operating on the carry/borrow data retrieved from the second register portion with the second arithmetic and logic unit.

17. The method of processing data and addresses with single chip data processing device according to claim 14, wherein a bit length of the register is equal to a bit length of data to be operated on by the arithmetic and logic section.

* * * * *